United States Patent
Davis et al.

(10) Patent No.: US 9,491,146 B2
(45) Date of Patent: *Nov. 8, 2016

(54) COMPUTATIONAL SYSTEMS AND METHODS FOR ENCRYPTING DATA FOR ANONYMOUS STORAGE

(71) Applicant: Elwha LLC, Bellevue, WA (US)

(72) Inventors: Marc E. Davis, San Francisco, CA (US); Matthew G. Dyor, Bellevue, WA (US); William Gates, Medina, WA (US); Xuedong Huang, Bellevue, WA (US); Roderick A. Hyde, Redmond, WA (US); Edward K. Y. Jung, Bellevue, WA (US); Jordin T. Kare, Seattle, WA (US); Royce A. Levien, Lexington, MA (US); Richard T. Lord, Tacoma, WA (US); Robert W. Lord, Seattle, WA (US); Qi Lu, Bellevue, WA (US); Mark A. Malamud, Seattle, WA (US); Nathan P. Myhrvold, Medina, WA (US); Satya Nadella, Clyde Hill, WA (US); Danny Allen Reed, Iowa City, IA (US); Harry Shum, Medina, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 195 days.

This patent is subject to a terminal disclaimer.

(21) Appl. No.: 13/830,343

(22) Filed: Mar. 14, 2013

(65) Prior Publication Data

US 2013/0290700 A1    Oct. 31, 2013

Related U.S. Application Data

(63) Continuation-in-part of application No. 13/199,832, filed on Sep. 7, 2011, and a continuation-in-part of application No. 13/199,829, filed on Sep. 9, 2011, now Pat. No. 9,183,520, and a continuation-in-part of (Continued)

(51) Int. Cl.
*H04L 29/06*      (2006.01)
*G06Q 10/10*      (2012.01)
(Continued)

(52) U.S. Cl.
CPC ........... *H04L 63/0428* (2013.01); *G06Q 10/10* (2013.01); *G06Q 50/01* (2013.01);
(Continued)

(58) Field of Classification Search
CPC . H04L 63/0428; H04L 9/0825; H04L 9/088; H04L 9/0894; H04L 9/3236; H04L 9/0866; G06Q 10/10; G06Q 50/01
USPC .................................................. 713/168, 153
See application file for complete search history.

(56) References Cited

U.S. PATENT DOCUMENTS 5,870,473 A    2/1999  Boesch et al.
5,878,141 A    3/1999  Daly et al.
(Continued)

OTHER PUBLICATIONS

Dancu, John; "Using Identity and Age Verification within Social Networking Sites"; bearing date of Jul. 21, 2008 (retrieved on Apr. 13, 2014), as provided by examiner; pp. 1-4; located at: http://cyber.law.harvard.edu/sites/cyber.law.harvard.edu/files/IDology_IST-TFTAB_submission.pdf (Continued)

*Primary Examiner* — Kambiz Zand
*Assistant Examiner* — Aubrey Wyszynski

(57) ABSTRACT

Methods, apparatuses, computer program products, devices and systems are described that carry out accepting from a user identifier encryption entity at least one encrypted identifier corresponding to a user having at least one instance of data for encryption; encrypting the at least one instance of data to produce level-one-encrypted data; associating the at least one encrypted identifier with the level-one-encrypted data, wherein a level-one decryption key for the level-one-encrypted data is inaccessible to the user identifier encryption entity; and transmitting the level-one-encrypted data and associated encrypted identifier.

22 Claims, 81 Drawing Sheets

Related U.S. Application Data application No. 13/200,806, filed on Sep. 30, 2011, and a continuation-in-part of application No. 13/200,810, filed on Sep. 30, 2011, now Pat. No. 9,141,977, and a continuation-in-part of application No. 13/373,542, filed on Nov. 16, 2011, and a continuation-in-part of application No. 13/373,572, filed on Nov. 17, 2011, and a continuation-in-part of application No. 13/373,871, filed on Dec. 2, 2011, now Pat. No. 9,167,099, and a continuation-in-part of application No. 13/373,872, filed on Dec. 2, 2011, and a continuation-in-part of application No. 13/374,247, filed on Dec. 16, 2011, and a continuation-in-part of application No. 13/374,246, filed on Dec. 16, 2011, and a continuation-in-part of application No. 13/374,428, filed on Dec. 27, 2011, and a continuation-in-part of application No. 13/374,429, filed on Dec. 27, 2011, now Pat. No. 9,159,055, and a continuation-in-part of application No. 13/374,532, filed on Dec. 29, 2011, and a continuation-in-part of application No. 13/374,535, filed on Dec. 29, 2011, and a continuation-in-part of application No. 13/374,534, filed on Dec. 29, 2011, and a continuation-in-part of application No. 13/374,530, filed on Dec. 29, 2011, and a continuation-in-part of application No. 13/374,513, filed on Dec. 30, 2011, and a continuation-in-part of application No. 13/374,526, filed on Dec. 30, 2011, and a continuation-in-part of application No. 13/374,528, filed on Dec. 30, 2011, and a continuation-in-part of application No. 13/374,523, filed on Dec. 30, 2011.

(51) Int. Cl.
  *H04L 9/08* (2006.01)
  *H04L 9/32* (2006.01)
  *G06Q 50/00* (2012.01)

(52) U.S. Cl.
  CPC ............ *H04L 9/088* (2013.01); *H04L 9/0825* (2013.01); *H04L 9/0866* (2013.01); *H04L 9/0894* (2013.01); *H04L 9/3236* (2013.01)

(56) References Cited

U.S. PATENT DOCUMENTS

| | | | |
|---|---|---|---|
| 5,944,787 A | 8/1999 | Zoken | |
| 5,978,373 A | 11/1999 | Hoff et al. | |
| 5,987,440 A | 11/1999 | O'Neil et al. | |
| 5,988,497 A | 11/1999 | Wallace | |
| 6,018,761 A | 1/2000 | Uomini | |
| 6,141,010 A | 10/2000 | Hoyle | |
| 6,763,020 B1 | 7/2004 | Hon | |
| 7,016,866 B1 | 3/2006 | Chin et al. | |
| 7,246,315 B1 | 7/2007 | Andrieu et al. | |
| 7,318,049 B2 | 1/2008 | Iannacci | |
| 7,334,184 B1 | 2/2008 | Simons | |
| 7,340,048 B2 | 3/2008 | Stern et al. | |
| 7,636,853 B2 | 12/2009 | Cluts et al. | |
| 7,895,177 B2 | 2/2011 | Wu | |
| 7,925,708 B2 | 4/2011 | Davis et al. | |
| 8,244,556 B1 | 8/2012 | Ringold | |
| 8,256,013 B1 | 8/2012 | Hernacki et al. | |
| 8,332,517 B2 | 12/2012 | Russell | |
| 8,365,257 B1 | 1/2013 | Causey et al. | |
| 8,549,412 B2 | 10/2013 | Brezina et al. | |
| 8,595,069 B2 | 11/2013 | Shkedi et al. | |
| 8,600,343 B2 | 12/2013 | Brezina et al. | |
| 8,650,103 B2 | 2/2014 | Wilf et al. | |
| 8,713,027 B2 | 4/2014 | Forutanpour et al. | |
| 8,768,838 B1 | 7/2014 | Hoffman | |
| 8,863,256 B1 | 10/2014 | Addepalli et al. | |
| 2001/0027413 A1 | 10/2001 | Bhutta | |
| 2002/0026382 A1 | 2/2002 | Nakajima | |
| 2002/0032785 A1 | 3/2002 | Britt, Jr. | |
| 2002/0049907 A1 | 4/2002 | Woods et al. | |
| 2002/0055884 A1 | 5/2002 | Tokuma | |
| 2002/0062438 A1 | 5/2002 | Asay et al. | |
| 2002/0062451 A1* | 5/2002 | Scheidt et al. | 713/201 |
| 2002/0073041 A1 | 6/2002 | Kumhyr | |
| 2002/0085511 A1 | 7/2002 | Koponen et al. | |
| 2002/0120714 A1 | 8/2002 | Agapiev | |
| 2002/0174363 A1 | 11/2002 | Chefalas et al. | |
| 2003/0009418 A1 | 1/2003 | Green et al. | |
| 2003/0061170 A1 | 3/2003 | Uzo | |
| 2003/0107606 A1 | 6/2003 | Capps et al. | |
| 2003/0126092 A1 | 7/2003 | Chihara | |
| 2003/0126094 A1 | 7/2003 | Fisher et al. | |
| 2003/0130919 A1 | 7/2003 | Templeton et al. | |
| 2003/0131260 A1 | 7/2003 | Hanson et al. | |
| 2003/0149781 A1 | 8/2003 | Yared et al. | |
| 2003/0154171 A1 | 8/2003 | Karp et al. | |
| 2003/0177361 A1 | 9/2003 | Wheeler et al. | |
| 2004/0030637 A1 | 2/2004 | Robison et al. | |
| 2004/0070566 A1 | 4/2004 | Ashton | |
| 2004/0199592 A1 | 10/2004 | Gould et al. | |
| 2005/0060532 A1 | 3/2005 | Dorenbosch et al. | |
| 2005/0091072 A1 | 4/2005 | Dunn et al. | |
| 2005/0149854 A1 | 7/2005 | Pennell et al. | |
| 2005/0171954 A1 | 8/2005 | Hull et al. | |
| 2005/0216953 A1 | 9/2005 | Ellingson | |
| 2006/0005020 A1 | 1/2006 | Hardt | |
| 2006/0020821 A1* | 1/2006 | Waltermann et al. | 713/189 |
| 2006/0029228 A1* | 2/2006 | Lagrange et al. | 380/201 |
| 2006/0036951 A1 | 2/2006 | Marion et al. | |
| 2006/0136561 A1 | 6/2006 | Lee | |
| 2006/0161501 A1 | 7/2006 | Waserstein et al. | |
| 2006/0178986 A1 | 8/2006 | Giordano et al. | |
| 2006/0179114 A1 | 8/2006 | Deeds | |
| 2006/0195364 A1 | 8/2006 | Shroff et al. | |
| 2006/0198351 A1 | 9/2006 | Baek | |
| 2006/0206413 A1 | 9/2006 | Van Luchene et al. | |
| 2006/0212407 A1 | 9/2006 | Lyon | |
| 2006/0212713 A1 | 9/2006 | Hatakeda | |
| 2006/0242245 A1 | 10/2006 | Christensen | |
| 2006/0251008 A1 | 11/2006 | Wu et al. | |
| 2006/0288394 A1 | 12/2006 | Thomas et al. | |
| 2007/0042755 A1 | 2/2007 | Singhal | |
| 2007/0061301 A1 | 3/2007 | Ramer et al. | |
| 2007/0067448 A1 | 3/2007 | Giroux et al. | |
| 2007/0087822 A1 | 4/2007 | Van Luchene | |
| 2007/0094042 A1 | 4/2007 | Ramer et al. | |
| 2007/0121856 A1 | 5/2007 | Alperin et al. | |
| 2007/0150603 A1 | 6/2007 | Crull et al. | |
| 2007/0192179 A1 | 8/2007 | Van Luchene | |
| 2007/0198410 A1 | 8/2007 | Labgold et al. | |
| 2007/0202484 A1 | 8/2007 | Toombs et al. | |
| 2007/0214180 A1 | 9/2007 | Crawford | |
| 2007/0226303 A1 | 9/2007 | Provo | |
| 2007/0250585 A1 | 10/2007 | Ly et al. | |
| 2008/0005793 A1 | 1/2008 | Wenig et al. | |
| 2008/0021958 A1 | 1/2008 | Foote | |
| 2008/0071808 A1 | 3/2008 | Hardt et al. | |
| 2008/0083826 A1 | 4/2008 | Henry et al. | |
| 2008/0097849 A1 | 4/2008 | Ramsaier et al. | |
| 2008/0109473 A1 | 5/2008 | Dixon et al. | |
| 2008/0114776 A1 | 5/2008 | Sun et al. | |
| 2008/0125085 A1 | 5/2008 | Ullah | |
| 2008/0127331 A1 | 5/2008 | Seidman et al. | |
| 2008/0183832 A1 | 7/2008 | Kirkland et al. | |
| 2008/0207327 A1 | 8/2008 | Van Luchene et al. | |
| 2008/0243873 A1 | 10/2008 | Shah et al. | |
| 2008/0301112 A1 | 12/2008 | Wu | |
| 2008/0308624 A1 | 12/2008 | Gardner | |
| 2009/0006614 A1 | 1/2009 | Le et al. | |
| 2009/0006628 A1 | 1/2009 | Webb et al. | |
| 2009/0006940 A1 | 1/2009 | Hardt | |
| 2009/0031232 A1 | 1/2009 | Brezina et al. | |
| 2009/0043502 A1 | 2/2009 | Shaffer et al. | |
| 2009/0061406 A1 | 3/2009 | Clayton et al. | |
| 2009/0089176 A1 | 4/2009 | McCabe | |

(56) References Cited

U.S. PATENT DOCUMENTS

| | | |
|---|---|---|
| 2009/0099924 A1 | 4/2009 | Lensch et al. |
| 2009/0106415 A1 | 4/2009 | Brezina et al. |
| 2009/0141876 A1 | 6/2009 | Carter et al. |
| 2009/0144211 A1 | 6/2009 | O'Sullivan et al. |
| 2009/0149166 A1 | 6/2009 | Habib et al. |
| 2009/0157560 A1 | 6/2009 | Carter et al. |
| 2009/0171690 A1 | 7/2009 | Lubarski et al. |
| 2009/0225967 A1 | 9/2009 | Koch |
| 2009/0227290 A1 | 9/2009 | Chien |
| 2009/0259560 A1 | 10/2009 | Bachenheimer |
| 2009/0260064 A1 | 10/2009 | McDowell et al. |
| 2009/0271764 A1 | 10/2009 | Gonzales, II |
| 2009/0282187 A1 | 11/2009 | Ito et al. |
| 2009/0292640 A1 | 11/2009 | Heatherly |
| 2009/0292814 A1 | 11/2009 | Ting et al. |
| 2009/0319387 A1 | 12/2009 | Keithley et al. |
| 2009/0324022 A1 | 12/2009 | Sangberg et al. |
| 2009/0327296 A1 | 12/2009 | Francis et al. |
| 2009/0328173 A1 | 12/2009 | Jakobson et al. |
| 2010/0010887 A1 | 1/2010 | Karlin et al. |
| 2010/0042414 A1 | 2/2010 | Lewis et al. |
| 2010/0042470 A1 | 2/2010 | Chang et al. |
| 2010/0054600 A1 | 3/2010 | Anbalagan et al. |
| 2010/0063889 A1 | 3/2010 | Proctor, Jr. et al. |
| 2010/0076955 A1 | 3/2010 | Van Steenbergen et al. |
| 2010/0082431 A1 | 4/2010 | Ramer et al. |
| 2010/0088752 A1 | 4/2010 | Nagulakonda et al. |
| 2010/0088753 A1 | 4/2010 | Ayres et al. |
| 2010/0100424 A1 | 4/2010 | Buchanan et al. |
| 2010/0106620 A1 | 4/2010 | Marcus |
| 2010/0107152 A1 | 4/2010 | Kwon |
| 2010/0113001 A1 | 5/2010 | Tenbrook et al. |
| 2010/0113162 A1 | 5/2010 | Vemuri et al. |
| 2010/0131589 A1 | 5/2010 | Lawyer et al. |
| 2010/0144442 A1 | 6/2010 | Yanow |
| 2010/0146639 A1 | 6/2010 | Kim et al. |
| 2010/0153148 A1 | 6/2010 | Johnson et al. |
| 2010/0180001 A1 | 7/2010 | Hardt |
| 2010/0191590 A1 | 7/2010 | Hakkarainen et al. |
| 2010/0211637 A1 | 8/2010 | Borzsei et al. |
| 2010/0228726 A1 | 9/2010 | Slinker et al. |
| 2010/0228767 A1 | 9/2010 | Slinker et al. |
| 2010/0235288 A1 | 9/2010 | Kisbye |
| 2010/0268830 A1 | 10/2010 | McKee et al. |
| 2010/0279713 A1 | 11/2010 | Dicke |
| 2010/0296505 A1 | 11/2010 | Kissinger et al. |
| 2010/0312636 A1 | 12/2010 | Coulter et al. |
| 2010/0313009 A1 | 12/2010 | Combet et al. |
| 2010/0318614 A1 | 12/2010 | Sager et al. |
| 2010/0322396 A1 | 12/2010 | Southerland |
| 2010/0324989 A1 | 12/2010 | Etchegoyen |
| 2011/0010423 A1 | 1/2011 | Thatcher et al. |
| 2011/0022621 A1 | 1/2011 | Luo et al. |
| 2011/0029616 A1 | 2/2011 | Wang et al. |
| 2011/0040609 A1 | 2/2011 | Hawkins et al. |
| 2011/0053574 A1 | 3/2011 | Rice |
| 2011/0060905 A1 | 3/2011 | Stack et al. |
| 2011/0072109 A1 | 3/2011 | Robb et al. |
| 2011/0082737 A1 | 4/2011 | Crowe et al. |
| 2011/0093949 A1 | 4/2011 | Macrae |
| 2011/0099612 A1 | 4/2011 | Lee et al. |
| 2011/0106429 A1 | 5/2011 | Poppen et al. |
| 2011/0106610 A1 | 5/2011 | Landis et al. |
| 2011/0110364 A1 | 5/2011 | Fried et al. |
| 2011/0131491 A1 | 6/2011 | Lu et al. |
| 2011/0137932 A1 | 6/2011 | Wable |
| 2011/0142299 A1 | 6/2011 | Akbarzadeh et al. |
| 2011/0145273 A1 | 6/2011 | Kolathaya et al. |
| 2011/0159856 A1 | 6/2011 | Walsh et al. |
| 2011/0165896 A1 | 7/2011 | Stromberg et al. |
| 2011/0183651 A1 | 7/2011 | Mundy et al. |
| 2011/0191177 A1 | 8/2011 | Blackhurst et al. |
| 2011/0191433 A1 | 8/2011 | Du |
| 2011/0209194 A1 | 8/2011 | Kennedy |
| 2011/0213785 A1 | 9/2011 | Kristiansson et al. |
| 2011/0215949 A1 | 9/2011 | Yarnold et al. |
| 2011/0225048 A1 | 9/2011 | Nair |
| 2011/0231282 A1 | 9/2011 | Dai |
| 2011/0258049 A1 | 10/2011 | Ramer et al. |
| 2011/0264648 A1 | 10/2011 | Gulik et al. |
| 2011/0269424 A1 | 11/2011 | Multer et al. |
| 2011/0288868 A1 | 11/2011 | Lloyd et al. |
| 2011/0289132 A1 | 11/2011 | Polis et al. |
| 2011/0289143 A1 | 11/2011 | Polis et al. |
| 2011/0289153 A1 | 11/2011 | Hull et al. |
| 2011/0298701 A1 | 12/2011 | Holzer et al. |
| 2011/0320282 A1 | 12/2011 | Ramer et al. |
| 2011/0320314 A1 | 12/2011 | Brown |
| 2012/0005221 A1 | 1/2012 | Ickman et al. |
| 2012/0017266 A1 | 1/2012 | DiChiara et al. |
| 2012/0022927 A1 | 1/2012 | Yankovich et al. |
| 2012/0022931 A1 | 1/2012 | Syed et al. |
| 2012/0027189 A1 | 2/2012 | Shaffer et al. |
| 2012/0030724 A1 | 2/2012 | Godas et al. |
| 2012/0036015 A1 | 2/2012 | Sheikh |
| 2012/0036364 A1 | 2/2012 | Yoneda et al. |
| 2012/0041830 A1 | 2/2012 | Rothschild et al. |
| 2012/0042320 A1 | 2/2012 | Jamjoom et al. |
| 2012/0044089 A1 | 2/2012 | Yarnold et al. |
| 2012/0066142 A1 | 3/2012 | Jenkins et al. |
| 2012/0066301 A1 | 3/2012 | Holland |
| 2012/0069731 A1 | 3/2012 | Tooher et al. |
| 2012/0071131 A1 | 3/2012 | Zisapel et al. |
| 2012/0077462 A1 | 3/2012 | Rozensztejn et al. |
| 2012/0079019 A1 | 3/2012 | Miettinen et al. |
| 2012/0084078 A1 | 4/2012 | Moganti et al. |
| 2012/0094642 A1 | 4/2012 | Pöpperl et al. |
| 2012/0116979 A1 | 5/2012 | Hatch et al. |
| 2012/0130898 A1 | 5/2012 | Snyder et al. |
| 2012/0131350 A1 | 5/2012 | Atherton |
| 2012/0143859 A1 | 6/2012 | Lymperopoulos et al. |
| 2012/0143968 A1 | 6/2012 | Oren et al. |
| 2012/0148043 A1 | 6/2012 | Tofighbakhsh |
| 2012/0150742 A1 | 6/2012 | Poon et al. |
| 2012/0166530 A1 | 6/2012 | Tseng |
| 2012/0182935 A1 | 7/2012 | Addepalli et al. |
| 2012/0192258 A1 | 7/2012 | Spencer et al. |
| 2012/0196581 A1 | 8/2012 | Papakipos et al. |
| 2012/0196629 A1 | 8/2012 | Movsesyan et al. |
| 2012/0203846 A1 | 8/2012 | Hull et al. |
| 2012/0203853 A1 | 8/2012 | Davis et al. |
| 2012/0214442 A1 | 8/2012 | Crawford et al. |
| 2012/0244875 A1 | 9/2012 | Cardona et al. |
| 2012/0246075 A1* | 9/2012 | Rasti ............................. 705/44 |
| 2012/0246089 A1 | 9/2012 | Sikes |
| 2012/0251077 A1 | 10/2012 | Stewart et al. |
| 2012/0254774 A1 | 10/2012 | Patton |
| 2012/0257753 A1 | 10/2012 | Ochikubo et al. |
| 2012/0290468 A1 | 11/2012 | Benco et al. |
| 2012/0303616 A1 | 11/2012 | Abuelsaad et al. |
| 2013/0006749 A1 | 1/2013 | Fink et al. |
| 2013/0013727 A1 | 1/2013 | Walker |
| 2013/0019089 A1 | 1/2013 | Guidotti et al. |
| 2013/0030922 A1 | 1/2013 | Shalabi et al. |
| 2013/0031009 A1 | 1/2013 | Kapoor et al. |
| 2013/0040654 A1 | 2/2013 | Parish |
| 2013/0041961 A1 | 2/2013 | Thrower, III et al. |
| 2013/0047100 A1 | 2/2013 | Kroeger et al. |
| 2013/0051542 A1 | 2/2013 | Yao et al. |
| 2013/0060850 A1 | 3/2013 | Davis et al. |
| 2013/0061050 A1 | 3/2013 | Davis et al. |
| 2013/0061127 A1 | 3/2013 | Reyes et al. |
| 2013/0185285 A1 | 7/2013 | Shuman et al. |
| 2013/0332700 A1 | 12/2013 | Kopylovitz et al. |
| 2014/0045454 A1 | 2/2014 | Monjas Llorente et al. |
| 2014/0048454 A1 | 2/2014 | Birken et al. |
| 2014/0058568 A1 | 2/2014 | Imes et al. |
| 2014/0067702 A1 | 3/2014 | Rathod |
| 2014/0068270 A1 | 3/2014 | Shenoy |

(56) References Cited

U.S. PATENT DOCUMENTS

| | | |
|---|---|---|
| 2014/0087687 A1 | 3/2014 | Brezina et al. |
| 2014/0128001 A1 | 5/2014 | Imes et al. |
| 2014/0222690 A1 | 8/2014 | Wilf et al. |

OTHER PUBLICATIONS

Milian, Mark; "Facebook lets users opt out of facial recognition"; CNN Tech; Jun. 9, 2011; pp. 1-5; retrieved by examiner on May 30, 2013; CNN Cable News Network, Turner Broadcasting System, Inc.; http://www.cnn.com/2011/TECH/socialmedia/06/07/facebook.facial.recognition/index.html.

"How to Set Up an ICE Contact on Your iPhone"; The Backup Plan; Jun. 21, 2010; 11 pages; located at mn10.wordpress.com/2010/06/21/how-to-set-up-an-ice-contact-on-your-iphone/.

Spivack, Nova; "How Siri Works—Interview with Tom Gruber, CTO of SIRI"; Jan. 26, 2010; 9 pages; located at http://www.novaspivack.com/technology/how-hisiri-works-interview-with-tom-gruber-cto . . . .

* cited by examiner

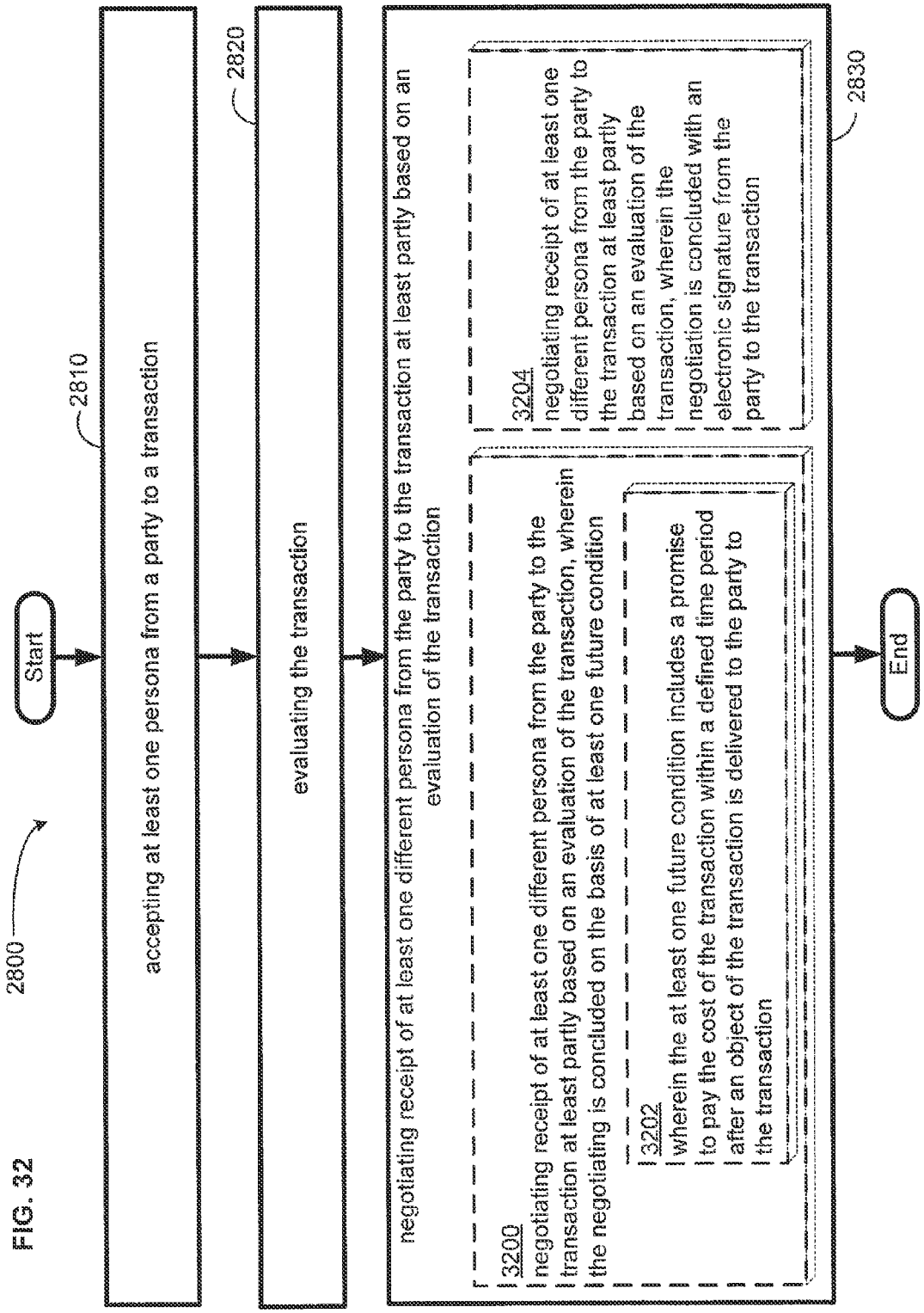

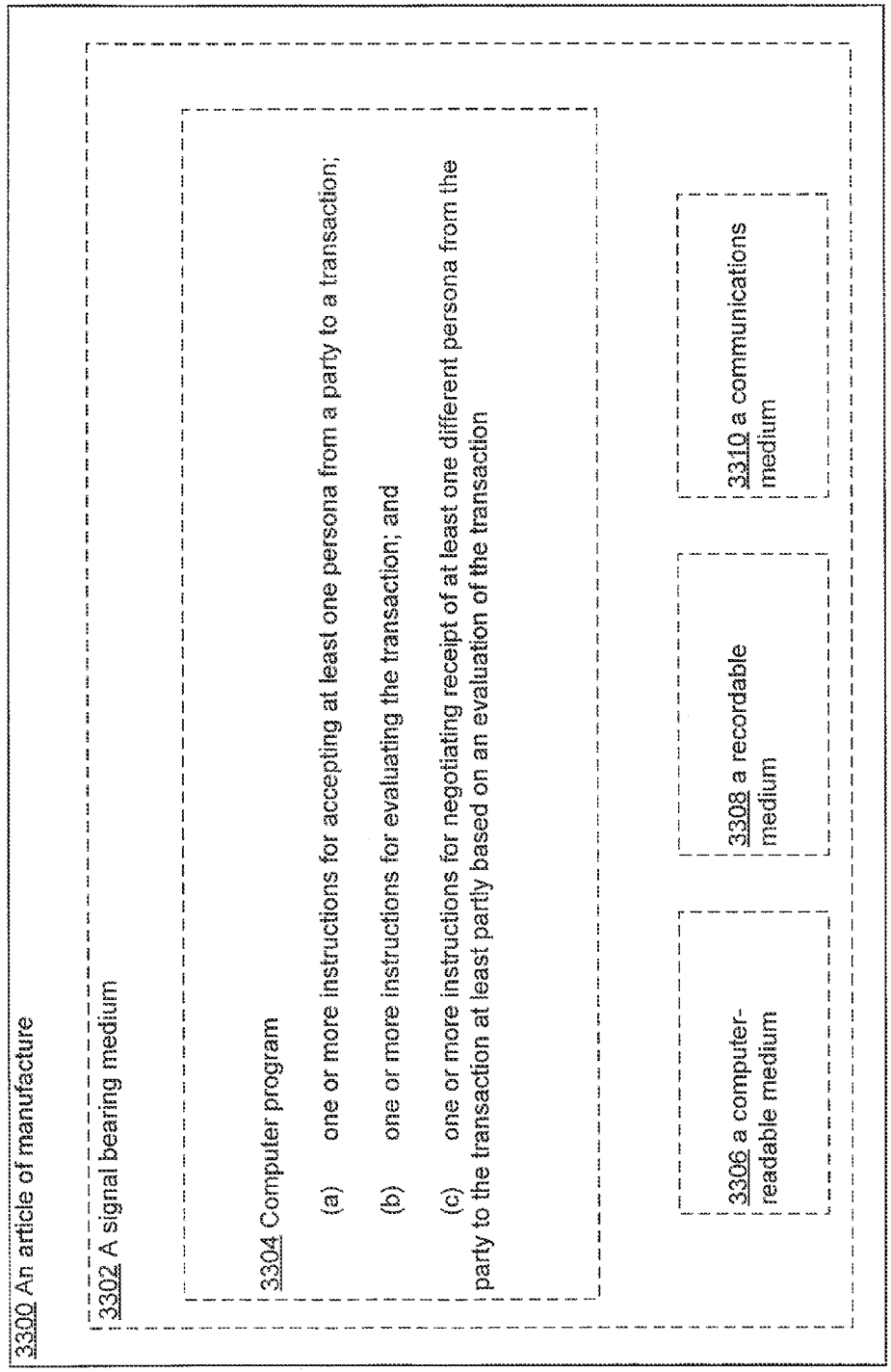

FIG. 33

3300 An article of manufacture

3302 A signal bearing medium

3304 Computer program (a) one or more instructions for accepting at least one persona from a party to a transaction;

(b) one or more instructions for evaluating the transaction; and (c) one or more instructions for negotiating receipt of at least one different persona from the party to the transaction at least partly based on an evaluation of the transaction 3306 a computer-readable medium 3308 a recordable medium 3310 a communications medium 2700 System

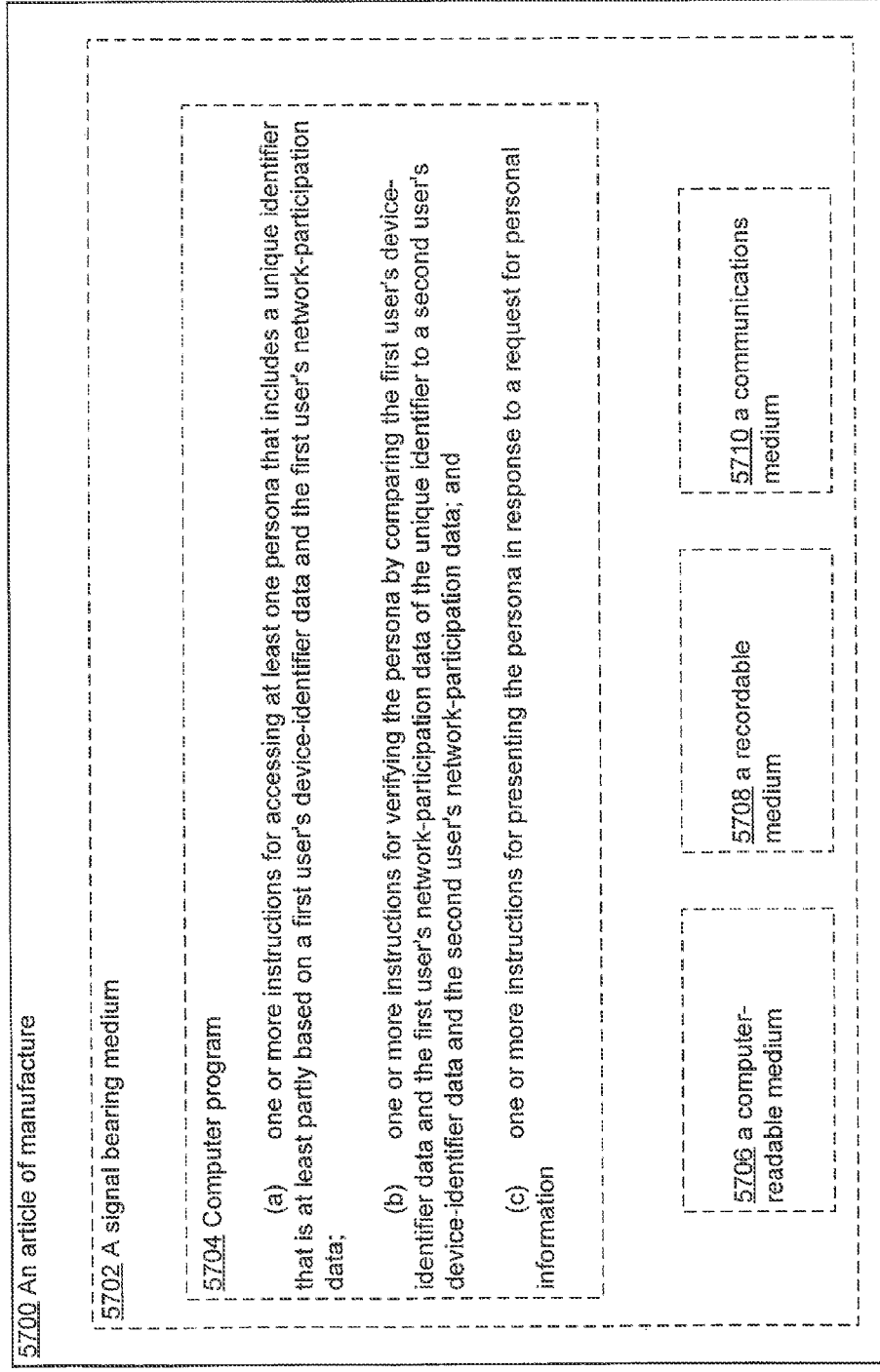

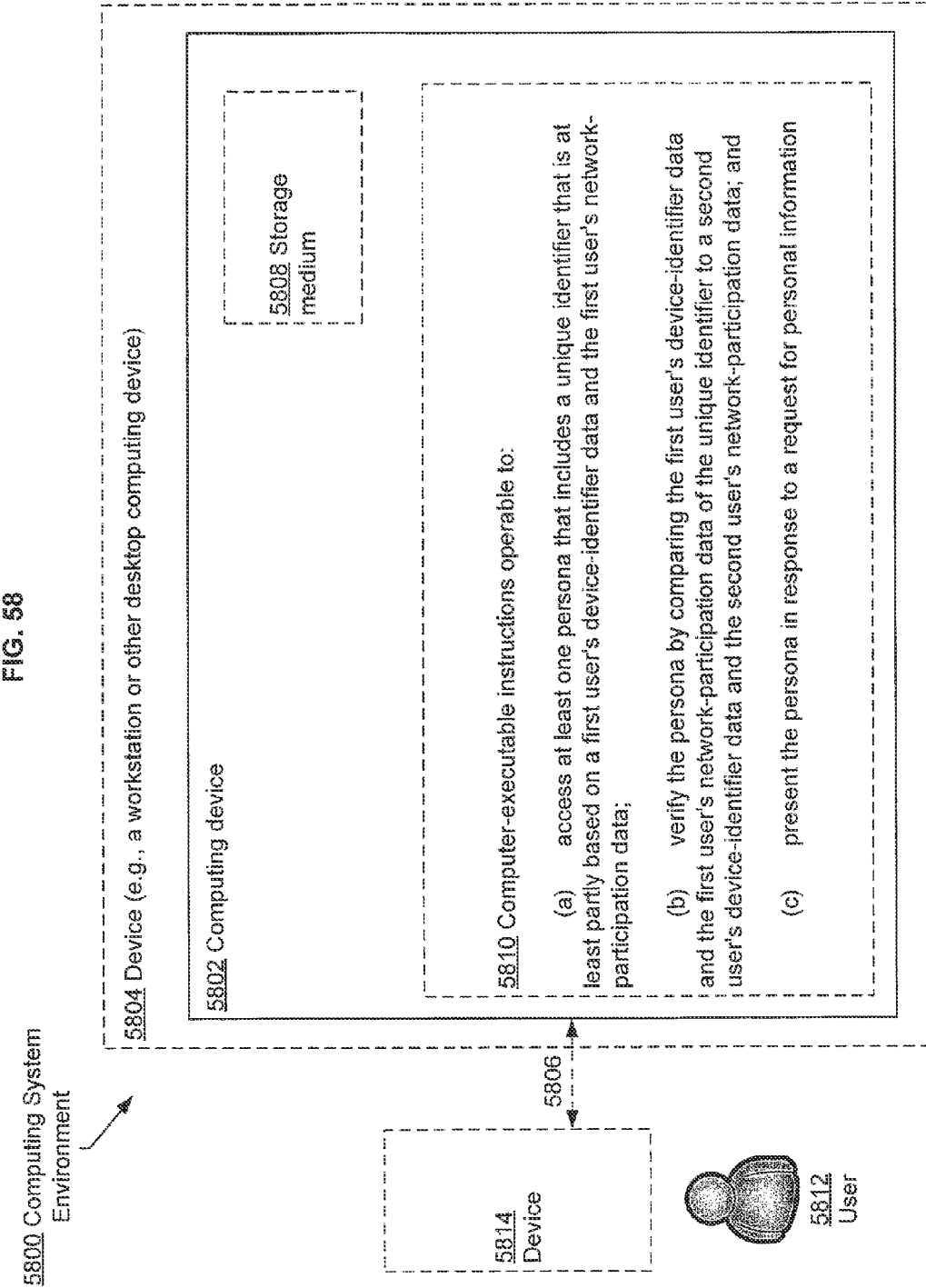

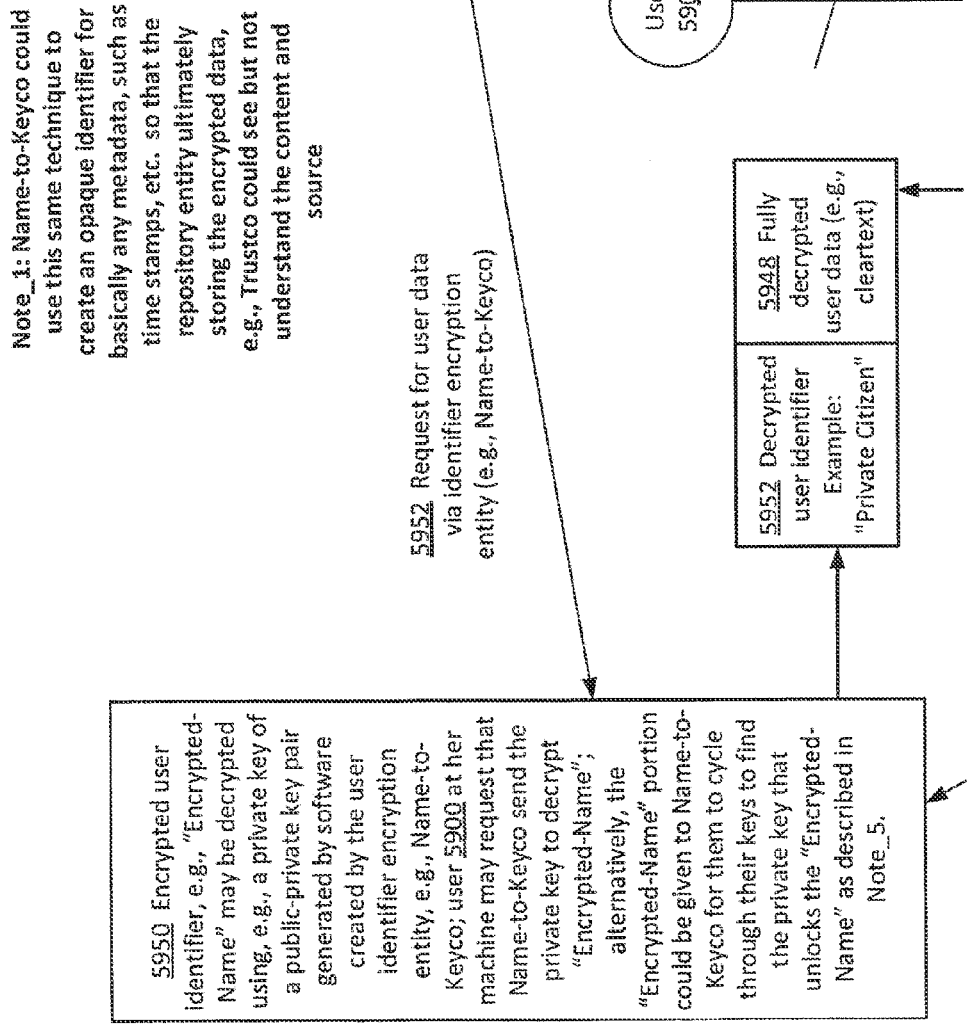

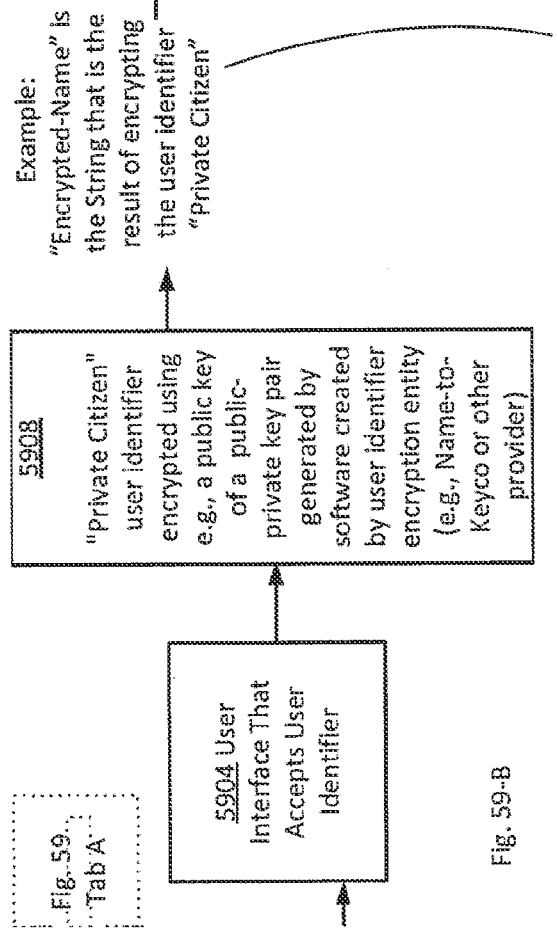

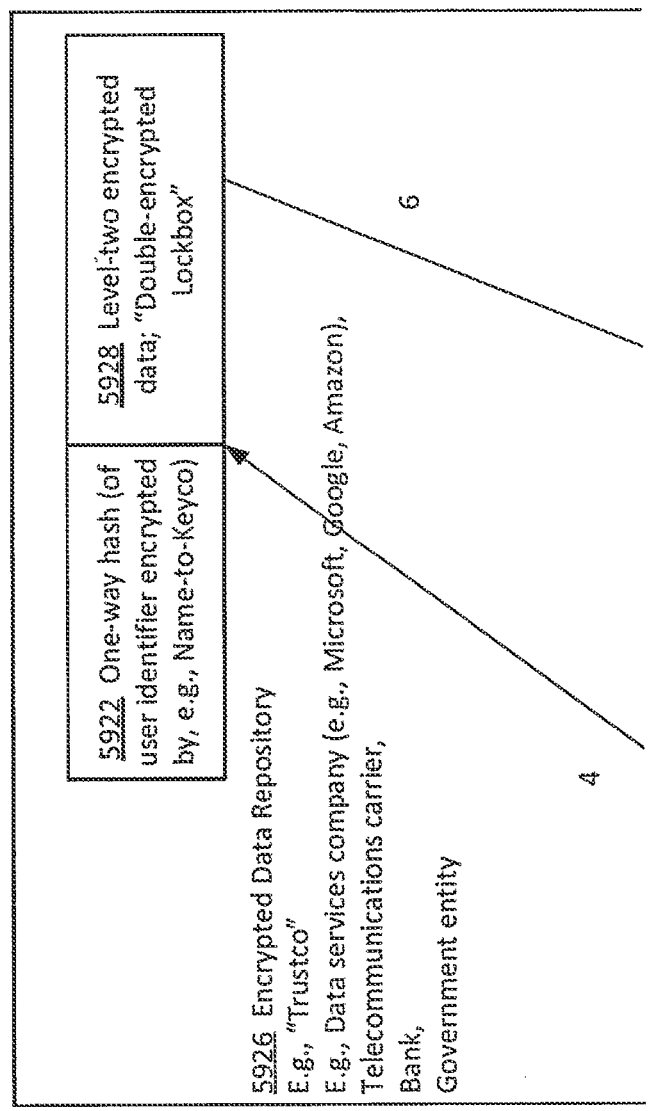
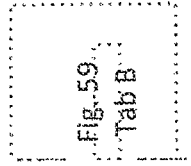
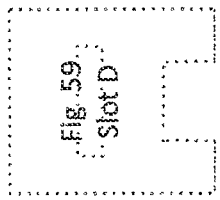

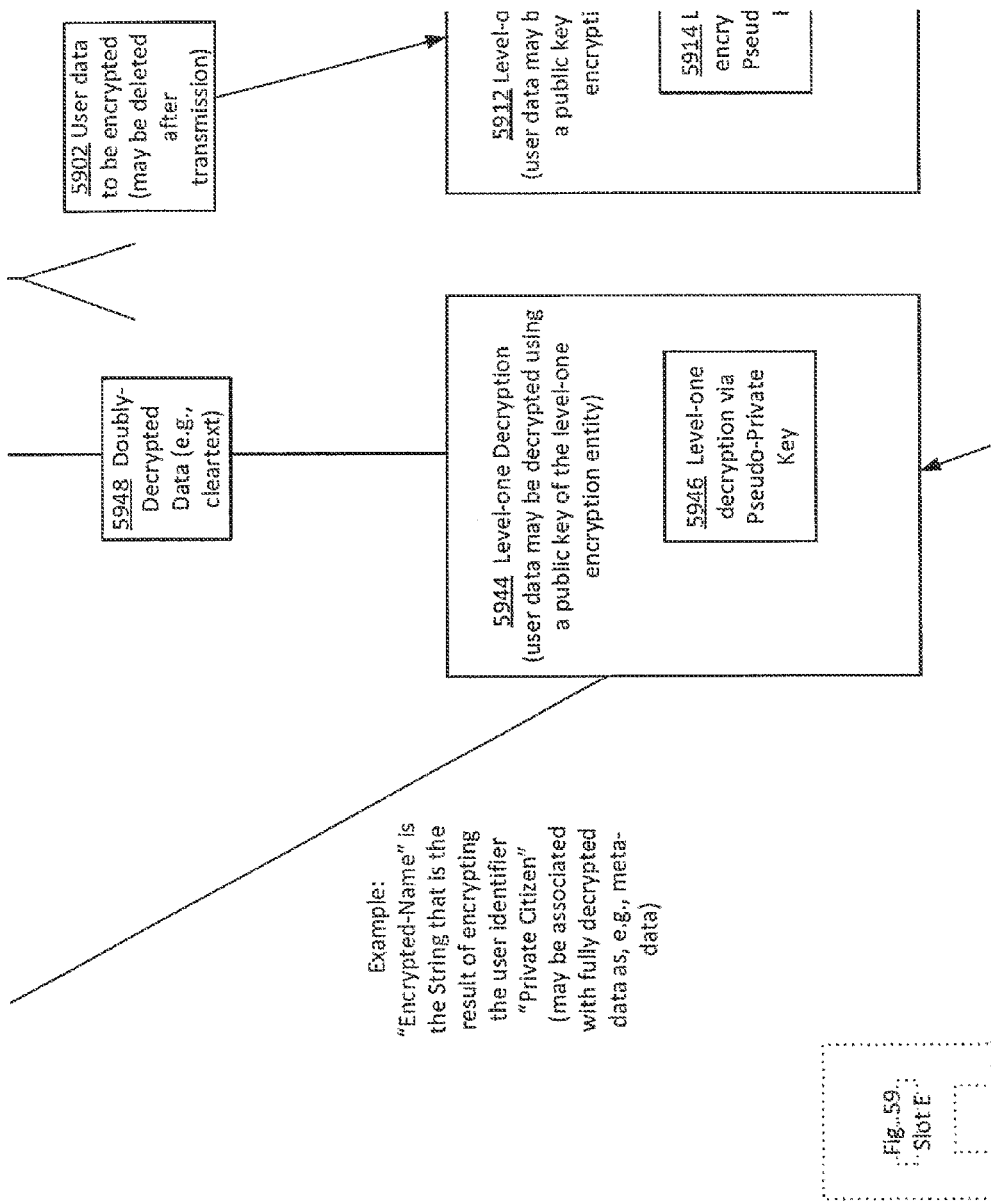

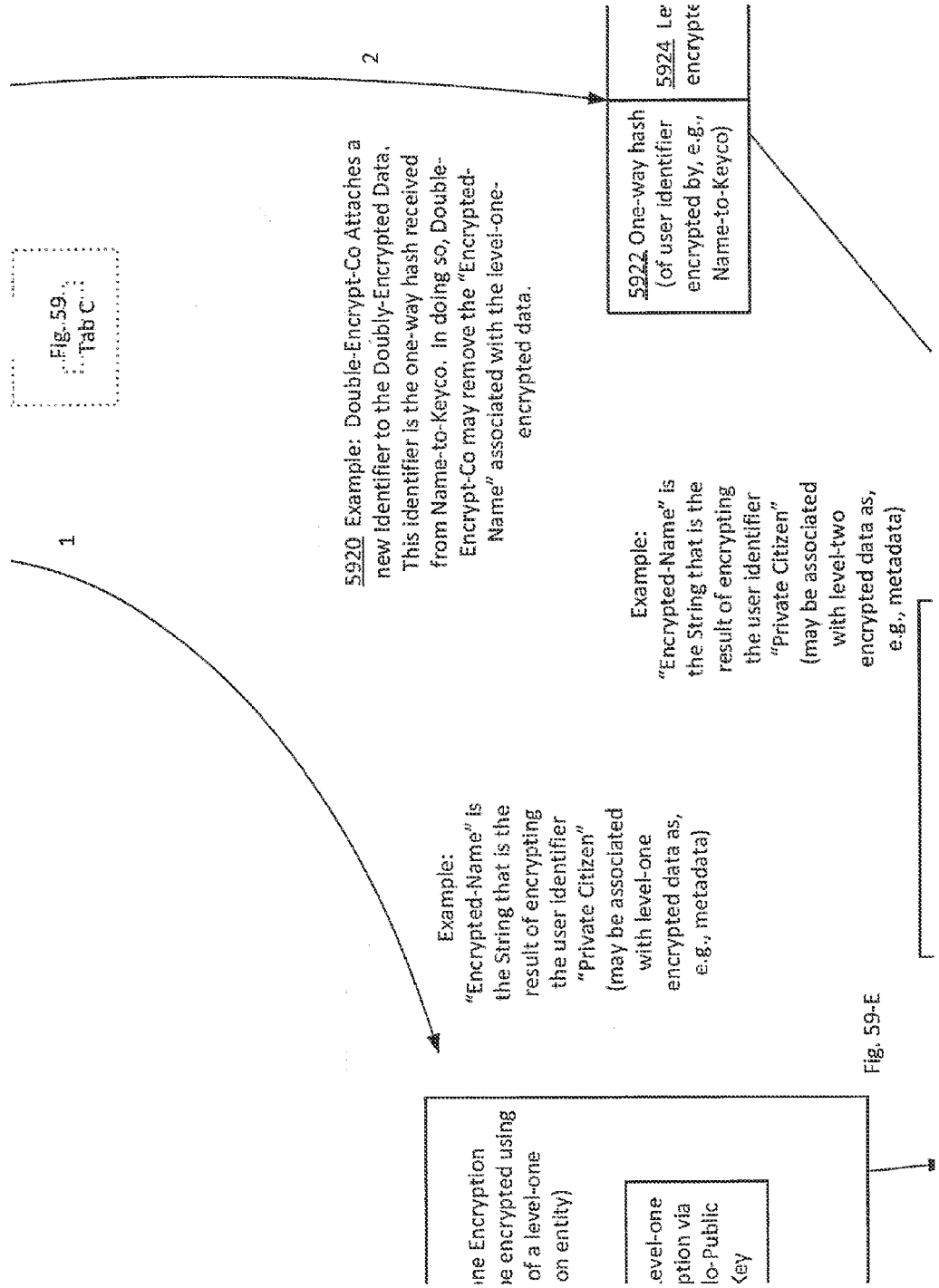

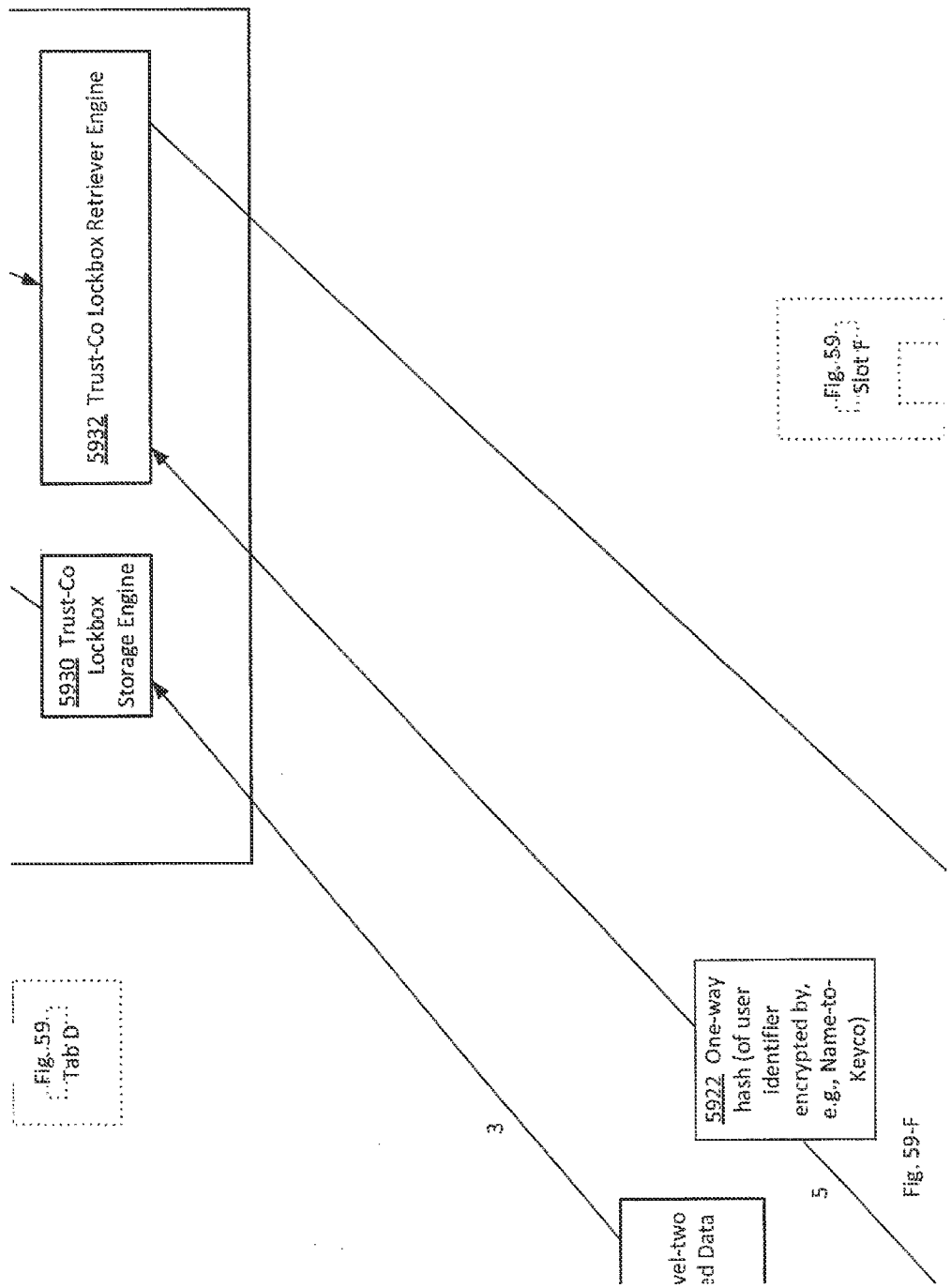

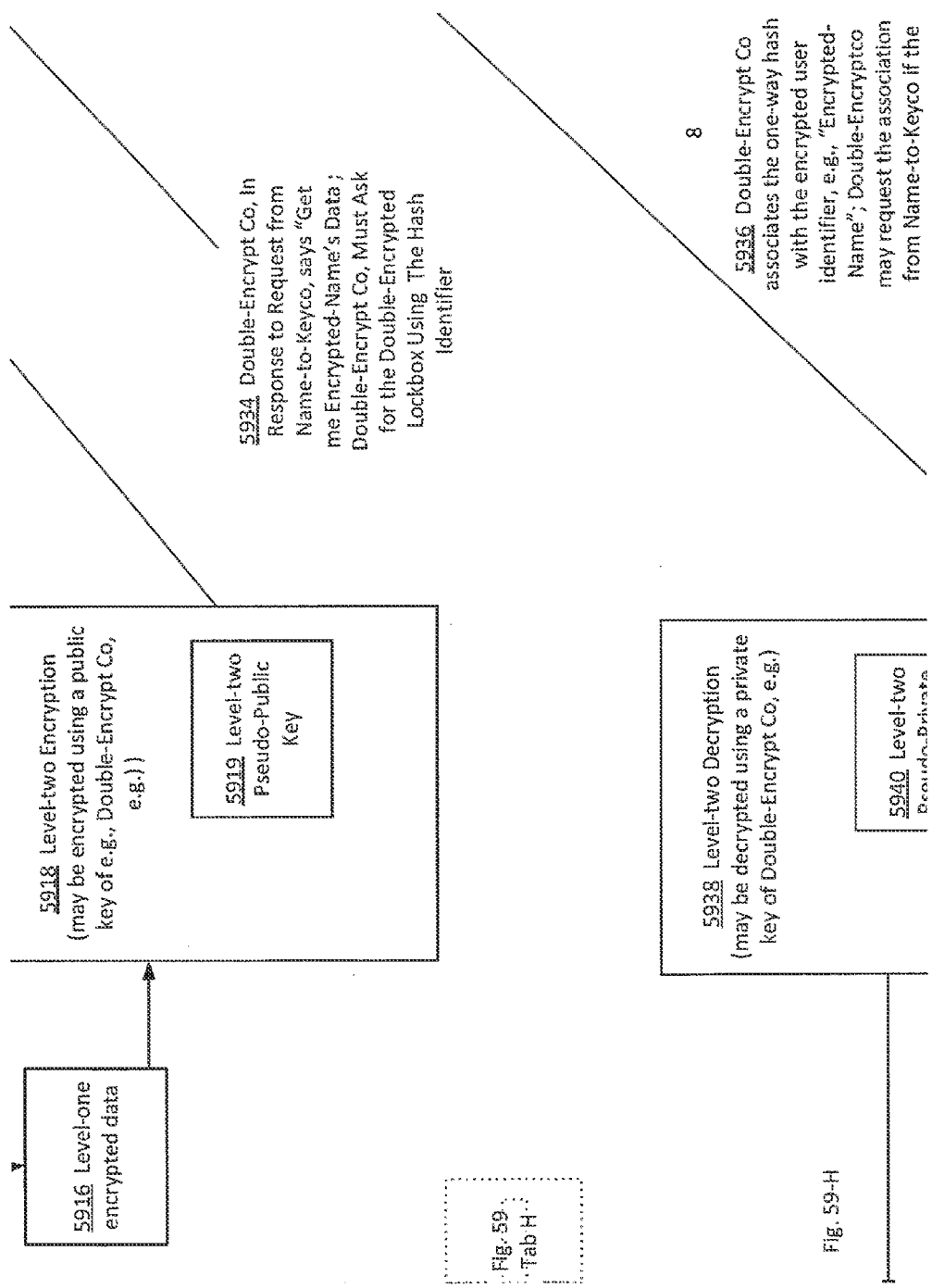

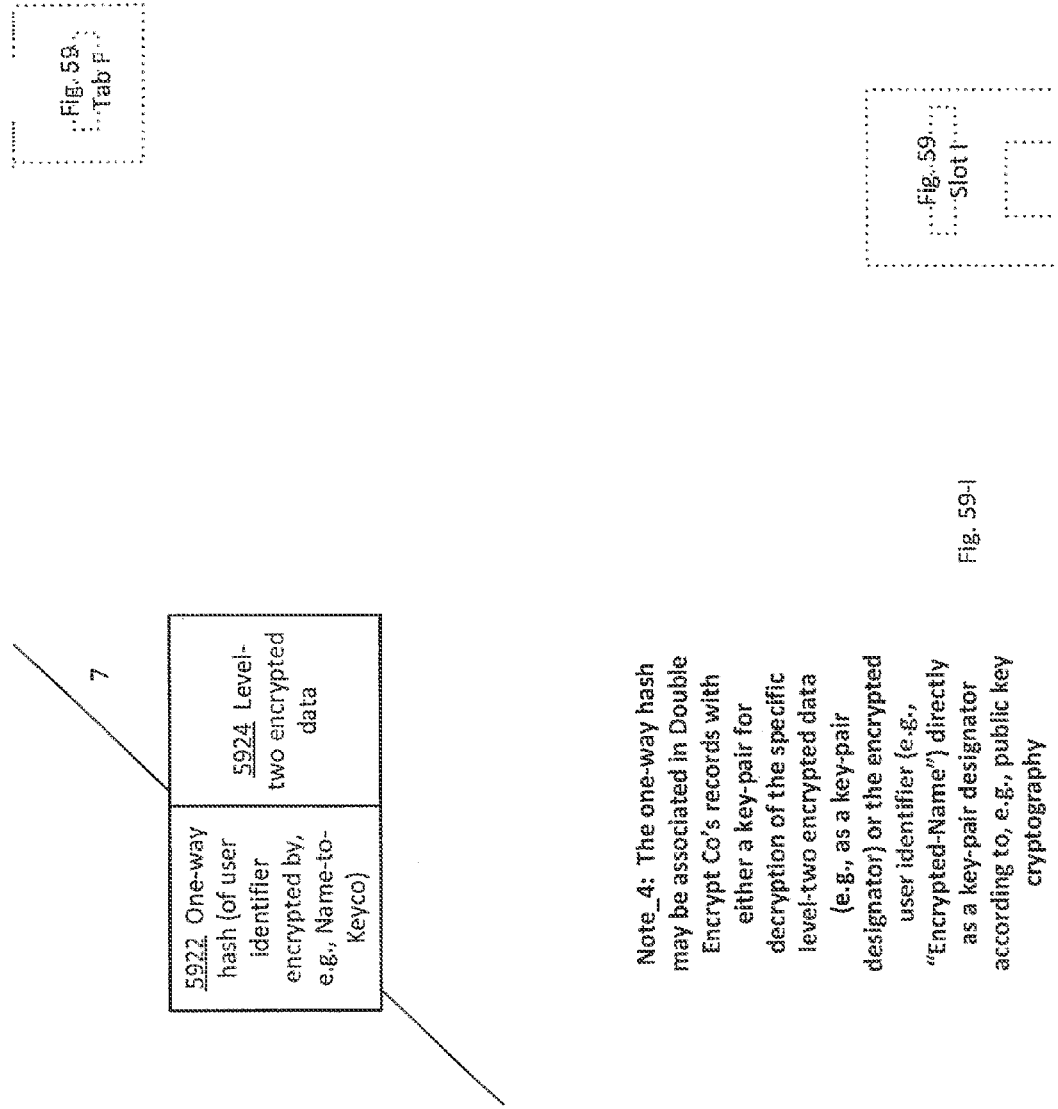
Fig. 59-l

Example:
"Encrypted-Name" is
the String that is the
result of encrypting
the user identifier
"Private Citizen"
(may be associated
with level-one
decrypted data as,
e.g., meta-data)

Fig. 59
Slot J

Fig. 59
Tab G

Fig. 59-J

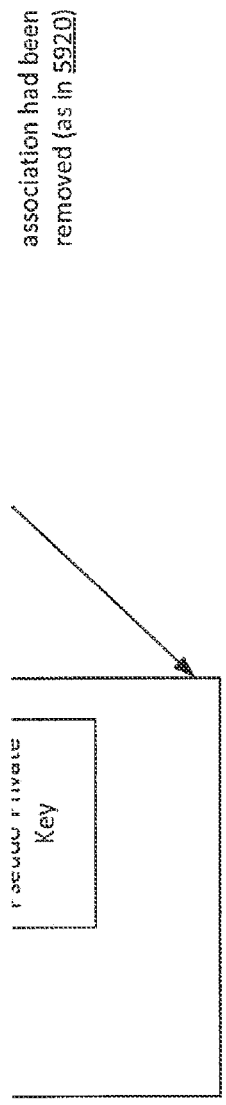
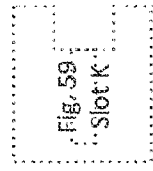

association had been removed (as in 5920)

Note_5: because a user may ask for their double-encrypted lockboxes days or years after they deposit them in an encrypted data repository, there will either need to be tracking/storage of the key pairs for first/second encryptions or cycling of the key pairs. For example, for decryption, cycling of the key pairs involves trial and error use of private keys to find the one that works.

Example:
"Encrypted-Name" is the String that is the result of encrypting the user identifier "Private Citizen" (may be associated with level-two encrypted data as, e.g., metadata)

Fig. 59-K

Note 6: The encrypted user identifier, e.g., "Encrypted Name" may serve as a key-pair designator attached to the level-two encrypted data by Double Encryptco, e.g., as metadata. After retrieval, this allows Double Encrypt Co to match a private key with the corresponding retrieved level-two encrypted data. This works because Double Encrypt Co generated the key pair for level-two encryption/decryption, and can therefore associate the private key for decryption with "Encrypted Name," e.g.). Alternatively, the one-way hash may be used for this purpose.

Fig. 59-L

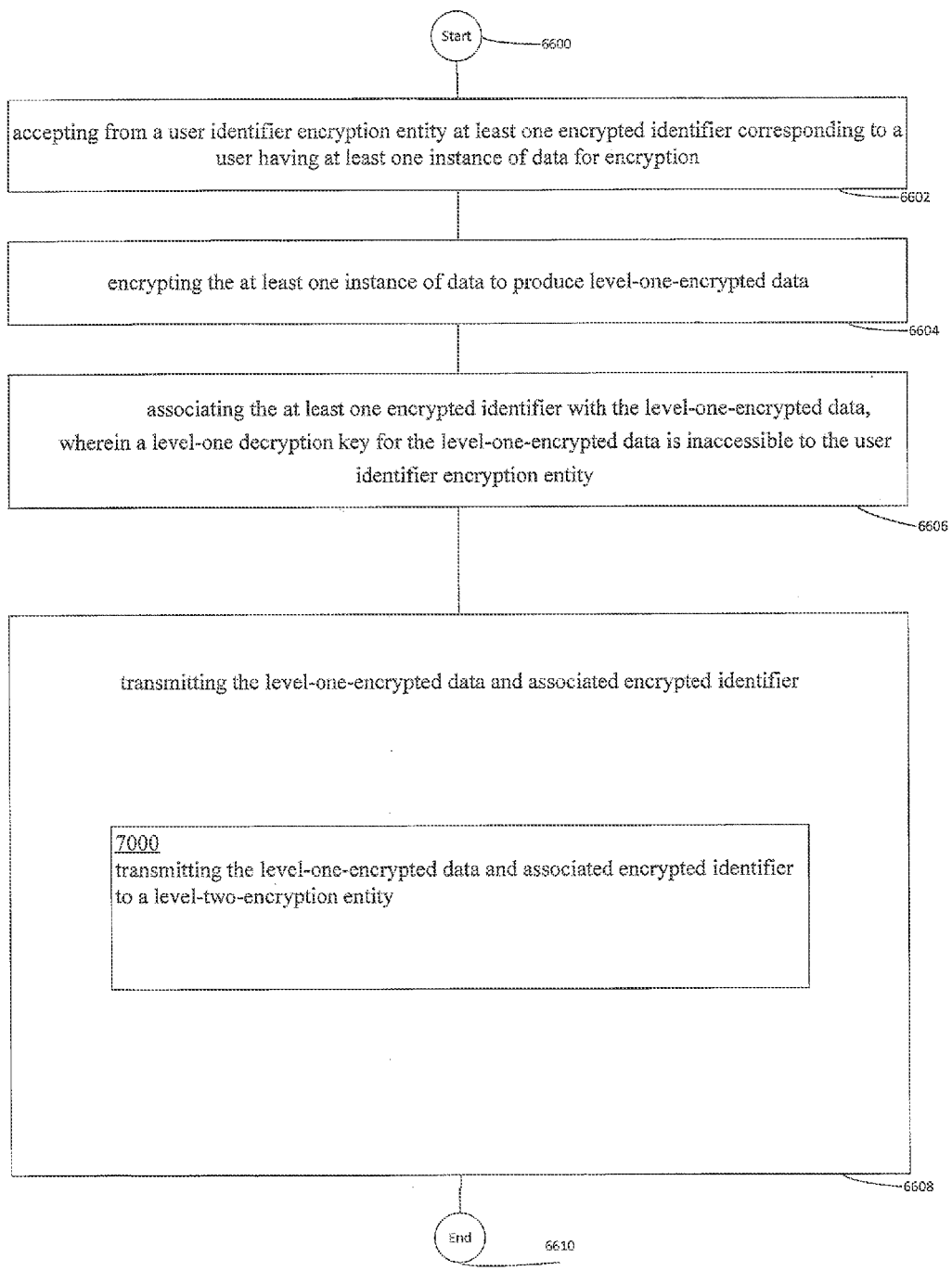

COMPUTATIONAL SYSTEMS AND METHODS FOR ENCRYPTING DATA FOR ANONYMOUS STORAGE

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, greatgrandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/199,832, entitled COMPUTATIONAL SYSTEMS AND METHODS FOR LINKING USERS OF DEVICES, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 7 Sep. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/199,829, entitled COMPUTATIONAL SYSTEMS AND METHODS FOR LINKING USERS OF DEVICES, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 9 Sep. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/200,806, entitled COMPUTATIONAL SYSTEMS AND METHODS FOR DISAMBIGUATING SEARCH TERMS CORRESPONDING TO NETWORK MEMBERS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Sep. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/200,810, entitled COMPUTATIONAL SYSTEMS AND METHODS FOR DISAMBIGUATING SEARCH TERMS CORRESPONDING TO NETWORK MEMBERS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Sep. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,542, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 16 Nov. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,572, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 17 Nov. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,871, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 2 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,872, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 2 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,247, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 16 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,246, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 16 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,428, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 27 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,429, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 27 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,532, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 29 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,535, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 29 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,534, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 29 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,530, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 29 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,513, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,526, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,528, entitled COMPUTATIONAL SYSTEMS AND METHODS FOR VERIFYING PERSONAL INFORMATION DURING TRANSACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,523, entitled COMPUTATIONAL SYSTEMS AND METHODS FOR VERIFYING PERSONAL INFORMATION DURING TRANSACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Dec. 2011 which is currently co-pending, or is an application of which a currently co-pending application is entitled to the benefit of the filing date.

RELATED APPLICATIONS

U.S. patent application Ser. No. 13/830,331, entitled COMPUTATIONAL SYSTEMS AND METHODS FOR PREPARING DATA FOR DOUBLE-ENCRYPTION AND ANONYMOUS STORAGE, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 14 Mar. 2013, is related to the present application.

U.S. patent application Ser. No. 13/830,358, entitled COMPUTATIONAL SYSTEMS AND METHODS FOR DOUBLE-ENCRYPTING DATA FOR SUBSEQUENT ANONYMOUS STORAGE, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 14 Mar. 2013, is related to the present application.

U.S. patent application Ser. No. 13/830,366, entitled COMPUTATIONAL SYSTEMS AND METHODS FOR ANONYMIZED STORAGE OF DOUBLE-ENCRYPTED DATA, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 14 Mar. 2013, is related to the present application.

U.S. patent application Ser. No. 13/385,598, entitled RIGHT OF INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark A. Malamud as inventors, filed 12 Jul. 2012, is related to the present application.

U.S. patent application Ser. No. 13/653,222, entitled LEVEL-ONE ENCRYPTION ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark A. Malamud as inventors, filed 16 Oct. 2012, is related to the present application.

U.S. patent application Ser. No. 13/677,634, entitled LEVEL-ONE ENCRYPTION ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark A. Malamud as inventors, filed 15 Nov. 2012, is related to the present application.

U.S. patent application Ser. No. 13/660,848, entitled LEVEL-TWO ENCRYPTION ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark A. Malamud as inventors, filed 25 Oct. 2012, is related to the present application.

U.S. patent application Ser. No. 13/664,265, entitled LEVEL-TWO ENCRYPTION ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark A. Malamud as inventors, filed 30 Oct. 2012, is related to the present application.

U.S. patent application Ser. No. 13/707,427, entitled PRE-EVENT REPOSITORY ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark A. Malamud as inventors, filed 6 Dec. 2012, is related to the present application.

U.S. patent application Ser. No. 13/708,651, entitled PRE-EVENT REPOSITORY ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark A. Malamud as inventors, filed 7 Dec. 2012, is related to the present application.

U.S. patent application Ser. No. 13/720,360, entitled LEVEL-TWO DECRYPTION ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark A. Malamud as inventors, filed 19 Dec. 2012, is related to the present application.

U.S. patent application Ser. No. 13/724,941, entitled LEVEL-TWO DECRYPTION ASSOCIATED WITH INDIVIDUAL PRIVACY AND PUBLIC SAFETY PROTEC- TION VIA DOUBLE ENCRYPTED LOCK BOX, naming Edward K. Y. Jung, Royce A. Levien, Richard T. Lord, Robert W. Lord, and Mark A. Malamud as inventors, filed 21 Dec. 2012, is related to the present application.

U.S. patent application Ser. No. 13/731,751, entitled LEVEL-TWO DECRYPTION ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark A. Malamud as inventors, filed 31 Dec. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official 5 Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute.

Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This description relates to data capture, data handling, and data security techniques.

SUMMARY

An embodiment provides a system. In one implementation, the system includes but is not limited to circuitry for accepting from a user identifier encryption entity at least one encrypted identifier corresponding to a user having at least one instance of data for encryption; circuitry for encrypting the at least one instance of data to produce level-one-encrypted data; circuitry for associating the at least one encrypted identifier with the level-one-encrypted data, wherein a level-one decryption key for the level-one-encrypted data is inaccessible to the user identifier encryption entity; and circuitry for transmitting the level-one-encrypted data and associated encrypted identifier. In addition to the foregoing, other system aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one or more various aspects, related systems include but are not limited to computing means and/or programming for effecting the herein-referenced method aspects; the computing means and/or programming may be virtually any combination of hardware, software, and/or firmware configured to effect the herein-referenced method aspects depending upon the design choices of the system designer.

An embodiment provides a computer-implemented method. In one implementation, the method includes but is not limited to accepting from a user identifier encryption entity at least one encrypted identifier corresponding to a user having at least one instance of data for encryption; encrypting the at least one instance of data to produce level-one-encrypted data; associating the at least one encrypted identifier with the level-one-encrypted data, wherein a level-one decryption key for the level-one-encrypted data is inaccessible to the user identifier encryption entity; and transmitting the level-one-encrypted data and associated encrypted identifier. In addition to the foregoing, other method aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to accepting from a user identifier encryption entity at least one encrypted identifier corresponding to a user having at least one instance of data for encryption; encrypting the at least one instance of data to produce level-one-encrypted data; associating the at least one encrypted identifier with the level-one-encrypted data, wherein a level-one decryption key for the level-one-encrypted data is inaccessible to the user identifier encryption entity; and transmitting the level-one-encrypted data and associated encrypted identifier. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to accept from a user identifier encryption entity at least one encrypted identifier corresponding to a user having at least one instance of data for encryption; encrypt the at least one instance of data to produce level-one-encrypted data; associate the at least one encrypted identifier with the level-one-encrypted data, wherein a level-one decryption key for the level-one-encrypted data is inaccessible to the user identifier encryption entity; and transmit the level-one-encrypted data and associated encrypted identifier. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

With reference now to FIG. 1, shown is an example of a system for linking users of devices in which embodiments may be implemented, perhaps in a device and/or through a network, which may serve as a context for introducing one or more processes and/or devices described herein.

Figure 3:
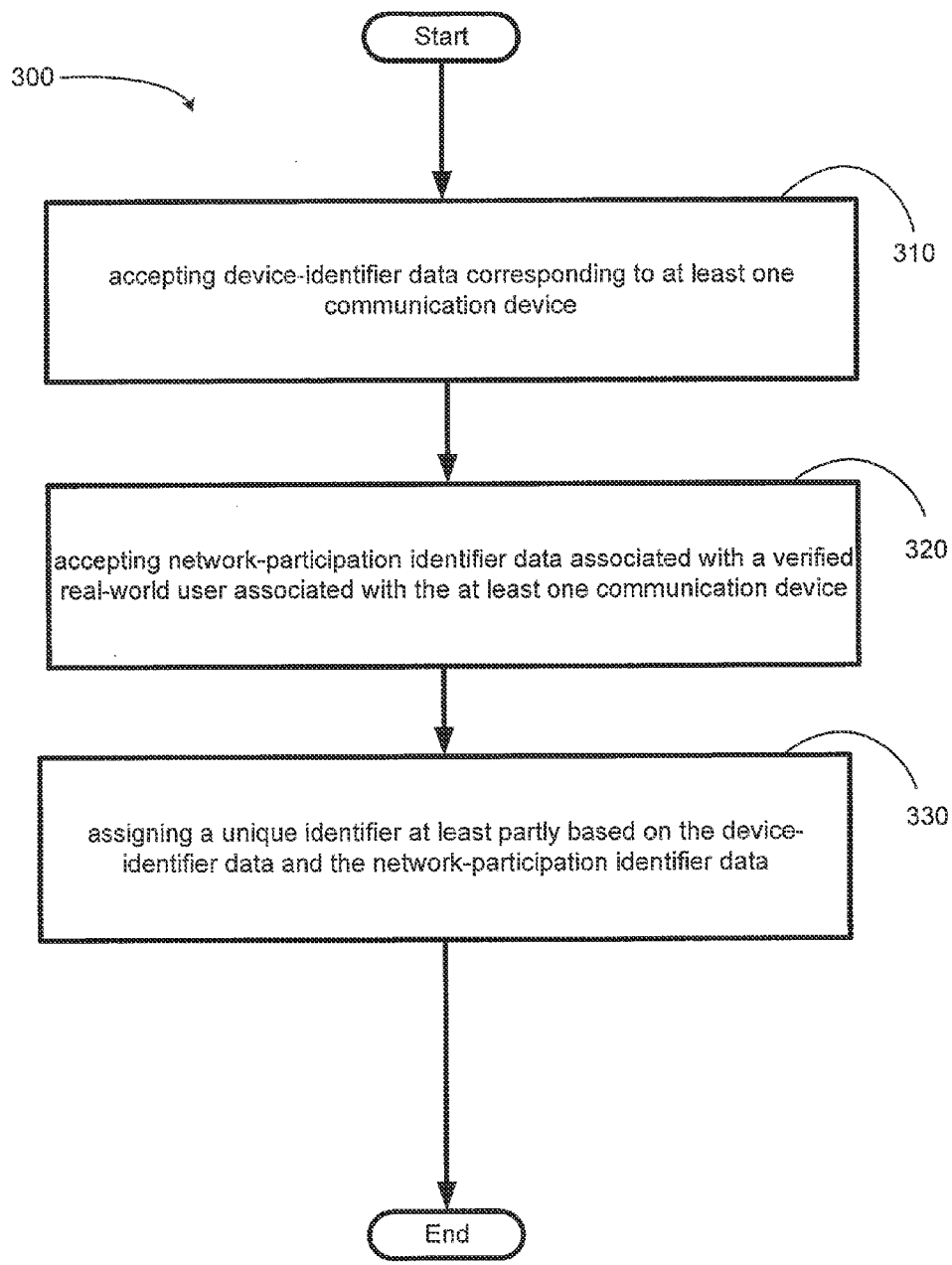

With reference now to FIG. 3, shown is an example of an operational flow representing example operations related to linking users of devices, which may serve as a context for introducing one or more processes and/or devices described herein.

Figure 4:
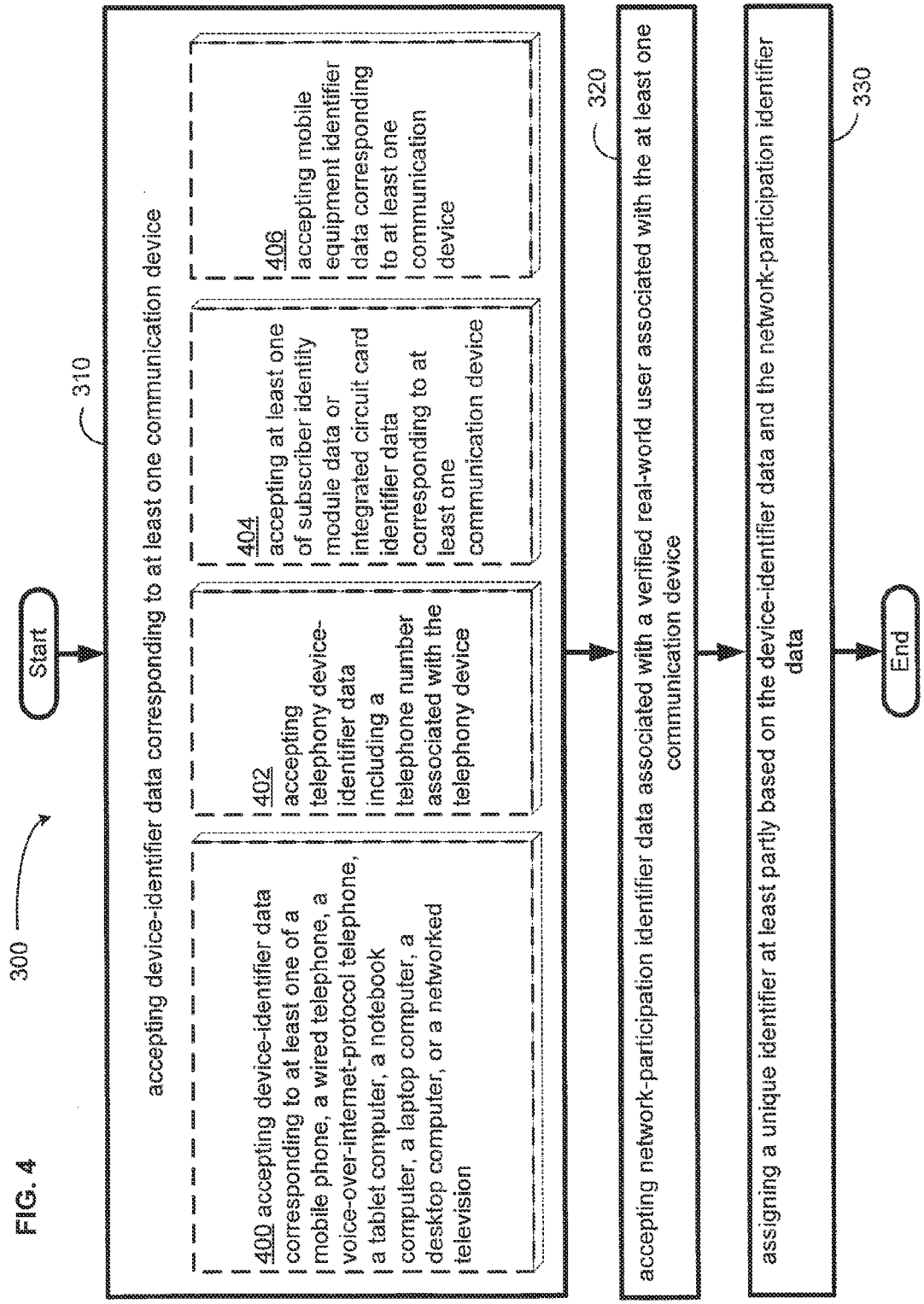

FIG. 4 illustrates an alternative embodiment of the example operational flow of FIG. 3.

Figure 5:
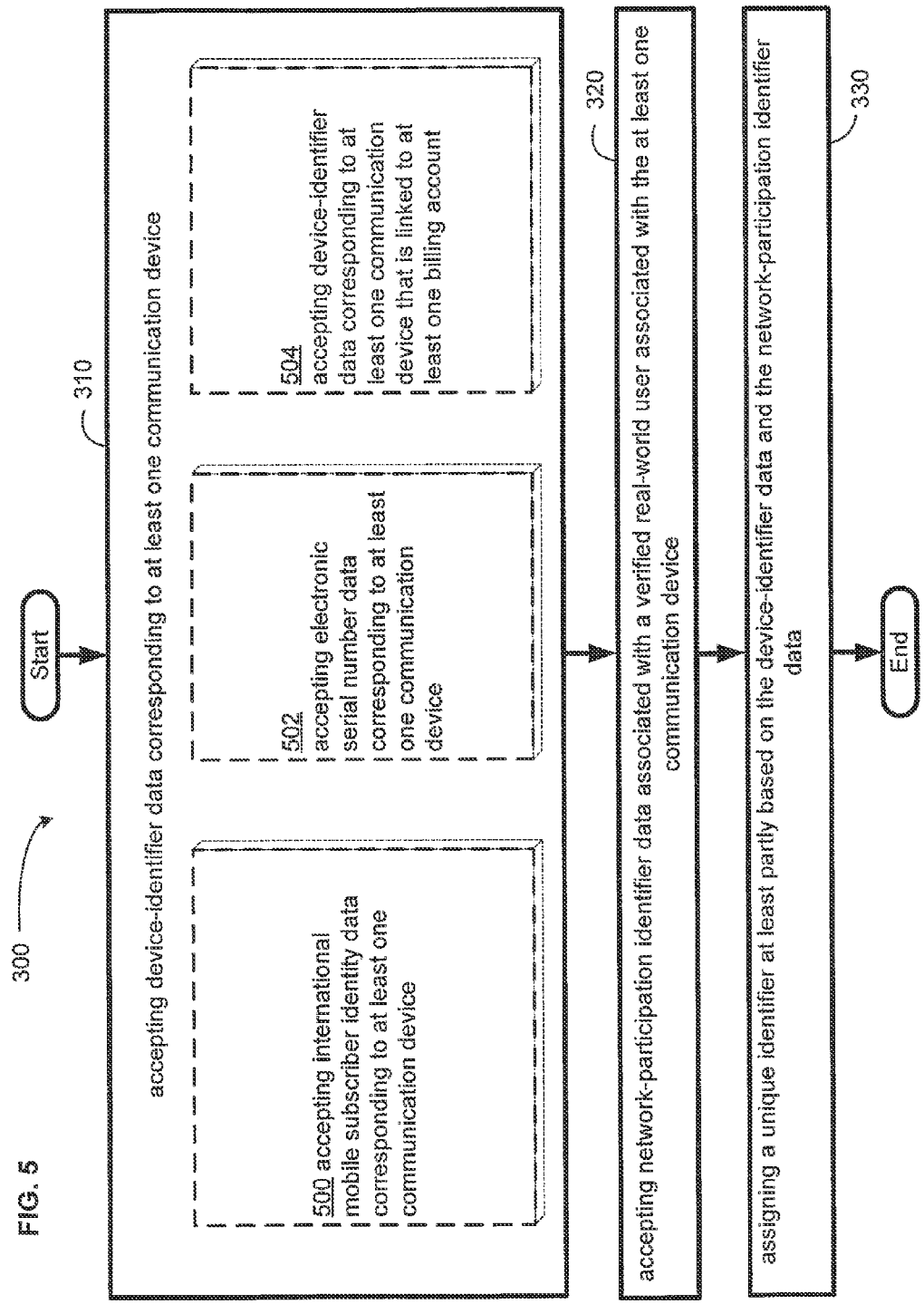

FIG. 5 illustrates an alternative embodiment of the example operational flow of FIG. 3.

Figure 6:
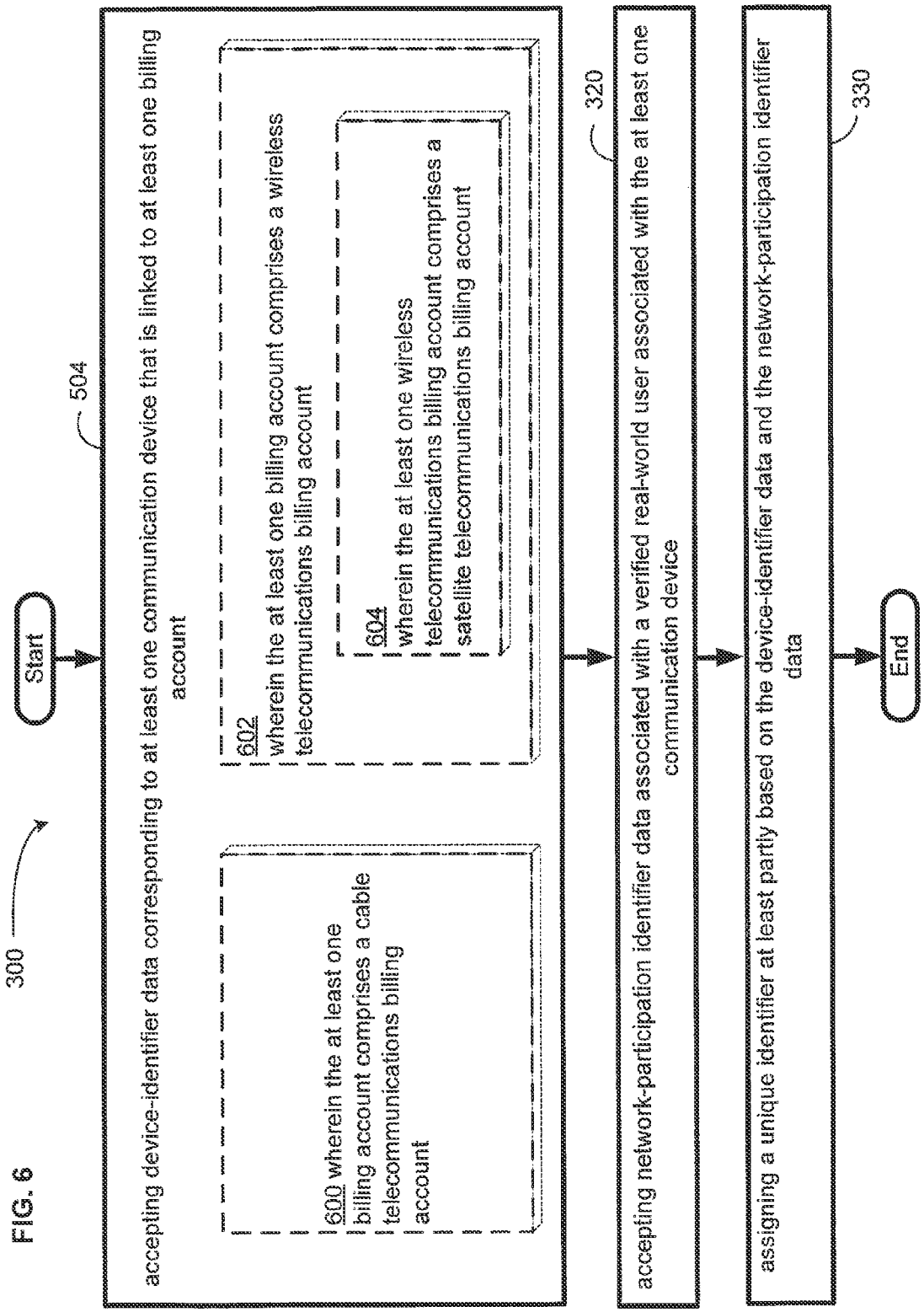

FIG. 6 illustrates an alternative embodiment of the example operational flow of FIG. 3.

Figure 7:
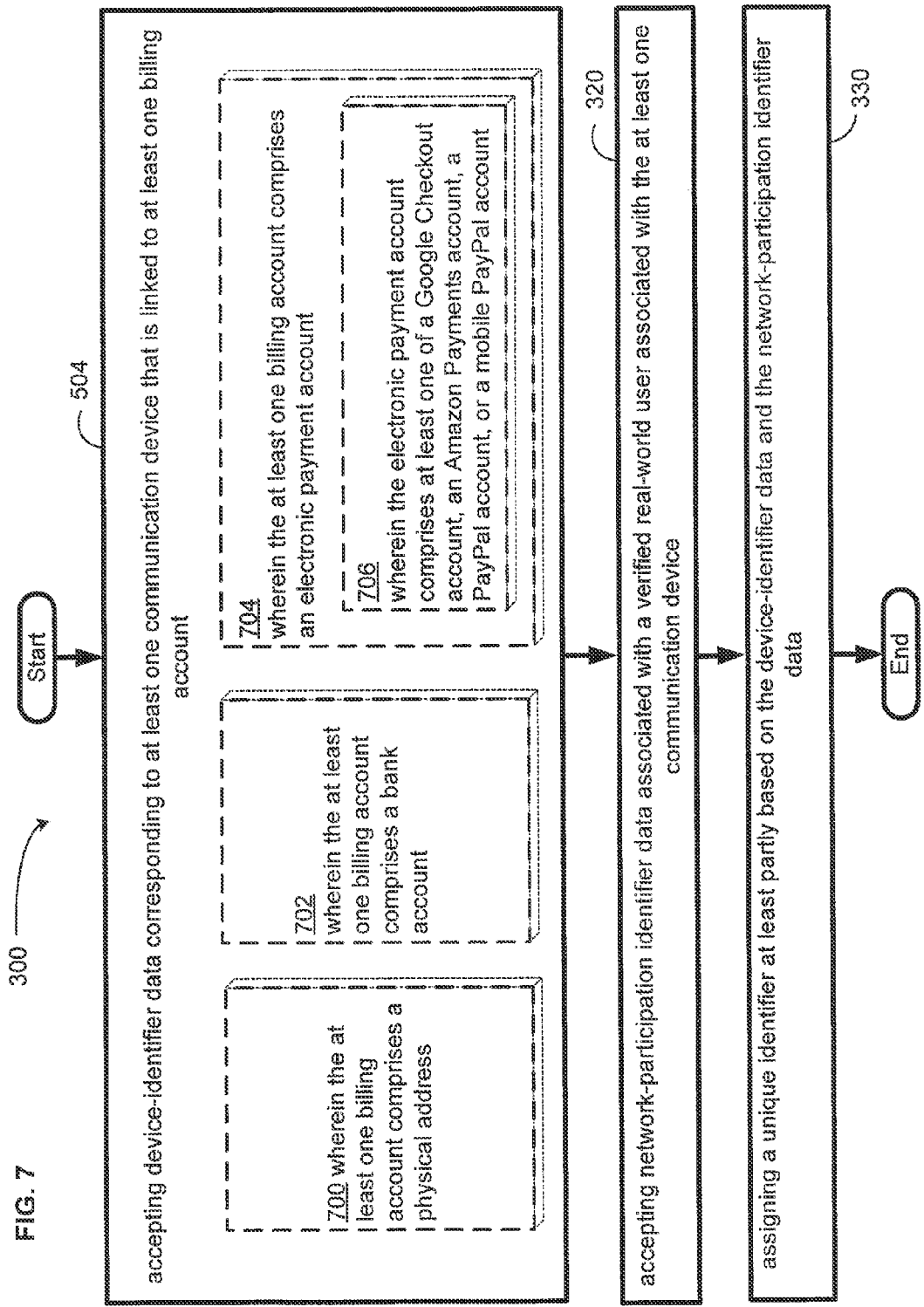

FIG. 7 illustrates an alternative embodiment of the example operational flow of FIG. 3.

Figure 8:
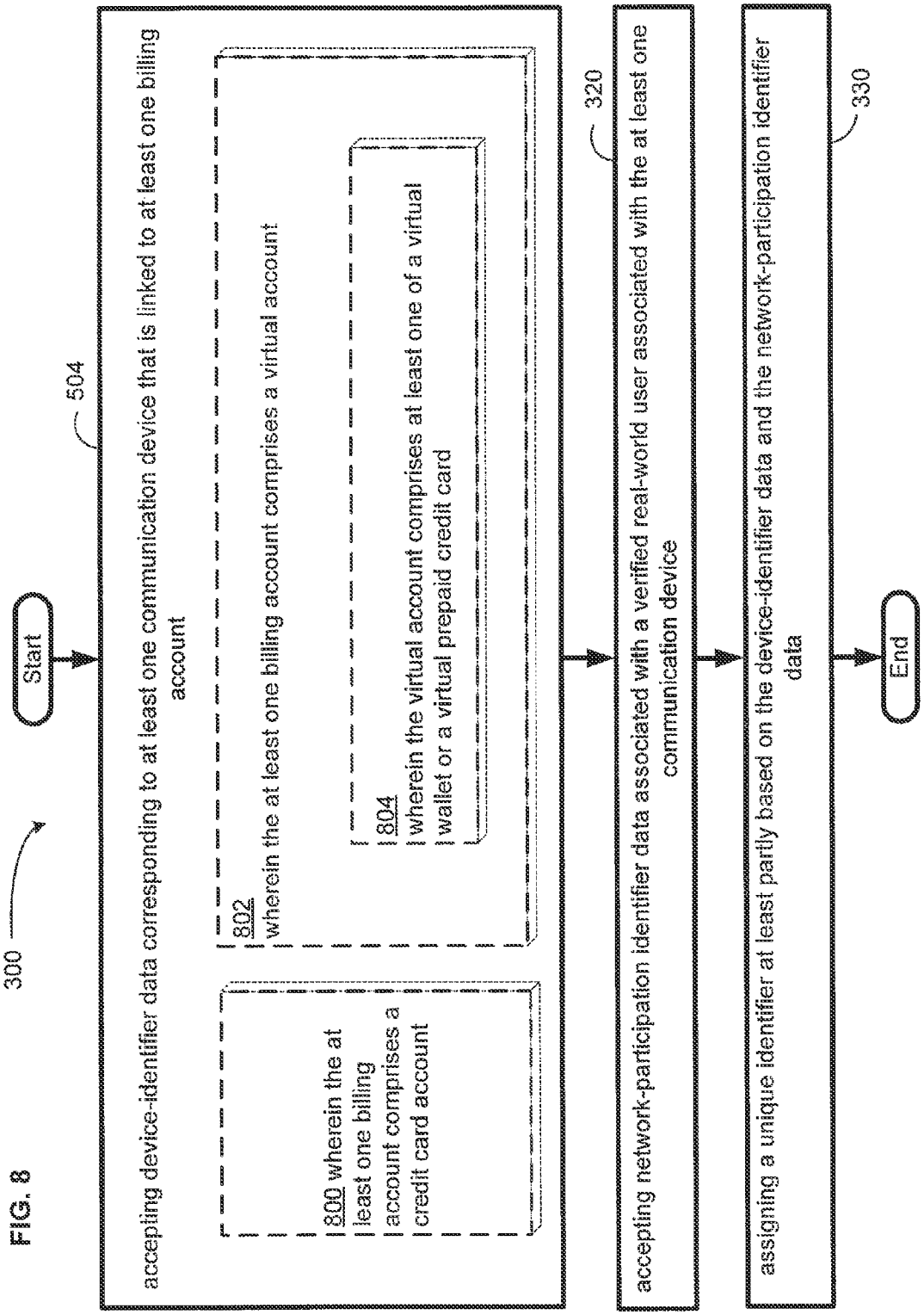

FIG. 8 illustrates an alternative embodiment of the example operational flow of FIG. 3.

Figure 9:
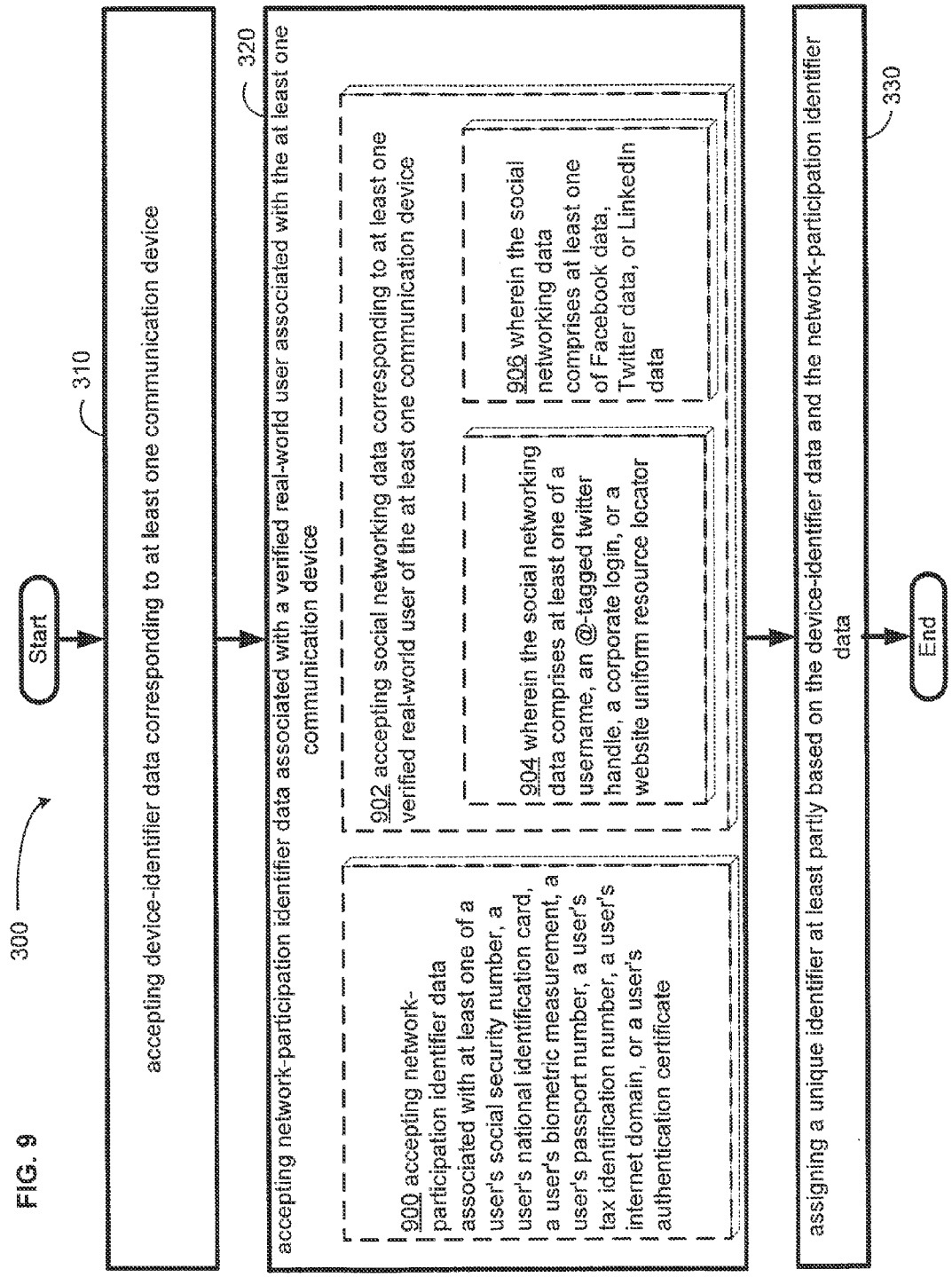

FIG. 9 illustrates an alternative embodiment of the example operational flow of FIG. 3.

Figure 10:
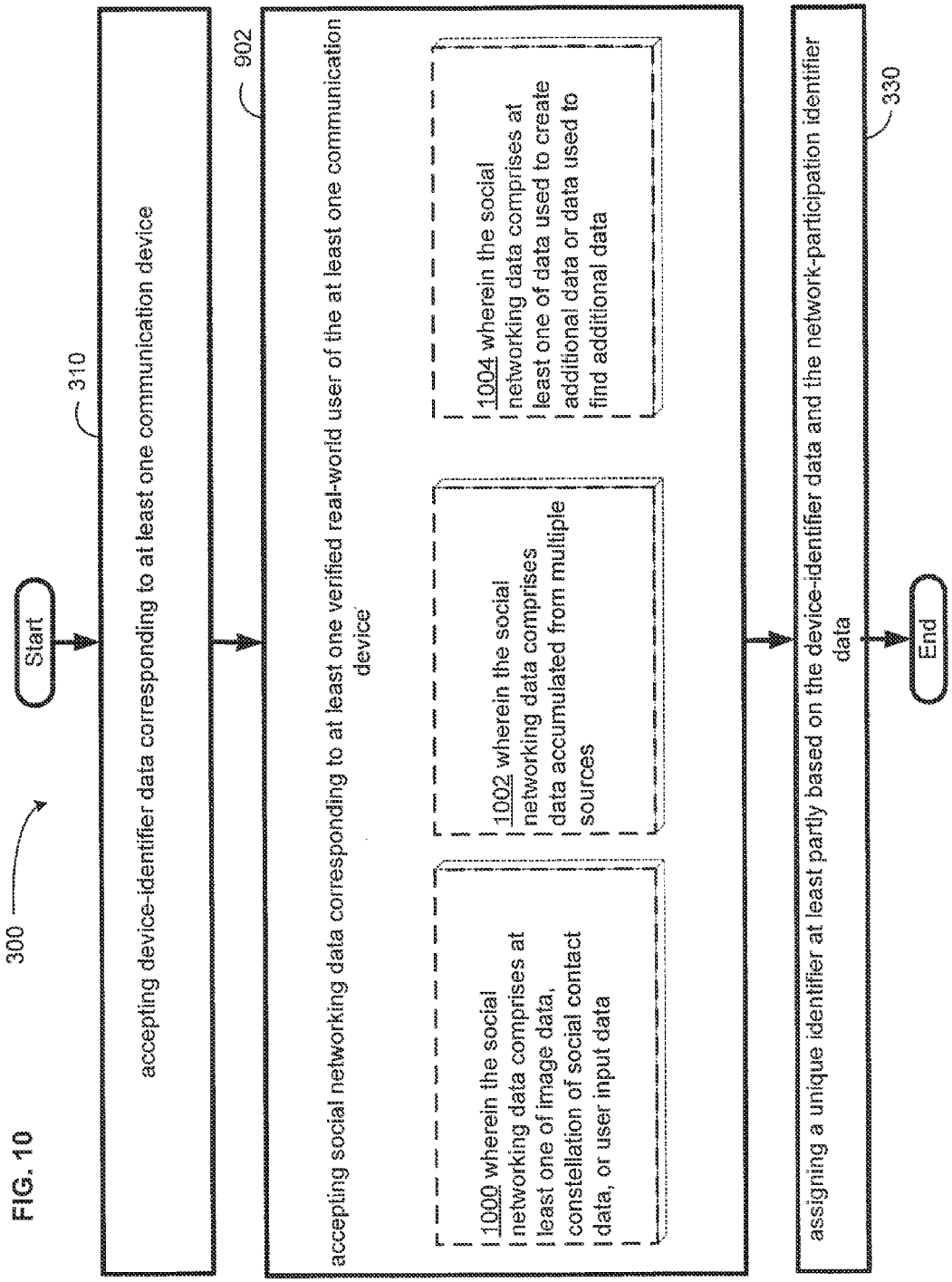

FIG. 10 illustrates an alternative embodiment of the example operational flow of FIG. 3.

Figure 11:
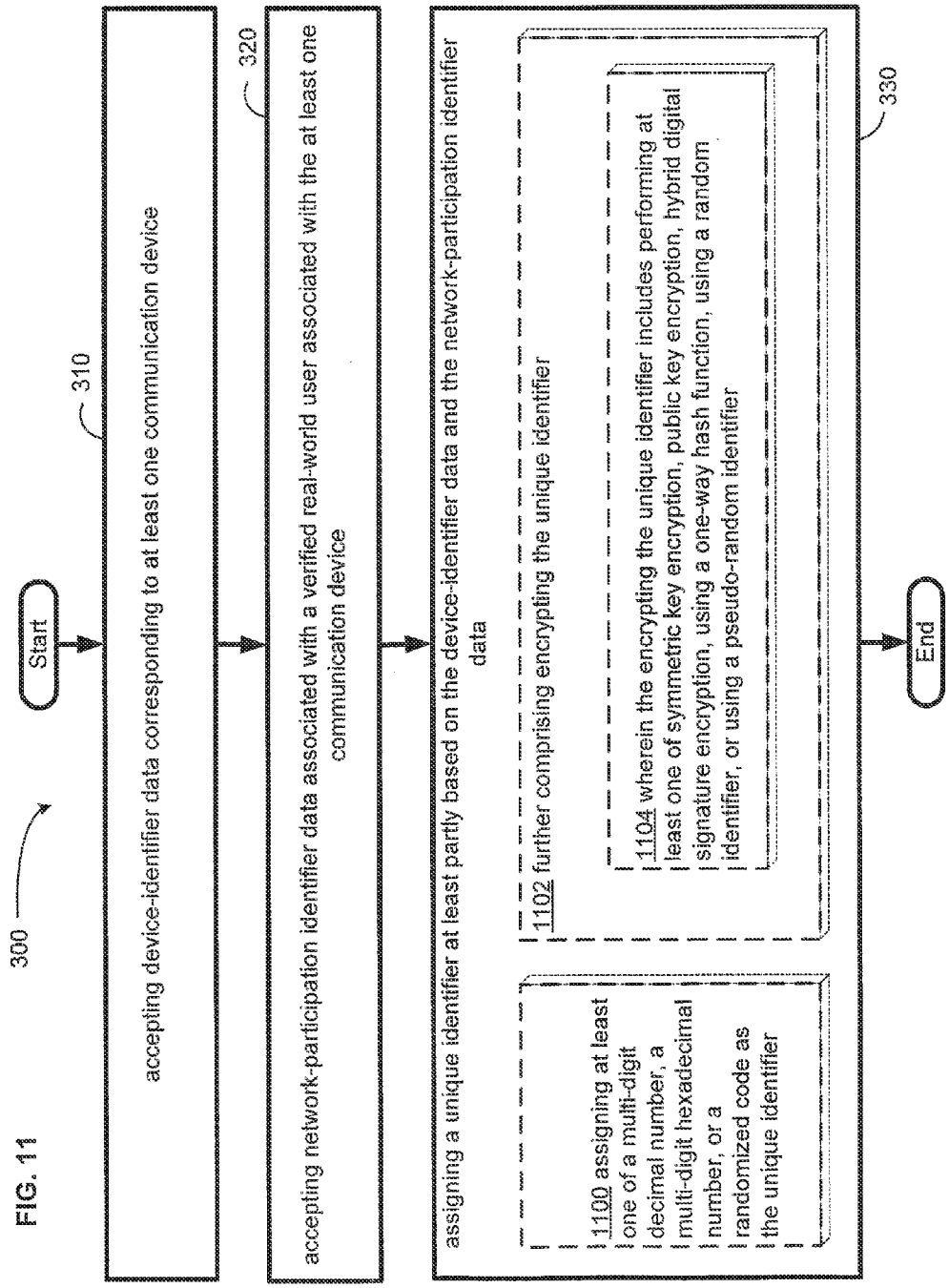

FIG. 11 illustrates an alternative embodiment of the example operational flow of FIG. 3.

Figure 12:
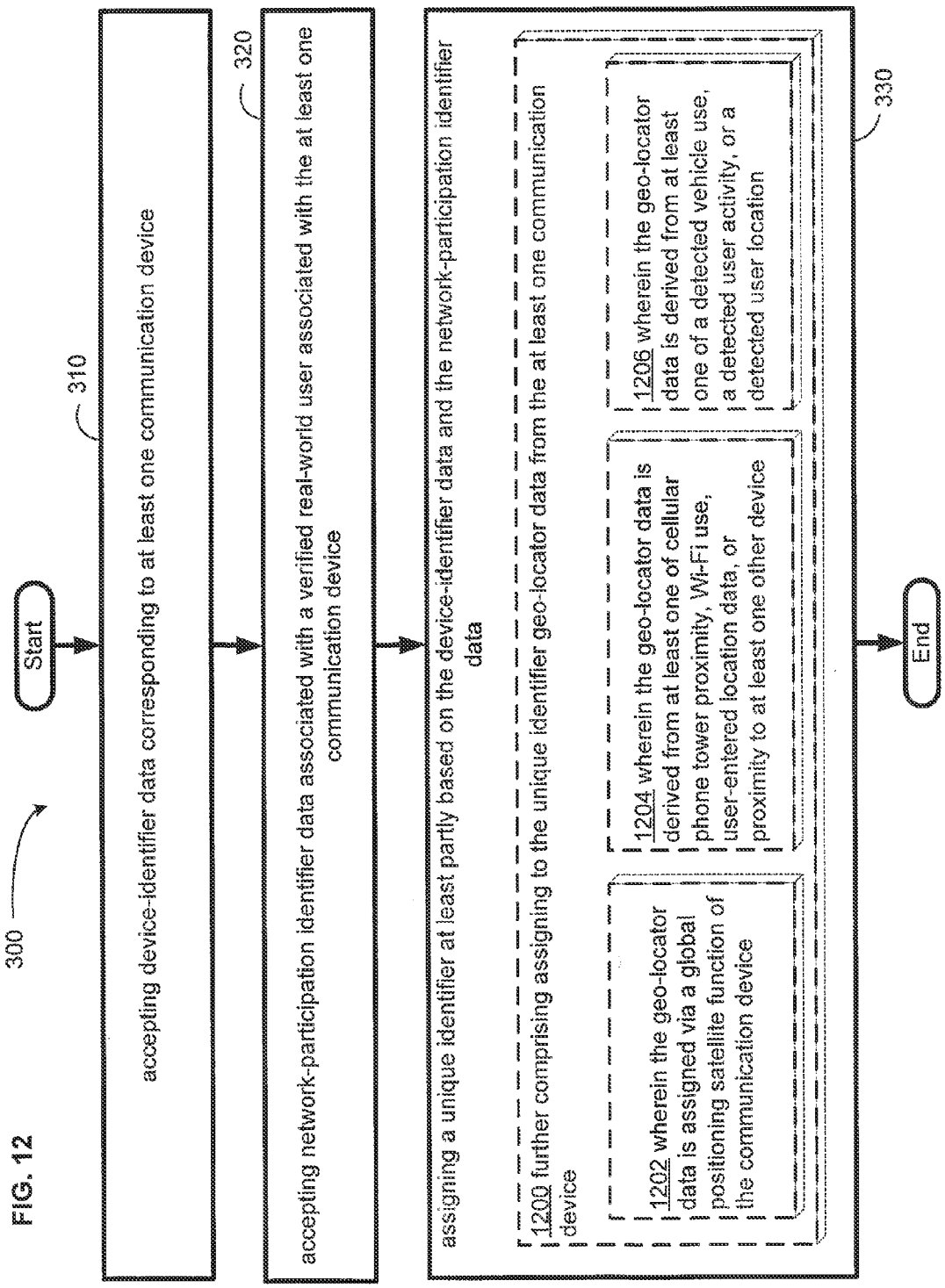

FIG. 12 illustrates an alternative embodiment of the example operational flow of FIG. 3.

Figure 13:
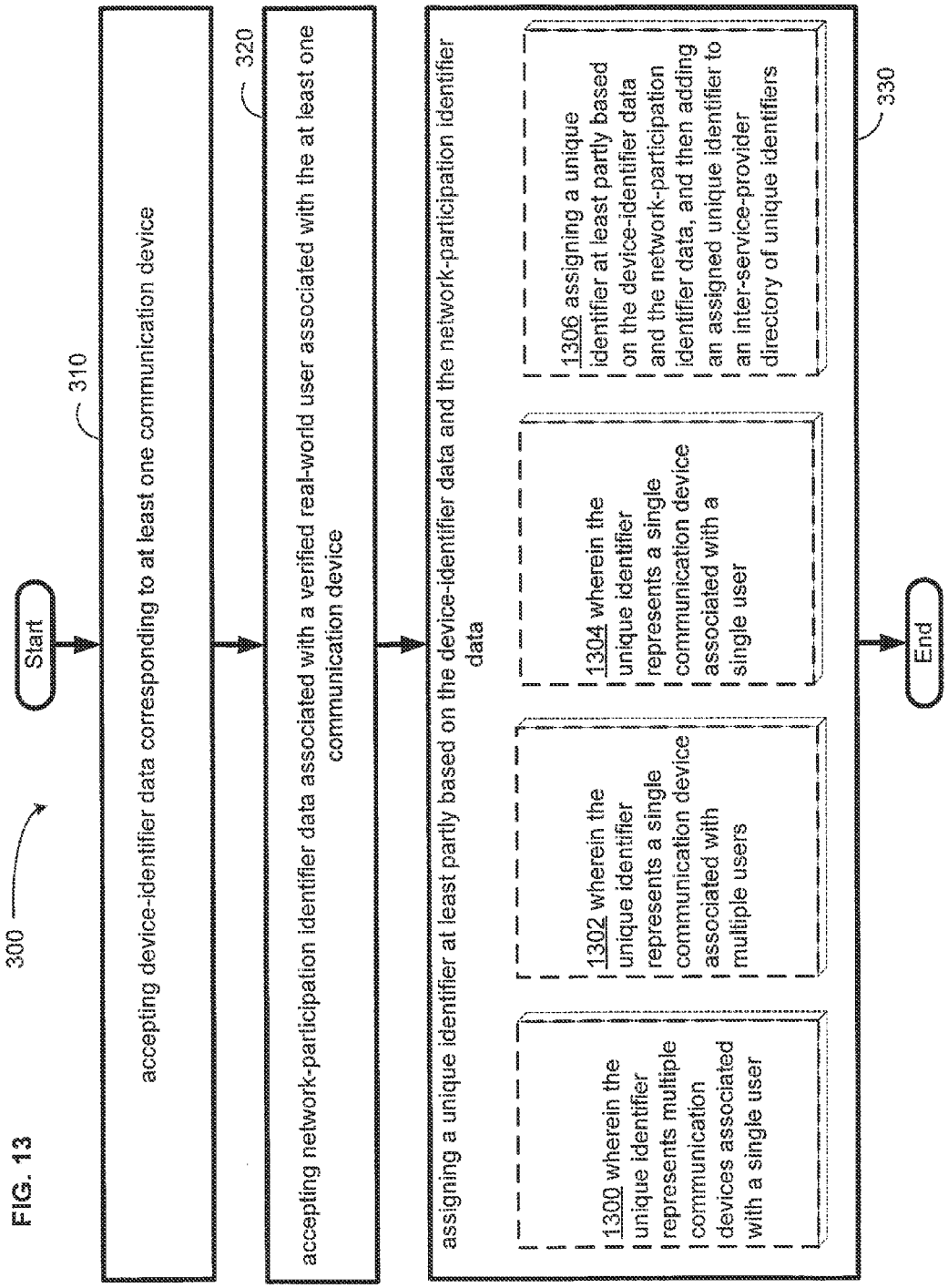

FIG. 13 illustrates an alternative embodiment of the example operational flow of FIG. 3.

Figure 14:
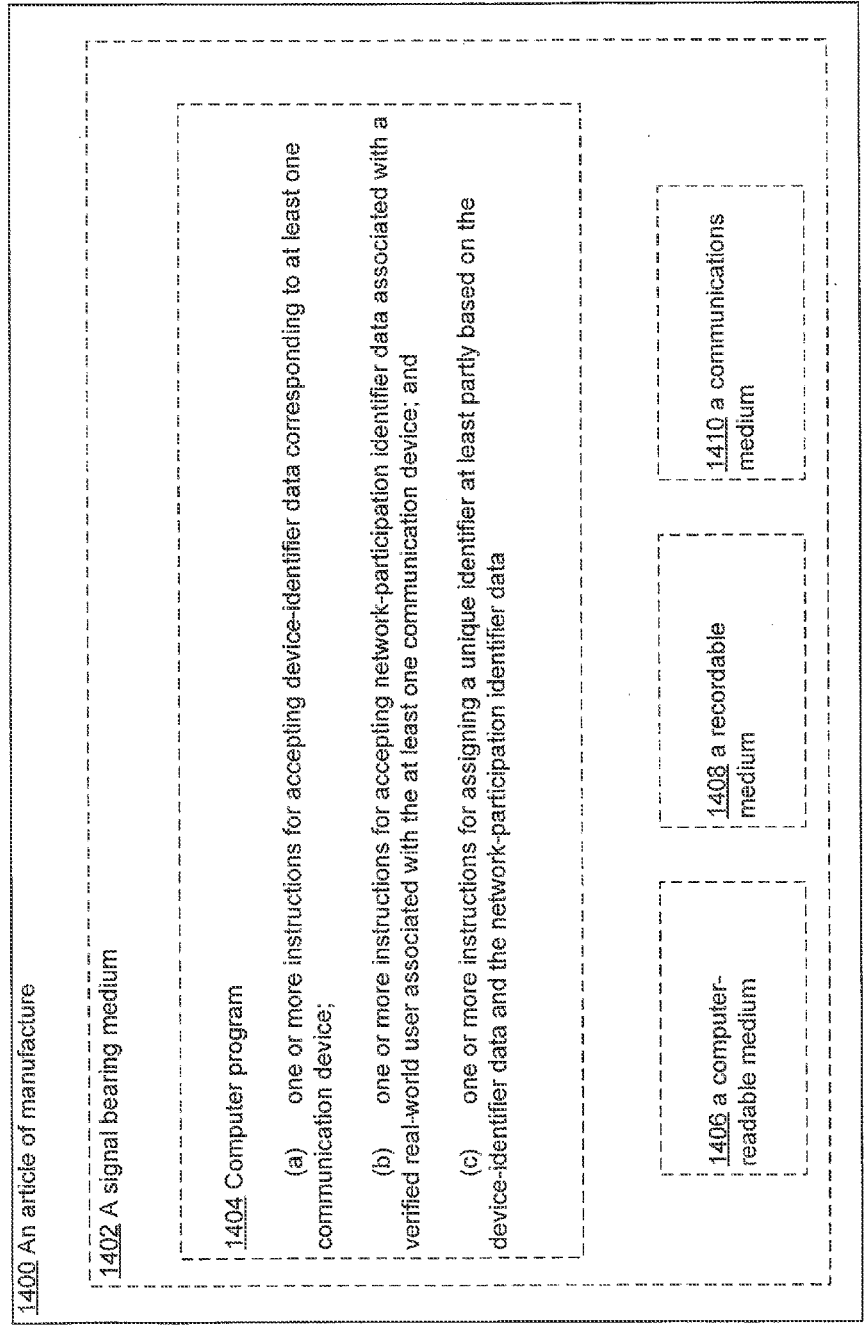

With reference now to FIG. 14, shown is a partial view of an example article of manufacture including a computer program product that includes a computer program for executing a computer process on a computing device related to linking users of devices, which may serve as a context for introducing one or more processes and/or devices described herein.

Figure 15:
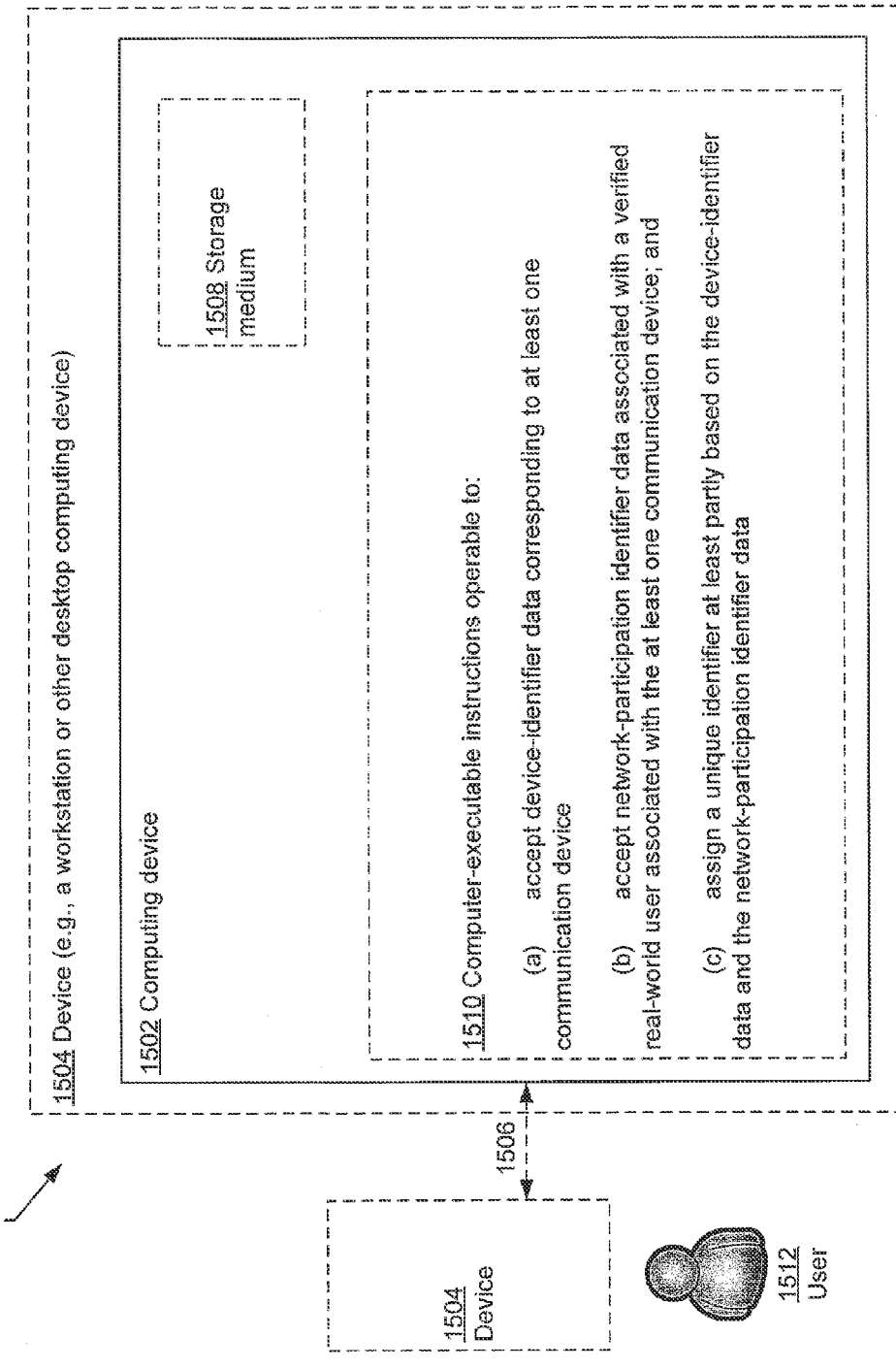

With reference now to FIG. 15, shown is an example device in which embodiments may be implemented related to linking users of devices, which may serve as a context for introducing one or more processes and/or devices described herein.

Figure 16:
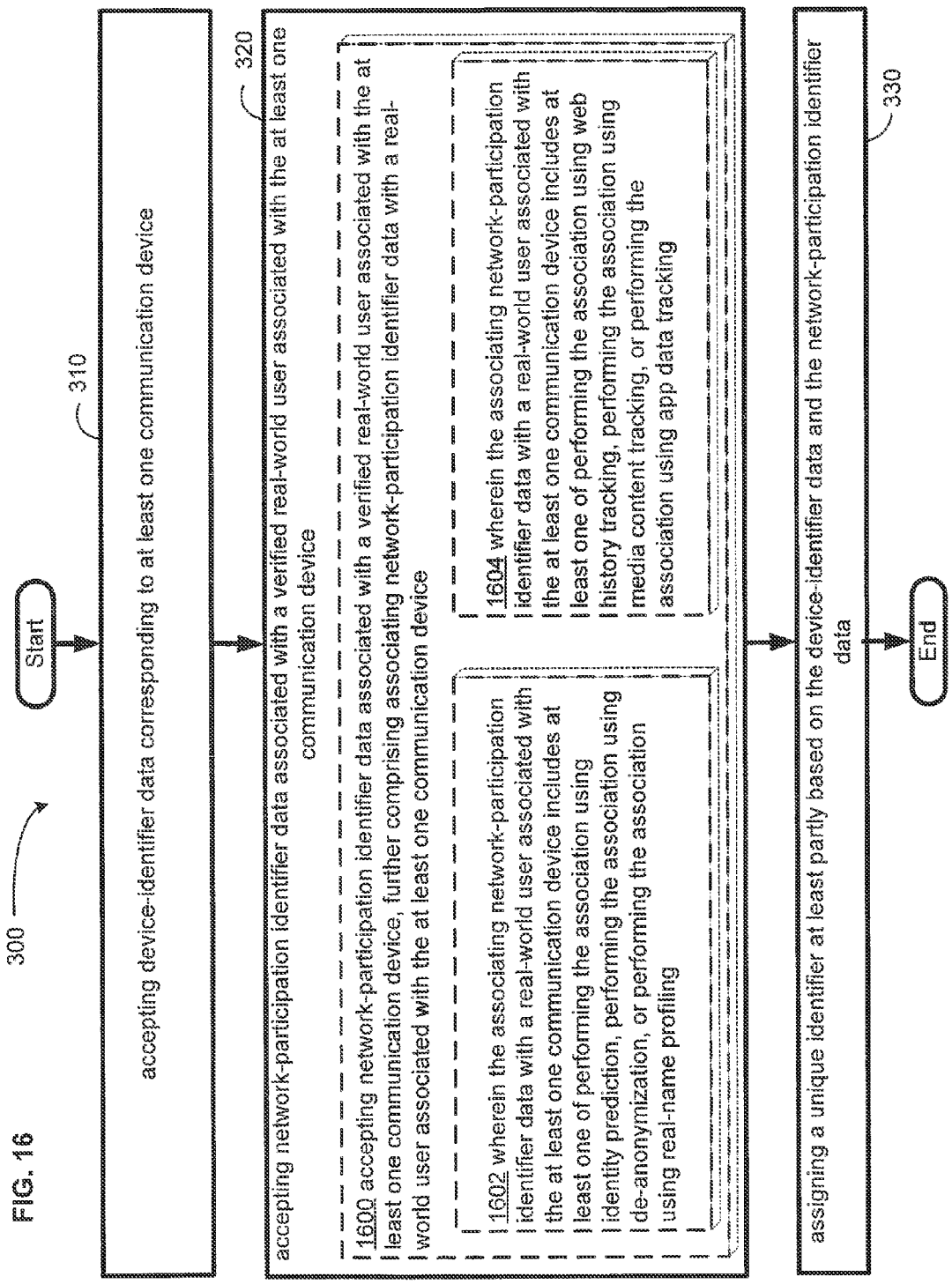

FIG. 16 illustrates an alternative embodiment of the example operational flow of FIG. 3.

Figure 17:
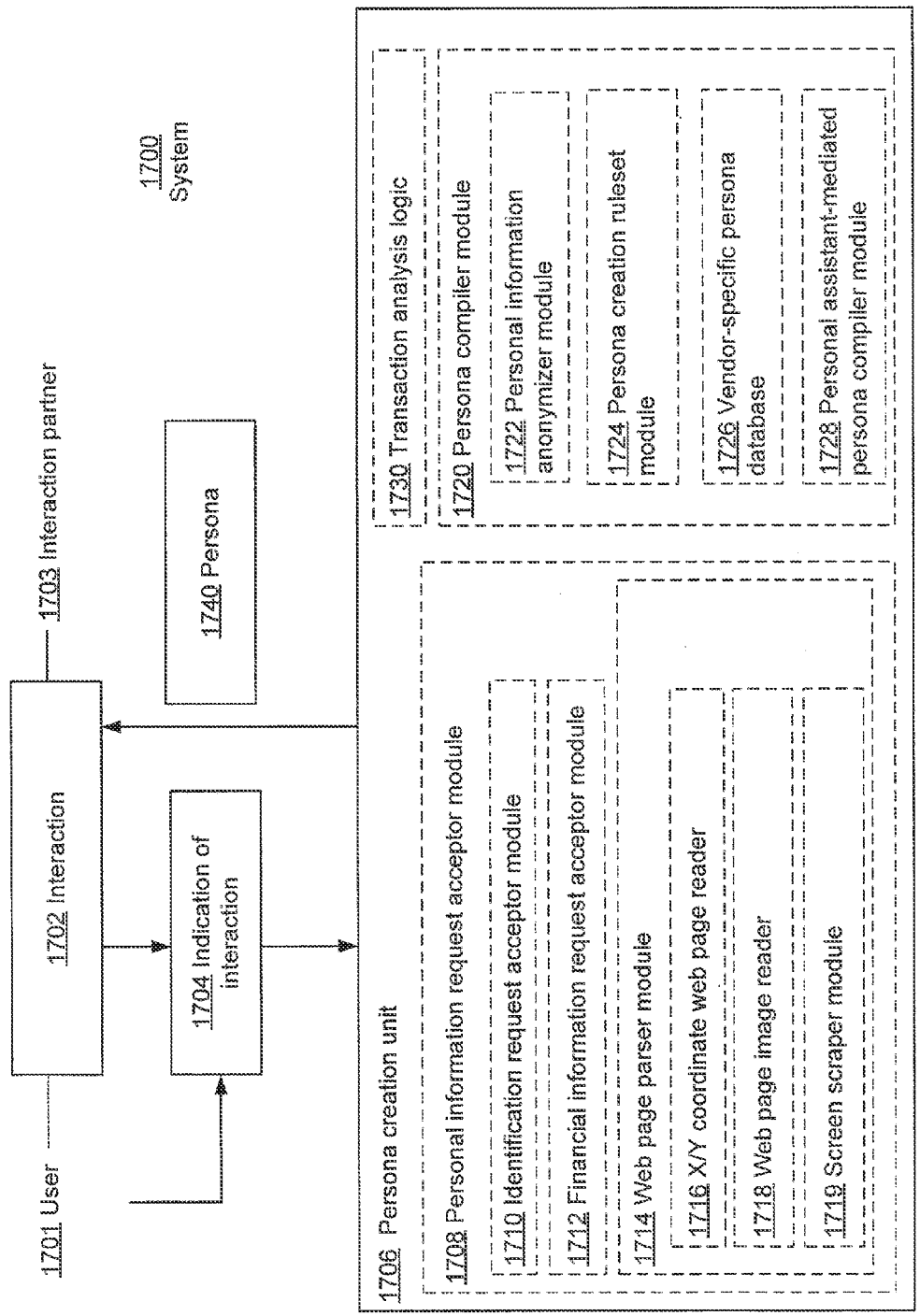

With reference now to FIG. 17, shown is an example of a system for regulating information flow during interactions in which embodiments may be implemented, perhaps in a device and/or through a network, which may serve as a context for introducing one or more processes and/or devices described herein.

Figure 18:
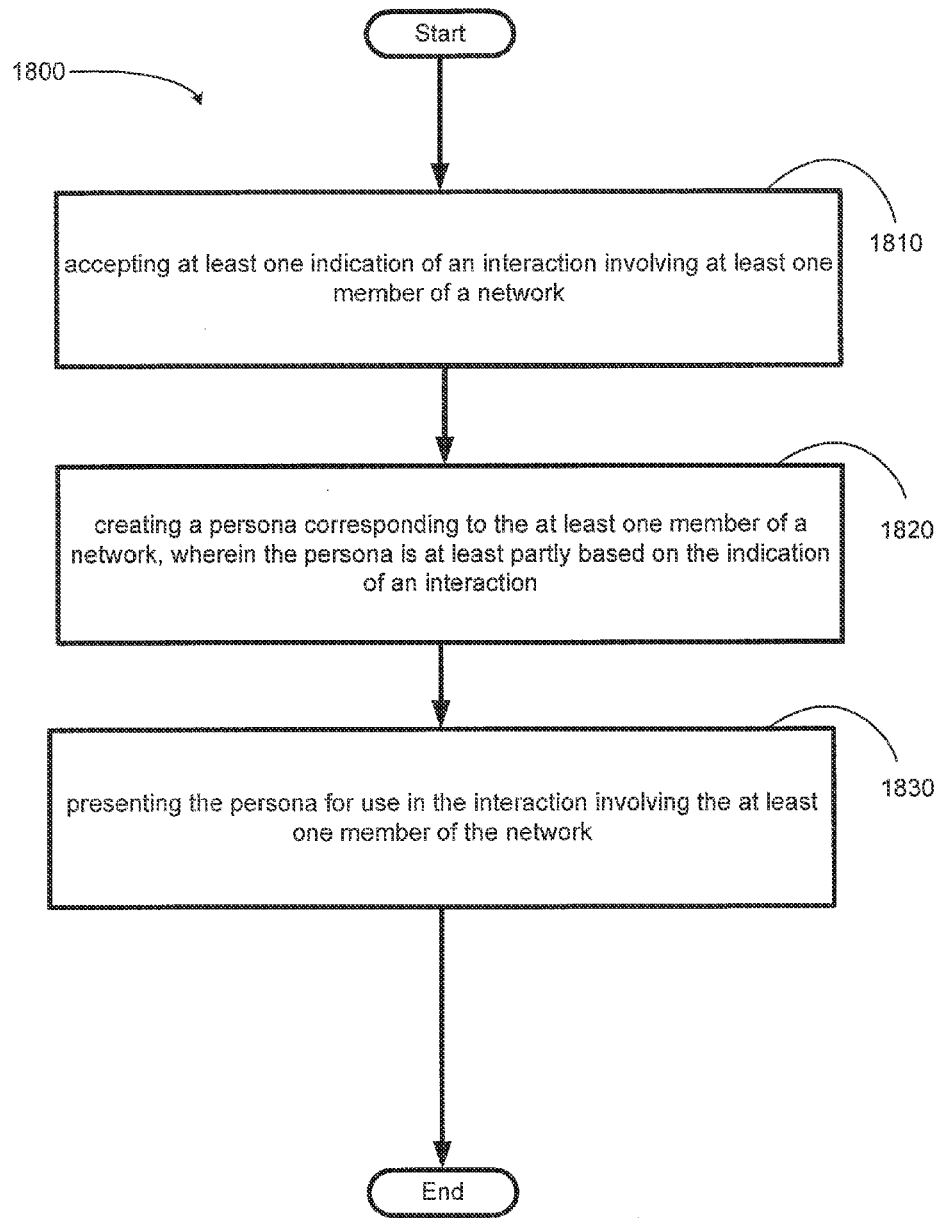

With reference now to FIG. 18, shown is an example of an operational flow representing example operations related to regulating information flow during interactions, which may serve as a context for introducing one or more processes and/or devices described herein.

Figure 19:
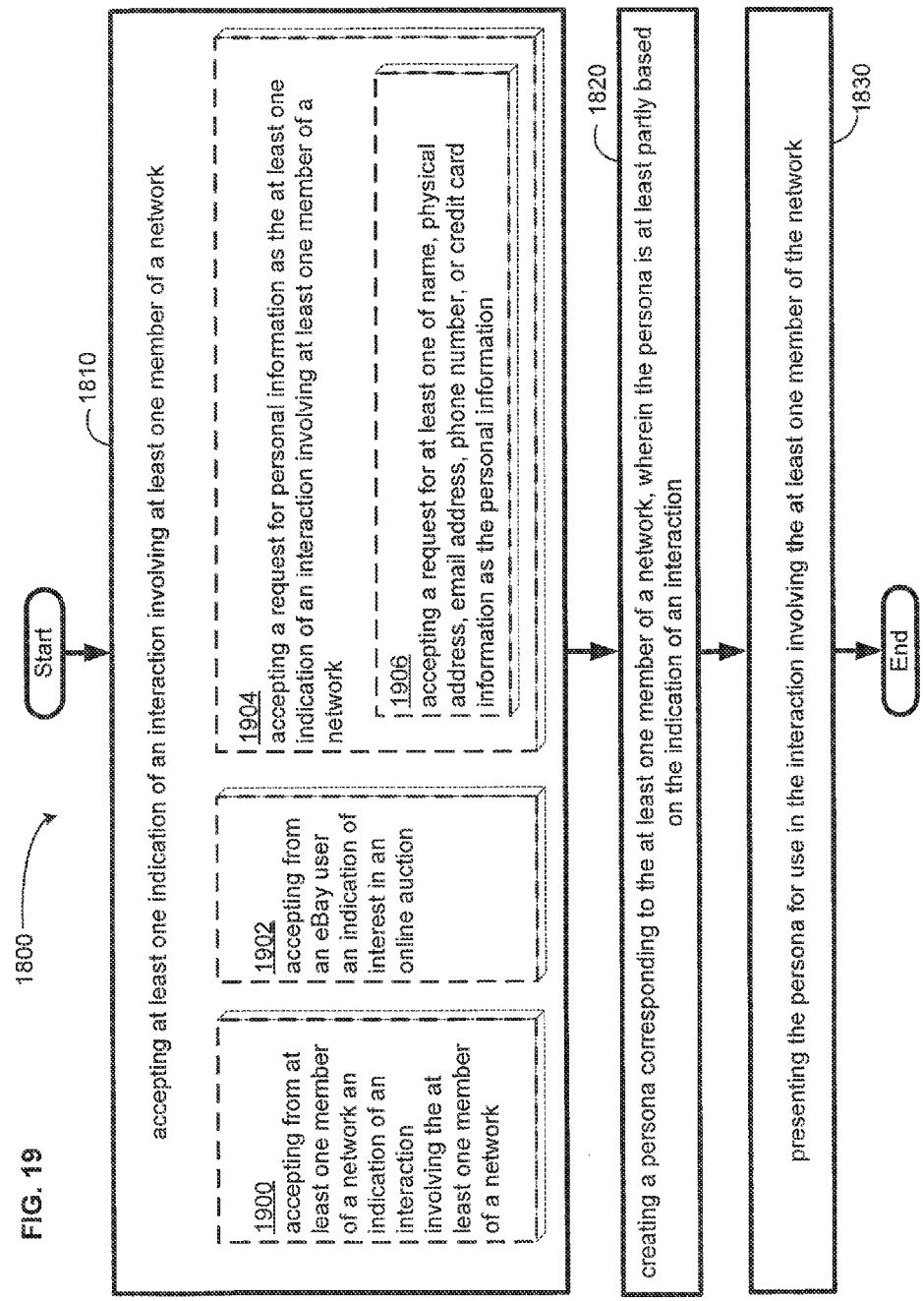

FIG. 19 illustrates an alternative embodiment of the example operational flow of FIG. 18.

Figure 20:
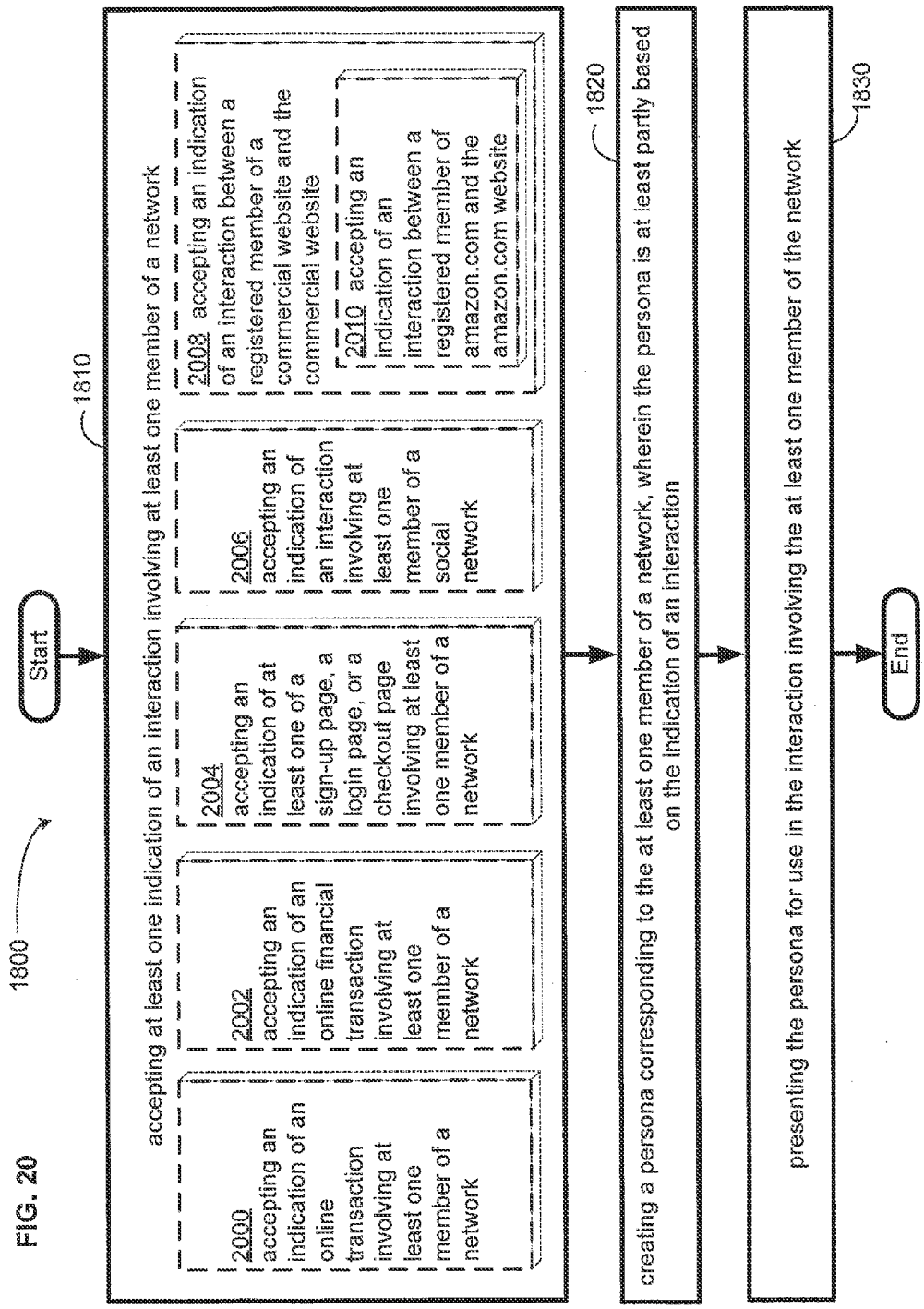

FIG. 20 illustrates an alternative embodiment of the example operational flow of FIG. 18.

Figure 21:
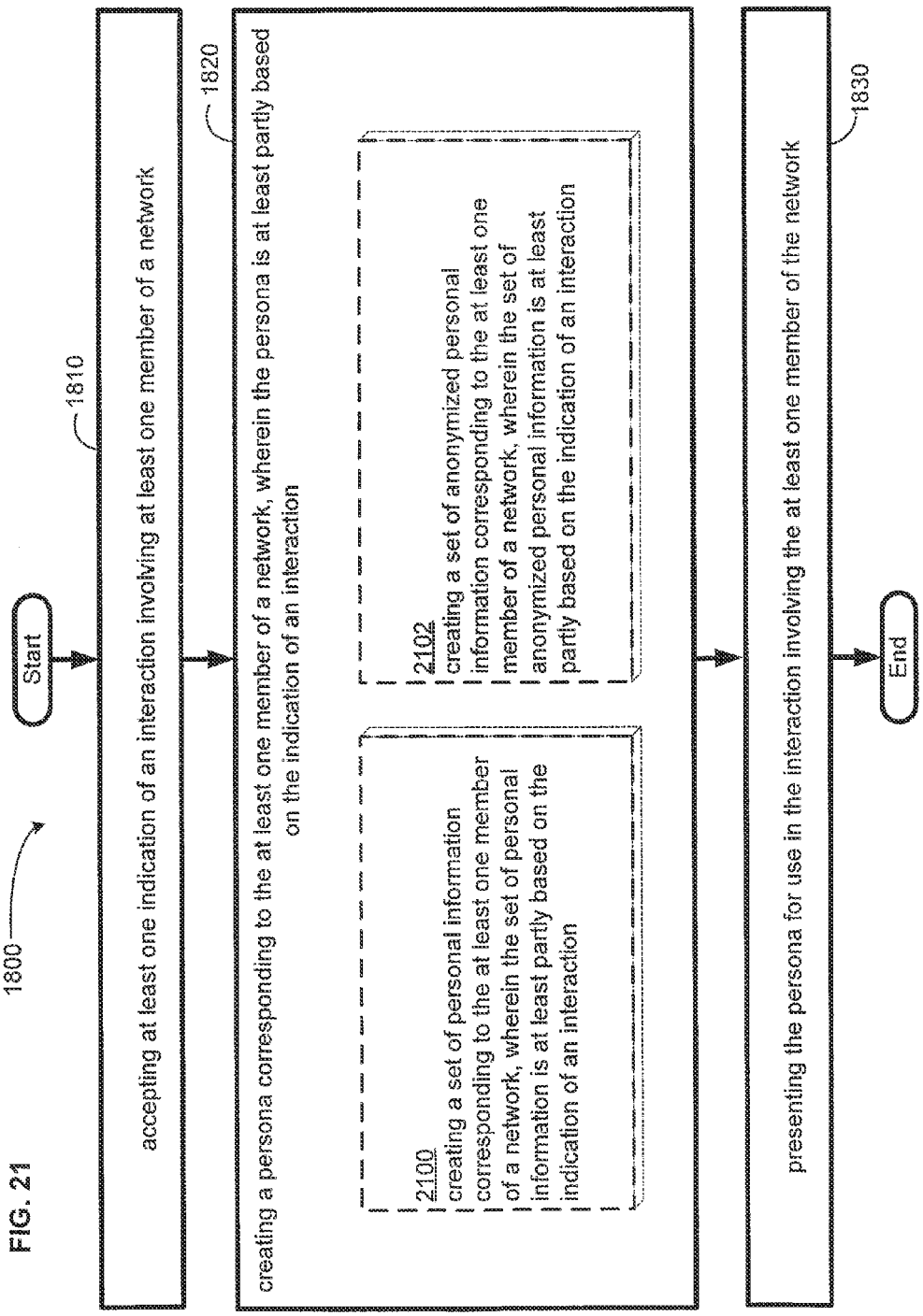

FIG. 21 illustrates an alternative embodiment of the example operational flow of FIG. 18.

Figure 22:
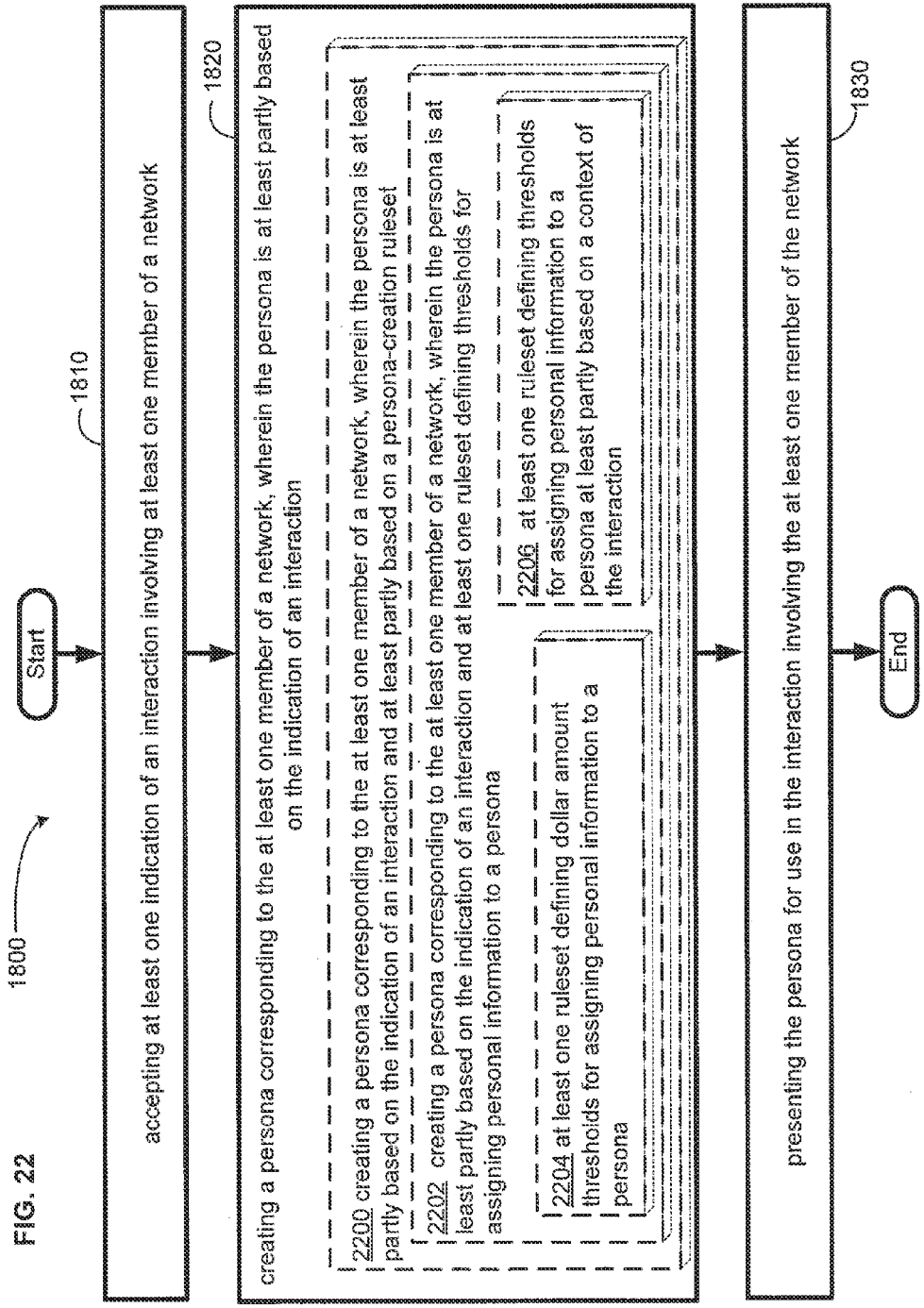

FIG. 22 illustrates an alternative embodiment of the example operational flow of FIG. 18.

Figure 23:
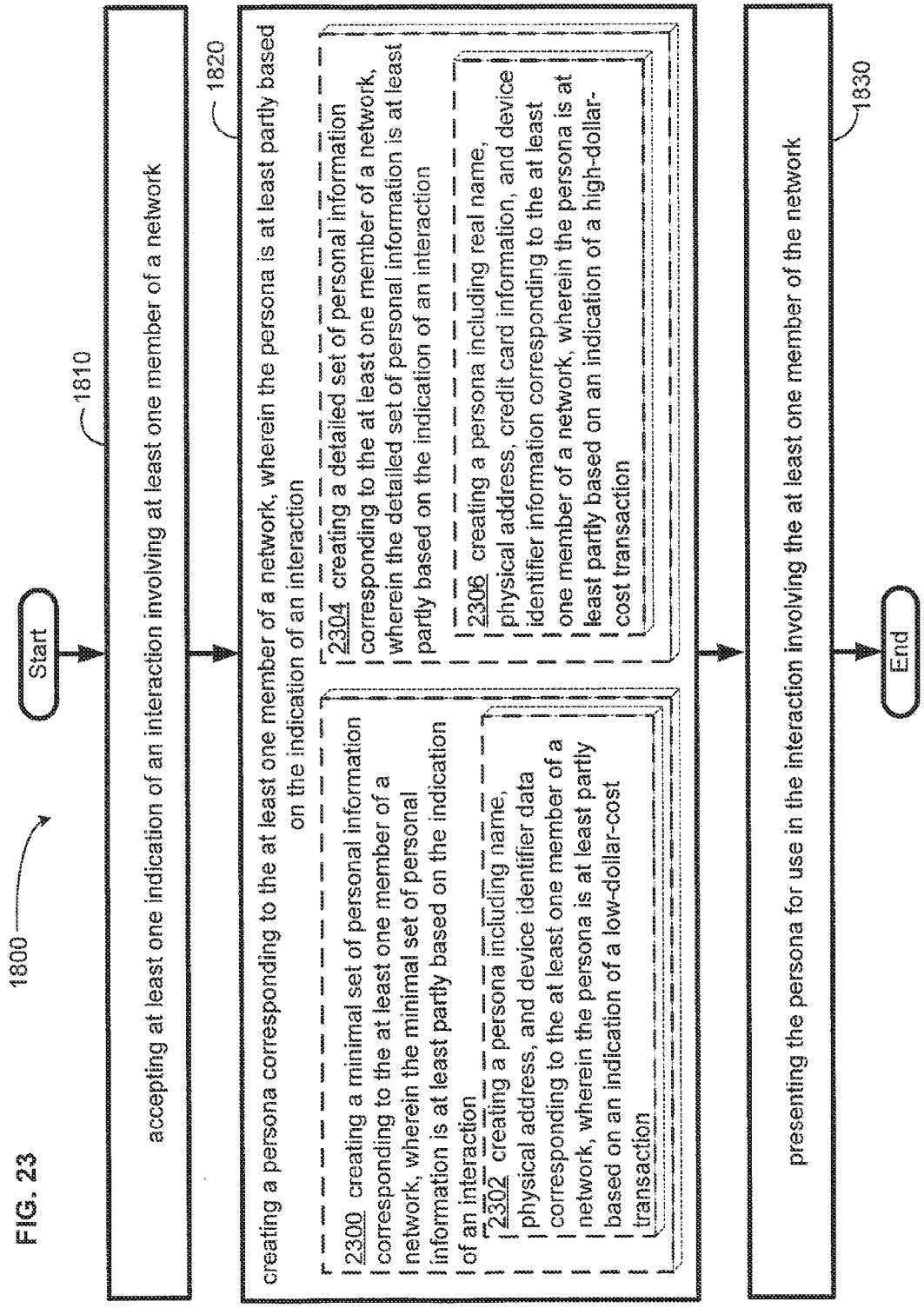

FIG. 23 illustrates an alternative embodiment of the example operational flow of FIG. 18.

Figure 24:
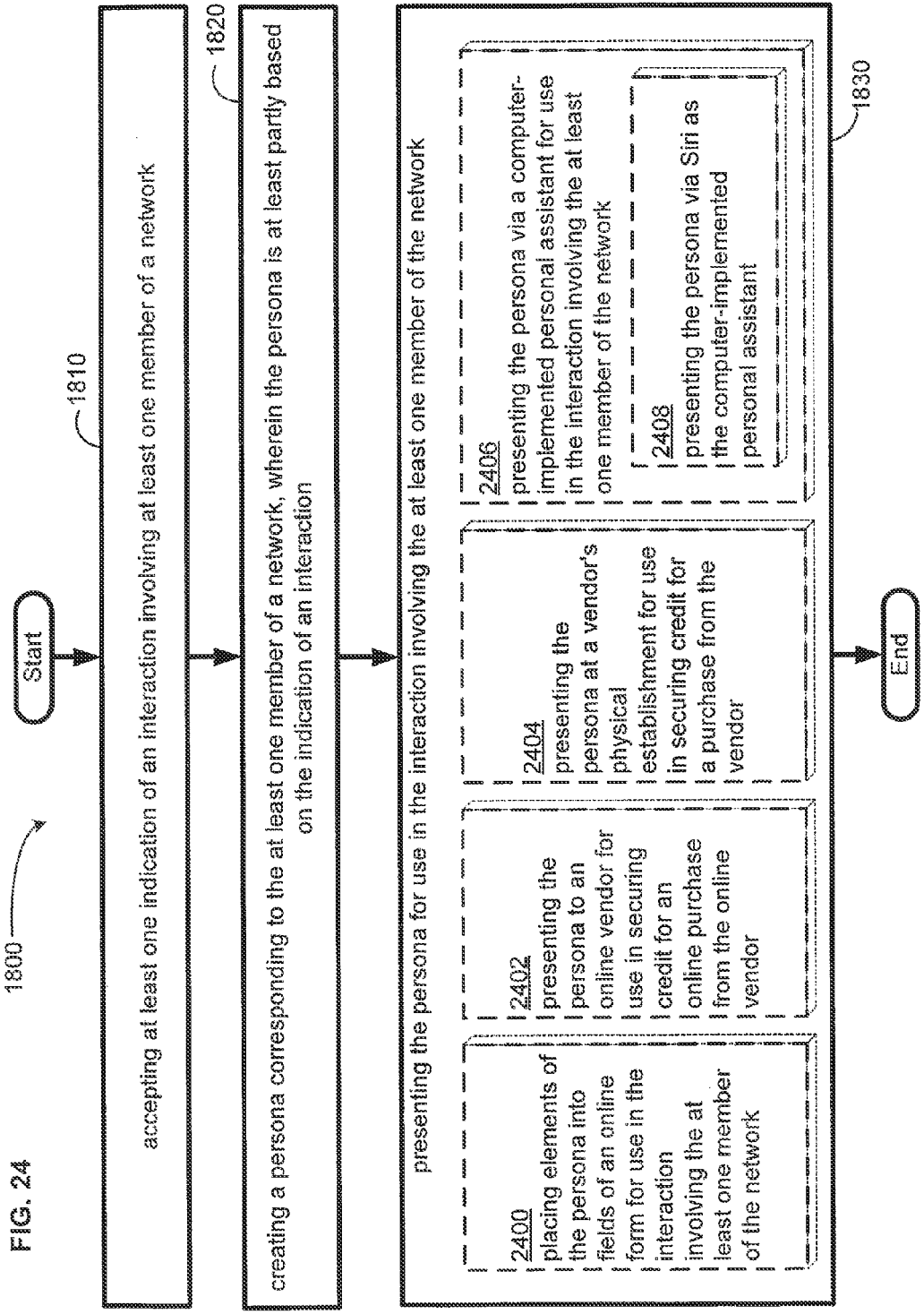

FIG. 24 illustrates an alternative embodiment of the example operational flow of FIG. 18.

Figure 25:
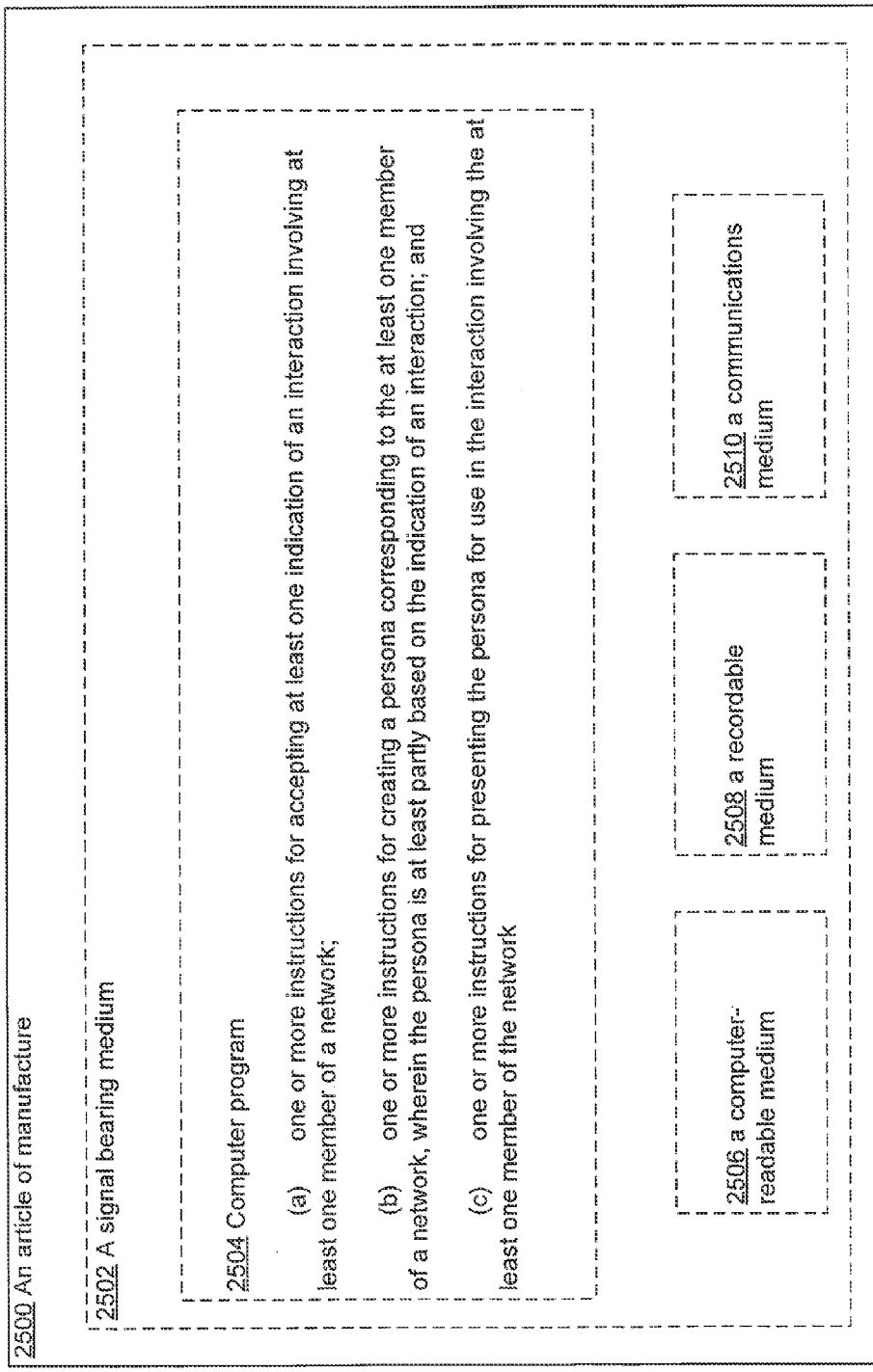

With reference now to FIG. 25, shown is a partial view of an example article of manufacture including a computer program product that includes a computer program for executing a computer process on a computing device related to regulating information flow during interactions, which may serve as a context for introducing one or more processes and/or devices described herein.

Figure 26:
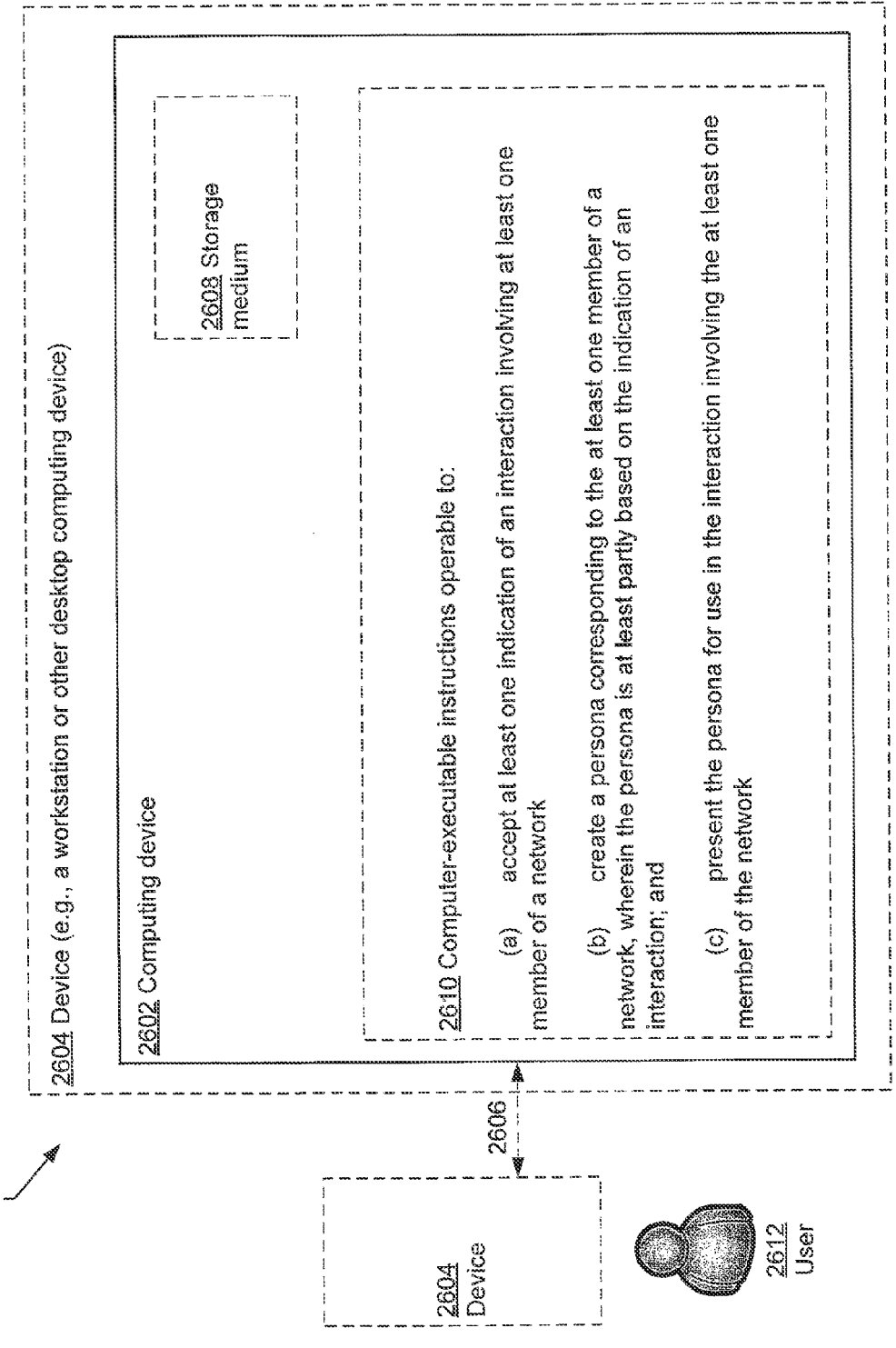

With reference now to FIG. 26, shown is an example device in which embodiments may be implemented related to regulating information flow during interactions, which may serve as a context for introducing one or more processes and/or devices described herein.

Figure 27:
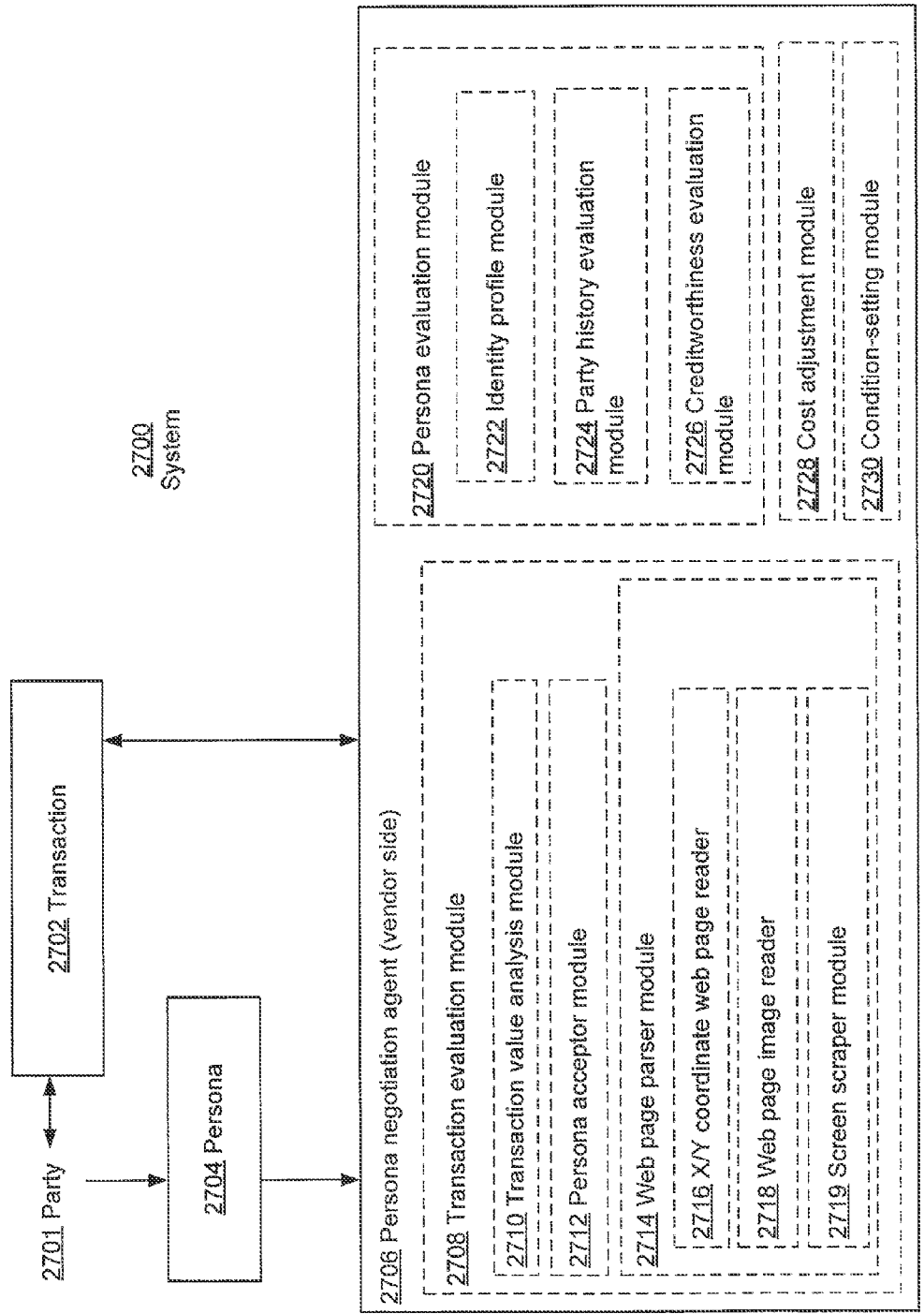

With reference now to FIG. 27, shown is an example of a system for regulating information flow during interactions in which embodiments may be implemented, perhaps in a device and/or through a network, which may serve as a context for introducing one or more processes and/or devices described herein.

Figure 28:
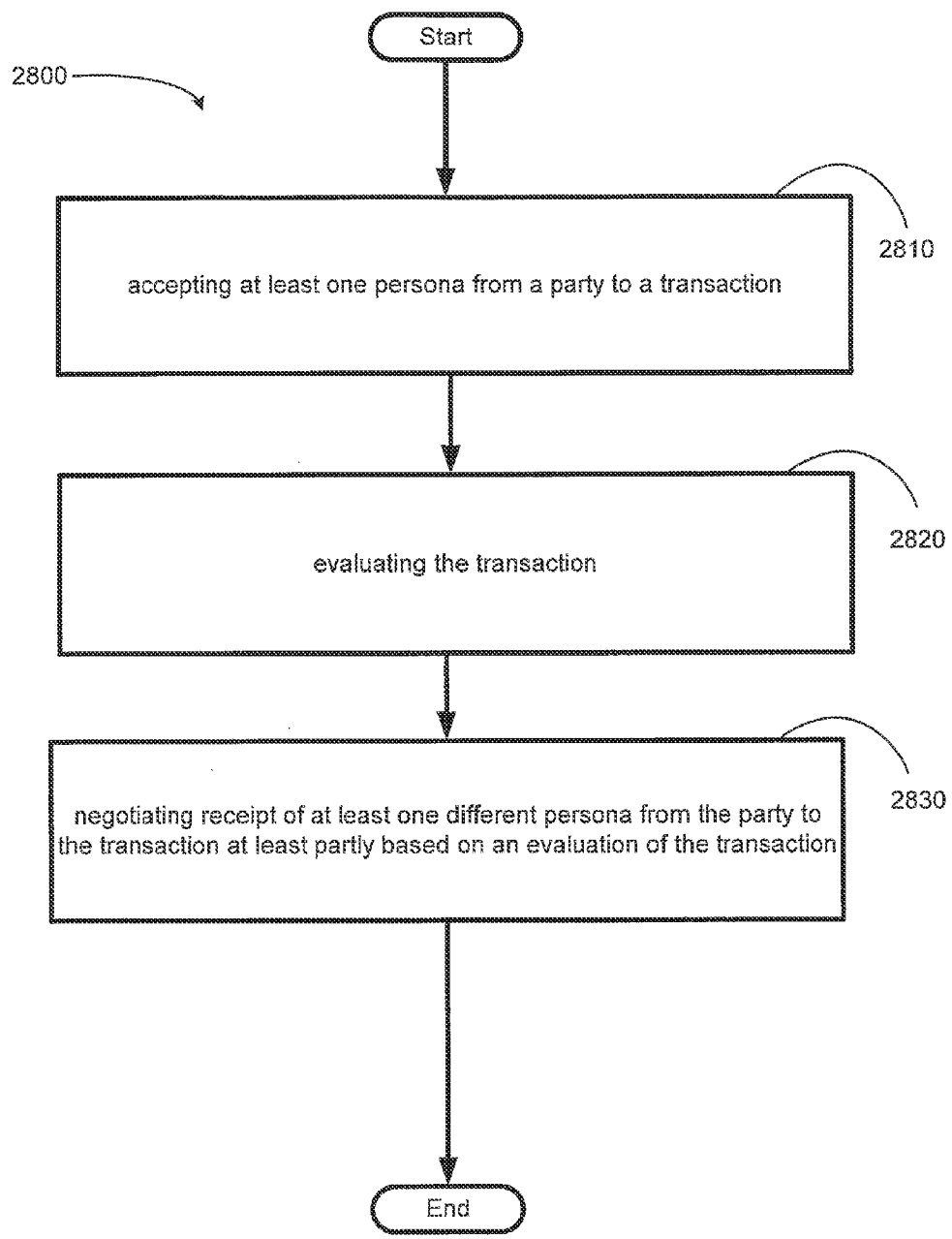

With reference now to FIG. 28, shown is an example of an operational flow representing example operations related to regulating information flow during interactions, which may serve as a context for introducing one or more processes and/or devices described herein.

Figure 29:
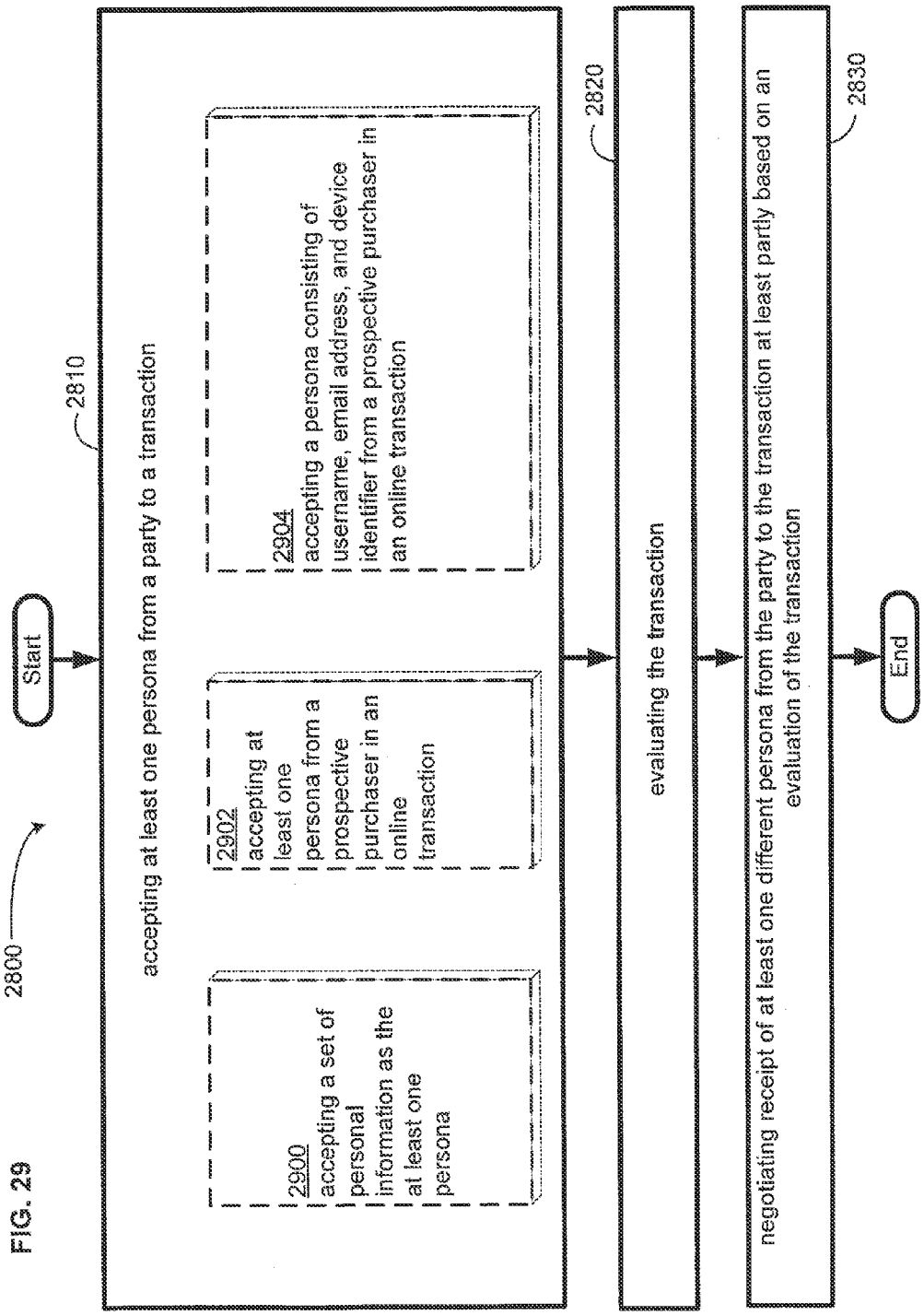

FIG. 29 illustrates an alternative embodiment of the example operational flow of FIG. 28.

Figure 30:
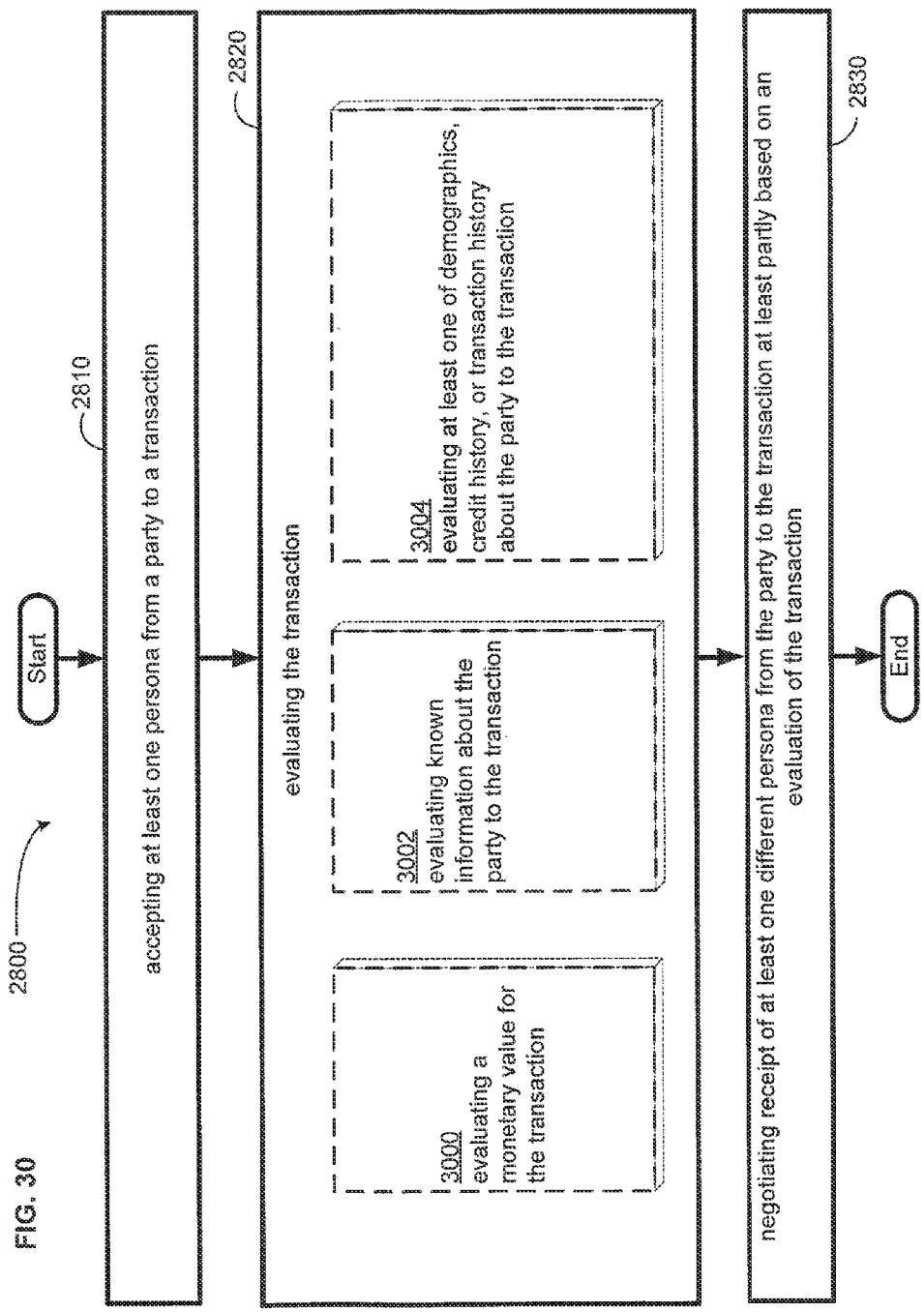

FIG. 30 illustrates an alternative embodiment of the example operational flow of FIG. 28.

Figure 31:
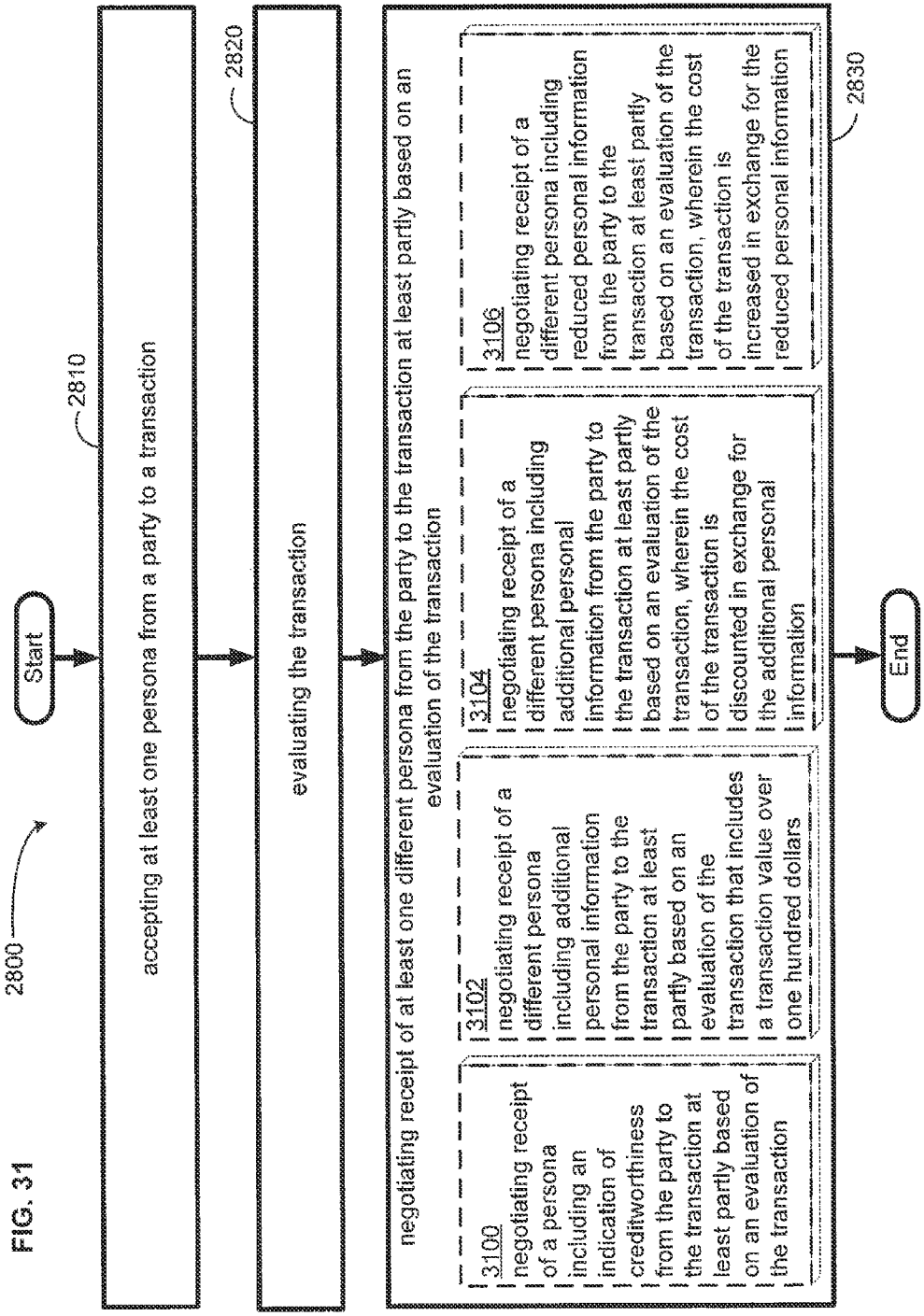

FIG. 31 illustrates an alternative embodiment of the example operational flow of FIG. 28.

FIG. 32 illustrates an alternative embodiment of the example operational flow of FIG. 28.

With reference now to FIG. 33, shown is a partial view of an example article of manufacture including a computer program product that includes a computer program for executing a computer process on a computing device related to regulating information flow during interactions, which may serve as a context for introducing one or more processes and/or devices described herein.

Figure 34:
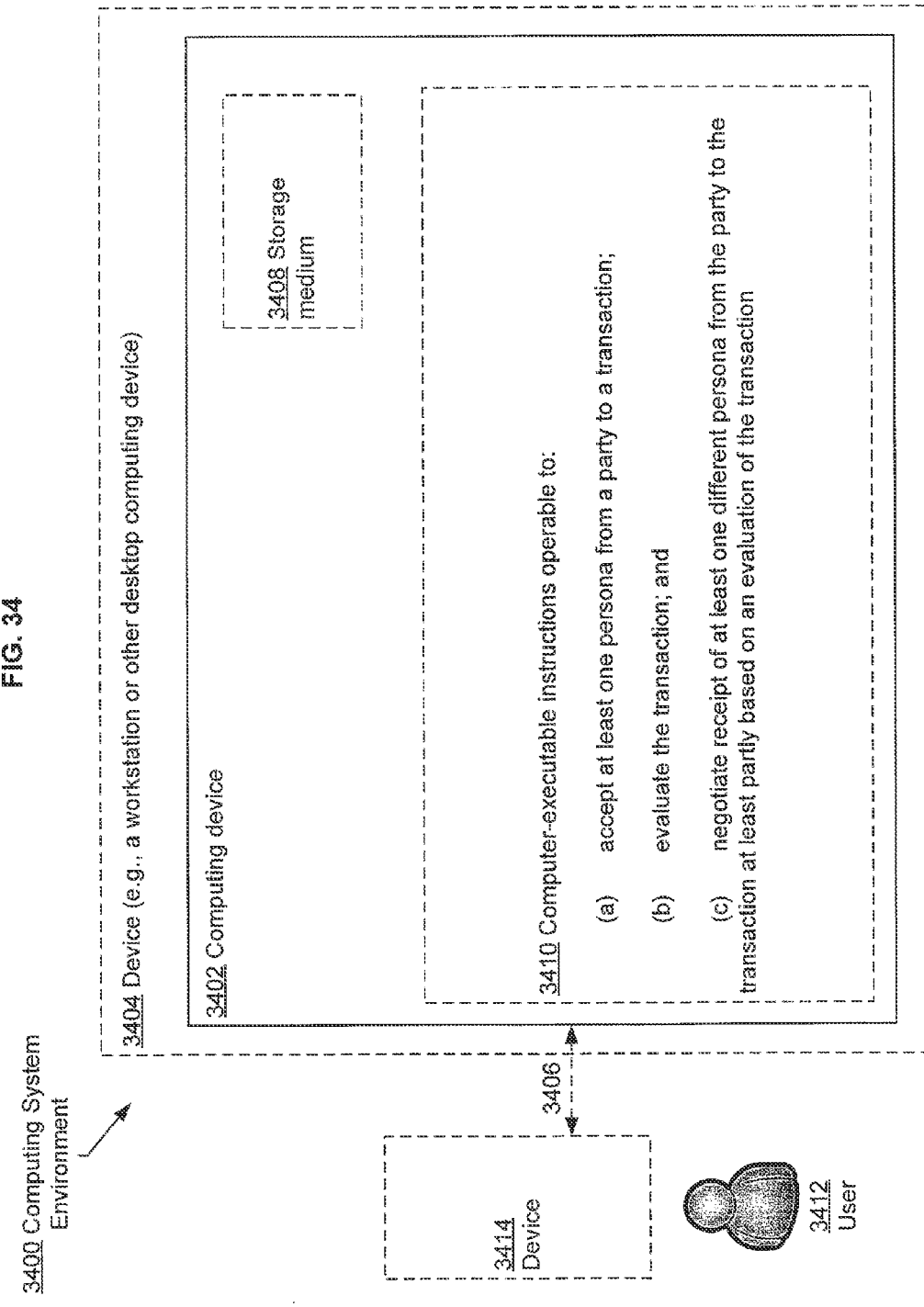

With reference now to FIG. 34, shown is an example device in which embodiments may be implemented related to regulating information flow during interactions, which may serve as a context for introducing one or more processes and/or devices described herein.

Figure 35:
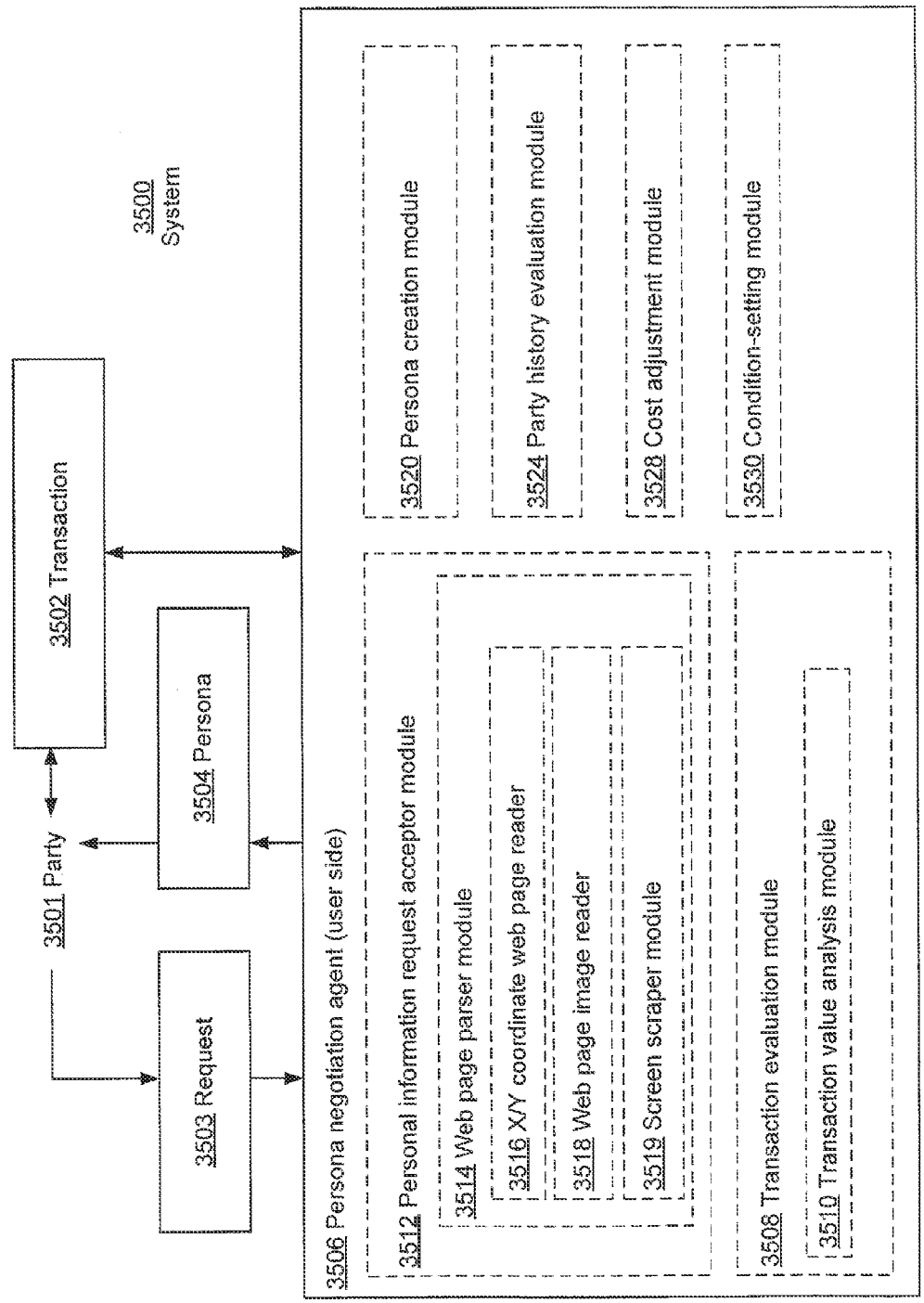

With reference now to FIG. 35, shown is an example of a system for regulating information flow during interactions in which embodiments may be implemented, perhaps in a device and/or through a network, which may serve as a context for introducing one or more processes and/or devices described herein.

Figure 36:
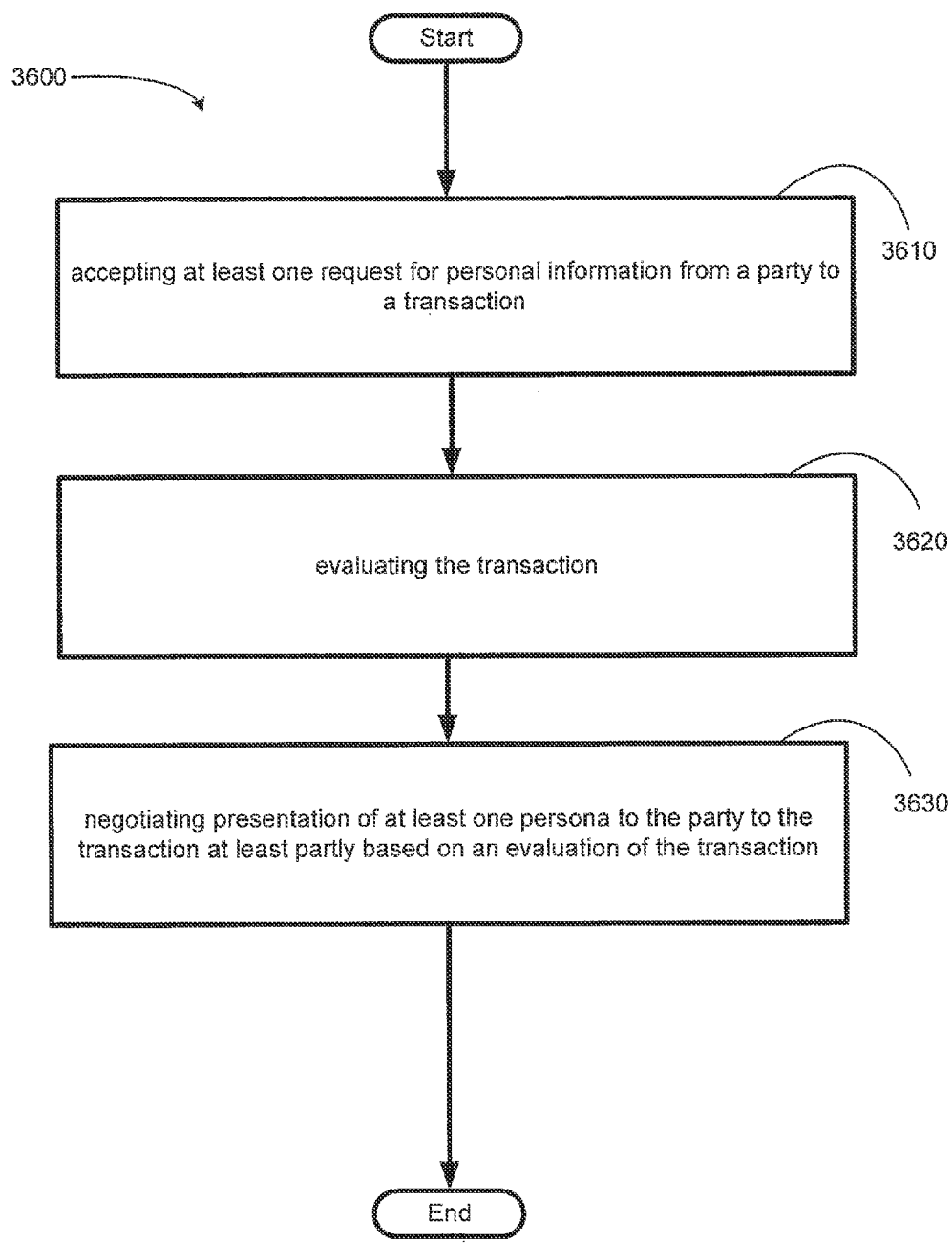

With reference now to FIG. 36, shown is an example of an operational flow representing example operations related to regulating information flow during interactions, which may serve as a context for introducing one or more processes and/or devices described herein.

Figure 37:
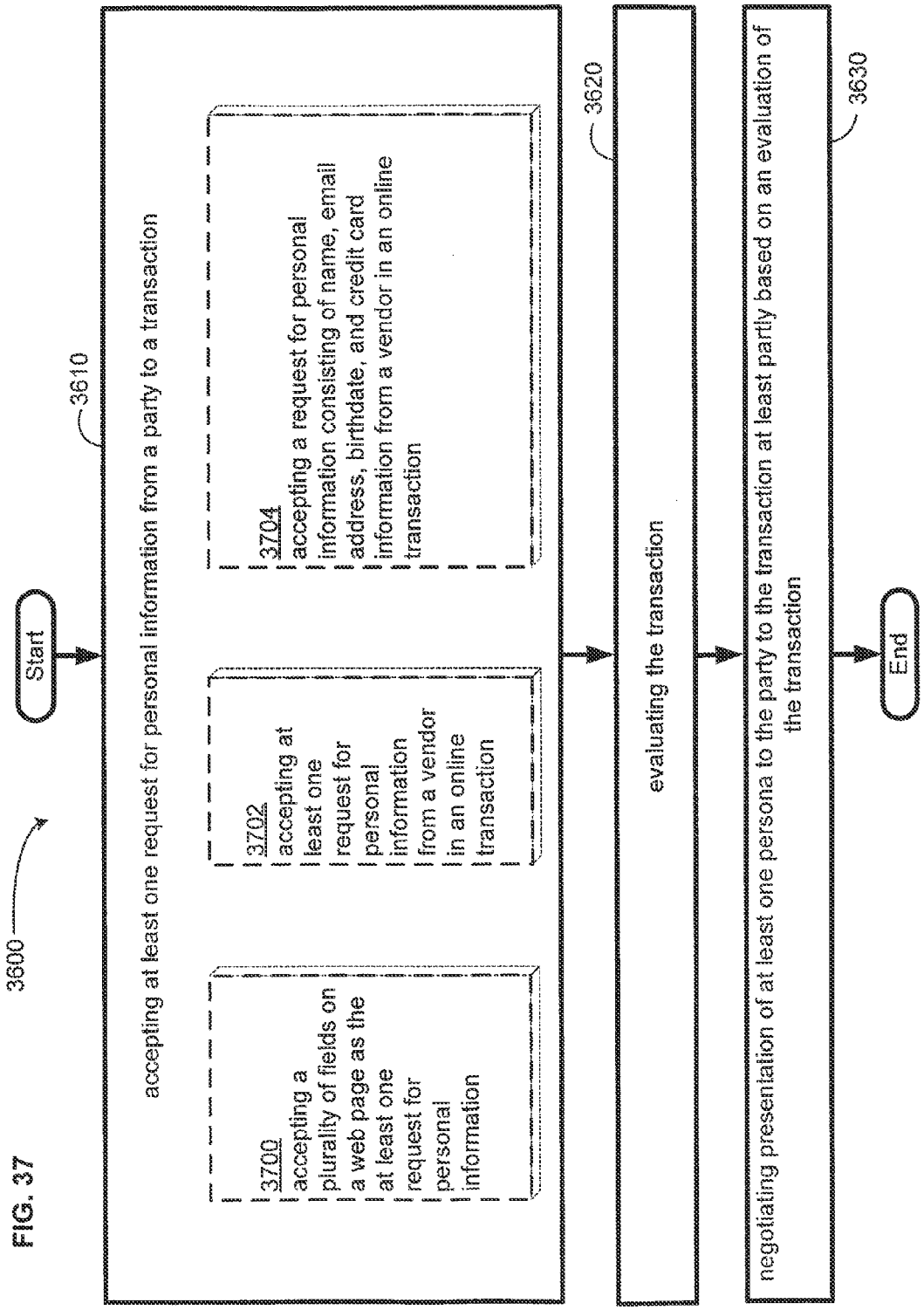

FIG. 37 illustrates an alternative embodiment of the example operational flow of FIG. 36.

Figure 38:
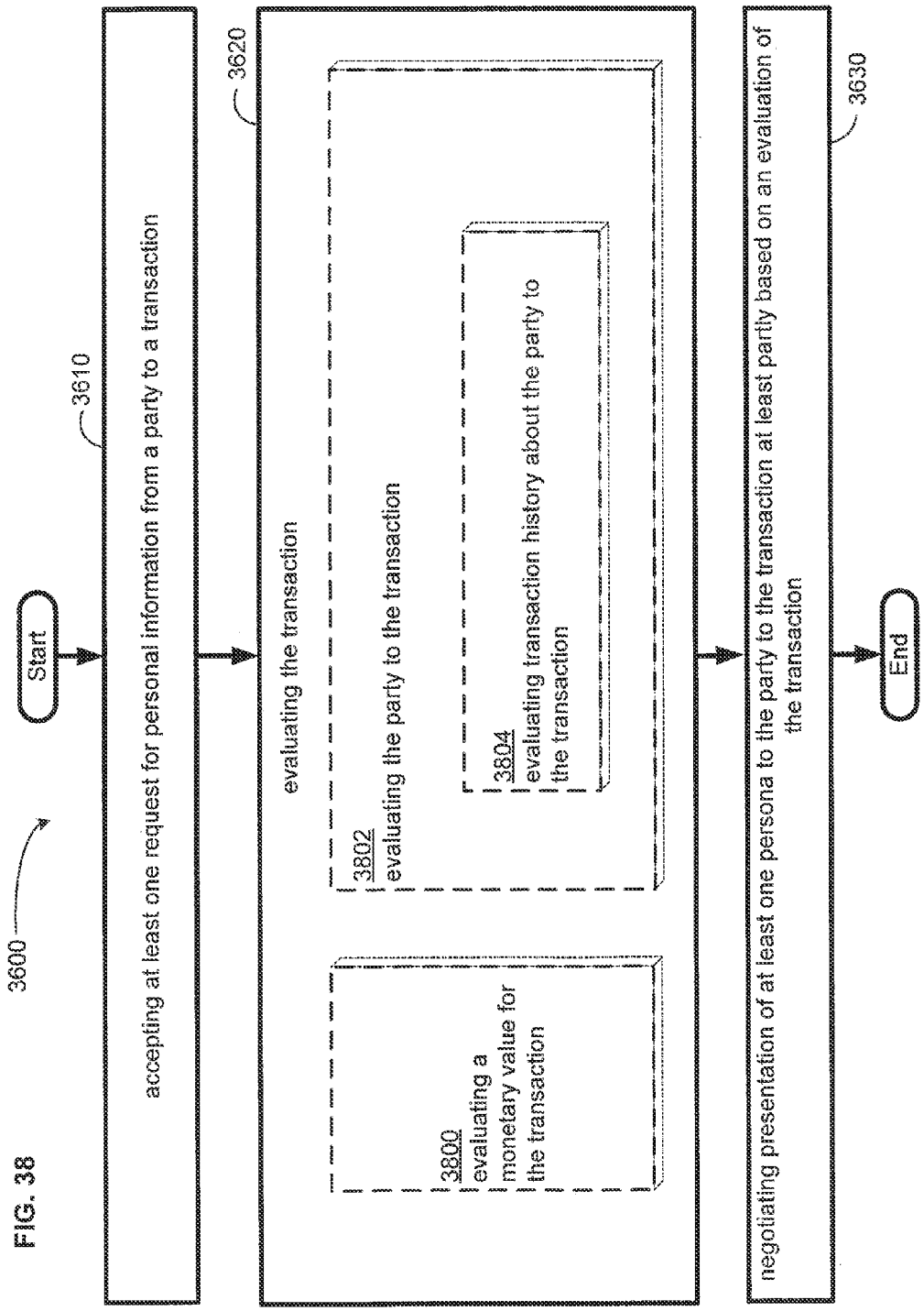

FIG. 38 illustrates an alternative embodiment of the example operational flow of FIG. 36.

Figure 39:
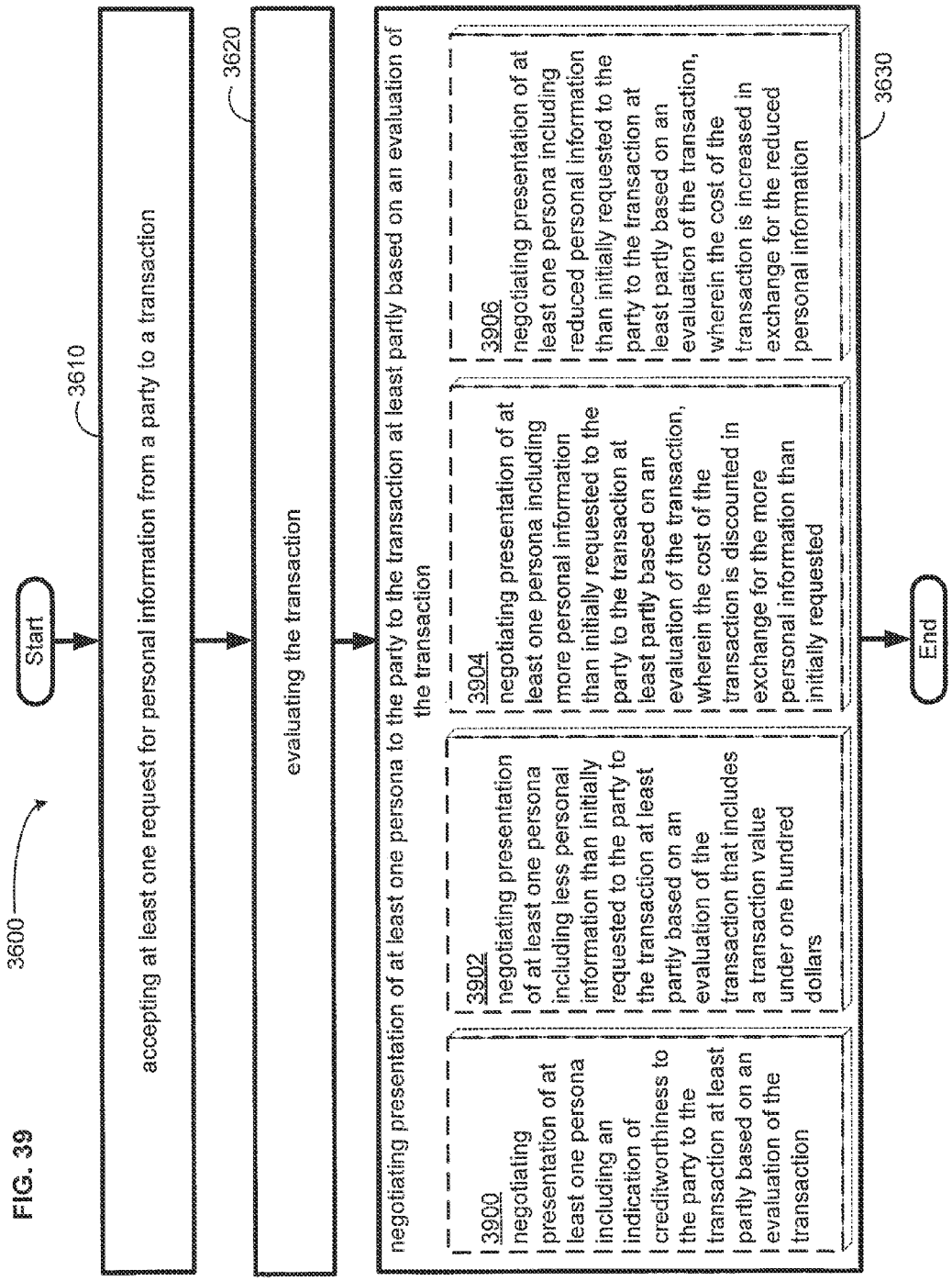

FIG. 39 illustrates an alternative embodiment of the example operational flow of FIG. 36.

Figure 40:
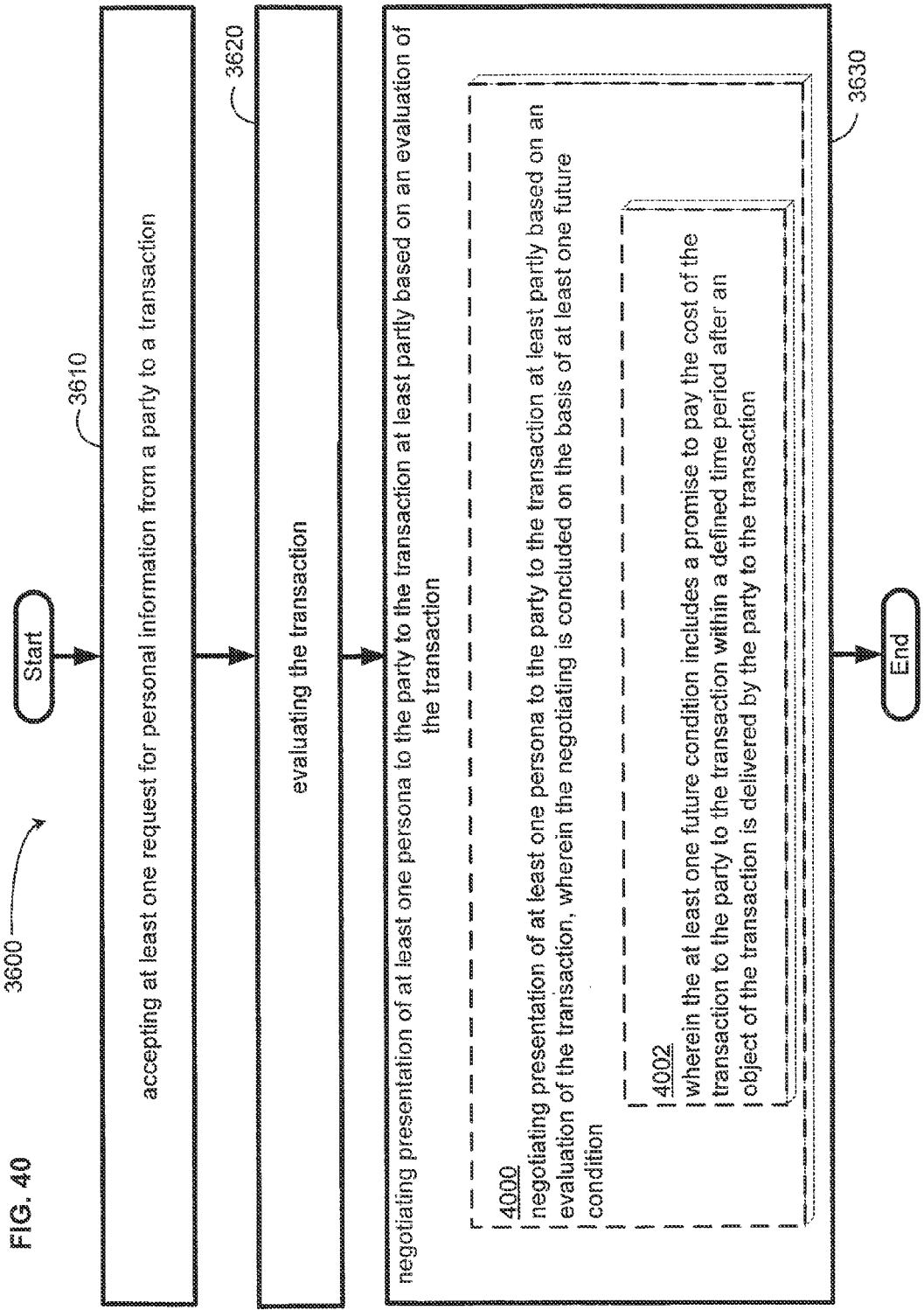

FIG. 40 illustrates an alternative embodiment of the example operational flow of FIG. 36.

Figure 41:
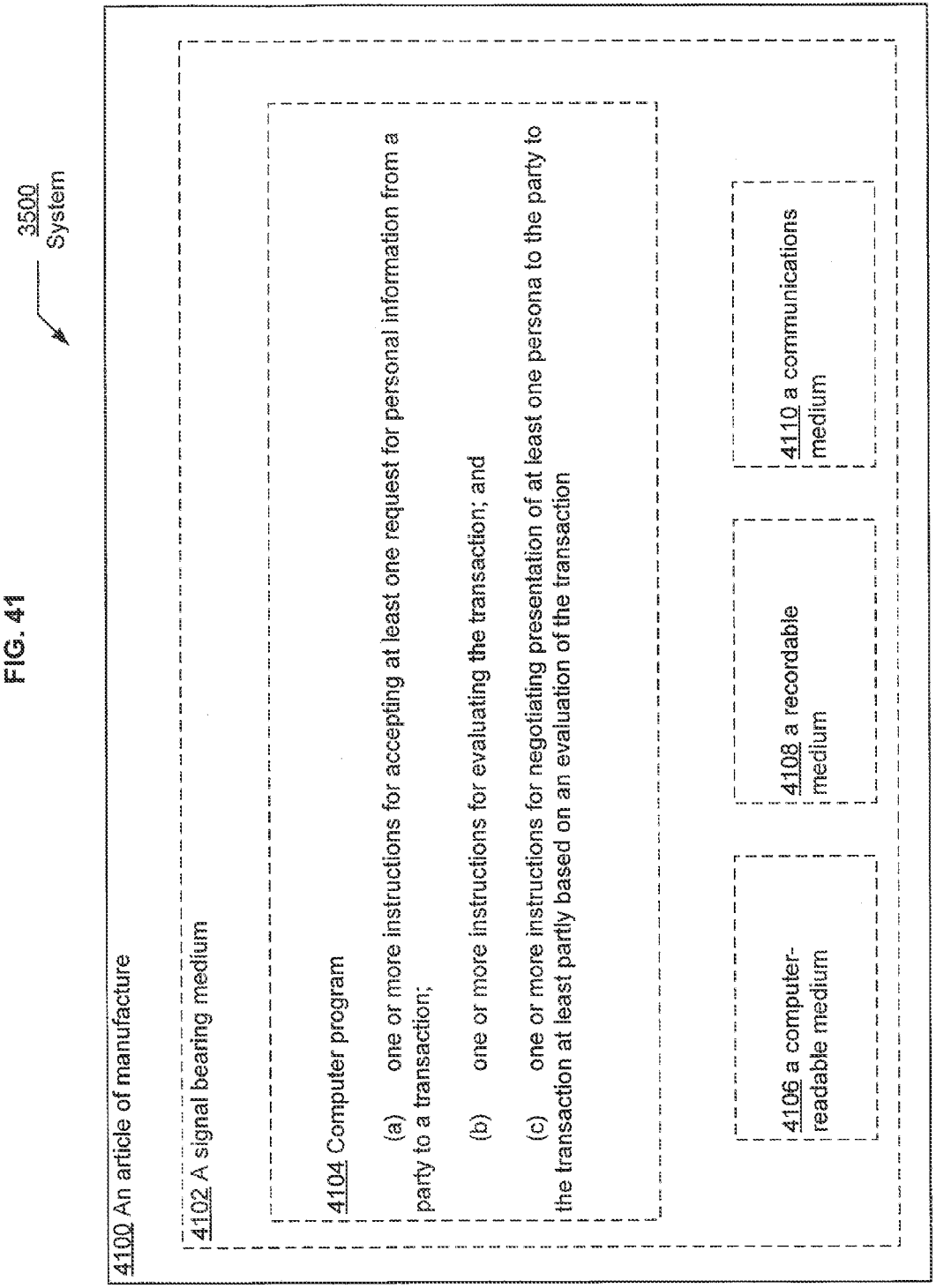

With reference now to FIG. 41, shown is a partial view of an example article of manufacture including a computer program product that includes a computer program for executing a computer process on a computing device related to regulating information flow during interactions, which may serve as a context for introducing one or more processes and/or devices described herein.

Figure 42:
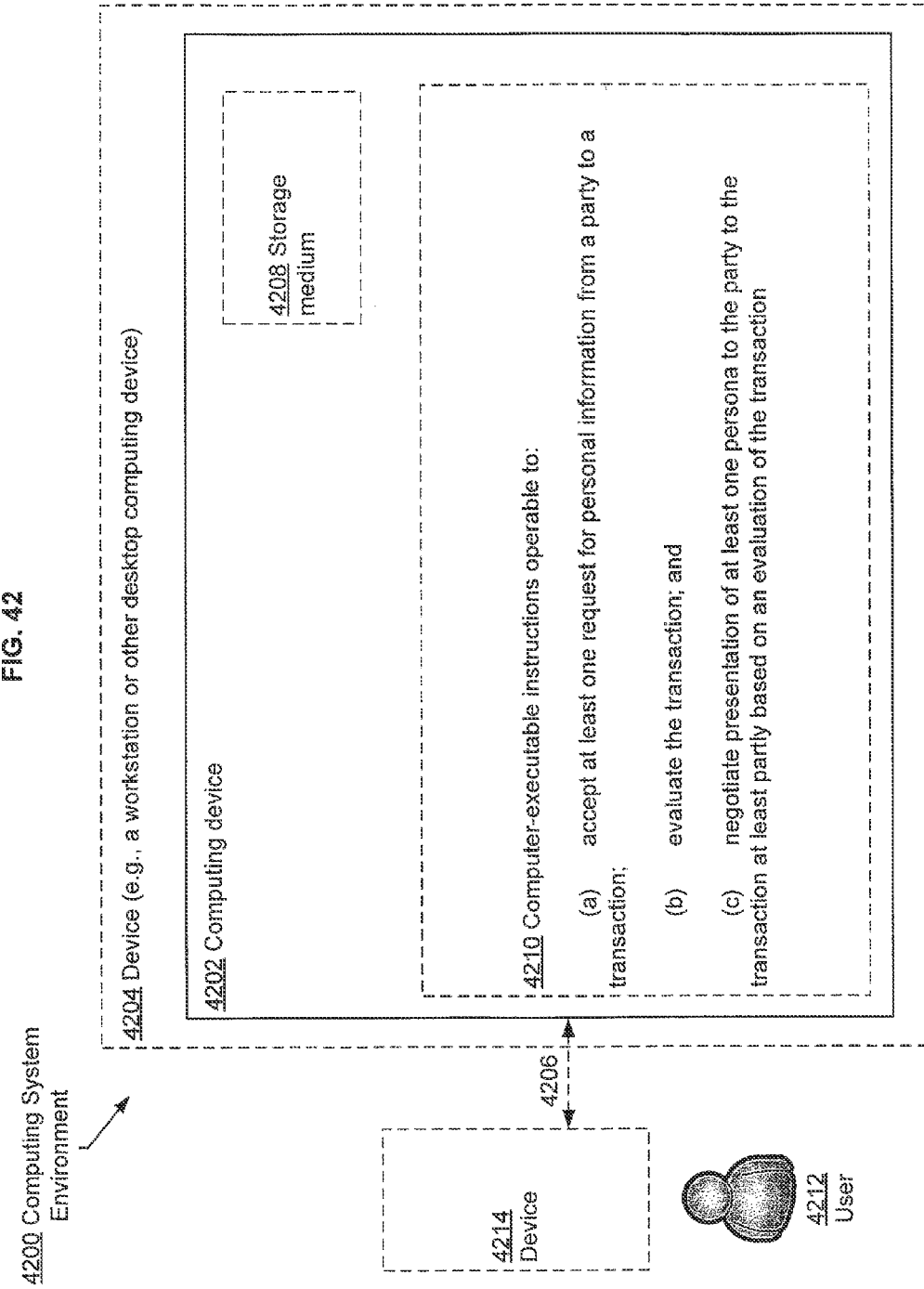

With reference now to FIG. 42, shown is an example device in which embodiments may be implemented related to regulating information flow during interactions, which may serve as a context for introducing one or more processes and/or devices described herein.

Figure 43:
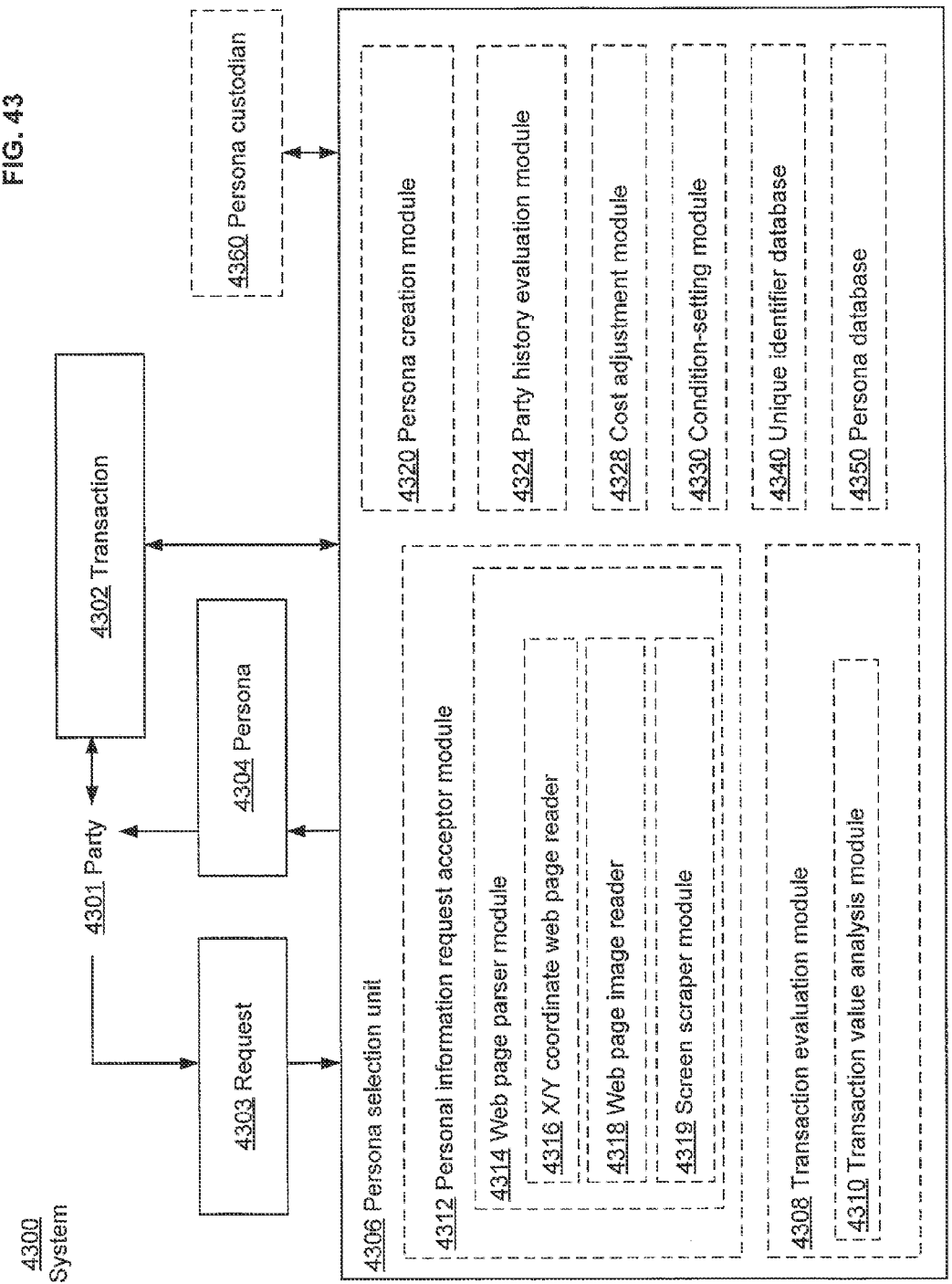

With reference now to FIG. 43, shown is an example of a system for regulating information flow during interactions in which embodiments may be implemented, perhaps in a device and/or through a network, which may serve as a context for introducing one or more processes and/or devices described herein.

Figure 44:
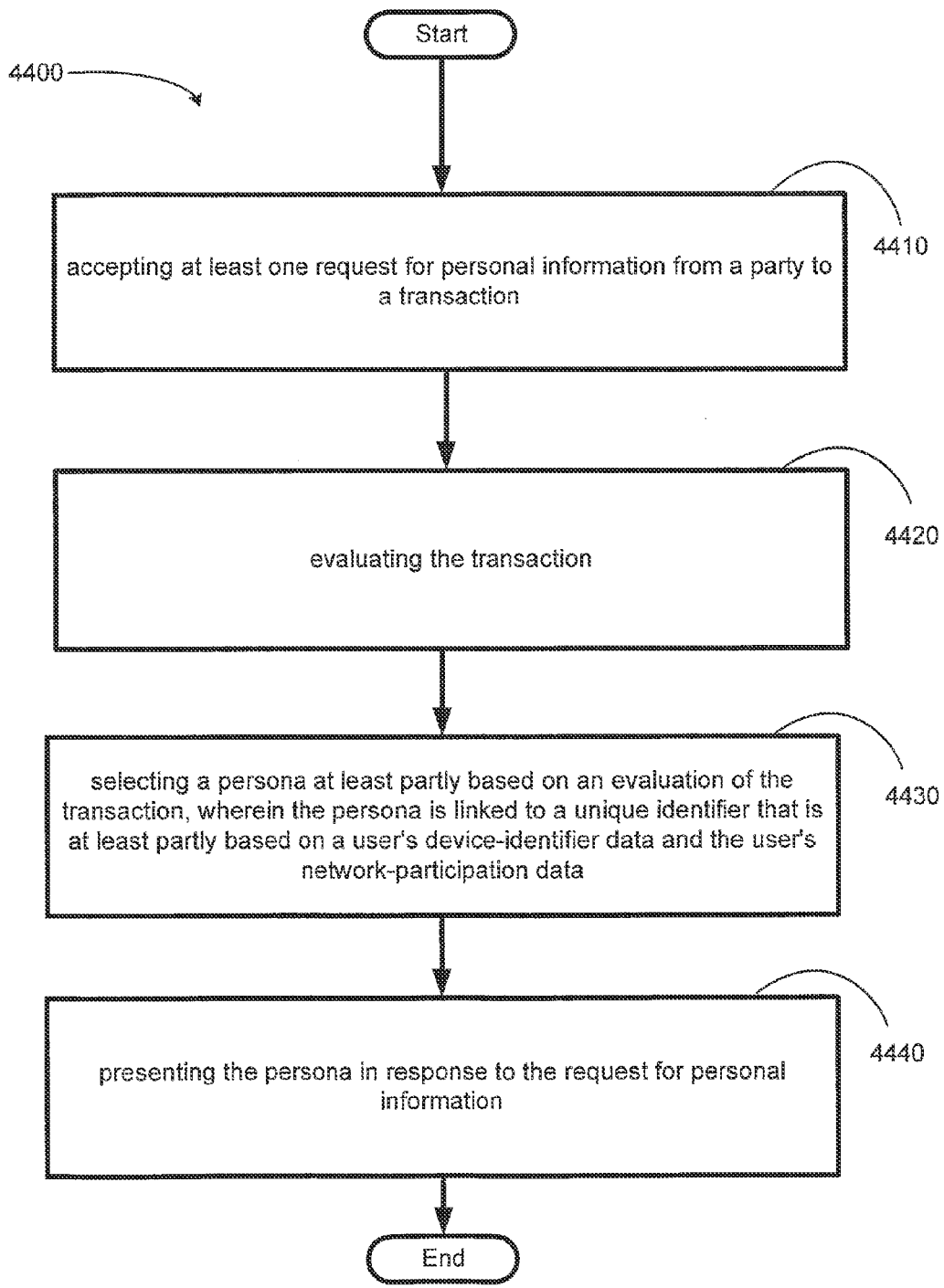

With reference now to FIG. 44, shown is an example of an operational flow representing example operations related to regulating information flow during interactions, which may serve as a context for introducing one or more processes and/or devices described herein.

Figure 45:
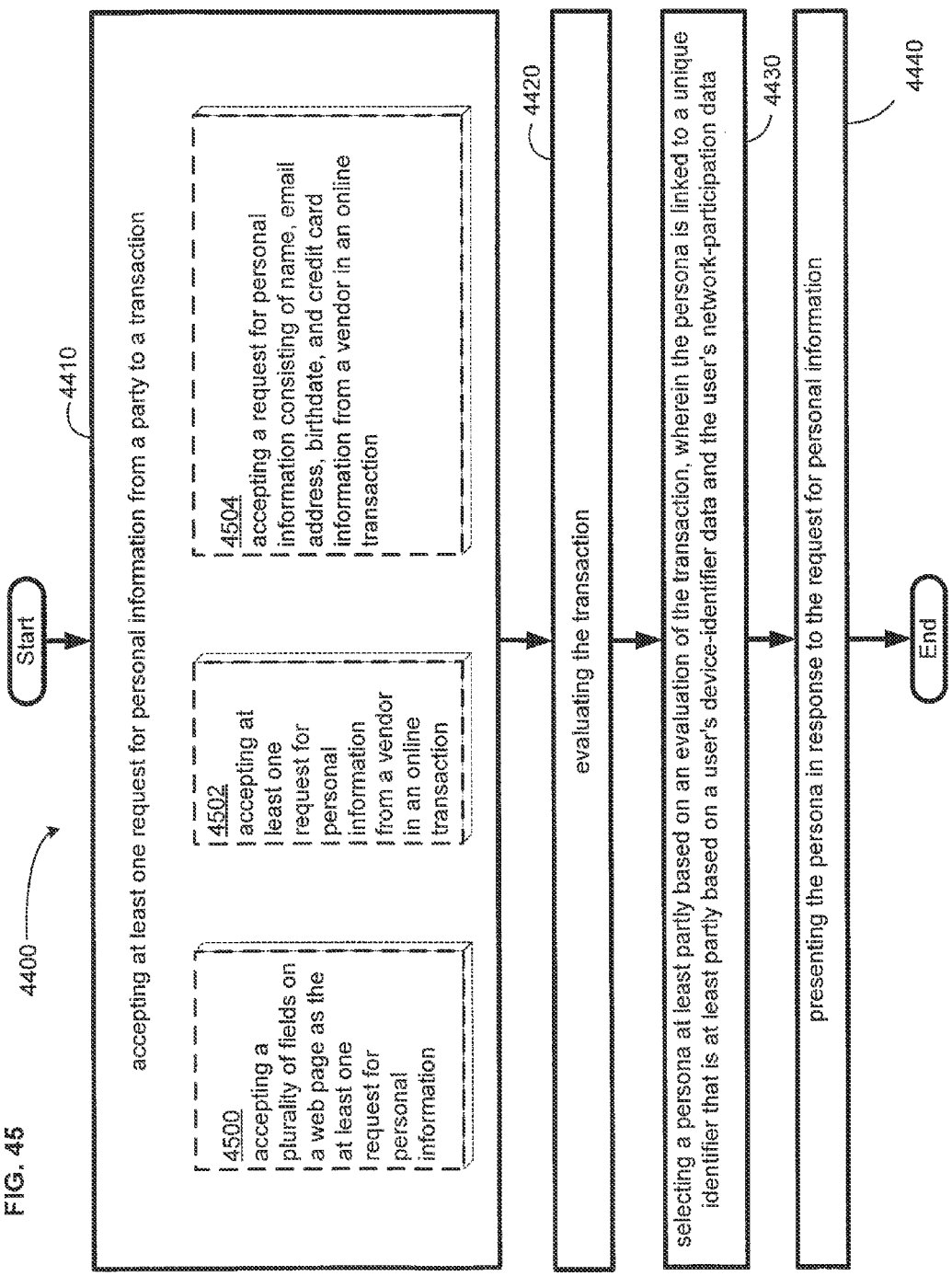

FIG. 45 illustrates an alternative embodiment of the example operational flow of FIG. 44.

Figure 46:
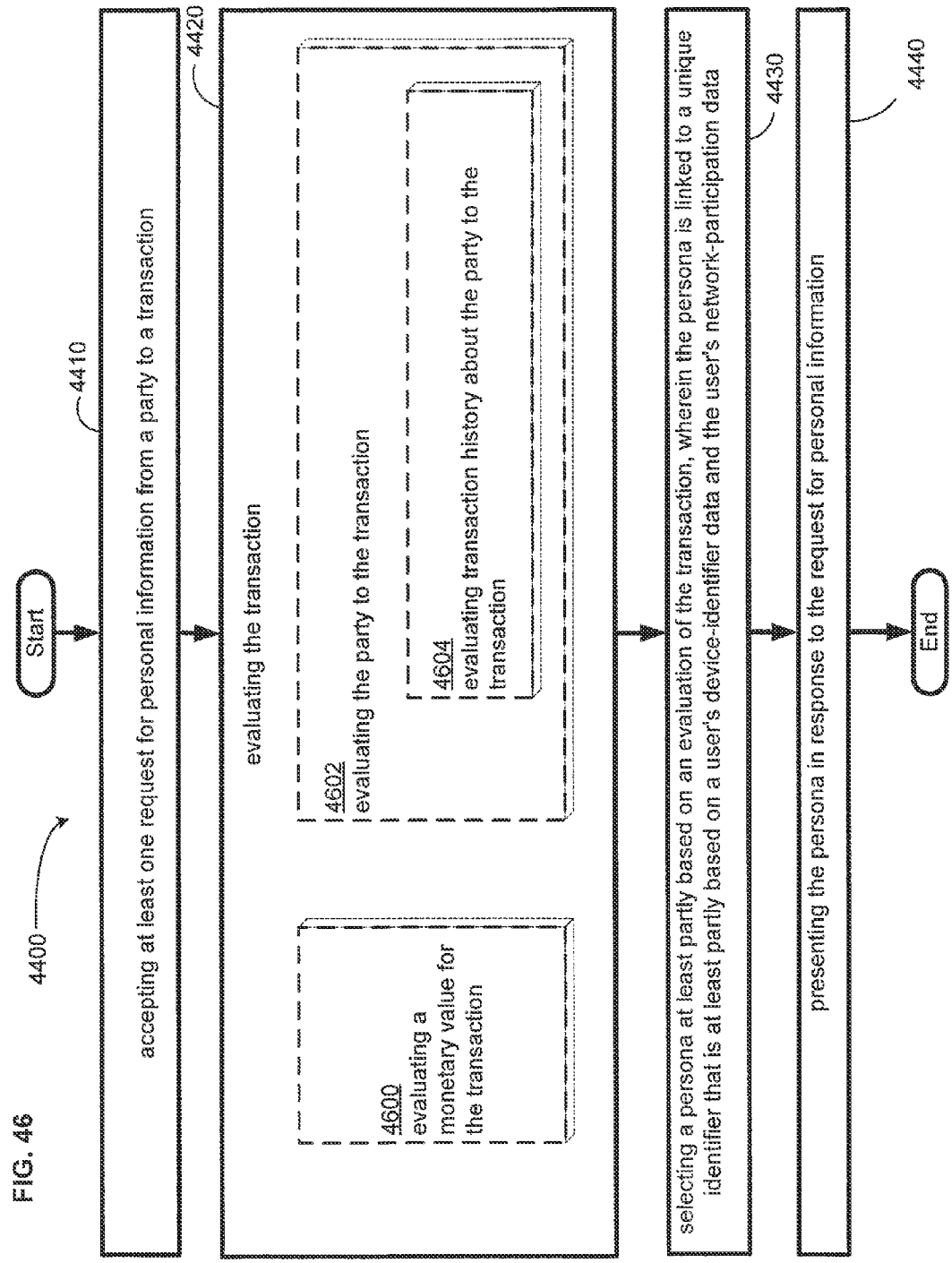

FIG. 46 illustrates an alternative embodiment of the example operational flow of FIG. 44.

Figure 47:
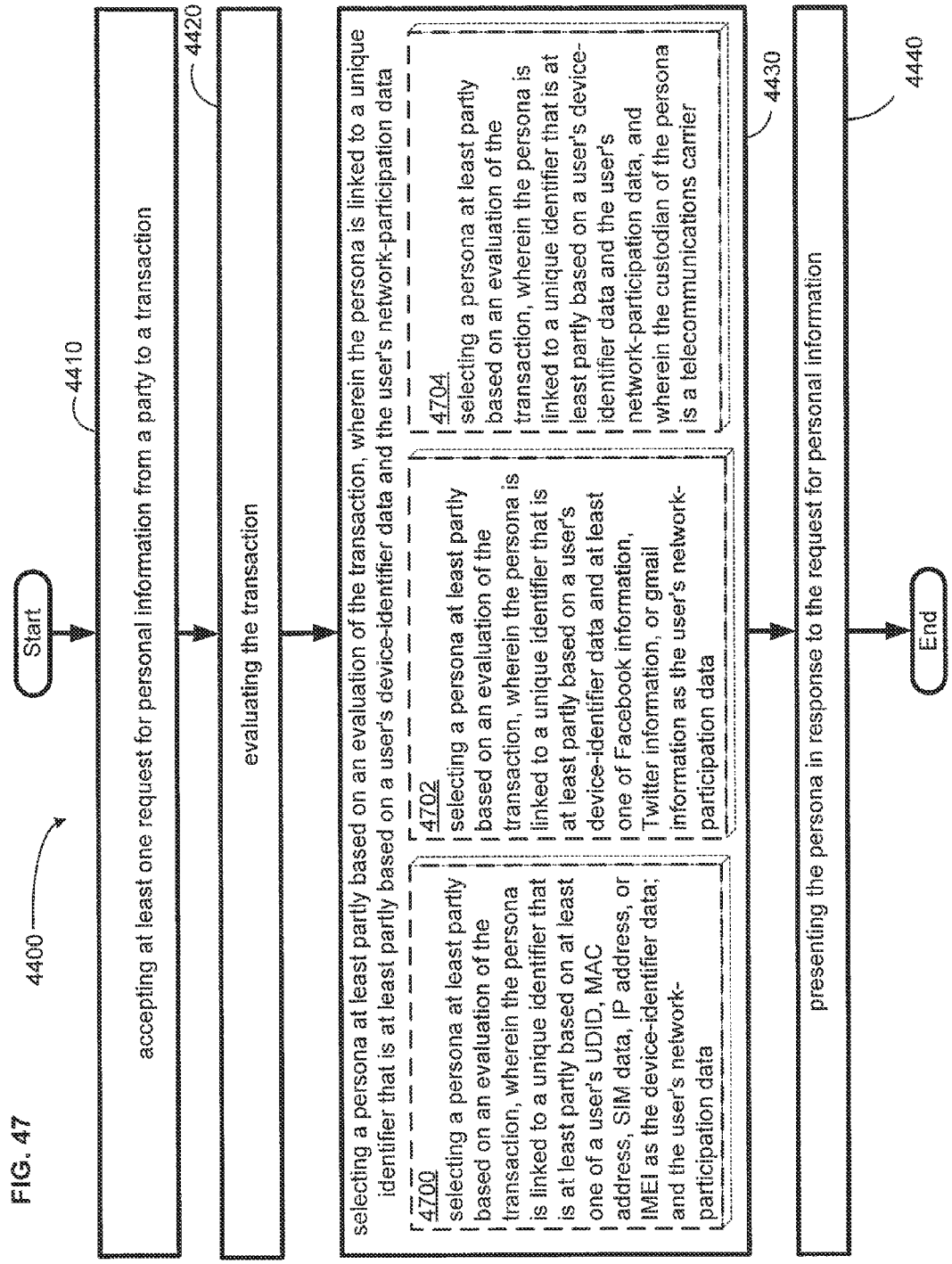

FIG. 47 illustrates an alternative embodiment of the example operational flow of FIG. 44.

Figure 48:
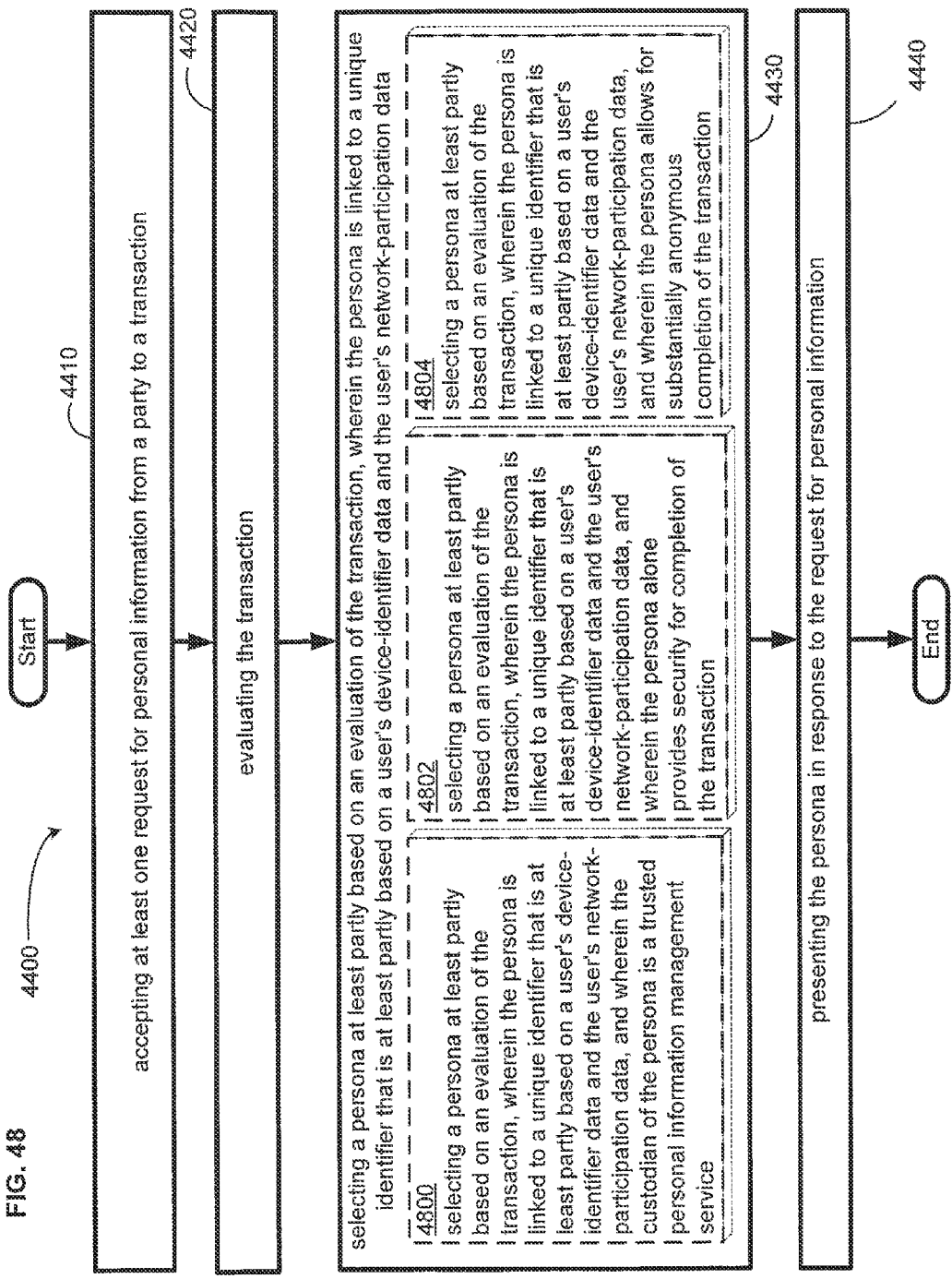

FIG. 48 illustrates an alternative embodiment of the example operational flow of FIG. 44.

Figure 49:
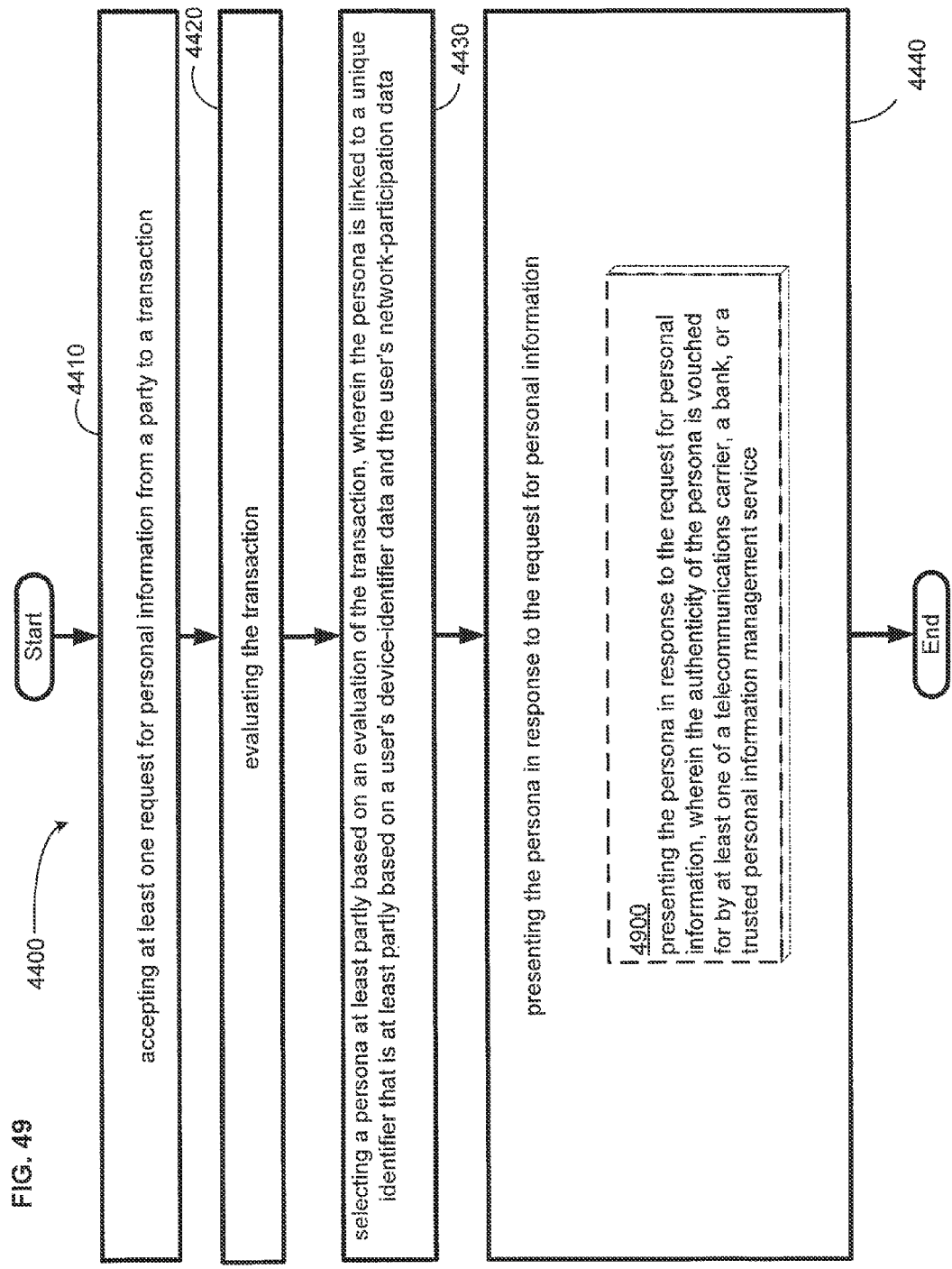

FIG. 49 illustrates an alternative embodiment of the example operational flow of FIG. 44.

Figure 50:
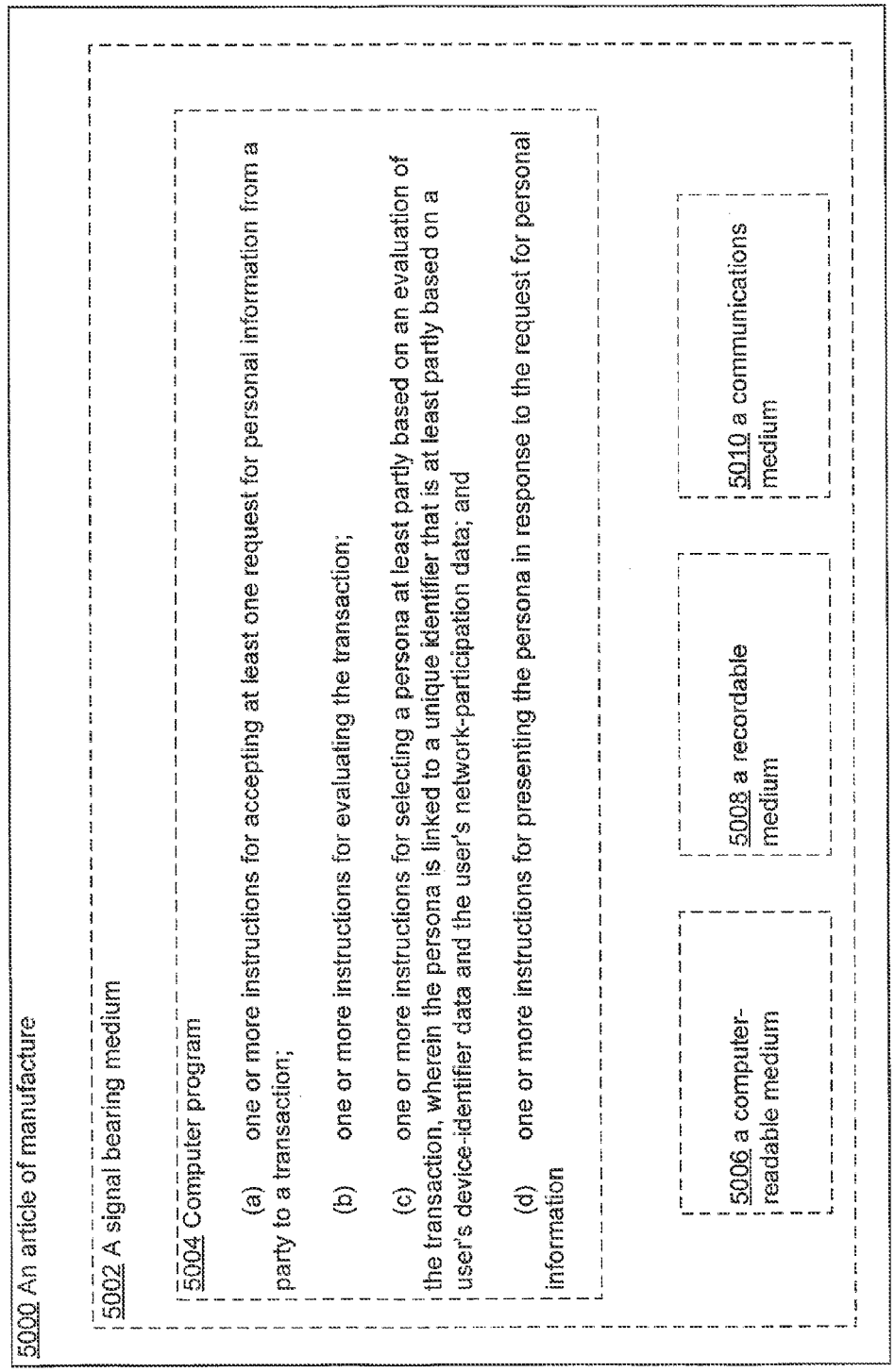

With reference now to FIG. 50, shown is a partial view of an example article of manufacture including a computer program product that includes a computer program for executing a computer process on a computing device related to regulating information flow during interactions, which may serve as a context for introducing one or more processes and/or devices described herein.

Figure 51:
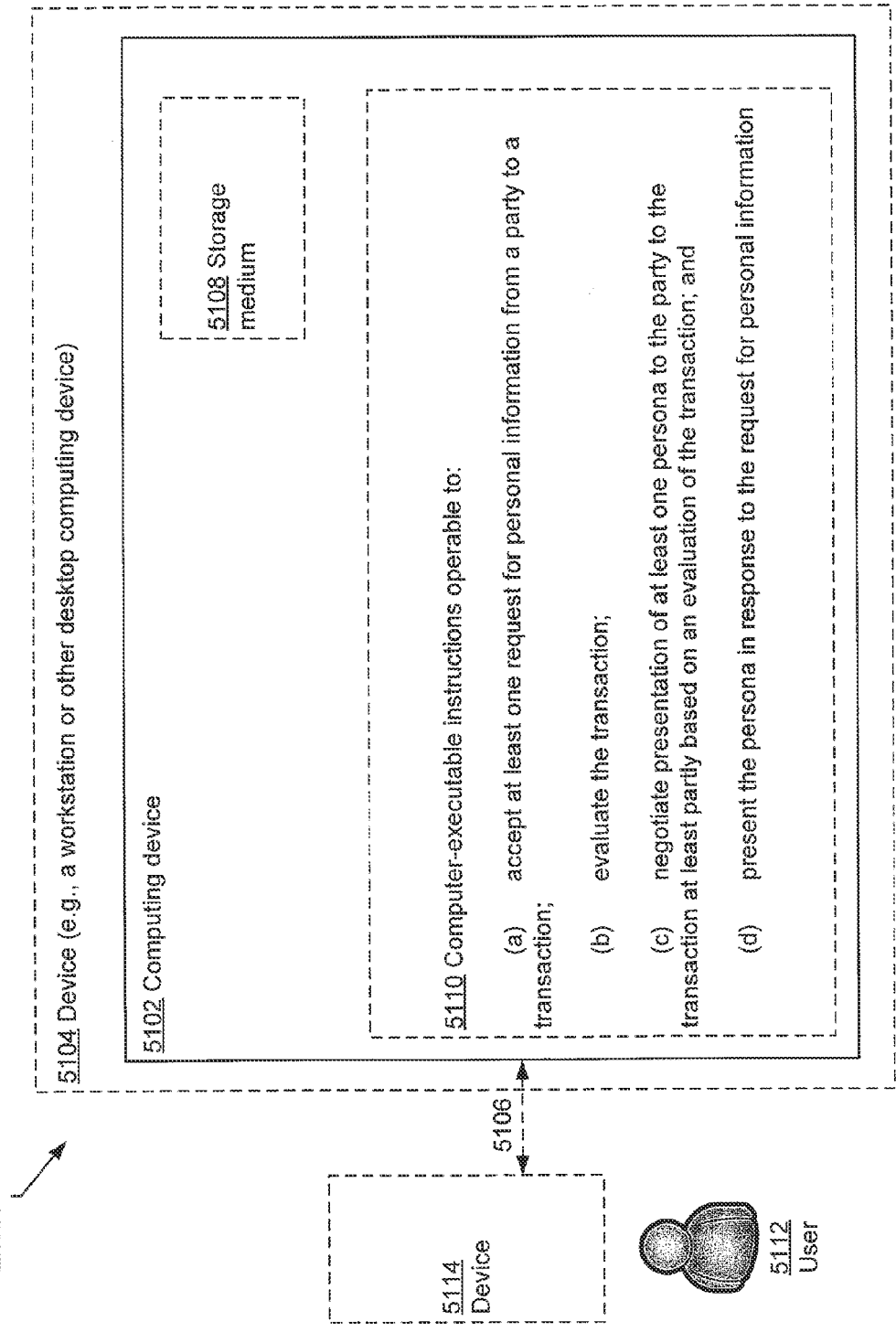

With reference now to FIG. 51, shown is an example device in which embodiments may be implemented related to regulating information flow during interactions, which may serve as a context for introducing one or more processes and/or devices described herein.

Figure 52:
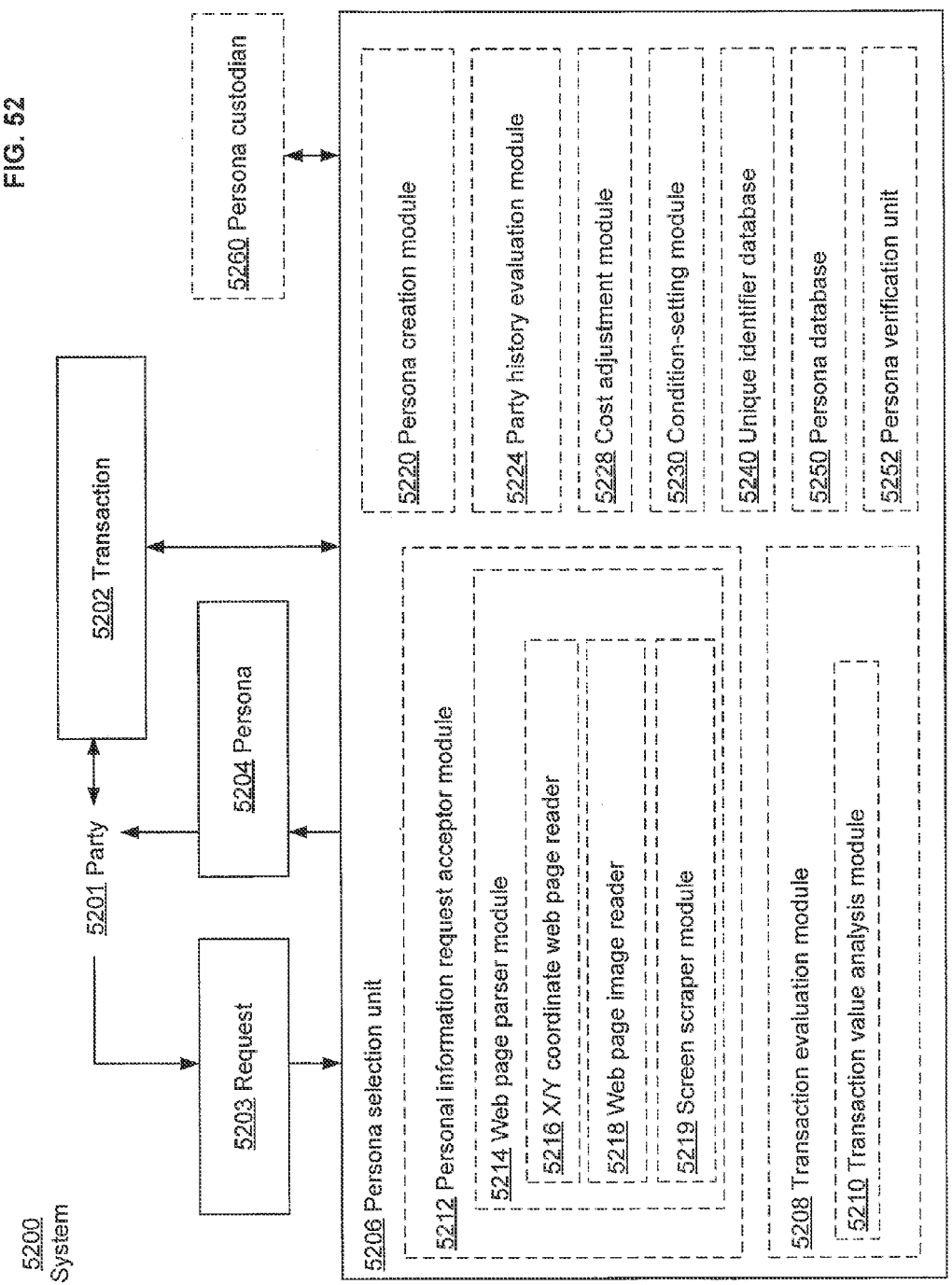

With reference now to FIG. 52, shown is an example of a system for verifying personal information during transactions in which embodiments may be implemented, perhaps in a device and/or through a network, which may serve as a context for introducing one or more processes and/or devices described herein.

Figure 53:
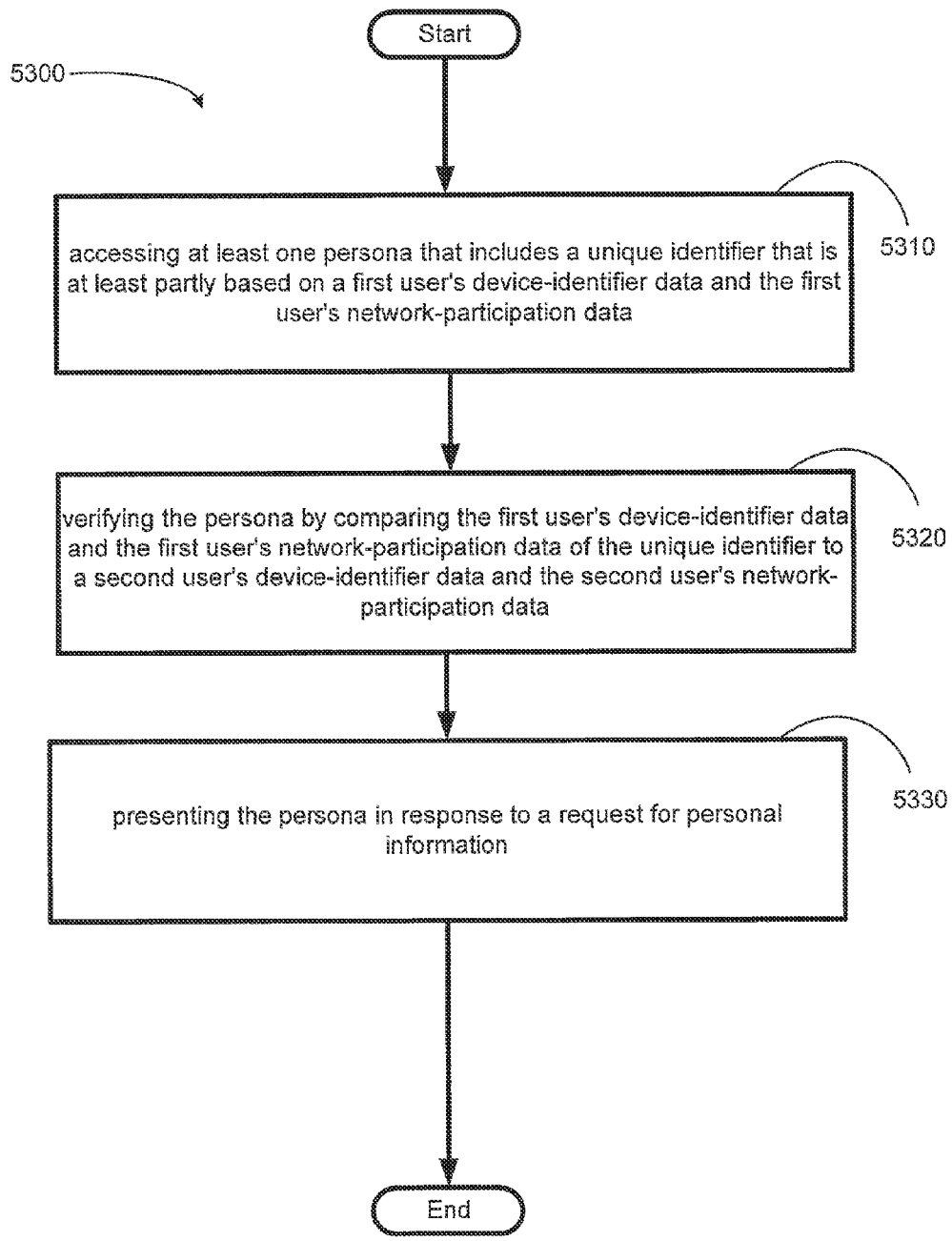

With reference now to FIG. 53, shown is an example of an operational flow representing example operations related to verifying personal information during transactions, which may serve as a context for introducing one or more processes and/or devices described herein.

Figure 54:
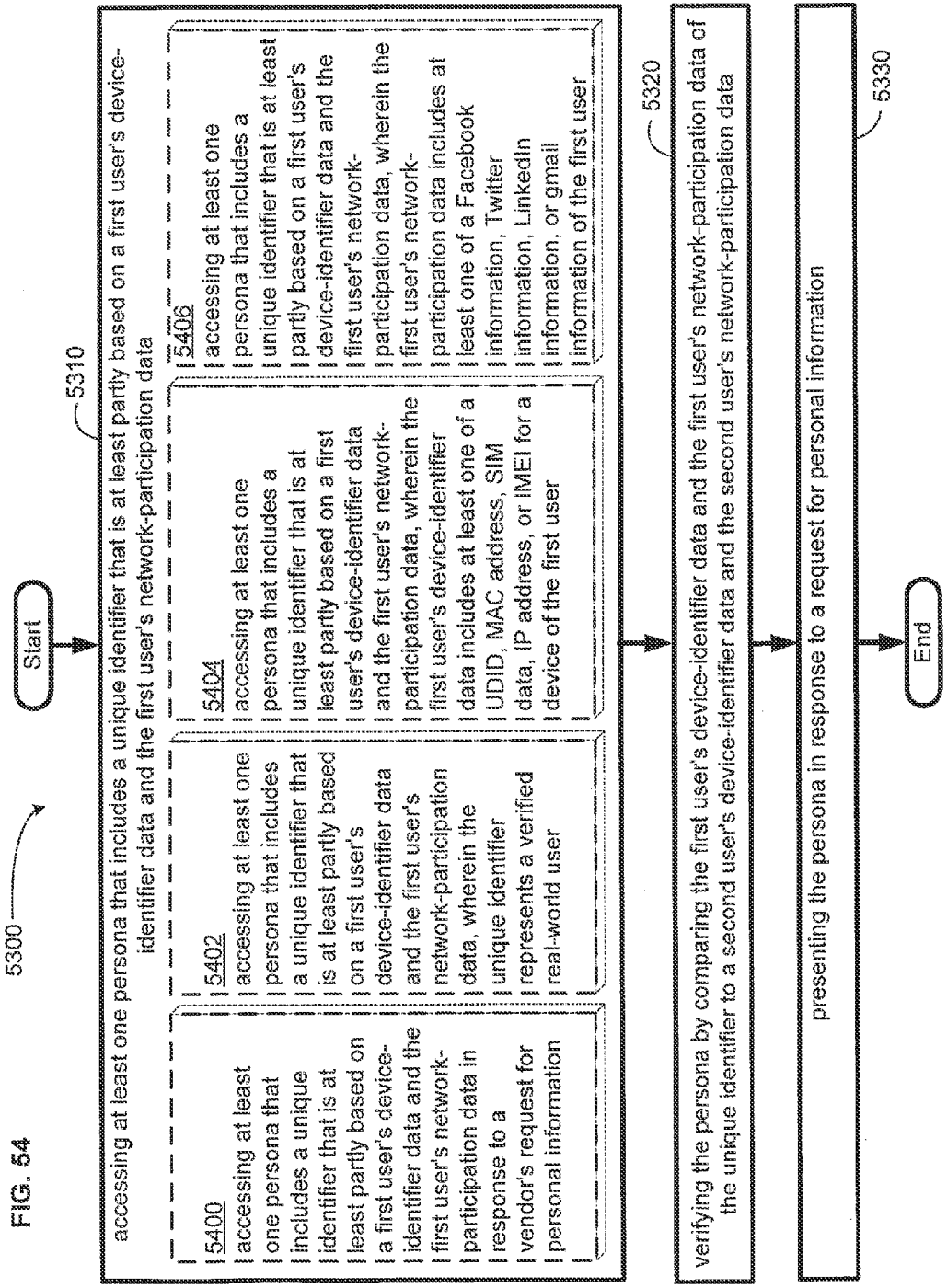

FIG. 54 illustrates an alternative embodiment of the example operational flow of FIG. 53.

Figure 55:
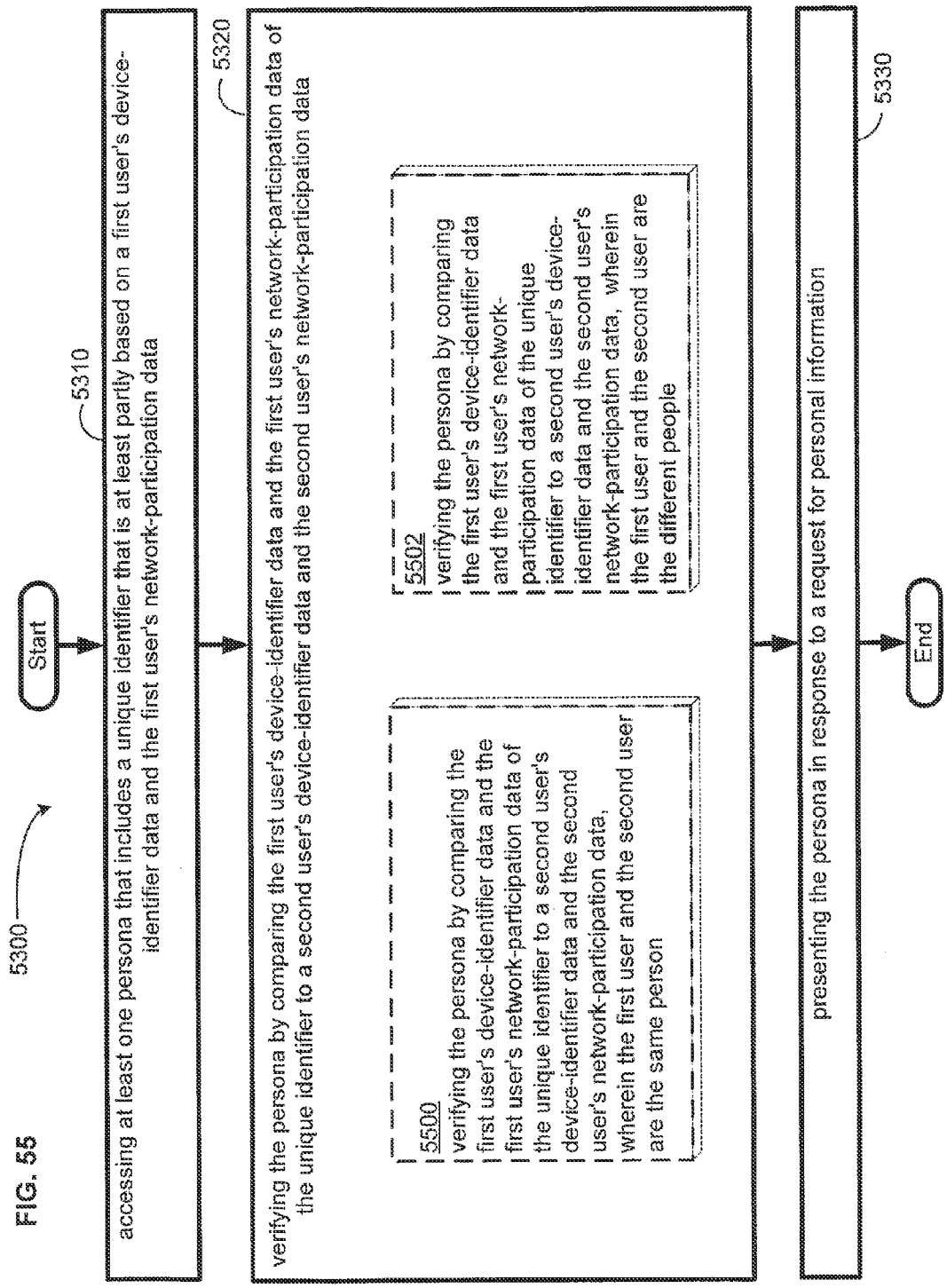

FIG. 55 illustrates an alternative embodiment of the example operational flow of FIG. 53.

Figure 56:
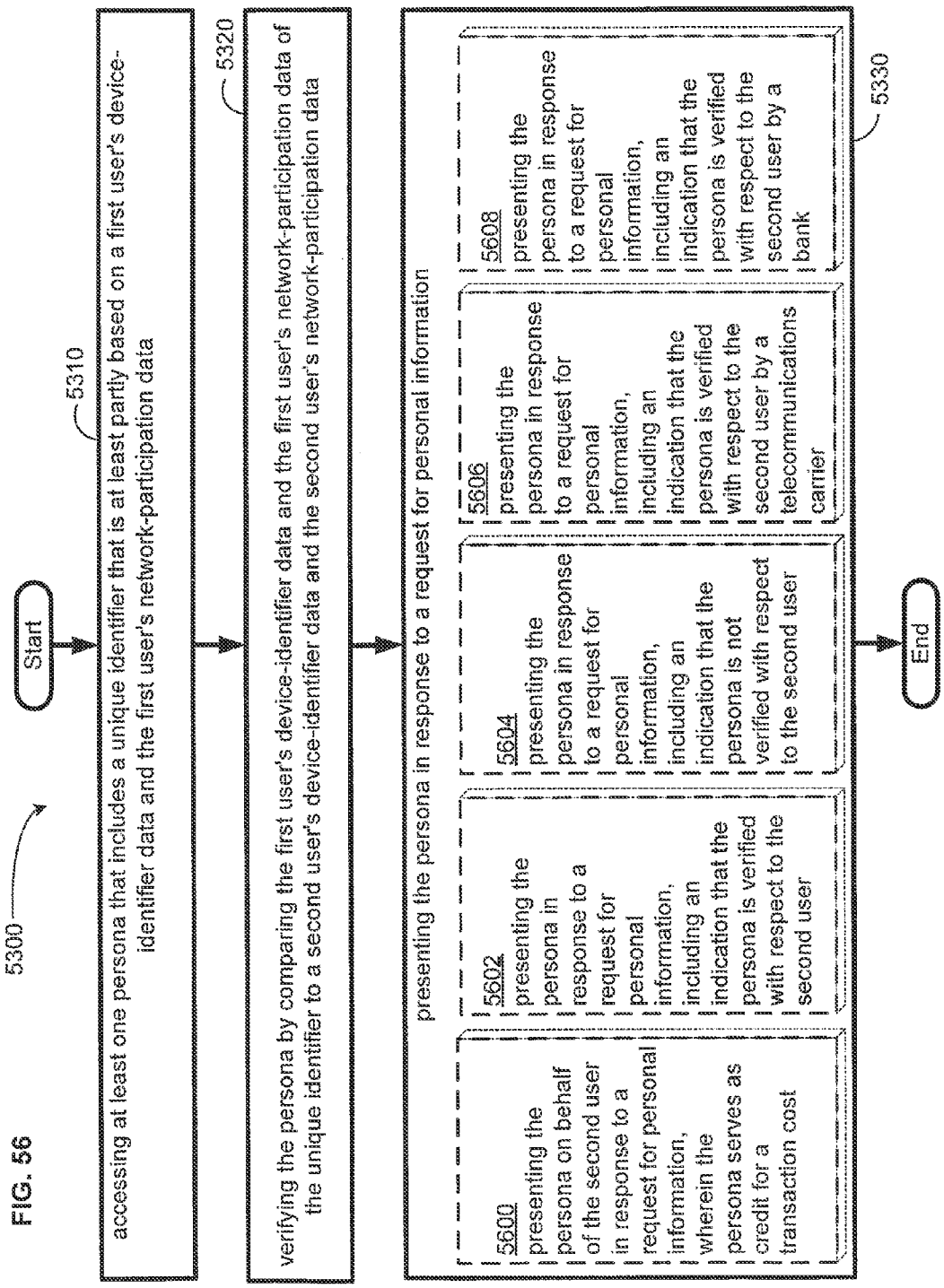

FIG. 56 illustrates an alternative embodiment of the example operational flow of FIG. 53.

With reference now to FIG. 57, shown is a partial view of an example article of manufacture including a computer program product that includes a computer program for executing a computer process on a computing device related to verifying personal information during transactions, which may serve as a context for introducing one or more processes and/or devices described herein.

With reference now to FIG. 58, shown is an example device in which embodiments may be implemented related to verifying personal information during transactions, which may serve as a context for introducing one or more processes and/or devices described herein.

With reference now to FIGS. 59A-L, shown is an example of a system for double-encryption and anonymous storage in which embodiments may be implemented, perhaps in a device and/or through a network, which may serve as a context for introducing one or more processes and/or devices described herein.

Figure 59:
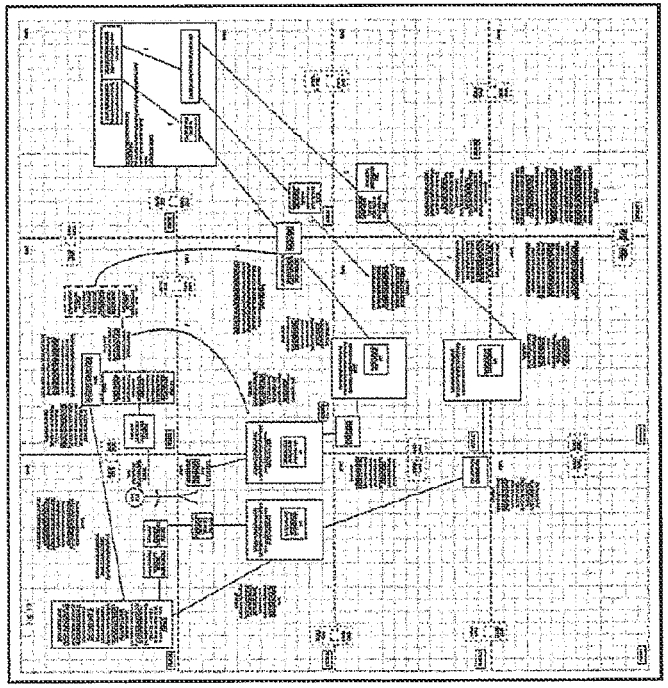
Figure 60:
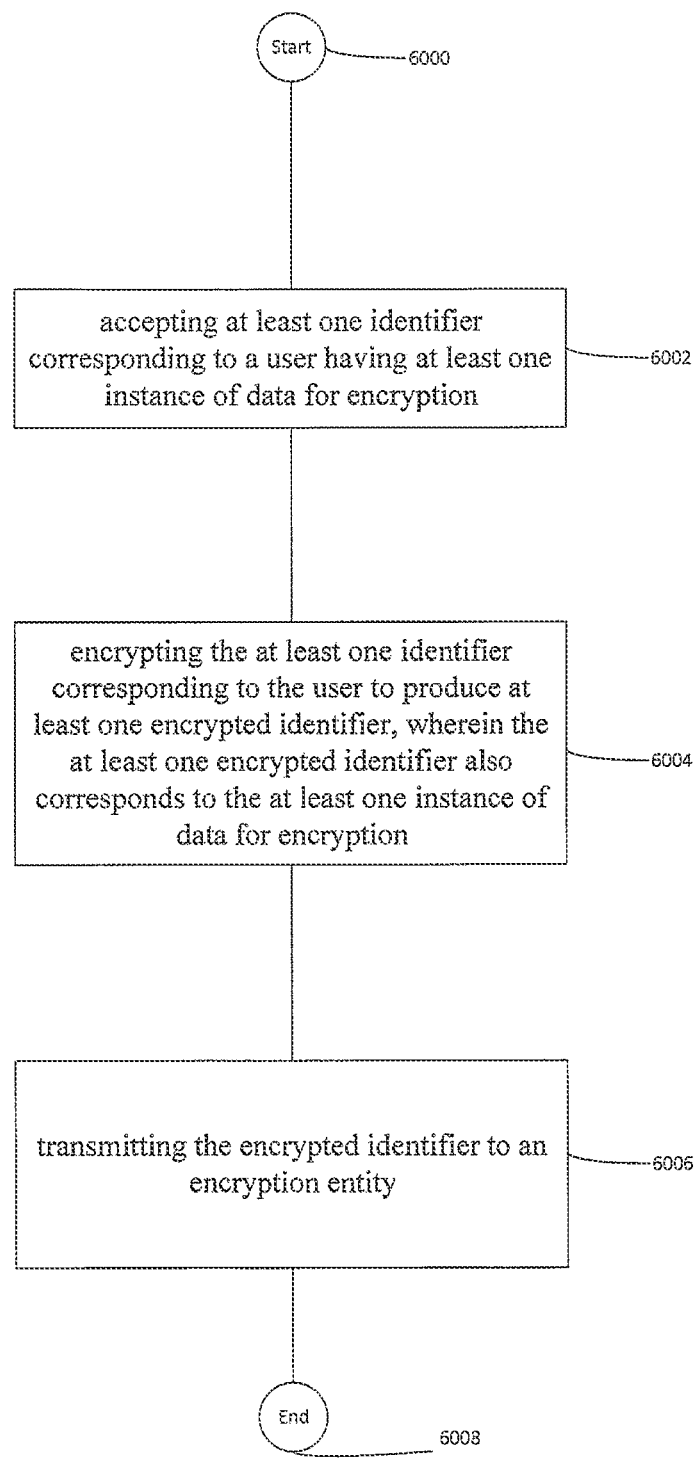

With reference now to FIG. 60, shown is an example of an operational flow representing example operations related to preparing data for double-encryption and anonymous storage, which may serve as a context for introducing one or more processes and/or devices described herein. Context for the operations of FIG. 60 may be found in FIG. 59.

Figure 61:
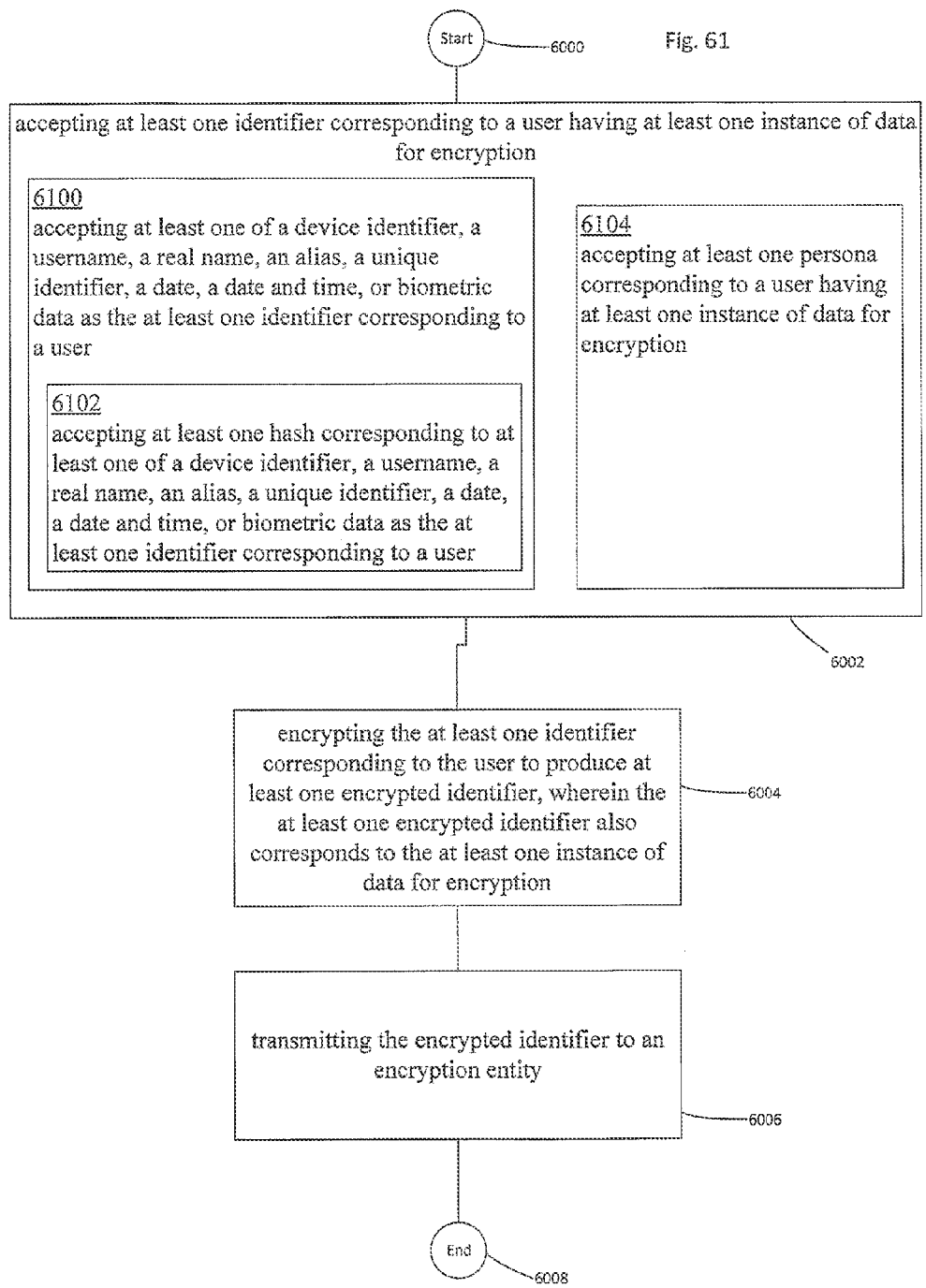

FIG. 61 illustrates an alternative embodiment of the example operational flow of FIG. 60.

Figure 62:
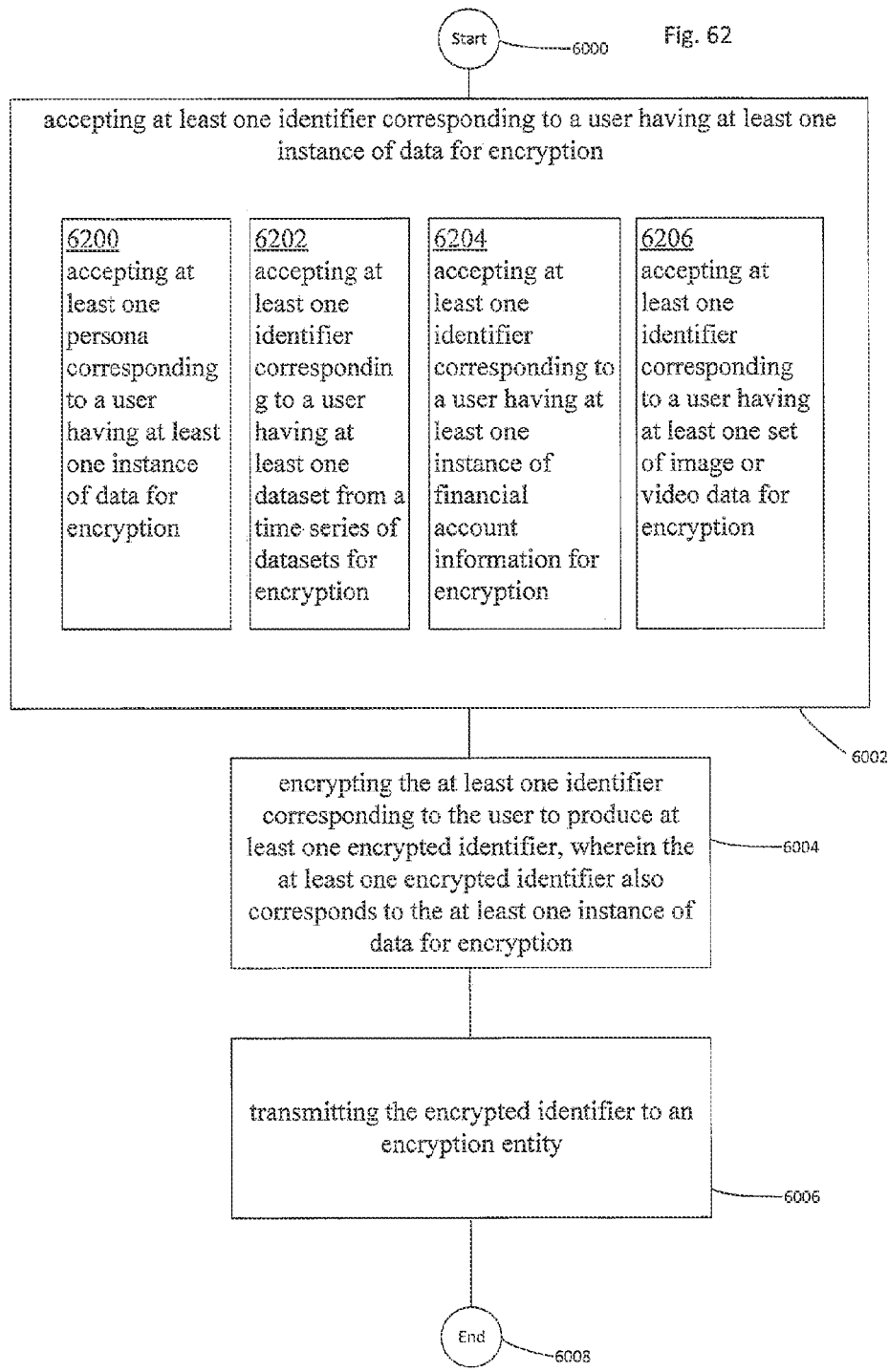

FIG. 62 illustrates an alternative embodiment of the example operational flow of FIG. 60.

Figure 63:
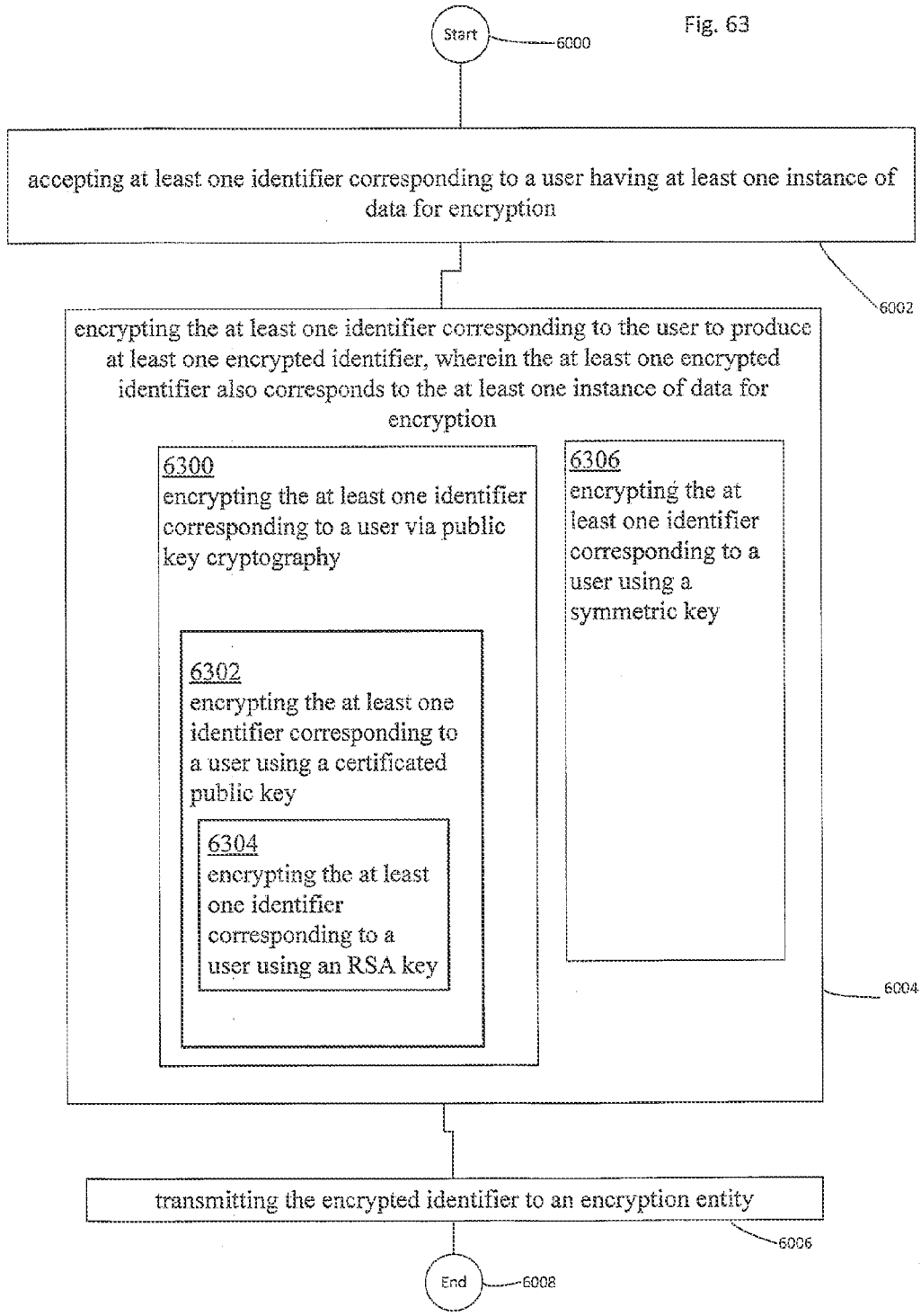

FIG. 63 illustrates an alternative embodiment of the example operational flow of FIG. 60.

Figure 64:
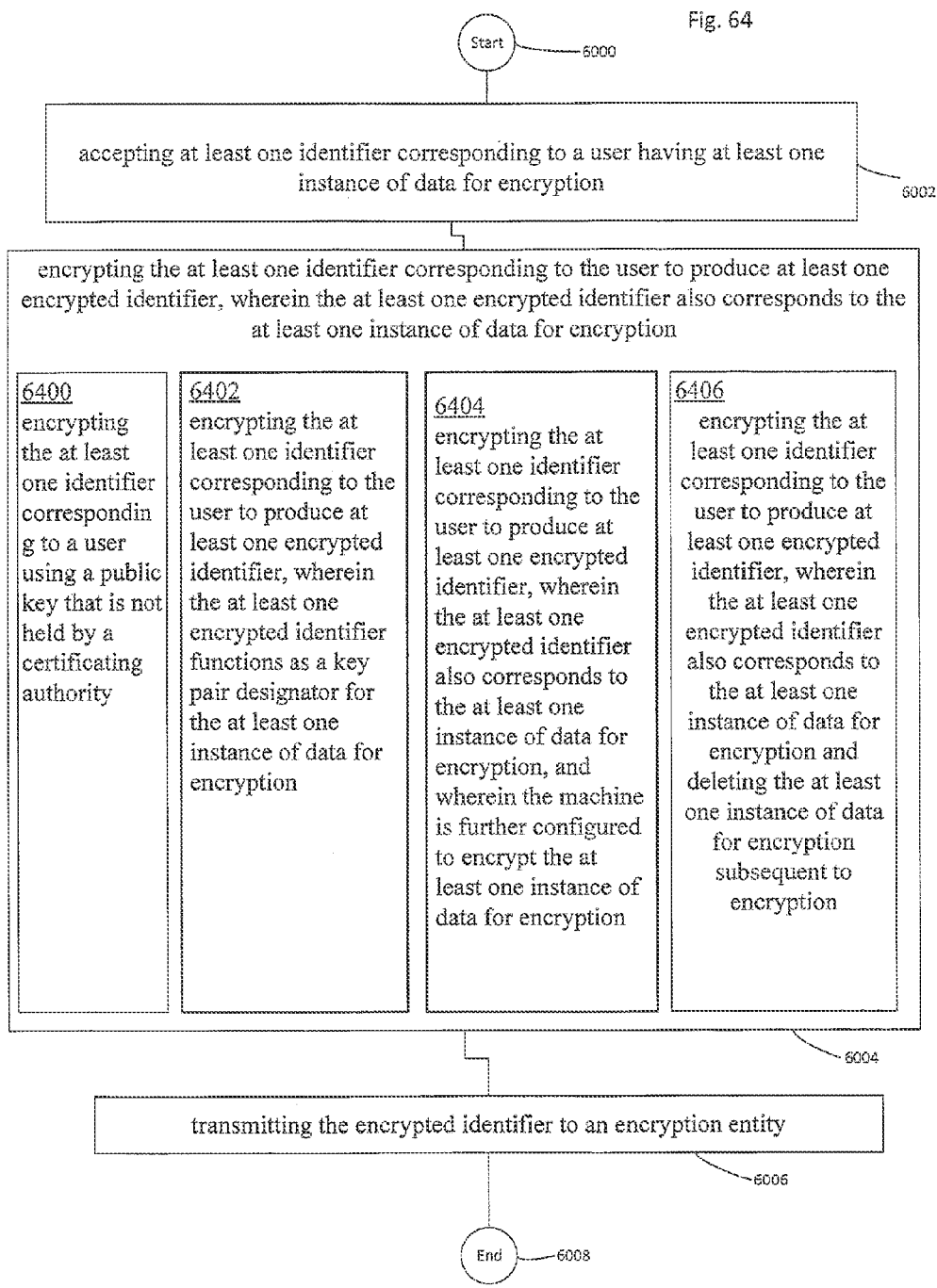

FIG. 64 illustrates an alternative embodiment of the example operational flow of FIG. 60.

Figure 65:
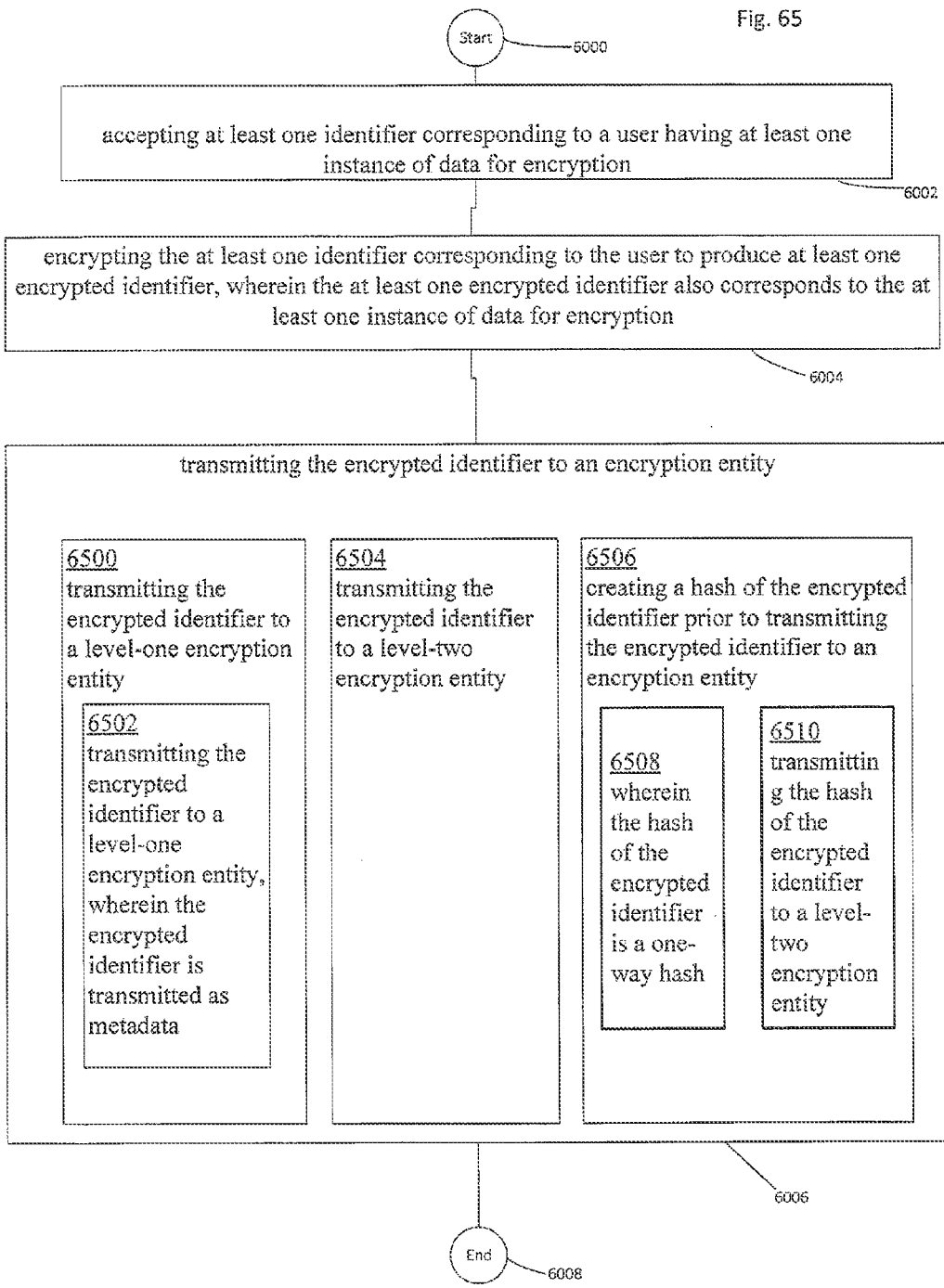

FIG. 65 illustrates an alternative embodiment of the example operational flow of FIG. 60.

Figure 66:
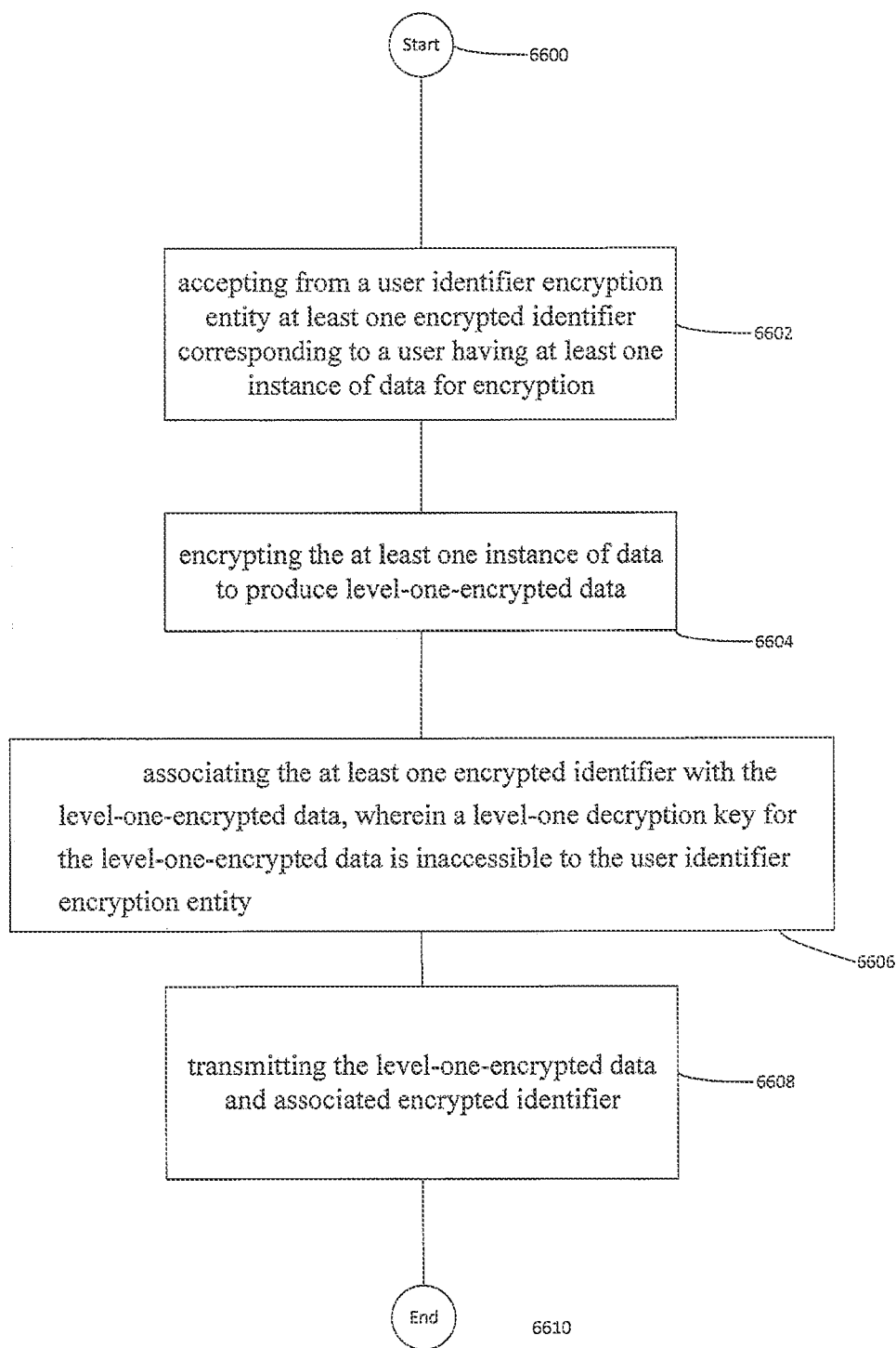

With reference now to FIG. 66, shown is an example of an operational flow representing example operations related to preparing data for double-encryption and anonymous storage, which may serve as a context for introducing one or more processes and/or devices described herein. Context for the operations of FIG. 66 may be found in FIG. 59.

Figure 67:
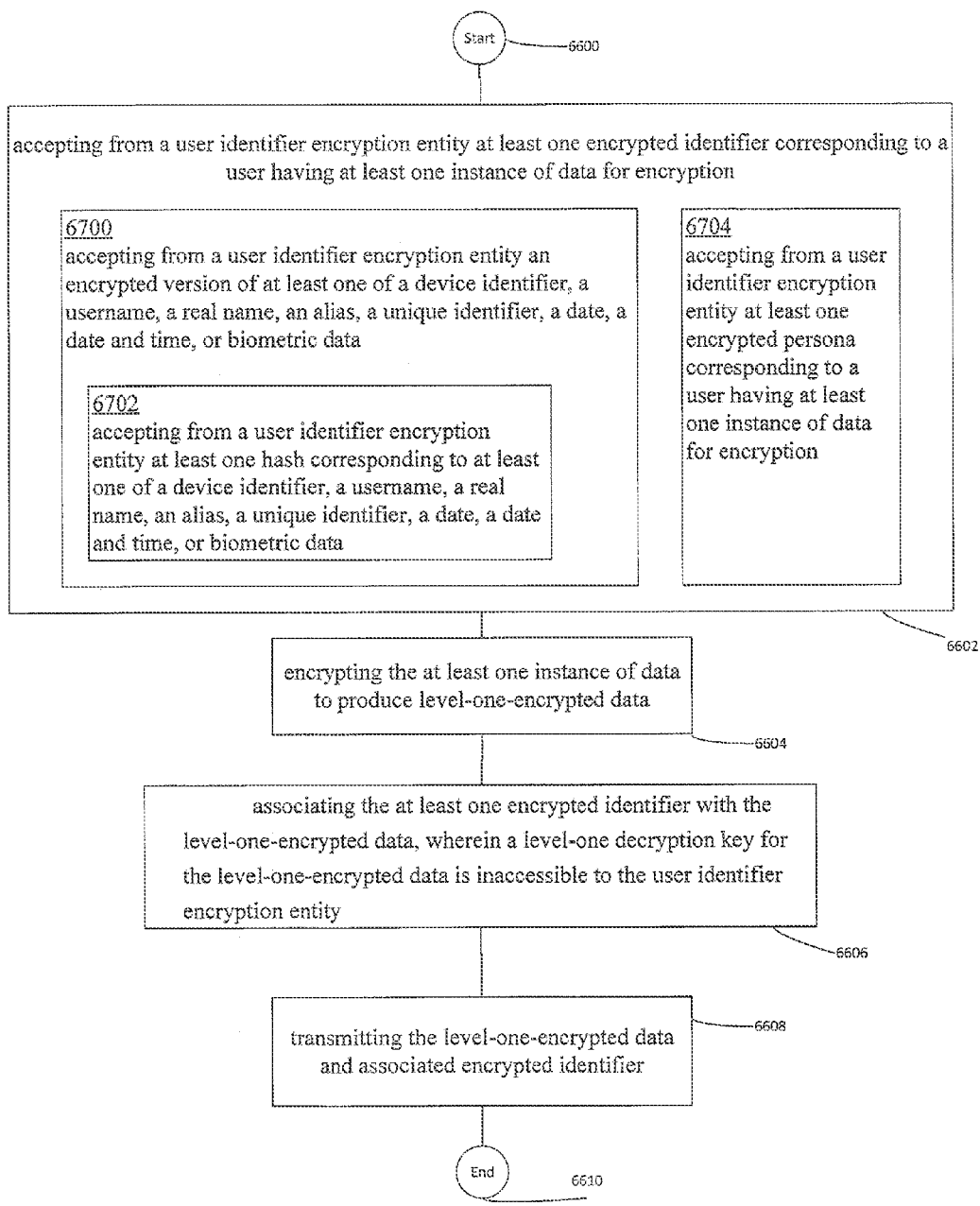

FIG. 67 illustrates an alternative embodiment of the example operational flow of FIG. 66.

Figure 68:
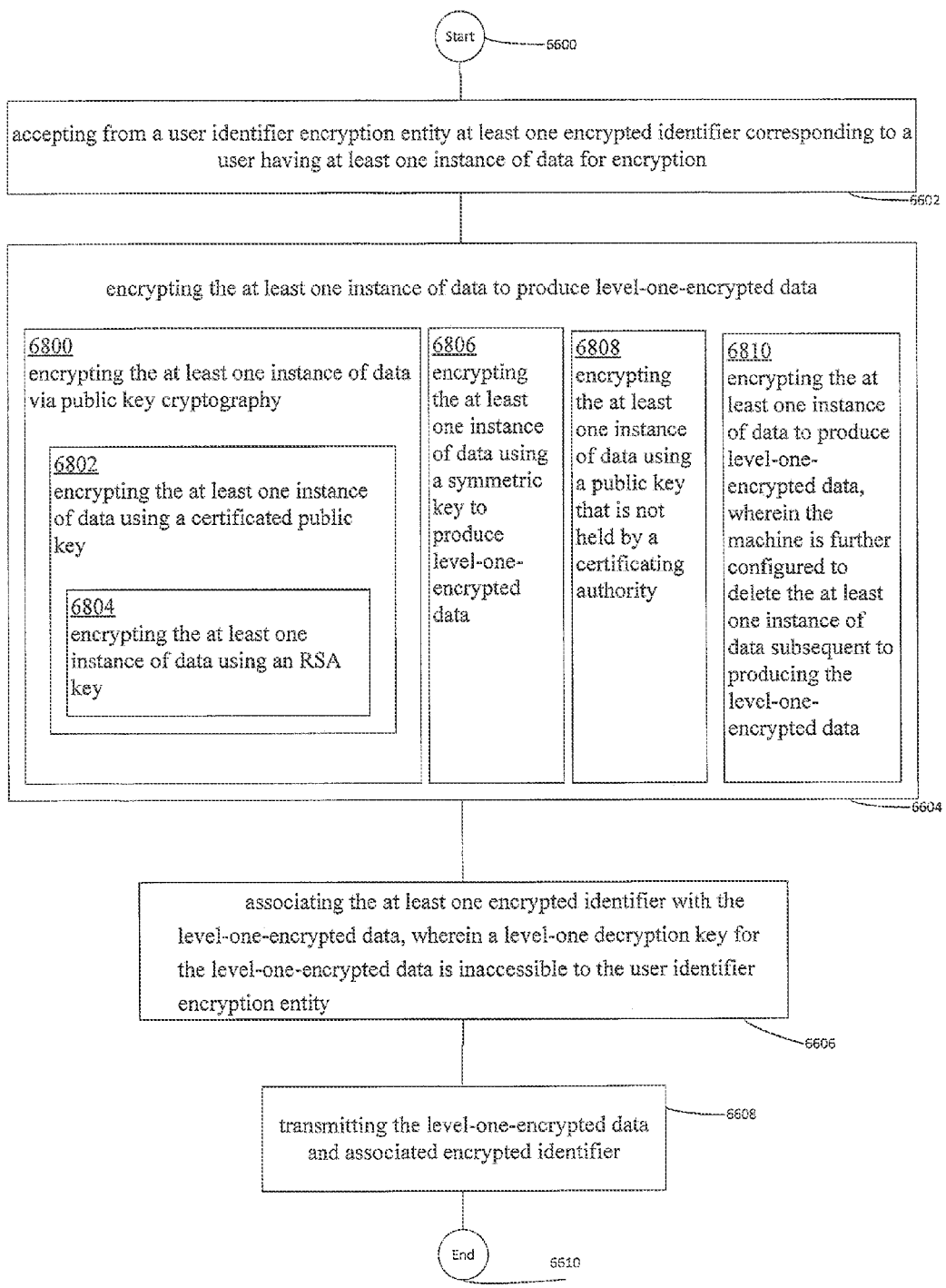

FIG. 68 illustrates an alternative embodiment of the example operational flow of FIG. 66.

Figure 69:
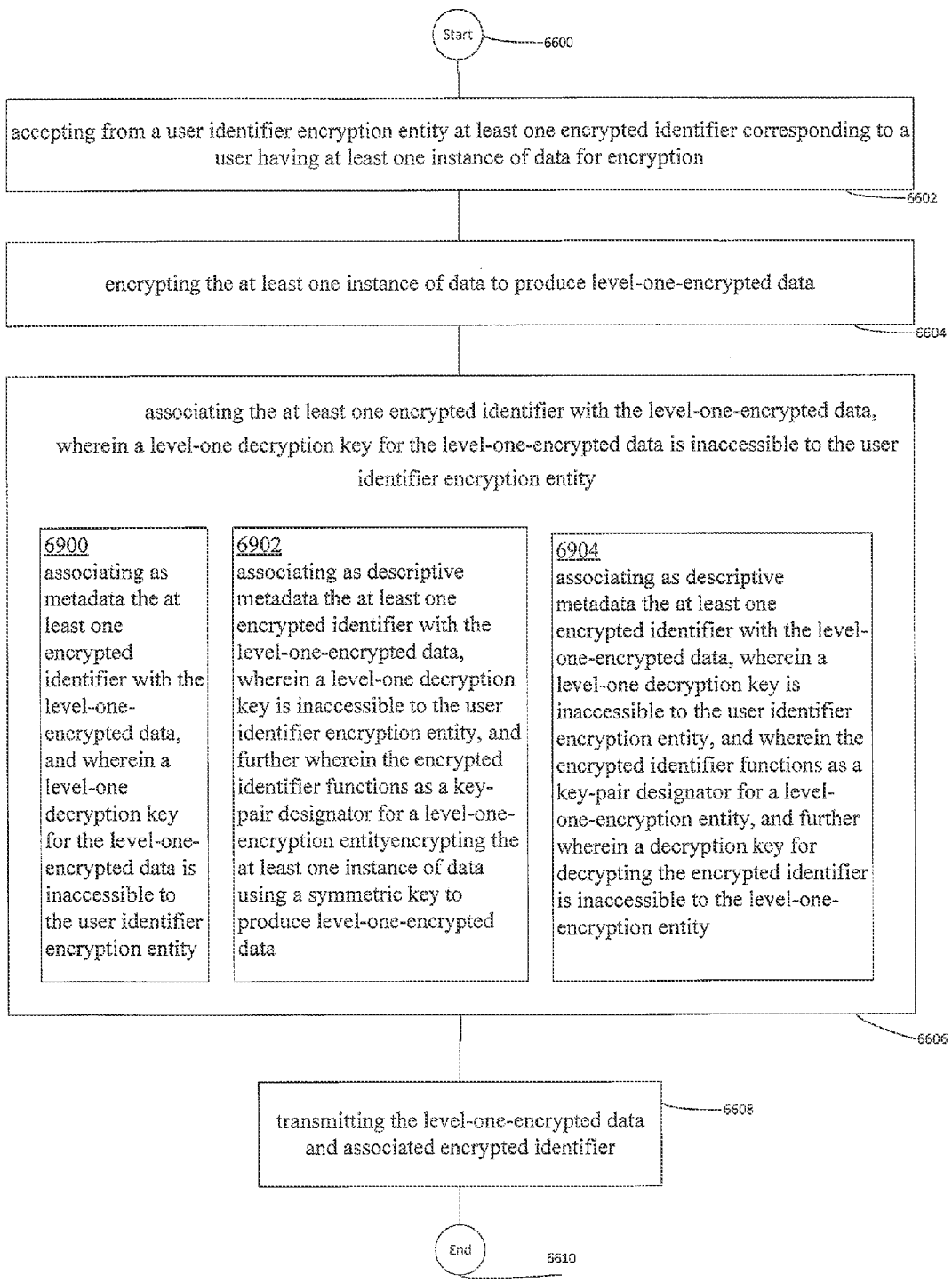

FIG. 69 illustrates an alternative embodiment of the example operational flow of FIG. 66.

FIG. 70 illustrates an alternative embodiment of the example operational flow of FIG. 66.

The use of the same symbols in different drawings typically indicates similar or identical items unless context dictates otherwise.

DETAILED DESCRIPTION

Figure 1:
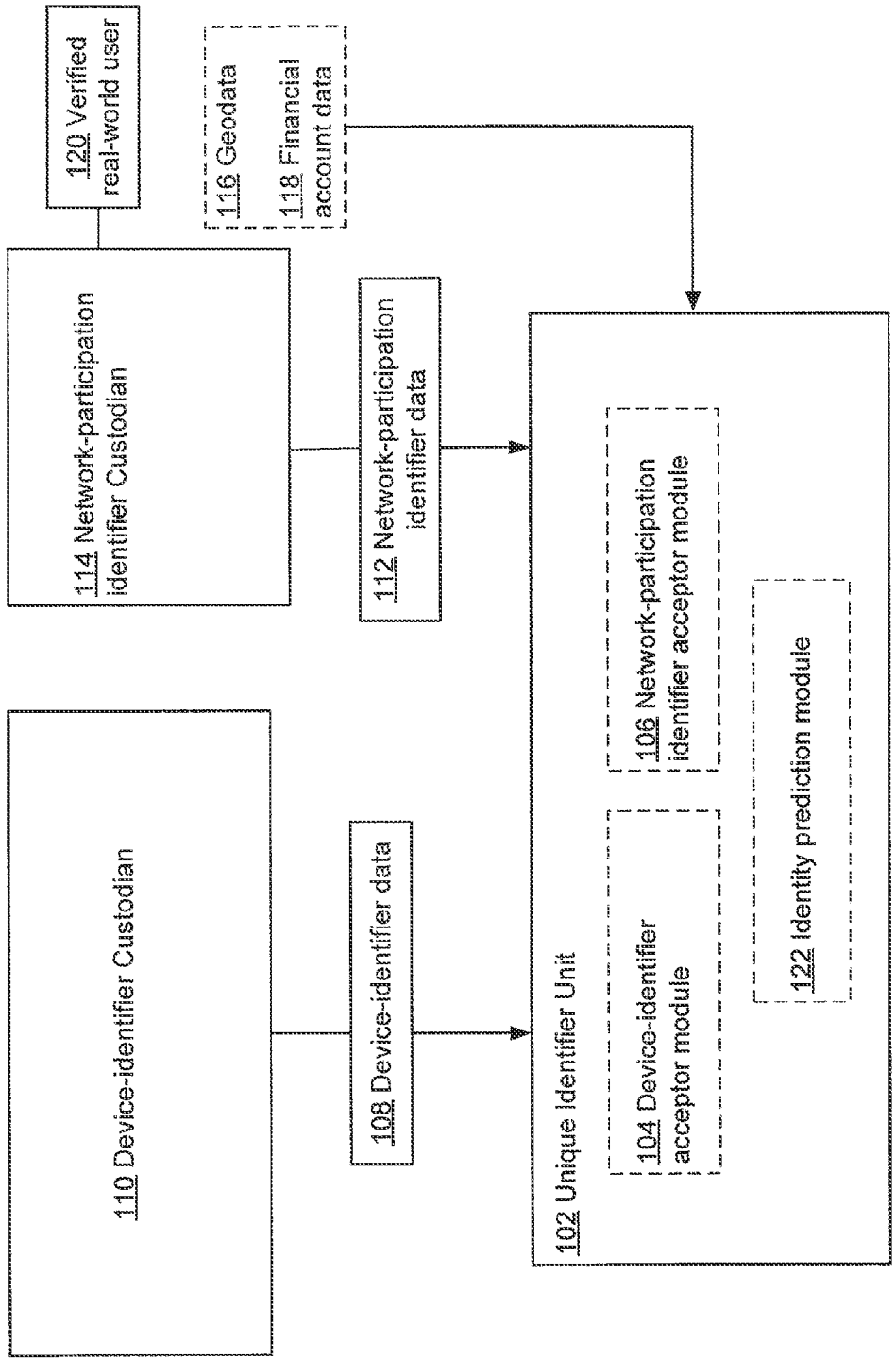
Figure 2:
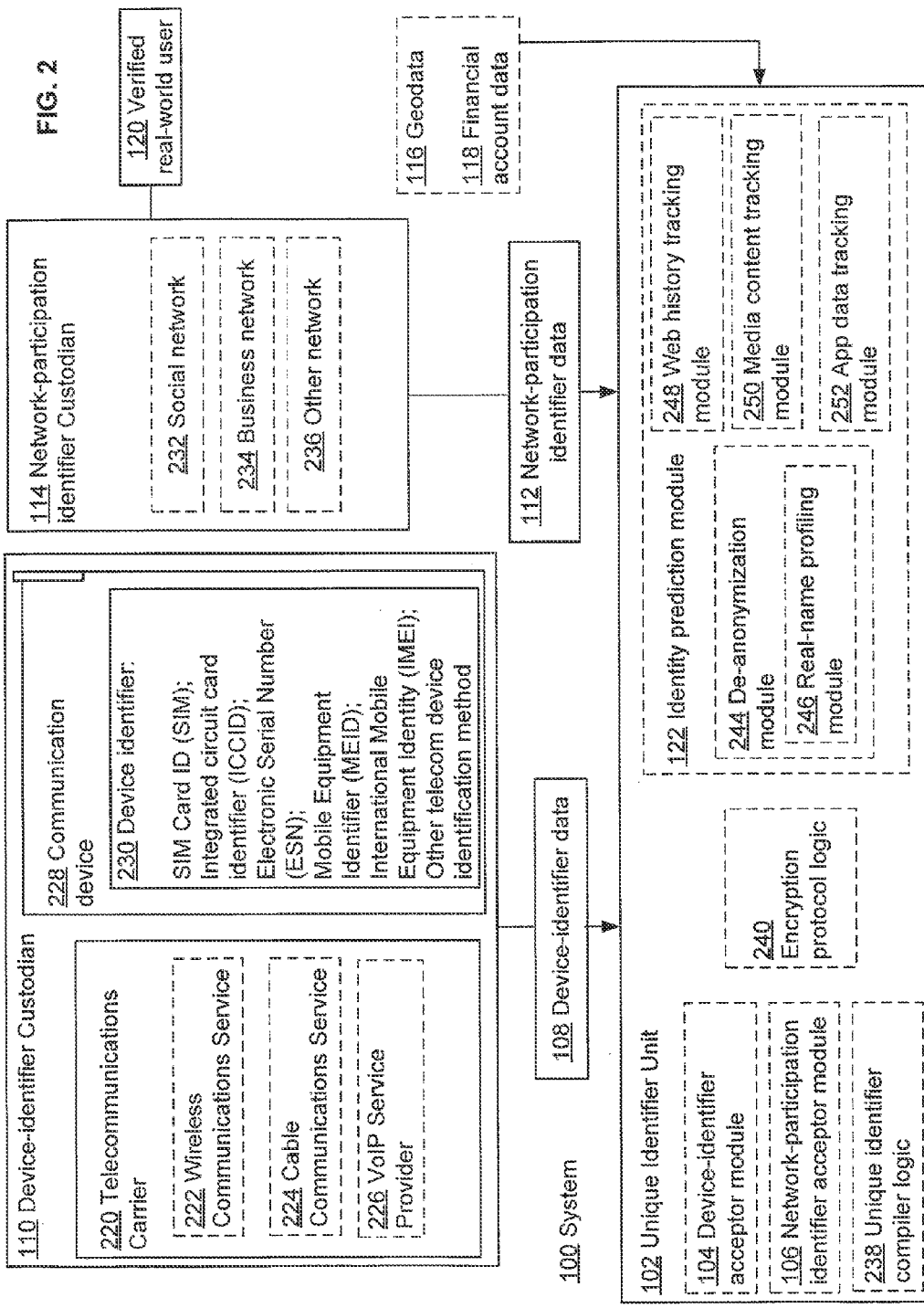
FIG. 2 illustrates certain alternative embodiments of the system for linking users of devices of FIG. 1.

As a courtesy to the reader, and with reference to the accompanying figures herein, in general "100 series" reference numerals will typically refer to items first introduced/ described by FIG. 1, "200 series" reference numerals will typically refer to items first introduced/described by FIG. 2, "300 series" reference numerals will typically refer to items first introduced/described by FIG. 3, etc.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example system 100 in which embodiments may be implemented. The system 100 includes a unique identifier unit 102. The unique identifier unit 102 may contain, for example, device-identifier acceptor module 104 and network-participation identifier acceptor module 106. Unique identifier unit 102 may communicate over a network or directly with device-identifier custodian 110 to accept device-identifier data 108. Unique identifier unit 102 may also communicate over a network or directly with network-participation identifier custodian 114 to accept network-participation identifier data 112 associated with a verified real-world user 120 associated with the at least one communication device. Optionally, unique identifier unit 102 may also accept geodata 116 or financial account data 118. Unique identifier unit 102 may also include identity prediction module 122 for associating network-participation identifier data with a verified real-world user 120 associated with a communication device.

In FIG. 1, unique identifier unit 102 may assign a unique identifier based on accepted device-identifier data 108 and accepted network-participation identifier data 112. Optionally, unique identifier unit 102 may assign geodata 116 and/or financial account data 118 to an assigned unique identifier.

In FIG. 1, the unique identifier unit 102 is illustrated as possibly being included within a system 100. Of course, virtually any kind of computing device may be used to implement the special purpose unique identifier unit 102, such as, for example, a workstation, a desktop computer, a networked computer, a server, a collection of servers and/or databases, a virtual machine running inside a computing device, a mobile computing device, or a tablet PC.

Additionally, not all of the unique identifier unit 102 need be implemented on a single computing device. For example, the unique identifier unit 102 may be implemented and/or operable on a remote computer, while a user interface and/or local instance of the unique identifier unit 102 are implemented and/or occur on a local computer. Further, aspects of the unique identifier unit 102 may be implemented in different combinations and implementations than that shown in FIG. 1. For example, functionality of a user interface may be incorporated into the unique identifier unit 102. The unique identifier unit 120 may perform simple data relay functions and/or complex data analysis, including, for example, fuzzy logic and/or traditional logic steps. Further, many methods of assigning unique identifiers described herein or known in the art may be used, including, for example, algorithms used in generating globally unique identifiers, universally unique identifiers, other random number generation methods. In some embodiments, the unique identifier unit 102 may assign unique identifiers based on device-identifier data 108 and/or network-participation identifier data 112 available as updates through a network.

Unique identifier unit 102 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

FIG. 2 illustrates certain alternative embodiments of the system 100 of FIG. 1. In FIG. 2, The unique identifier unit 102 may also include unique identifier compiler logic 238 and or encryption protocol logic 240. Unique identifier unit 102 may communicate over a network or directly with device-identifier custodian 110 to accept device-identifier data 108, perhaps in the form of device identifier 230 from communication device 228. Unique identifier unit 102 may also communicate over a network or directly with network-participation identifier custodian 114 to accept network-participation identifier data 112 associated with a verified real-world user 120 associated with the at least one communication device, perhaps from social network 232, business network 234, and/or other network 236.

In this way, the unique identifier unit 102 may generate a compiled and/or encrypted list of unique identifiers that are optionally coded with or otherwise linked to geodata and/or financial account data.

In some embodiments, unique identifier compiler logic 112 may create a compiled set of composite identifiers that can be used to disambiguate search results in the network based on device-identifier data, network participation identifier data, and/or geodata, for example. Unique identifier unit 102 can be operated by a telecom company or by a social or other network owner, or by both in cooperation with each other. A compiled list of unique identifiers as discussed herein can represent all or substantially all unique user devices in a given social network or other communications network, e.g., wireless network, email network, or the like.

A directory of uniquely-identified devices can serve as the foundation for searching within a social network, and for facilitating financial transactions via the device for members of the social network associated with the device.

In some embodiments, unique identifier unit 102 may also include identity prediction module 122 for associating network-participation identifier data with a verified real-world user 120 associated with a communication device 228. Identity prediction module 122 may include various search and/or matching functions for associating network-participation identifier data 112 with a verified real-world user 120 associated with a communications device 228. For example, identity prediction module 122 may include de-anonymization module 244, which in turn may include real-name profiling module 246. Identity prediction module 122 may also include web history tracking module 248, media content tracking module 250, and/or app list tracking module 252.

For the purposes of this application, SIM as used herein includes mini-SIM, micro-SIM, Universal Subscriber Identity Module, CDMA Subscriber Identity Module, Universal Integrated Circuit Card, Removable User Identity Module, virtual SIM, and other variants of the subscriber identity module described herein and understood by those of ordinary skill in the art.

As referenced herein, the unique identifier unit 102 may be used to perform various data querying and/or recall techniques with respect to the device-identifier data 108 and/or network-participation identifier data 112, in order to assign a unique identifier. For example, where the network-participation identifier data 112 is organized, keyed to, and/or otherwise accessible using one or more user accounts such as social network, email, or the like, unique identifier unit 102 may employ various Boolean, statistical, and/or semi-boolean searching techniques to assign a unique identifier. Similarly, for example, where device-identifier data 108 is organized, keyed to, and/or otherwise accessible using one or more device-identifier custodian 110, various Boolean, statistical, and/or semi-boolean searching techniques may be performed by unique identifier unit 102 to assign a unique identifier.

Many examples of databases and database structures may be used in connection with the unique identifier unit 102. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive queries for disambiguating information and/or for gathering and/or compiling data from the relational database(s).

For example, SQL or SQL-like operations over one or more device-identifier data 108 and/or network-participation identifier data 112 may be performed, or Boolean operations using a device-identifier data 108 and/or network-participation identifier data 112 may be performed. For example, weighted Boolean operations may be performed in which different weights or priorities are assigned to one or more of the device-identifier data 108 and/or network-participation identifier data 112, including various network participation aliases associated with a particular verified real-world user, perhaps relative to one another. For example, a number-weighted, exclusive-OR operation may be performed to request specific weightings of network participation identifiers.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 3 illustrates an operational flow 300 representing example operations related to linking users of devices. In FIG. 3 and in following figures that include various examples of operational flows, discussion and explanation may be provided with respect to the above-described system environments of FIGS. 1-2, and/or with respect to other examples and contexts. However, it should be understood that the operational flows may be executed in a number of other environments and contexts including that of FIG. 15, and/or in modified versions of FIGS. 1-2. Also, although the various operational flows are presented in the sequence(s) illustrated, it should be understood that the various operations may be performed in other orders than those which are illustrated, or may be performed concurrently.

After a start operation, operation 310 depicts accepting device-identifier data corresponding to at least one communication device. For example, unique identifier unit 102 and/or device-identifier acceptor module 104 can accept device-identifier data 108 from a telecommunications carrier 220, for example in the form of a Unique Device Identifier (UDID) for an iPhone or iPod Touch. The UDID is a sequence of 40 letters and numbers that is specific to each iPhone or iPod Touch. It may look something like this: 2b6f0cc904d137be2e1730235f5664094b831186. Other examples of sources of device-identifier data 108 include voice-over-internet-protocol service providers such as Skype (peer-to-peer VoIP), and wireless carriers such as Verizon Wireless (CDMA-based wireless communication). Other examples of device-identifier data 108 include Media Access Control addresses (MAC address) and International Mobile Equipment Identity numbers (IMEI).

Operation 320 depicts accepting network-participation identifier data associated with a verified real-world user associated with the at least one communication device. For example, unique identifier unit 102 and/or network-participation identifier acceptor module 106 may accept from Facebook a username associated with a verified real-world user having an iPhone and corresponding account with a telecommunications company. In another example, unique identifier unit 102 may accept from LinkedIn the name of a person associated with a videoconferencing device and corresponding account with a videoconferencing service such as WebEx Web conferencing. In another example, unique identifier unit 102 may accept from Google the email address of a person associated with an Android phone and corresponding account with a wireless carrier.

In some embodiments, network-participation identifier custodian 114 and device-identifier custodian will cooperate to provide the necessary network-participation identifier data 112 and device-identifier data 108 to unique identifier unit 108. For example, Facebook may provide usernames, images, birthdates, telephone numbers, or other data that it has about the verified real-world users of its social network to a consortium of telecommunications carriers 220 (this may optionally involve an opting-in step whereby users of Facebook affirmatively approve this action), who may provide device-identifier data 108. Assigning a unique identifier (discussed below) for each network-user-associated device across each of the carriers in the consortium may result in a directory that is particularly valuable for the telecommunications carriers, who can then provide directory searching, support, and disambiguation for a potentially large fraction of the Facebook social network. Such a directory will likely be of equal interest and value to networks including Facebook in this example, for the same reasons. For example, a cross-carrier directory of Facebook members with associated phone numbers would be an added feature for Facebook that could significantly enhance the social information provided by the network.

Operation 330 depicts assigning a unique identifier at least partly based on the device-identifier data and the network-participation identifier data. For example, unique identifier unit 102, upon accepting device-identifier data 108 and network-participation identifier data 112 associated with a verified real-world user 120 associated with the at least one communication device, may assign a randomly-generated 32-bit unique identifier. In the iPhone example above, unique identifier unit 102 may accept the iPhone's unique device identifier (UDID) as the device-identifier data 108, accept an iTunes username associated with a user with a valid credit card and security code as the network-participation identifier data 112 associated with a verified real-world user 120 associated with the at least one communication device, and assign a unique identifier to the device and username pair.

As another example, unique identifier unit 102 may accept the MAC address of a networked computer as the device-identifier data 108, accept an Outlook email address associated with a user with a verified biometric measurement as the network-participation identifier data 112 associated with a verified real-world user 120 associated with the at least one communication device, and assign a unique identifier to the computer and email address pair.

As another example, unique identifier unit 102 may accept a mobile phone's integrated circuit card ID (ICC-ID) as the device-identifier data 108, accept a Facebook username associated with a user with a valid Facebook Credits account as the network-participation identifier data 112 associated with a verified real-world user 120 associated with the at least one communication device, and assign a unique identifier to the mobile phone and Facebook username pair.

In some embodiments, unique identifier unit 102 may include an identity prediction algorithm such as a de-anonymization algorithm, a real-name profiling algorithm, a web history tracking algorithm, media content tracking algorithm, and/or an app list tracking algorithm. These algorithms may aid in the association of network-participation identifier data with a verified real-world user 120 associated with the communication device 228, where those associations are not provided directly by a device-identifier custodian 110 and/or a network-participation identifier custodian 114.

FIG. 4 illustrates alternative embodiments of the example operational flow 300 of FIG. 3. FIG. 4 illustrates example embodiments where the accepting operation 310 may include at least one additional operation. Additional operations may include operation 400, 402, 404, and/or operation 406.

Operation 400 depicts accepting device-identifier data corresponding to at least one of a mobile phone, a wired telephone, a voice-over-internet-protocol telephone, a tablet computer, a notebook computer, a laptop computer, a desktop computer, or a networked television. For example, unique identifier unit 102 and/or device-identifier acceptor module 104 may accept device-identifier data corresponding to at least one of a mobile phone, a wired telephone, a voice-over-internet-protocol telephone, a tablet computer, a notebook computer, a laptop computer, a desktop computer, or a networked television. For example, device-identifier acceptor module 104 may accept a mobile phone's mobile equipment identifier, a land line's telephone number, or a networked computer's media access control address (MAC address) or internet protocol address (IP address).

Device-identifier data 108 may be accepted in different forms depending on the device identified. For example, an IP address or MAC address may be used to identify a computer.

Every device connected to the public internet is assigned a unique number known as an internet protocol address (IP address). IP addresses consist of four numbers separated by periods (also called a "dotted-quad") and look something like 127.0.0.1. Since these numbers are usually assigned to internet service providers within region-based blocks, an IP address can often be used to identify the region or country from which a computer is connecting to the Internet. An IP address can sometimes be used to show the user's general location. An IP address may also be assigned to a Host name, which may be easier to remember. Hostnames may be looked up to find IP addresses, and vice-versa. At one time internet service providers issued one IP address to each user. These are static IP addresses. With the increased number of issued IP addresses, internet service providers now issue IP addresses in a dynamic fashion out of a pool of IP addresses using dynamic host configuration protocol (DHCP), which provides a central database for keeping track of computers that have been connected to the network. This prevents two computers from accidentally being configured with the same IP address. These are referred to as dynamic IP addresses. In addition to users connecting to the internet, with virtual hosting, a single machine can act like multiple machines, with multiple domain names and IP addresses.

MAC addresses are unique identifiers assigned to network interfaces for communications on the physical network segment. They are most often assigned by the manufacturer of a network interface card (NIC) and are stored in its hardware, the card's read-only memory, or some other firmware mechanism. If assigned by the manufacturer, a MAC address usually encodes the manufacturer's registered identification number and may be referred to as the burned-in address. It may also be known as an Ethernet hardware address (EHA), hardware address, or physical address. A network node may have multiple NICs and will then have one unique MAC address per NIC.

A subscriber identity module or subscriber identification module (SIM) is an integrated circuit that securely stores the service-subscriber key or international mobile subscriber identity (IMSI) used to identify a subscriber on mobile telephony devices (such as mobile phones and computers). A SIM card typically contains its unique serial number (integrated circuit card identifier or ICCID), an internationally unique number of the mobile user (IMSI), security authentication and ciphering information, temporary information related to the local network, a list of the services the user has access to and two passwords: a personal identification number (PIN) for usual use and a PIN unlock code (PUC) for unlocking A SIM card may also store other carrier-specific data such as the SMSC (Short Message Service Center) number, Service Provider Name (SPN), Service Dialing Numbers (SDN), Advice-Of-Charge parameters and Value Added Service (VAS) applications.

A SIM card's ICCID is stored in the SIM card and also engraved or printed on the SIM card body. The ICCID is typically composed of an issuer identification number (IIN), an individual account identification number, and a check digit.

SIM cards are identified on their individual operator networks by a unique international mobile subscriber identity number or IMSI. Mobile operators connect mobile phone calls and communicate with their market SIM cards using their IMSIs. The format is: the first 3 digits represent the Mobile Country Code (MCC), the next 2 or 3 digits represent the Mobile Network Code (MNC), and the next digits represent the mobile station identification number.

SIM cards may also orthogonally store a number of SMS messages and phone book contacts. A SIM is held on a removable SIM card, which can be transferred between different mobile devices.

Operation 402 depicts accepting telephony device-identifier data including a telephone number associated with the telephony device. For example, unique identifier unit 102 may accept a ten-digit telephone number or a seven-digit telephone number from a telecommunications carrier 220 as the device-identifier data 108. The number contains the information necessary to identify uniquely the intended endpoint for the telephone call. Each such endpoint must have a unique number within the public switched telephone network.

Operation 404 depicts accepting at least one of subscriber identity module data or integrated circuit card identifier data corresponding to at least one communication device. For example, unique identifier unit 102 may accept an international mobile subscriber identity (IMSI) from a mobile phone's SIM card from a telecommunications carrier 220 as the device-identifier data 108. As another example, device-identifier acceptor module 104 may accept from a wireless communications service 222 an integrated circuit card identifier number from a SIM card for a mobile phone.

Operation 406 depicts accepting mobile equipment identifier data corresponding to at least one communication device. For example, unique identifier unit 102 may accept a mobile equipment identifier corresponding to a mobile handset from a telecommunications carrier 220 or wireless communications service 222. A Mobile Equipment IDentifier (MEID) is a globally unique 56-bit identification number for a physical piece of mobile equipment. Equipment identifiers are "burned" into a device and are used as a means to facilitate mobile equipment identification and tracking Additionally, MEIDs are coordinated with International Mobile Equipment Identifiers (IMEIs), facilitating global roaming and harmonization between 3G technologies as a universal mobile equipment identifier. The MEID is a 14-digit hexadecimal value. The MEID is capable of being transmitted over the air upon a request from the network. The MEID is composed mainly of two basic components, the manufacturer code and the serial number.

FIG. 5 illustrates alternative embodiments of the example operational flow 300 of FIG. 3. FIG. 5 illustrates example embodiments where the accepting operation 310 may include at least one additional operation. Additional operations may include operation 500, 502, and/or operation 504.

Operation 500 depicts accepting international mobile subscriber identity data corresponding to at least one communication device. For example, device-identifier acceptor module 104 may accept an international mobile subscriber identity (IMSI) from a mobile phone's SIM card from a wireless communications service 222 as the device-identifier data 108. An International Mobile Subscriber Identity or IMSI is a unique identification associated with all GSM and UMTS network mobile phone users. It is stored as a 64-bit field in the SIM inside the phone and is sent by the phone to the network. It is also used for acquiring other details of the mobile device in the Home Location Register (HLR) or as locally copied in the Visitor Location Register. To prevent eavesdroppers identifying and tracking the subscriber on the radio interface, the IMSI is sent as rarely as possible and a randomly-generated temporary mobile subscriber identity (TMSI) is sent instead. The IMSI is used in any mobile network that interconnects with other networks. This number is kept in the phone directly or in the removable user identity module (R-UIM) card, a card developed for CDMA handsets that extends the GSM SIM card to CDMA phones and networks.

Operation 502 depicts accepting electronic serial number data corresponding to at least one communication device. For example, unique identifier unit 102 may accept an electronic serial number from a mobile phone's SIM card from a telecommunications carrier 220 as the device-identifier data 108. As another example, device-identifier acceptor module 104 may accept from a wireless communications service 222 an electronic serial number from a SIM card for a CDMA-based mobile phone.

Operation 504 depicts accepting device-identifier data corresponding to at least one communication device that is linked to at least one billing account. For example, unique identifier unit 102 may accept a mobile equipment identifier from a mobile phone's SIM card from a telecommunications carrier 220, the MEID corresponding to a billing account for a subscriber of a wireless service provided by the telecommunications carrier 220. As another example, device-identifier acceptor module 104 may accept from a wireless communications service 222 an IMSI from a SIM card for a mobile phone, the IMSI corresponding to a billing account for a subscriber of the wireless communications service 222.

FIG. 6 illustrates alternative embodiments of the example operational flow 300 of FIGS. 3 and 5. FIG. 6 illustrates example embodiments where the accepting operation 504 may include at least one additional operation. Additional operations may include operation 600, 602, and/or operation 604.

Operation 600 depicts accepting device-identifier data corresponding to at least one communication device that is linked to at least one billing account, wherein the at least one billing account comprises a cable telecommunications billing account. For example, unique identifier unit 102 may accept a computer user's MAC address or IP address as the device identifier data 108. In this example, the MAC address or IP address of the computer may be linked to a Skype account for billing purposes.

Operation 602 depicts accepting device-identifier data corresponding to at least one communication device that is linked to at least one billing account, wherein the at least one billing account comprises a wireless telecommunications billing account. For example, unique identifier unit 102 may accept from a wireless service provider an IMEI for a mobile phone linked to a billing account for an individual subscriber.

Operation 604 depicts accepting device-identifier data corresponding to at least one communication device that is linked to at least one billing account, wherein the at least one wireless telecommunications billing account comprises a satellite telecommunications billing account. For example, unique identifier unit 102 may accept from a satellite-based wireless service provider such as LightSquared, a device-identifier for a mobile phone linked to a billing account for an individual subscriber.

FIG. 7 illustrates alternative embodiments of the example operational flow 300 of FIGS. 3 and 5. FIG. 7 illustrates example embodiments where the accepting operation 504 may include at least one additional operation. Additional operations may include operation 700, 702, 704, and/or operation 706.

Operation 700 depicts accepting device-identifier data corresponding to at least one communication device that is linked to at least one billing account, wherein the at least one billing account comprises a physical address. For example, device-identifier acceptor module 104 may accept from a wireless communications service 222 an IMSI from a SIM card for a mobile phone, the IMSI corresponding to a billing account for a subscriber of the wireless communications service 222 at a specific street, city, and country address.

Operation 702 depicts accepting device-identifier data corresponding to at least one communication device that is linked to at least one billing account, wherein the at least one billing account comprises a bank account. For example, device-identifier acceptor module 104 may accept from a wireless communications service 222 an iPhone or iPod Touch device identifier, the identifier corresponding to a bank account number for a subscriber of the wireless service to the iPhone or iPod Touch device.

Operation 704 depicts accepting device-identifier data corresponding to at least one communication device that is linked to at least one billing account, wherein the at least one billing account comprises an electronic payment account. To continue the previous example involving the iPhone or iPod Touch device, the wireless service subscription may be linked to a bank's electronic payment service, wire transfer service, or the like.

Operation 706 depicts accepting device-identifier data corresponding to at least one communication device that is linked to at least one electronic payment account, wherein the electronic payment account comprises at least one of a Google Checkout account, an Amazon Payments account, a PayPal account, or a mobile PayPal account. For example, a unique identifier unit 102 may accept a mobile device ID for an Android mobile phone from an Android app such as "Android Device ID" available for download from the Android Market. The Android mobile device ID, perhaps derived from a wireless network socket, for the mobile phone may correspond to a Google Checkout account for the subscriber of the wireless service to the mobile phone.

FIG. 8 illustrates alternative embodiments of the example operational flow 300 of FIGS. 3 and 5. FIG. 8 illustrates example embodiments where the accepting operation 504 may include at least one additional operation. Additional operations may include operation 800, 802, and/or operation 804.

Operation 800 depicts accepting device-identifier data corresponding to at least one communication device that is linked to at least one billing account, wherein the at least one billing account comprises a credit card account. For example, a wireless device's service subscription may be linked to a user's credit card account.

Operation 802 depicts accepting device-identifier data corresponding to at least one communication device that is linked to at least one billing account, wherein the at least one billing account comprises a virtual account. For example, to continue the Google Checkout example above, a unique identifier unit 102 may accept a mobile device ID for an Android mobile phone from an Android app such as "Android Device ID" available for download from the Android Market. The Android mobile device ID for the mobile phone may correspond to a virtual account such as a Facebook credit account.

Operation 804 depicts accepting device-identifier data corresponding to at least one communication device that is linked to at least one virtual account, wherein the virtual account comprises at least one of a virtual wallet or a virtual prepaid credit card. For example, to continue the Google Checkout example above, a unique identifier unit 102 may accept a mobile device ID for an Android mobile phone from an Android app such as "Android Device ID" available for download from the Android Market. The Android mobile device ID for the mobile phone may correspond to a virtual wallet account such as Google wallet.

FIG. 9 illustrates alternative embodiments of the example operational flow 300 of FIG. 3. FIG. 9 illustrates example embodiments where the accepting operation 320 may include at least one additional operation. Additional operations may include operation 900, 902, 904, and/or operation 906.

Operation 900 depicts accepting network-participation identifier data associated with at least one of a user's social security number, a user's national identification card, a user's biometric measurement, a user's passport number, a user's tax identification number, a user's internet domain, or a user's authentication certificate. For example, unique identifier unit 102 and/or network-participation identifier acceptor module 106 may accept network-participation identifier data associated with at least one of a user's social security number, a user's national identification card, a user's biometric measurement, a user's passport number, a user's tax identification number, a user's internet domain, or a user's authentication certificate. For example, network-participation identifier acceptor module 106 may accept a Facebook username as network-participation identifier data, the username associated with a photograph of the user as a biometric measurement verifying that a real-world user is associated with the username. In some embodiments, an image recognition system may be employed to associate an image with a specific user. In some embodiments, the real-world user may be a corporation.

In another example, network-participation identifier acceptor module 106 may accept an email address as network-participation identifier data, the email address associated with a social security number on file with a telecommunications company with which the user has a service subscription.

As used herein, "network-participation identifier data" may refer to a signifier of belonging in a network, such as an email address; a username, such as a social networking user name; or other mark such as an image, number, or writing that signifies participation in a particular network.

Operation 902 depicts accepting social networking data corresponding to at least one verified real-world user of the at least one communication device. For example, unique identifier unit 102 and/or network-participation identifier acceptor module 106 may accept a Google+ username as a network-participation identifier datum, wherein the Google+ username is associated with a photograph of the user having the username. In some embodiments, the photograph of the user may be analyzed by image recognition technologies to identify a person having specific geographic, demographic, or other identifying characteristics.

Operation 904 depicts accepting social networking data corresponding to at least one verified real-world user of the at least one communication device, wherein the social networking data comprises at least one of a username, an @-tagged twitter handle, a corporate login, or a website uniform resource locator (URL). For example, unique identifier unit 102 and/or network-participation identifier acceptor module 106 may accept a blogger's website URL as a network-participation identifier datum, wherein the website URL is associated with a photograph and/or description of the blogger on the website at the website URL.

Operation 906 depicts accepting social networking data corresponding to at least one verified real-world user of the at least one communication device, wherein the social networking data comprises at least one of Facebook data, Twitter data, or LinkedIn data. For example, unique identifier unit 102 and/or network-participation identifier acceptor module 106 may accept a LinkedIn username as a network-participation identifier datum, wherein the username is associated with a public profile of a user of the business-related social networking site LinkedIn.

FIG. 10 illustrates alternative embodiments of the example operational flow 300 of FIGS. 3 and 9. FIG. 10 illustrates example embodiments where the accepting operation 902 may include at least one additional operation. Additional operations may include operation 1000, 1002, and/or operation 1004.

Operation 1000 depicts accepting social networking data corresponding to at least one verified real-world user of the at least one communication device, wherein the social networking data comprises at least one of image data, constellation of social contact data, or user input data. For example, unique identifier unit 102 and/or network-participation identifier acceptor module 106 may accept a list of social contacts from a social network such as Facebook or LinkedIn as the network-participation identifier data. In another example, unique identifier unit 102 and/or network-participation identifier acceptor module 106 may accept a list of email contacts grouped as friends or family from an email contact list as the network-participation identifier data.

Operation 1002 depicts accepting social networking data corresponding to at least one verified real-world user of the at least one communication device, wherein the social networking data comprises data accumulated from multiple sources. For example, unique identifier unit 102 and/or network-participation identifier acceptor module 106 may accept a plurality of usernames sourced from various social networks, each corresponding to the same verified real-world user of the at least one communication device as the data accumulated from multiple sources. As another example, unique identifier unit 102 and/or network-participation identifier acceptor module 106 may accept a set of photographs of the same verified real-world user of the at least one communication device, sourced from various social networks as the data accumulated from multiple sources.

Operation 1004 depicts accepting social networking data corresponding to at least one verified real-world user of the at least one communication device, wherein the social networking data comprises at least one of data used to create additional data or data used to find additional data. For example, unique identifier unit 102 and/or network-participation identifier acceptor module 106 may accept a website URL of a social networking site's videoconferencing or videochat feed as data (website URL) used to create additional data (streaming video of network participants). In another example, unique identifier unit 102 and/or network-participation identifier acceptor module 106 may accept a user image or alias that can be used to find other data, for example as a search term in an reverse-image query or a text query, respectively.

FIG. 11 illustrates alternative embodiments of the example operational flow 300 of FIG. 3. FIG. 11 illustrates example embodiments where the assigning operation 330 may include at least one additional operation. Additional operations may include operation 1100, 1102, and/or operation 1104.

Operation 1100 depicts assigning at least one of a multi-digit decimal number, a multi-digit hexadecimal number, or a randomized code as the unique identifier. For example, unique identifier unit 102 may assign at least one of a multi-digit decimal number, a multi-digit hexadecimal number, or a randomized code as the unique identifier. In another example, unique identifier unit 102 may assign a unique identifier using an algorithm(s) known in the art to generate unique multi-digit decimal numbers or unique multi-digit hexadecimal numbers. See, e.g., U.S. Pat. No. 8,010,587 (hereby incorporated by reference).

Operation 1102 depicts further comprising encrypting the unique identifier. For example, unique identifier unit 102 and/or encryption protocol logic 240 may encrypt the assigned unique identifier. Encrypting the unique identifier may be desirable in cases where telecommunications carriers sharing a directory comprised of unique identifiers for the purpose of locating and disambiguating users of one or more networks, can share the unique identifiers but still protect them and the underlying data from access by undesirable entities such as spammers and telemarketers. In another example, unique identifier unit 102 may encrypt the assigned identifier or associated sensitive personal and/or financial information according to encryption schemes described herein and known in the art. See, e.g., U.S. Pat. No. 8,010,791 and U.S. Pat. No. 8,010,786 (hereby incorporated by reference).

Operation 1104 depicts further comprising encrypting the unique identifier, wherein the encrypting the unique identifier includes performing at least one of symmetric key encryption, public key encryption, hybrid digital signature encryption, using a one-way hash function, using a random identifier, or using a pseudo-random identifier. For example, unique identifier unit 102 and/or encryption protocol logic 240 may encrypt the assigned unique identifier using a one-way hash function, which is easy to compute on every input, but hard to invert given the image of a random input.

FIG. 12 illustrates alternative embodiments of the example operational flow 300 of FIG. 3. FIG. 12 illustrates example embodiments where the assigning operation 330 may include at least one additional operation. Additional operations may include operation 1200, 1202, 1204, and/or operation 1206.

Operation 1200 depicts assigning a unique identifier at least partly based on the device-identifier data and the network-participation identifier data, further comprising assigning to the unique identifier geo-locator data from the at least one communication device. For example, unique identifier unit 102 may accept geodata 116 from a mobile phone, and then assign that geodata to an assigned unique identifier corresponding to a device and a network participant. In another example, unique identifier unit 102 may accept geodata 116 in the form of a computer's IP address, and then assign that geodata to an assigned unique identifier corresponding to the computer and a verified network participant associated with that computer.

Operation 1202 depicts assigning a unique identifier at least partly based on the device-identifier data and the network-participation identifier data, further comprising assigning to the unique identifier geo-locator data from the at least one communication device, wherein the geo-locator data is assigned via a global positioning satellite function of the communication device. For example, unique identifier unit 102 may accept geodata 116 from a mobile phone having a gps receiver, and then assign that geodata to an assigned unique identifier corresponding to a device and a network participant.

Operation 1204 depicts assigning a unique identifier at least partly based on the device-identifier data and the network-participation identifier data, further comprising assigning to the unique identifier geo-locator data from the at least one communication device, wherein the geo-locator data is derived from at least one of cellular phone tower proximity, Wi-Fi use, user-entered location data, or proximity to at least one other device. For example, unique identifier unit 102 may accept geodata 116 from a smart phone using a Wi-Fi network contained in a database that contains location information for the Wi-Fi network, and then assign that geodata to an assigned unique identifier corresponding to a device and a network participant.

Operation 1206 depicts assigning a unique identifier at least partly based on the device-identifier data and the network-participation identifier data, further comprising assigning to the unique identifier geo-locator data from the at least one communication device, wherein the geo-locator data is derived from at least one of a detected vehicle use, a detected user activity, or a detected user location. For example, unique identifier unit 102 may derive geo-locator data from detected automobile use, based on, for example, last known location and predicted range of travel of the automobile. In another example, unique identifier unit 102 may receive or deduce geo-locator data from a detected user activity, for example, checking in with foursquare at a specific location or searching for driving directions in a web browser, respectively.

FIG. 13 illustrates alternative embodiments of the example operational flow 300 of FIG. 3. FIG. 13 illustrates example embodiments where the assigning operation 330 may include at least one additional operation. Additional operations may include operation 1300, 1302, 1304, and/or operation 1306.

Operation 1300 depicts assigning a unique identifier at least partly based on the device-identifier data and the network-participation identifier data, wherein the unique identifier represents multiple communication devices associated with a single user. For example, unique identifier unit 102 may assign a unique identifier at least partly based on the device-identifier data and the network-participation identifier data, wherein the unique identifier represents multiple communication devices associated with a single user. In another example, unique identifier unit 102 may accept device-identifier data from a mobile phone, a desktop computer, and a laptop computer, each of which is associated with a single user, for example by virtue of an IMSI or other SIM data, email data, billing account data, or social networking data.

Operation 1302 depicts assigning a unique identifier at least partly based on the device-identifier data and the network-participation identifier data, wherein the unique identifier represents a single communication device associated with multiple users. For example, unique identifier unit 102 may assign a unique identifier at least partly based on the device-identifier data and the network-participation identifier data, wherein the unique identifier represents a single communication device associated with multiple users. In another example, unique identifier unit 102 may accept device-identifier data from a mobile phone, the device-identifier data associated with a multiple users, for example members of a family by virtue of different login data used for access to the device and/or different social networking usernames used on the device.

Operation 1304 depicts assigning a unique identifier at least partly based on the device-identifier data and the network-participation identifier data, wherein the unique identifier represents a single communication device associated with a single user. For example, unique identifier unit 102 may assign a unique identifier at least partly based on the device-identifier data and the network-participation identifier data, wherein the unique identifier represents a single communication device associated with a single user. As another example, unique identifier unit 102 may assign a unique identifier at least partly based on a videoconferencing device ID, such as an IP address or a MAC address, and at least partly based on a username and password for the videoconference, accompanied by a video image of a user associated with the username and password, verifying that a real-world user is associated with the videoconferencing device.

Operation 1306 depicts assigning a unique identifier at least partly based on the device-identifier data and the network-participation identifier data, and then adding an assigned unique identifier to an inter-service-provider directory of unique identifiers. For example, unique identifier unit 102 may assign a unique identifier at least partly based on the device-identifier data and the network-participation identifier data, and then adding an assigned unique identifier to an inter-service-provider directory of unique identifiers. In another example, unique identifier unit 102 may assign a unique identifier at least partly based on SIM data identifying a user's mobile phone, and at least partly based on subscriber's participation in the wireless network, as verified, for example, by a social security number for the user on file with the wireless carrier for the mobile device, for example, Verizon. Verizon may similarly create unique identifiers for all of the other verified real-world users of its network and their associated devices. Other wireless carriers may similarly create unique identifiers for their subscribers and associated devices.

If many wireless carriers agree to share their unique identifier lists and keep them in the same format for use as a global directory of mobile phone users, a comprehensive "white pages" of communications device users becomes possible, across potentially all service providers. Such a directory could also be keyed to social networking data such as username or user image, such that, for example, Facebook users could easily find each other's device contact information and possibly location information. Inclusion of users' device information in such a directory could be done on an opt-in basis.

As used herein, a unique identifier based on a device-identifier and a network-participant identifier may be keyed to that underlying data. That is, having the unique identifier corresponding to specific device data and specific network-participation identifier data associated with a verified real-world user associated with the at least one communication device will permit the creator of the unique identifier to use it to call up the specific device data and specific network participation identifier data. This may allow, for example, a telecommunications carrier to disambiguate one user from another having similar or identical network participation identifier data. This can be done on the basis of different device identifier data for the two users with similar or identical network participation identifier data, for example.

FIG. 14 illustrates a partial view of an example article of manufacture 1400 that includes a computer program 1404 for executing a computer process on a computing device. An embodiment of the example article of manufacture 1400 is provided including a signal bearing medium 1402, and may include one or more instructions for accepting device-identifier data corresponding to at least one communication device; one or more instructions for accepting network-participation identifier data associated with a verified real-world user associated with the at least one communication device; and one or more instructions for assigning a unique identifier at least partly based on the device-identifier data and the network-participation identifier data. The one or more instructions may be, for example, computer executable and/or logic-implemented instructions. In one implementation, the signal-bearing medium 1402 may include a computer-readable medium 1406. In one implementation, the signal bearing medium 1402 may include a recordable medium 1408. In one implementation, the signal bearing medium 1402 may include a communications medium 1410.

FIG. 15 illustrates an example system 1500 in which embodiments may be implemented. The system 1500 includes a computing system environment. The system 1500 also illustrates a user 1512 using a device 1504, which is optionally shown as being in communication with a computing device 1502 by way of an optional coupling 1506. The optional coupling 1506 may represent a local, wide-area, or peer-to-peer network, or may represent a bus that is internal to a computing device (e.g., in example embodiments in which the computing device 1502 is contained in whole or in part within the device 1504). A storage medium 1508 may be any computer storage media. In one embodiment, the computing device 1502 may include a virtual machine operating within another computing device. In an alternative embodiment, the computing device 1502 may include a virtual machine operating within a program running on a remote server.

The computing device 1502 includes computer-executable instructions 1510 that when executed on the computing device 1502 cause the computing device 1502 to (a) accept device-identifier data corresponding to at least one communication device; (b) accept network-participation identifier data associated with a verified real-world user associated with the at least one communication device; and (c) assign a unique identifier at least partly based on the device-identifier data and the network-participation identifier data. As referenced above and as shown in FIG. 15, in some examples, the computing device 1502 may optionally be contained in whole or in part within the device 1504.

In FIG. 15, then, the system 1500 includes at least one computing device (e.g., 1502 and/or 1504). The computer-executable instructions 1510 may be executed on one or more of the at least one computing device. For example, the computing device 1502 may implement the computer-executable instructions 1510 and output a result to (and/or receive data from) the computing device 1504. Since the computing device 1502 may be wholly or partially contained within the computing device 1504, the device 1504 also may be said to execute some or all of the computer-executable instructions 1510, in order to be caused to perform or implement, for example, various ones of the techniques described herein, or other techniques.

The device 1504 may include, for example, a portable computing device, workstation, or desktop computing device. In another example embodiment, the computing device 1502 is operable to communicate with the device 1504 associated with the user 1512 to receive information about the input from the user 1512 for performing data access and data processing, and assign a unique identifier at least partly based on the device-identifier data and the network-participation identifier data.

FIG. 16 illustrates alternative embodiments of the example operational flow 300 of FIG. 3. FIG. 16 illustrates example embodiments where the accepting operation 320 may include at least one additional operation. Additional operations may include operation 1600, 1602, and/or operation 1604.

Operation 1600 depicts accepting network-participation identifier data associated with a verified real-world user associated with the at least one communication device, further comprising associating network-participation identifier data with a real-world user associated with the at least one communication device. To continue an example of operation 302 above in which unique identifier unit 102 and/or network-participation identifier acceptor module 106 may accept from Facebook a username associated with a verified real-world user having an iPhone and corresponding account with a telecommunications company, the unique identifier unit 102 and/or identity prediction module 122 may search one or more identity databases for associations between the username and a real-world user, and for associations between that real-world user and the iPhone. Sources of data for associating a user with network-participation data and/or a communication device may include, for example, information that is provided by the user. For example, social network, message boards, internet forums, and the like may contain a link between a username and a phone number, a real-world name, birth date, gender, age, or other identifying attribute. Private sources of data may also include information provided by the user, such as private social networks, e-commerce websites, or any websites to which a consumer provides sign-up information. Publicly available sources may contain unique consumer information, including for example, vehicle registration records, real estate records, driving records, voting records, political donations, health information, government related data, technographics, or any other online sources disclosing information about people. Examples of algorithms that may be employed to perform these associations can be found in U.S. Patent Application Publication 2010/0088313 "Data Source Attribution System," hereby incorporated in its entirety by reference. See also U.S. Patent Application Publication 2010/0010993 "Distributed Personal Information Aggregator," also hereby incorporated in its entirety by reference.

In the example above, the Facebook username may be used as a search query by identity prediction module 122 to find the same username on a blog containing a real-world name and mobile phone number associated with the username, the mobile phone number being assigned to the iPhone associated with the now-verified real-world user associated with the Facebook username.

Operation 1602 depicts associating network-participation identifier data with a real-world user associated with the at least one communication device, including at least one of performing the association using identity prediction, performing the association using de-anonymization, or performing the association using real-name profiling. For example, unique identifier unit 102, identity prediction module 122, de-anonymization module 244, and/or real-name profiling module 246 may associate network-participation identifier data with a real-world user associated with the at least one communication device, including at least one of performing the association using identity prediction, performing the association using de-anonymization, or performing the association using real-name profiling. For example, accept from LinkedIn the name of a person associated with a videoconferencing device and corresponding account with a videoconferencing service such as WebEx Web conferencing. If the association between the LinkedIn subscriber and a real-world user associated with the videoconferencing device is missing, identity prediction module 122 may search relevant identity databases for matches to the subscriber's username or other profile data. In this way, verification of the real-world user can be accomplished, and association between the network-participation identifier data and the user associated with the communications device can be performed.

Operation 1604 depicts associating network-participation identifier data with a real-world user associated with the at least one communication device, including at least one of performing the association using web history tracking, performing the association using media content tracking, or performing the association using app data tracking. For example, unique identifier unit 102, Web history tracking module 248, media content tracking module 250, and/or app data tracking module 252 may associate network-participation identifier data with a real-world user associated with the at least one communication device, including at least one of performing the association using web history tracking, performing the association using media content tracking, or performing the association using app data tracking. For example, unique identifier unit 102 may accept from Google the email address of a person associated with an Android phone and corresponding account with a wireless carrier. In this example, app data tracking module 252 may match the email address with device ID from the phone, e.g., SIM data, and make the association between the email address and the phone. Additionally, web history tracking module 248 may search public databases for verification that a real-world user is associated with the email address, for example by searching department of motor vehicle records or real estate records.

Regulating Information Flow During Interactions

FIG. 17 illustrates an example system 1700 in which embodiments may be implemented. The system 1700 includes a persona creation unit 1706. The persona creation unit 1706 may contain, for example, personal information request acceptor module 1708, which may in turn contain identification request acceptor module 1710, financial information request acceptor module 1712, and/or web page parser module 1714. Web page parser module 1714 may contain X/Y coordinate web page reader 1716, web page image reader 1718, and/or screen scraper module 1719. Persona creation unit 1706 also may contain, for example, transaction analysis logic 1730 and/or persona compiler module 1720, which may in turn contain personal information anonymizer module 1722, persona creation ruleset module 1724, vendor-specific persona database 1726, and/or personal assistant-mediated persona compiler module 1728. Persona creation unit 1706 may communicate over a network or directly with user 1701 to accept indication of interaction 1704 reflecting interaction 1702 with interaction partner 1703. Persona creation unit 1706 may also communicate over a network or directly with user 1701 and/or interaction partner 1703 to present persona 1740.

In FIG. 17, persona creation unit 1706 may accept indication of interaction 1704 by direct inspection of interaction 1702 or from user 1701 and/or interaction partner 1703. Optionally, persona creation unit 1706 may accept indication of interaction 1704 such as a request for personal information, a transaction indication, and/or a call from user 1701 for a persona.

In FIG. 17, the persona creation unit 1706 is illustrated as possibly being included within a system 1700. Of course, virtually any kind of computing device may be used to implement the special purpose persona creation unit 1706, such as, for example, a workstation, a desktop computer, a networked computer, a server, a collection of servers and/or databases, a virtual machine running inside a computing device, a mobile computing device, or a tablet PC.

Additionally, not all of the persona creation unit 1706 need be implemented on a single computing device. For example, the persona creation unit 1706 may be implemented and/or operable on a remote computer, while a user interface and/or local instance of the persona creation unit 1706 are implemented and/or occur on a local computer. Further, aspects of the persona creation unit 1706 may be implemented in different combinations and implementations than that shown in FIG. 17. For example, functionality of a user interface may be incorporated into the persona creation unit 1706. The persona creation unit 1706 may perform simple data relay functions and/or complex data analysis, including, for example, fuzzy logic and/or traditional logic steps. Further, many methods of establishing different online personas described herein or known in the art may be used, including, for example, algorithms commonly used in web page analysis may be used to determine a transaction scale as a basis for creating an appropriate persona containing an appropriate level of personal information for that transaction. In some embodiments, the persona creation unit 1706 may create a persona based on indications of interaction available as updates through a network.

Persona creation unit 1706 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

As referenced herein, the persona creation unit 1706 may be used to perform various data querying and/or recall techniques with respect to the indication of interaction 1704 and/or the interaction 1702, in order to create and present an appropriate persona 1740. For example, where indication of interaction 1704 elements are organized, keyed to, and/or otherwise accessible using one or more web page analysis tools, or the like, persona creation unit 1706 may employ various Boolean, statistical, and/or semi-boolean searching techniques to determine the appropriate level of information to place in a persona to be created. Similarly, for example, where user personal information is organized, keyed to, and/or otherwise accessible using one or more persona creation rulesets, various Boolean, statistical, and/or semi-boolean searching techniques may be performed by persona creation unit 1706 to create an appropriate persona.

Many examples of databases and database structures may be used in connection with the persona creation unit 1706. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive negotiation of persona content and/or for gathering and/or compiling data from the relational database(s).

For example, SQL or SQL-like operations over one or more indications of interaction 1704 and/or interaction 1702 may be performed, or Boolean operations using indications of interaction 1704 and/or interaction 1702 may be performed. For example, weighted Boolean operations may be performed in which different weights or priorities are assigned to one or more of the indications of interaction 1704 and/or interaction 1702, including various transaction identifier elements, locations, and/or contexts, perhaps relative to one another. For example, a number-weighted, exclusive-OR operation may be performed to request specific weightings of elements found on a check-out page of an e-commerce web page (e.g., dollar amount in cart, web site name, payment type).

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 18 illustrates an operational flow 1800 representing example operations related to regulating information flow during interactions. In FIG. 18 and in following figures that include various examples of operational flows, discussion and explanation may be provided with respect to the above-described system environments of FIG. 17, and/or with respect to other examples and contexts. However, it should be understood that the operational flows may be executed in a number of other environments and contexts including that of FIG. 26, and/or in modified versions of FIG. 17. Also, although the various operational flows are presented in the sequence(s) illustrated, it should be understood that the various operations may be performed in other orders than those which are illustrated, or may be performed concurrently.

After a start operation, operation 1810 depicts accepting at least one indication of an interaction involving at least one member of a network. For example, persona creation unit 1706, personal information request acceptor module 1708, and/or persona compiler module 1720 may accept indication of interaction 1704 from a user 1701, for example in the form of auction bid dollar amount, a website name, or a purchase item name or dollar value. In another example, persona creation unit 1706 or transaction analysis logic 1730 may accept markup language code (e.g., HTML or XML) corresponding to a web page as the indication of interaction 1704.

Operation 1820 depicts creating a persona corresponding to the at least one member of a network, wherein the persona is at least partly based on the indication of an interaction. For example, persona creation unit 1706, personal information request acceptor module 1708, and/or persona compiler module 1720 may create a persona corresponding to the at least one member of a network, wherein the persona is at least partly based on the indication of an interaction. In one embodiment, persona creation unit 1706 may accept markup language code from a checkout webpage as the indication of interaction 1704. In this example, the code may indicate a dollar value of a purchase or auction bid. Based on that dollar value, the persona compiler module 1720 may present a specific persona containing specific personal information about the user for use in the interaction. In some embodiments, persona compiler 1720 may present a limited persona or alias of the user where the interaction is deemed by persona creation unit 1706 and/or transaction analysis logic 1730 to be of low dollar value. For financial interactions such as purchases or auctions, transaction analysis logic 1730 may detect a dollar value and assign a dollar value category for the interaction, for example low dollar value, intermediate dollar value, or high dollar value.

Alternatively, many intermediate levels of interaction value may be assigned based on a detected value present in the code or other attribute of the interaction. In these embodiments, a minimal persona containing few elements of personal information may be presented. In cases where a negotiation is initiated, subsequent presentations of personas containing progressively more personal information may be presented with the goal that an acceptable persona may be presented to the interaction partner which provides only that amount of personal information which is sufficient for completion of the interaction/transaction. This approach attempts to avoid gratuitous dissemination of potentially valuable personal information. For example, for low dollar transactions, persona compiler logic 1720 may be programmed to put together a persona for the user 1701 containing only a name and a device identifier, such as a telephone number. For some interaction partners, such a minimal persona will provide enough trust in the creditworthiness of the user 1701, perhaps via a check with a telecommunications carrier that the name matches the telephone number. In other, higher dollar value transactions, a persona containing more detailed personal information may be necessary. For example, for a car purchase, a persona including credit information, credit history, and personal financial asset data may be presented by persona compiler logic 1720.

In some embodiments, user 1701 will provide indication of interaction 1704 to persona creation unit 1706. In another embodiment, user 1701 may grant access to interaction 1702, for example by an affirmative step of opting-in or by not opting-out of a request by persona creation unit 1706. Personal information may be obtainable as a matter of course by persona creation unit 1706. For example, personal information of a user 1701 may be directly entered into persona creation unit 1706 for the purpose of allowing the unit to create personas, or alternatively, persona creation unit 1706 may indirectly access personal information through access to various accounts of user 1701, such as bank accounts, social network accounts, or telecommunications accounts. In some embodiments, some of the personal information may be publicly available.

Operation 1830 depicts presenting the persona for use in the interaction involving the at least one member of the network. For example, persona creation unit 1706, upon creating a persona based on an indication of interaction 1704, may present the persona for use in the interaction involving the at least one member of the network. For example, persona creation unit 1706 may accept a request for personal information from an interaction partner such as amazon.com. Persona creation unit 1706 may then assess the interaction 1702 based on dollar amount or personal information requested, and create a persona accordingly, perhaps according to a persona creation ruleset pre-programmed into persona creation ruleset module 1724. Persona creation unit 1706 may then present the persona to user 1701 for use in interaction 1702, or directly present the persona to the interaction 1702, perhaps in the form of filling in personal information fields on an e-commerce website. Such fields are equivalent to requests for personal information.

In some embodiments, persona creation unit 1706 may include a persona compiler algorithm such as an anonymization algorithm, a user-defined persona creation algorithm (i.e., ruleset), a vendor-specific persona creation algorithm, and/or a personal assistant-mediated persona compiler algorithm. These algorithms may aid in the creation of personas that are appropriate to a given interaction 1702.

In some embodiments, both for detecting the specifics of an interaction or transaction on a web page and for placing data into fields on a web page, it may be useful to perform web scraping or web page image analysis on the web page.

Web scraping is a computer software technique of extracting information from websites. Usually, such software programs simulate human exploration of the World Wide Web by either implementing low-level Hypertext Transfer Protocol (HTTP), or embedding certain full-fledged Web browsers, such as Internet Explorer or Mozilla Firefox. Web scraping may involve the transformation of unstructured data on the Web, typically in HTML format, into structured data that can be stored and analyzed in a central local database or spreadsheet. Specific techniques for web scraping include text grepping and regular expression matching, which extracts information from Web pages based on the UNIX grep command or regular expression matching facilities of programming languages (for instance Perl or Python).

Another web scraping tool is HTTP programming wherein static and dynamic web pages can be retrieved by posting HTTP requests to a remote web server using socket programming.

Another web scraping tool is DOM (document object model) parsing: By embedding a full-fledged web browser, such as Internet Explorer or Mozilla web browser, programs can retrieve dynamic content generated by client-side scripts. These web browser controls may also parse web pages into a DOM tree, based on which programs can retrieve parts of the web pages.

Another web scraping tool is HTML parsing, wherein semi-structured data query languages, such as XQuery and HTQL can be used to parse HTML pages and to retrieve and transform web content.

There are many web-scraping software tools available that can be used to customize web-scraping solutions. These programs may attempt to automatically recognize the data structure of a page or provide a web recording interface that removes the necessity to manually write web-scraping code, or some scripting functions that can be used to extract and transform web content, and database interfaces that can store the scraped data in local databases.

Another web scraping tool is a vertical aggregation platform. These platforms create and monitor a multitude of "bots" for specific verticals with no man-in-the-loop, and no work related to a specific target site. The preparation involves establishing a knowledge base for the entire vertical, and then the platform creates the bots automatically. The platform's robustness is measured by the quality of the information it retrieves (usually number of fields) and its scalability (how quick it can scale up to hundreds or thousands of sites). This scalability is mostly used to target sites that common aggregators find complicated or too labor intensive to harvest content from.

Another web scraping tool is semantic annotation recognizing, wherein web pages may contain metadata or semantic markups/annotations which can be made use of to locate specific data. If the annotations are embedded in the pages, as Microformat does, this technique can be viewed as a special case of DOM parsing. In another case, the annotations, organized into a semantic layer, may be stored and managed separately from the web pages, so the web scrapers can retrieve data schema and instructions from this layer before scraping the pages.

Another tool for web page analysis is iMacros, a program that harvests web data automatically, which can do automatic form-filling. For example, iMacros works with every website; even the most complicated websites that use dialog boxes, frames, Javascript and AJAX can be automated. It has high data extraction speed: on a typical computer, 20-50 instances of iMacros can be run at once ("multi-threading"). It has full web-crawling support. iMacros can be scheduled to run in the background of other programs or in lean traffic hours. iMacros permits change of IP addresses programmatically with full PROXY support. After harvesting the web data, actions may be performed on it, it can be transferred to any application, or it can be used in another process. iMacros integrates with every Windows scripting or programming language. iMacros can connect to any database or software application. iMacros provides visual recording of all web activities and the extraction macros. iMacros has full unicode support, and iMacros can extract text in all languages, including Asian languages such as Chinese, Japanese and Korean.

In addition to working with the website source code like a "normal" software program, iMacros can also look at the website like a human does: iMacros' image recognition support allows a user to automate and test websites using images instead of X/Y coordinates: a user can tell iMacros what a button looks like and iMacros can find it on the page. Even when the button has moved or if it has changed color or screen resolution. The iMacros Image Recognition Wizard functions with web sites that use non-HTML technologies such as Flash applets, Java applets, Movie Player Applets, ActiveX controls or any other technology. Since the software relies only on the images that are rendered in the browser, it works independently of the underlying technology.

The creation of personas described and claimed herein may function as a control feature of the unique identifier described above. In one embodiment, cascaded personas give more and more access to your real-world assets information. These personas may be uniquely or semi-uniquely linked to a real user. A credit bank such as Visa may manages these online personas—from something with little personal information such as "white male" to detailed real-life identity information. Because there is a direct link to personal information, provided by a telecommunications carrier via the device, it is possible to protect previously vulnerable web surfers who are at risk for having their personal information taken at will by snoopers. A user may look online and find a persona on the internet that is uniquely associated with them.

Under the persona creation environment described herein, opt-in may no longer be binary because a user may opt in to a set of circumstances around a persona or a type of identification. In this environment a user will have a true identity—SIM data and all that goes with it—that may or may not be communicated to an interaction partner 1703 depending upon the nature of interaction 1702. Accordingly, in the herein envisioned personas/relationships a user may have an unfolding level of envelopes that increases exposure to their personal information as you go deeper into the value of an interaction.

In one embodiment, a user interface with persona creation unit 1706 will specify—easily and preferably visually—exactly what type of commercial obligations and/or identity personas/relationships he/she is entering when he/she consents to assume a particular persona template.

FIG. 19 illustrates alternative embodiments of the example operational flow 1800 of FIG. 18. FIG. 19 illustrates example embodiments where the accepting operation 1810 may include at least one additional operation. Additional operations may include operation 1900, 1902, 1904, and/or operation 1906.

Operation 1900 depicts accepting from at least one member of a network an indication of an interaction involving the at least one member of a network. For example, persona creation unit 1706 and/or personal information request acceptor module 1708 may accept from user 1701 an indication of interaction 1704 such as a request for a persona to give to iTunes for the purchase of an MP3 file. As another example, personal information request acceptor module 1708 may forward from user 1701 a request for personal information from an e-commerce website such as Groupon relating to a potential purchase. In some embodiments, user 1701 may send a message to persona creation unit 1706 telling it that an interaction requiring a persona is happening, the message including a URL or other venue for the interaction, from which persona creation unit 1706 can extract the information necessary to evaluate the interaction and create an appropriate persona. Such a message may be sent by voice, text, touch, or other user interface mechanism.

Operation 1902 depicts accepting from an eBay user an indication of interest in an online auction. For example, persona creation unit 1706 and/or personal information request acceptor module 1708 may accept from user 1701 an indication of interest in an online auction. For example, personal information request acceptor module 1708 may accept a URL for an eBay auction page as the indication of interest in an online auction. Alternatively, eBay user 1701 may provide to persona creation unit 1706 a URL for an eBay auction page, and a URL for an eBay sign in page having fields for a User ID and Password as the indication of interest in an online auction.

Operation 1904 depicts accepting a request for personal information as the at least one indication of an interaction involving at least one member of a network. For example, persona creation unit 1706 and/or personal information request acceptor module 1708 may accept a request for personal information as the at least one indication of an interaction involving at least one member of a network. In one embodiment, personal information request acceptor module 1708 may accept a request for personal information on an e-commerce sign up page, such as name, address, email address, or credit card information. The request for personal information may be in the form of field on a web page, perhaps bearing an asterisk indicating required personal information, or appearing in red type indicating required personal information. In another embodiment, a request for personal information may be in the form of a field(s) asking for a shipping address.

Operation 1906 depicts accepting a request for at least one of name, physical address, email address, phone number, or credit card information as the personal information. For example, persona creation unit 1706 and/or personal information request acceptor module 1708 may accept a request for at least one of name, physical address, email address, phone number, or credit card information as the personal information. In one embodiment, personal information request acceptor module 1708 may accept a request for personal information on an e-commerce check out page, such as name, address, email address, or credit card information. For example, identification request acceptor module 1710 may accept a request for a user name and password from an e-commerce website such as Amazon.com or iTunes.

FIG. 20 illustrates alternative embodiments of the example operational flow 1800 of FIG. 18. FIG. 20 illustrates example embodiments where the accepting operation 1810 may include at least one additional operation. Additional operations may include operation 2000, 2002, 2004, 2006, 2008, and/or operation 2010.

Operation 2000 depicts accepting an indication of an online transaction involving at least one member of a network. For example, persona creation unit 1706, identification request acceptor module 1710, and/or financial information request acceptor module 1712 may accept an indication of an online transaction involving at least one member of a network. For example, identification request acceptor module 1710 may analyze a URL provided by a user 1701 corresponding to a social network sign up page such as the Facebook sign up page (e.g., http://www.facebook.com) having fields for first name, last name, email address, gender, age and password. In another example, web page parser module 1714 may accept a URL for a sign-in page, such as the sign-in page for Google mobile (e.g., m.google.com), and parse the markup language code to identify fields requesting a username and password. Other embodiments may involve transactions that are financial, as discussed below.

Operation 2002 depicts accepting an indication of an online financial transaction involving at least one member of a network. For example, persona creation unit 1706 and/or financial information request acceptor module 1712 may accept an indication of an online financial transaction involving at least one member of a network. In one embodiment, financial information request acceptor module 1712 may accept a request for an eBay user's PayPal account information as the indication of an online transaction involving at least one member of a network. In another embodiment, financial information request acceptor module 1712 may accept a request for an iTunes user's credit card information as the indication of an online transaction involving at least one member of a network. In another embodiment, financial information request acceptor module 1712 may accept a request for an Amazon.com user's credit card information as the indication of an online transaction involving at least one member of a network.

Operation 2004 depicts accepting an indication of at least one of a sign-up page, a login page, or a checkout page involving at least one member of a network. For example, persona creation unit 1706, identification request acceptor module 1710, financial information request acceptor module 1712, and/or web page parser module 1714 may accept an indication of at least one of a sign-up page, a login page, or a checkout page involving at least one member of a network. In one embodiment, financial information request acceptor module 1712 may accept a login page request for information from a member of the Amazon Prime network. In another example as discussed above, web page parser module 1714 may accept a URL for a sign-in page, such as the sign-in page for Google mobile (e.g., m.google.com), and parse the markup language code to identify fields requesting a username and password.

Operation 2006 depicts accepting an indication of an interaction involving at least one member of a social network. For example, persona creation unit 1706, identification request acceptor module 1710, and/or financial information request acceptor module 1712 may accept an indication of an interaction involving at least one member of a social network. For example as discussed above, identification request acceptor module 1710 may analyze a URL provided by a user 1701 corresponding to a social network sign up page such as the Facebook sign up page (e.g., http://www.facebook.com) having fields for first name, last name, email address, gender, age and password. In another example, web page parser module 1714 may accept a URL for a sign-in page, such as the sign-in page for Google+ (e.g., plus.google.com), and parse the markup language code of the sign-in page to identify fields requesting a username and password.

Operation 2008 depicts accepting an indication of an interaction between a registered member of a commercial website and the commercial website. For example, persona creation unit 1706, identification request acceptor module 1710, and/or financial information request acceptor module 1712 may accept an indication of an interaction between a registered member of a commercial website and the commercial website. In one embodiment, financial information request acceptor module 1712 may accept a request for a registered eBay user's PayPal account information in an interaction between the registered eBay user and the eBay website. In another embodiment, financial information request acceptor module 1712 may accept a request for a registered member of iTunes' credit card information in an interaction between the registered iTunes user and the iTunes website. In another embodiment, financial information request acceptor module 1712 may accept a request for information from amazon.com during a transaction between a member of Amazon Prime and the amazon.com website.

Operation 2010 depicts accepting an indication of an interaction between a registered member of amazon.com and the amazon.com website. For example, persona creation unit 1706, identification request acceptor module 1710, and/or financial information request acceptor module 1712 may accept an indication of an interaction between a registered member of amazon.com and the amazon.com website. In one embodiment, financial information request acceptor module 1712 may accept a request for information from Amazon.com during a transaction between a registered member of amazon.com and the amazon.com website, perhaps at the sign-in page on which the web page has fields for, e.g., username and password.

FIG. 21 illustrates alternative embodiments of the example operational flow 1800 of FIG. 18. FIG. 21 illustrates example embodiments where the creating operation 1820 may include at least one additional operation. Additional operations may include operation 2100 and/or operation 2102.

Operation 2100 depicts creating a set of personal information corresponding to the at least one member of a network, wherein the set of personal information is at least partly based on the indication of an interaction. For example, persona creation unit 1706 and/or persona compiler module 1720 may create a set of personal information corresponding to the at least one member of a network, wherein the set of personal information is at least partly based on the indication of an interaction. In one embodiment, persona creation unit 1706, having accepted an indication of interaction 1704 may compile a set of personal information for user 1701 to use in the interaction 1702. The set of personal information may be commensurate with the scale of the interaction. A general rule to protect personal information from possible identity thieves, advertisers, and spammers is to reveal as little personal information as possible within the requirements of the interaction.

As discussed above, individuals commonly have large amounts of personal information online that is publicly available, leaving them open to profiling by advertisers and those with even less honorable intentions such as identity thieves. Accordingly, as a way of mitigating the risk of spam and identity theft, it will be desirable for those interacting with websites to limit the dissemination of personal information, particularly when an interaction or transaction does not absolutely require transfer of certain personal information. For example, low dollar value online transactions ought not require detailed personal information about the buyer. If sufficient trust in payment is available, for example via an anonymous telecommunications carrier account, unique identifier as discussed above, or device identifier as security for the transaction, that ought to suffice. Conversely, high dollar value transactions will still require that detailed personal information be provided as security for the transaction, but a large range of intermediate dollar value transactions may benefit from a smart system of providing as little personal information possible during the transaction.

Operation 2102 depicts creating a set of anonymized personal information corresponding to the at least one member of a network, wherein the set of anonymized personal information is at least partly based on the indication of an interaction. For example, persona creation unit 1706, persona compiler module 1720, and/or personal information anonymizer module 1722 may create a set of anonymized personal information corresponding to the at least one member of a network, wherein the set of anonymized personal information is at least partly based on the indication of an interaction. In one embodiment, personal information anonymizer module 1722 may, for a low dollar value transaction, create an anonymized set of personal information for user 1701 to use in buying a staple object online. This may provide for anonymous private sales online, in which the security of the transaction for the seller is provided by, for example, a Verizon account number associated with a mobile device on which the transaction is taking place. In some embodiments, such an account number may be associated with an alias for the actual account holder to enhance privacy in the transaction.

In some embodiments, user 1701 may want to have multiple aliases, each having a different amount of personal information detail as appropriate for use in various online activities.

FIG. 22 illustrates alternative embodiments of the example operational flow 1800 of FIG. 18. FIG. 22 illustrates example embodiments where the creating operation 1820 may include at least one additional operation. Additional operations may include operation 2200, 2202, 2204, and/or operation 2206.

Operation 2200 depicts creating a persona corresponding to the at least one member of a network, wherein the persona is at least partly based on the indication of an interaction and at least partly based on a persona-creation ruleset. For example, persona creation unit 1706, persona compiler module 1720, and/or persona creation ruleset module may create a persona corresponding to the at least one member of a network, wherein the persona is at least partly based on the indication of an interaction and at least partly based on a persona-creation ruleset. In one embodiment, persona compiler module 1720, having accepted an indication of interaction 1704 may access persona creation ruleset module 1724 to find out whether the indication of interaction 1704 matches a predefined rule. For example, persona creation ruleset module 1724 may contain a rule stating that online purchases for items having a value of 25 dollars or less should automatically trigger the creation and presentation of a persona for user 1701 that includes only a name and necessary payment information, such as an Entropay prepaid virtual Visa card number. In some cases, the name may be an alias, especially in cases where using an alias comports with the terms of service of a vendor's website.

Operation 2202 depicts creating a persona corresponding to the at least one member of a network, wherein the persona is at least partly based on the indication of an interaction and at least one ruleset defining thresholds for assigning personal information to a persona. For example, persona creation unit 1706, persona compiler module 1720, and/or persona creation ruleset module may create a persona corresponding to the at least one member of a network, wherein the persona is at least partly based on the indication of an interaction and at least one ruleset defining thresholds for assigning personal information to a persona. In one embodiment, persona compiler module 1720, having accepted an indication of interaction 1704 may access persona creation ruleset module 1724 to find out whether the indication of interaction 1704 matches a predefined rule establishing a threshold. For example, persona creation ruleset module 1724 may contain a rule stating that online purchases for items under 5 dollars in value using virtual currency or credit may be made using "persona A," whereas online purchases for items that are 5 dollars to 50 dollars in value using virtual currency or credit may be made using "persona B." Personas A and B may differ in, for example, the amount of personal information provided, the virtual account to be accessed for payment.

Operation 2204 depicts creating a persona corresponding to the at least one member of a network, wherein the persona is at least partly based on the indication of an interaction and at least one ruleset defining dollar amount thresholds for assigning personal information to a persona. For example, persona creation unit 1706, persona compiler module 1720, and/or persona creation ruleset module may create a persona corresponding to the at least one member of a network, wherein the persona is at least partly based on the indication of an interaction and at least one ruleset defining dollar amount thresholds for assigning personal information to a persona. In one embodiment, persona compiler module 1720, having accepted an indication of interaction 1704 may access persona creation ruleset module 1724 to find out whether the indication of interaction 1704 matches a predefined rule establishing a dollar amount threshold. As in the previous example, persona creation ruleset module 1724 may contain a rule stating that online purchases for items having a value of 25 dollars or less should automatically trigger the creation and presentation of a persona for user 1701 that includes only a name and necessary payment information, such as an Entropay prepaid virtual Visa card number. A dollar value threshold may also include a range, for example, transactions between 1,000 and 5,000 dollars in value. In this case, persona compiler module 1720 may consult a rule in persona creation ruleset module 1724 that assigns name, telephone number, physical address, and credit card information to the persona to be presented. The ruleset may also specify that the credit card information to be included in the persona should be checked to confirm that the available credit line is higher than the dollar value of the transaction, so as to avoid having the credit card declined.

Operation 2206 depicts creating a persona corresponding to the at least one member of a network, wherein the persona is at least partly based on the indication of an interaction and at least one ruleset defining thresholds for assigning personal information to a persona at least partly based on a context of the interaction. For example, persona creation unit 1706, persona compiler module 1720, and/or persona creation ruleset module may create a persona corresponding to the at least one member of a network, wherein the persona is at least partly based on the indication of an interaction and at least one ruleset defining thresholds for assigning personal information to a persona at least partly based on a context of the interaction. In one embodiment, persona compiler module 1720, having accepted a request for a "check-in" from a social networking app such as foursquare as the indication of interaction 1704 may access persona creation ruleset module 1724 to find out which persona to use in going forward with the check-in. In this example, some users may set as a rule using an alias as their persona for checking in geographically if they do not want everyone in their social graph knowing that they are checking in at a certain location. This would allow the user to check in, but in a way that is context-sensitive. Similarly, the context of a specific website could be a rule to use a certain persona on that website. For example, different personas could be pre-configured for websites such as amazon.com, eBay, and iTunes. When persona creation unit 1706 accepts data indicating an interaction with one of these websites, amazon.com, e.g., persona creation unit 1706 may consult persona creation ruleset module 1724 to call out a pre-programmed persona for use with a transaction on the amazon.com website. The context can be even more detailed by adding other contexts such as dollar value context, time of day context, and/or device context. For example, if a user 1701 shares a device like a smart phone with family members and has a shared e-commerce account on, e.g., eBay, persona creation unit 1706 may detect the smart phone, consult persona creation ruleset module 1724 to find a ruleset for that smart phone, and apply the appropriate persona. In this example, a parent may place an upper limit on all transactions made from the device so as to prevent a child from buying something that is too expensive. This control may be manifested by persona creation unit 1706 creating and presenting a persona for use with eBay on the smart phone which is associated with a payment means such as a credit card or PayPal account having the desired upper limit.

FIG. 23 illustrates alternative embodiments of the example operational flow 1800 of FIG. 18. FIG. 23 illustrates example embodiments where the creating operation 1820 may include at least one additional operation. Additional operations may include operation 2300, 2302, 2304, and/or operation 2306.

Operation 2300 depicts creating a minimal set of personal information corresponding to the at least one member of a network, wherein the minimal set of personal information is at least partly based on the indication of an interaction. For example, persona creation unit 1706 and/or personal information anonymizer module 1722 may create a minimal set of personal information corresponding to the at least one member of a network, wherein the minimal set of personal information is at least partly based on the indication of an interaction. For example, persona creation unit 1706 may accept from user 1701 an indication of interaction 1704 in the form of a web address linking to a page for the purchase of a music cd on the bestbuy.com website. In some embodiments, as a default setting, persona creation module 1706 may monitor the web pages visited by a member of a network, e.g., user 1701, and identify likely web pages or interactions 1702 in which a persona would be useful. For example, if persona creation module 1706 has access to the web pages visited by user 1701, it can examine the code of those pages looking for telltale signs of an e-commerce transaction or other transaction in which a persona could be useful. Such telltale signs may include words associated with a purchase such as payment type, credit card type, dollar amount, "cart," "buy now," tax, shipping, or the like. Alternatively, telltale signs may include personal information categories that typically appear on sign-up or sign-in pages such as name, username, password, and email address. In the above example, for a minor purchase such as a music cd or mp3, personal information anonymizer module 1722 may anonymize certain personal information of user 1701 under the theory that bestbuy.com does not need very much personal information to be assured of payment for the music. Assurance of payment may be obtained from, for example, a telecommunications carrier, credit card account, or virtual payment.

Operation 2302 depicts creating a persona including name, physical address, and device identifier data corresponding to the at least one member of a network, wherein the persona is at least partly based on an indication of a low-dollar-cost transaction. For example, persona creation unit 1706 and/or personal information anonymizer module 1722 may create a persona including name, physical address, and device identifier data corresponding to the at least one member of a network, wherein the persona is at least partly based on an indication of a low-dollar-cost transaction. For example, persona creation unit 1706 may accept from user 1701 an indication of interaction 1704 in the form of a check-out page having fields for payment including credit card information, where the dollar amount is under ten dollars. For example, in a low-dollar-cost transaction, persona creation unit 1706 may provide only name, physical address, and device identifier data in satisfying security concerns of the vendor. In one embodiment, payment may be secured through the telecommunications carrier associated with the device identifier data (e.g., SIM data, MEID, or other device identifier discussed above). In another embodiment, payment may be secured through a credit card account held by the telecommunications carrier associated with the device identifier data. In yet another embodiment, payment may be secured through a service like Portapayments, which creates quick response (QR) codes for PayPal payments. Scanning one of their QR codes with a mobile device takes a user 1701 to PayPal with the recipient and amount of the transaction automatically filled out. The user 1701 need only approve the payment to complete the interaction. PortaPayments allows customers to purchase goods by scanning a 3D bar code with their phone. Two types of codes are available: one is free and requires the use of PortaPayments' application to scan and pay; the other, called a universal code, has a fee associated with it and will work with any QR code scanner that can scan and direct users to website URLs.

Operation 2304 depicts creating a detailed set of personal information corresponding to the at least one member of a network, wherein the detailed set of personal information is at least partly based on the indication of an interaction. In one example, persona creation unit 1706 may create a detailed set of personal information corresponding to the at least one member of a network, wherein the detailed set of personal information is at least partly based on the indication of an interaction. For example, persona creation unit 1706 may accept an indication of interaction 1704 in the form of an e-commerce cart website on which is shown an item to be purchased having a price of 1500 dollars. The interaction partner 1703 in this transaction may require a relatively detailed set of personal information before approving the sale. For example, to circumvent fraud, personal information including a credit card number (perhaps with a card security code), valid email address, name matching that on the card, and physical address matching the billing address of the credit card.

Operation 2306 depicts creating a persona including real name, physical address, credit card information, and device identifier information corresponding to the at least one member of a network, wherein the persona is at least partly based on an indication of a high-dollar-cost transaction. In one example, persona creation unit 1706 may create a persona including real name, physical address, credit card information, and device identifier information corresponding to the at least one member of a network, wherein the persona is at least partly based on an indication of a high-dollar-cost transaction. To continue the above example, persona creation unit 1706 may accept an indication of interaction 1704 in the form of an e-commerce cart website on which is shown an item to be purchased having a price of 1500 dollars. The interaction partner 1703 in this transaction may require a relatively detailed set of personal information before approving the sale. For example, personal information including a credit card number (perhaps with a card security code), valid email address, name matching that on the card, and physical address matching the billing address of the credit card. However, persona creation unit 1706 may also include device identifier information, perhaps in lieu of other elements of personal information. In some embodiments, device identifier information in combination with other personal information such as telecommunications account number may provide security for payment to the vendor, perhaps even to the extent that a credit card number is not necessary where the telecommunications carrier stands in as the guarantor for the value of the transaction.

FIG. 24 illustrates alternative embodiments of the example operational flow 1800 of FIG. 18. FIG. 24 illustrates example embodiments where the presenting operation 1830 may include at least one additional operation. Additional operations may include operation 2400, 2402, 2404, 2406, and/or operation 2408.

Operation 2400 depicts placing elements of the persona into fields of an online form for use in the interaction involving the at least one member of the network. In one example, persona creation unit 1706 and/or vendor-specific persona database 1726 may create a persona for user 1701 based on an interaction 1702 with an amazon.com checkout page. Upon approval by the user 1701, the individual information elements of the created persona may be placed in the appropriate fields/boxes on the amazon.com checkout web page. This may be facilitated by vendor-specific persona database 1726, which may, in addition to having information about what personal information is required, may contain information as to where on the checkout page various personal information should go, perhaps in the form of markup language code, ordinary web page text, or XY coordinates, for example.

Operation 2402 depicts presenting the persona to an online vendor for use in securing credit for an online purchase from the online vendor. In one example, persona creation unit 1706 may present the persona to an online vendor for use in securing credit for an online purchase from the online vendor. To continue the embodiment above, persona creation unit 1706 may create a persona for user 1701 based on an interaction 1702 with an amazon.com checkout page as the interaction partner 1703. In this example user 1701 may be a member of the Amazon Prime network, Facebook, or the hotmail email network. In some embodiments, membership in the network may help secure low-dollar-value transactions. More specifically, verified membership in an exclusive private network such as Sermo for physicians or LinkedIn for professionals may suffice as security for low-dollar-value transactions, perhaps with only name and email address in addition.

Operation 2404 depicts presenting the persona at a vendor's physical establishment for use in securing credit for a purchase from the vendor. In one example, persona creation unit 1706 may present the persona at a vendor's physical establishment for use in securing credit for a purchase from the vendor. In one embodiment, a mobile device having a persona creation unit 1706 (either on the client or on a server perhaps as a cloud service) may be used to broker a transaction for a user 1701 at a device reader at a physical location of an interaction partner 1703. In this example, a vendor equipped with a near field communications reader may use the reader to communicate with the reader's device to exchange details of a purchase and a created persona. For example, for low-dollar-value purchases, a persona associated with a Google wallet account, even if the vendor's terminal is not PayPass enabled. For some transactions, the Google wallet account-associated persona may suffice as security for the transaction, perhaps through a transfer of virtual currency or credit. Another example of this may employ a persona associated with the Entropay prepaid virtual credit technology described above.

Operation 2406 depicts presenting the persona via a computer-implemented personal assistant for use in the interaction involving the at least one member of the network. In one example, persona creation unit 1706 may present the persona via a computer-implemented personal assistant for use in the interaction involving the at least one member of the network. In one embodiment, a mobile device having a persona creation unit 1706 (either on the client or on a server perhaps as a cloud service) through a personal assistant interface may be used to broker a transaction, such as an online purchase, for a user 1701. Natural language processing has advanced to the point where speech recognition and response by a mobile device is able to mediate persona management in the context of a transaction with only minimal input from the user 1702, and that by voice alone. For example, user 1701 may say to his mobile device "create a persona for buying a New York Times subscription on my iPad." The persona creation unit 1706 may accordingly access the web to find the cost of such a subscription so as to provide a persona with the appropriate amount of personal information. If subscriptions for different time periods are found, the personal assistant may ask user 1701 which he is interested in, for example one year. The personal assistant may then present a persona or two to the user 1701, the user may select one, and then the personal assistant may then open the New York Times subscription ordering web page and complete the appropriate fields according to the persona selected. The user may retain final confirmation of the purchase by voice command via the personal assistant.

Operation 2408 depicts presenting the persona via a computer-implemented personal assistant for use in the interaction involving the at least one member of the network, wherein Siri is the computer-implemented personal assistant. In one example, persona creation unit 1706 may present the persona via a computer-implemented personal assistant for use in the interaction involving the at least one member of the network, wherein Siri is the computer-implemented personal assistant. As described above, a personal assistant may be used at each operation of the claimed systems and methods. Siri is Apple's personal assistant included for the first time in the iPhone 4S. Siri may be used as a persona creation unit as described in the example above, for example to rapidly and easily buy apps from the iTunes App Store. Siri's knowledge of the user 1701's device and telecommunications carrier contract details may be used to quickly and easily secure low-dollar-value transaction credit, such as for iPad apps, in terms of minimal personas that are linked to known devices and accounts for a given user 1701.

FIG. 25 illustrates a partial view of an example article of manufacture 2500 that includes a computer program 2504 for executing a computer process on a computing device. An embodiment of the example article of manufacture 2500 is provided including a signal bearing medium 2502, and may include one or more instructions for accepting at least one indication of an interaction involving at least one member of a network; one or more instructions for creating a persona corresponding to the at least one member of a network, wherein the persona is at least partly based on the indication of an interaction; and one or more instructions for presenting the persona for use in the interaction involving the at least one member of the network. The one or more instructions may be, for example, computer executable and/or logic-implemented instructions. In one implementation, the signal-bearing medium 2502 may include a computer-readable medium 2506. In one implementation, the signal bearing medium 2502 may include a recordable medium 2508. In one implementation, the signal bearing medium 2502 may include a communications medium 2510.

FIG. 26 illustrates an example system 2600 in which embodiments may be implemented. The system 2600 includes a computing system environment. The system 2600 also illustrates a user 2612 using a device 2604, which is optionally shown as being in communication with a computing device 2602 by way of an optional coupling 2606. The optional coupling 2606 may represent a local, wide-area, or peer-to-peer network, or may represent a bus that is internal to a computing device (e.g., in example embodiments in which the computing device 2602 is contained in whole or in part within the device 2604). A storage medium 2608 may be any computer storage media. In one embodiment, the computing device 2602 may include a virtual machine operating within another computing device. In an alternative embodiment, the computing device 2602 may include a virtual machine operating within a program running on a remote server.

The computing device 2602 includes computer-executable instructions 2610 that when executed on the computing device 2602 cause the computing device 2602 to (a) accept at least one indication of an interaction involving at least one member of a network; (b) create a persona corresponding to the at least one member of a network, wherein the persona is at least partly based on the indication of an interaction; and (c) present the persona for use in the interaction involving the at least one member of the network. As referenced above and as shown in FIG. 26, in some examples, the computing device 2602 may optionally be contained in whole or in part within the device 2604.

In FIG. 26, then, the system 2600 includes at least one computing device (e.g., 2602 and/or 2604). The computer-executable instructions 2610 may be executed on one or more of the at least one computing device. For example, the computing device 2602 may implement the computer-executable instructions 2610 and output a result to (and/or receive data from) the computing device 2604. Since the computing device 2602 may be wholly or partially contained within the computing device 2604, the device 2604 also may be said to execute some or all of the computer-executable instructions 2610, in order to be caused to perform or implement, for example, various ones of the techniques described herein, or other techniques.

The device 2604 may include, for example, a portable computing device, workstation, or desktop computing device. In another example embodiment, the computing device 2602 is operable to communicate with the device 2604 associated with the user 2612 to receive information about the input from the user 2612 for performing data access and data processing, and present a persona for use in the interaction involving the at least one member of the network, e.g., user 2612.

Negotiation of Personas Between Parties to a Transaction—Vendor Side

FIG. 27 illustrates an example system 2700 in which embodiments may be implemented. The system 2700 includes a persona negotiation agent 2706. The persona negotiation agent 2706 may contain, for example, transaction evaluation module 2708, which may in turn contain transaction value analysis module 2710, persona acceptor module 2712, and/or web page parser module 2714. Web page parser module 2714 may contain X/Y coordinate web page reader 2716, web page image reader 2718, and/or screen scraper module 2719. Persona negotiation agent 2706 also may contain, for example, cost adjustment module 2728, condition-setting module 2730, and/or persona evaluation module 2720, which may in turn contain identity profile module 2722, party history evaluation module 2724, and/or creditworthiness evaluation module 2726. Persona negotiation agent 2706 may communicate over a network or directly with party 2701 to accept at least one persona in the context of transaction 2702, to evaluate transaction 2702, and to negotiate receipt of at least one different persona from the party to the transaction at least partly based on an evaluation of the transaction.

In FIG. 27, persona negotiation agent 2706 may accept persona 2704 directly from party 2701 or indirectly by inspection of transaction 2702, for example by viewing the party's personal information in fields on a web page related to the transaction.

In FIG. 27, the persona negotiation agent 2706 is illustrated as possibly being included within a system 2700. Of course, virtually any kind of computing device may be used to implement the special purpose persona negotiation agent 2706, such as, for example, a workstation, a desktop computer, a networked computer, a server, a collection of servers and/or databases, a virtual machine running inside a computing device, a mobile computing device, or a tablet PC.

Additionally, not all of the persona negotiation agent 2706 need be implemented on a single computing device. For example, the persona negotiation agent 2706 may be implemented and/or operable on a remote computer, while a user interface and/or local instance of the persona negotiation agent 2706 are implemented and/or occur on a local computer. Further, aspects of the persona negotiation agent 2706 may be implemented in different combinations and implementations than that shown in FIG. 27. For example, functionality of a user interface may be incorporated into the persona negotiation agent 2706 for the benefit of personnel supervising transactions for an online vendor. The persona negotiation agent 2706 may perform simple data relay functions and/or complex data analysis, including, for example, fuzzy logic and/or traditional logic steps. Further, many methods of negotiating personas described herein or known in the art may be used, including, for example, algorithms commonly used in web page analysis may be used to determine a transaction scale as a basis for negotiating an appropriate persona containing an appropriate level of personal information for a transaction. In some embodiments, the persona negotiation agent 2706 may negotiate a persona based on information about a transaction available as updates through a network.

Persona negotiation agent 2706 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

As referenced herein, the persona negotiation agent 2706 may be used to perform various data querying and/or recall techniques with respect to the persona 2704 and/or the transaction 2702, in order to negotiate an appropriate different persona. For example, where transaction 2702 elements are organized, keyed to, and/or otherwise accessible using one or more web page analysis tools, or the like, persona negotiation agent 2706 may employ various Boolean, statistical, and/or semi-boolean searching techniques to determine the appropriate level of information request and/or demand be present in a persona to be acceptable as an underpinning for a transaction. Similarly, for example, where user personal information is organized, keyed to, and/or otherwise accessible using one or more persona negotiation rulesets, various Boolean, statistical, and/or semi-boolean searching techniques may be performed by persona negotiation agent 2706 to negotiate an appropriate different persona.

Many examples of databases and database structures may be used in connection with the persona negotiation agent 2706. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive negotiation of persona content and/or for gathering and/or compiling data from the relational database(s).

For example, SQL or SQL-like operations over one or more personas 2704 and/or properties of transaction 2702 may be performed, or Boolean operations using personas 2704 and/or properties of transaction 2702 may be performed. For example, weighted Boolean operations may be performed in which different weights or priorities are assigned to one or more of the personas 2704 and/or properties of transaction 2702, including various transaction identifier elements, locations, and/or contexts, perhaps relative to one another. For example, a number-weighted, exclusive-OR operation may be performed to request specific weightings of elements found on a check-out page of an e-commerce web page (e.g., email address, telephone number, mailing address, credit card information, dollar amount in cart, web site name, payment type).

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 28 illustrates an operational flow 2800 representing example operations related to regulating information flow during interactions. In FIG. 28 and in following figures that include various examples of operational flows, discussion and explanation may be provided with respect to the above-described system environments of FIG. 27, and/or with respect to other examples and contexts. However, it should be understood that the operational flows may be executed in a number of other environments and contexts including that of FIG. 34, and/or in modified versions of FIG. 27. Also, although the various operational flows are presented in the sequence(s) illustrated, it should be understood that the various operations may be performed in other orders than those which are illustrated, or may be performed concurrently.

After a start operation, operation 2810 depicts accepting at least one persona from a party to a transaction. For example, persona negotiation agent 2706, persona acceptor module 2712, and/or persona evaluation module 2720 may accept persona 2704 from party 2701, for example in the form of a set of personal information about party 2704 or in the form of an incompletely filled-out online transaction form. In another example, persona negotiation agent 2706 or persona acceptor module 2712 may accept markup language code (e.g., HTML or XML) corresponding to a transaction web page as the persona 2704.

Operation 2820 depicts evaluating the transaction. For example, persona negotiation agent 2706, transaction evaluation module 2708, web page parser module, and/or transaction value analysis module 2710 may evaluate the transaction. In one embodiment, transaction value analysis module 2710 may analyze markup language code from a checkout webpage corresponding to transaction 2702. In this example, the code may indicate a dollar value of an item to be purchased or to be bid on in an auction. Based on that dollar value, the persona negotiation agent 1720 may present a specific counteroffer to party 2701 asking for additional personal information as the different persona, perhaps containing additional specific personal information about the party 2701 as security for the transaction. In some embodiments, persona transaction evaluation module 2708 may accept a limited persona or alias of the user where the interaction is of low dollar value. For financial interactions such as purchases or auctions, transaction value analysis module 2710 may detect a dollar value and assign a dollar value category for the interaction, for example low dollar value, intermediate dollar value, or high dollar value. Rule-sets for the persona negotiation agent 2706 to follow may be set by the vendor according to any premium that the vendor places on acquiring personal information about her customers.

Alternatively, many intermediate levels of interaction value may be assigned based on a detected value present in the web page code or other attribute of the transaction 2702. In these embodiments, a minimal persona containing only a few elements of personal information may be presented by party 2701 initially as the persona that supports the transaction 2702. After the negotiation is initiated, subsequent presentations of personas by party 2701 containing progressively more personal information may be presented with the goal that an acceptable persona may be presented to persona negotiation agent 2706 which provides only that amount of personal information needed for completion of the interaction/transaction. This approach attempts to avoid gratuitous dissemination of potentially valuable personal information. For example, for low dollar transactions, transaction evaluation module 2708 may be programmed to accept in a negotiation a minimal persona containing, e.g., only a name and a device identifier, such as a telephone number. For some vendors, such a minimal persona will provide enough trust in the credit-worthiness of the party 2701, perhaps via a check with a telecommunications carrier that the name matches the telephone number. In other, higher dollar value transactions, a persona containing more detailed personal information may be necessary. For example, for a car purchase, a persona including credit information, credit history, and personal financial asset data may be required by persona negotiation agent 2706.

In some embodiments, party 2701 will provide persona 2704 to persona negotiation agent 2706. In another embodiment, party 2701 may grant access to transaction 2702, for example by an affirmative step of opting-in or by not opting-out of a request by persona negotiation agent 2706. Personal information may be obtainable as a matter of course by persona negotiation agent 2706. For example, personal information of a party 2701 may be directly provided to persona negotiation agent 2706 for the purpose of facilitating the purchase, or alternatively, persona negotiation agent 2706 may indirectly access personal information of party 2701 through access to various accounts, such as website accounts, bank accounts, social network accounts, or telecommunications accounts. In some embodiments, some of the personal information may be publicly available.

Operation 2830 depicts negotiating receipt of at least one different persona from the party to the transaction at least partly based on an evaluation of the transaction. For example, persona negotiation agent 2706 negotiate receipt of at least one different persona from the party to the transaction at least partly based on an evaluation of the transaction. For example, persona negotiation agent 2706 may accept a persona from an amazon.com customer in the course of an online purchase. Persona negotiation agent 2706 may then evaluate the transaction 2702 based on dollar amount, party 2701, or personal information not provided, and initiate a negotiation to obtain more personal information, e.g., where the transaction has a high dollar value. This may be done according to a persona negotiation ruleset pre-programmed into persona negotiation agent 2706. Persona negotiation agent 2706 may then accept or reject a counteroffer from party 2701, perhaps by examining actions taken by party 2701 on the transaction webpage, such as completion of personal information fields on the webpage. Such fields are equivalent to requests for personal information.

In some embodiments, persona negotiation agent 2706 may include an identity profile function to further characterize party 2701 according to publicly or privately available information that might be available to persona negotiation agent 2706. Persona negotiation agent 2706 may also consider past interactions with party 2701 and any information that might be available about the creditworthiness of party 2701.

In some embodiments, both for detecting the specifics of an interaction or transaction on a web page and for placing data into fields on a web page, it may be useful for persona negotiation agent 2706 to perform web scraping or web page image analysis on the web page.

Web scraping is a computer software technique of extracting information from websites. Usually, such software programs simulate human exploration of the World Wide Web by either implementing low-level Hypertext Transfer Protocol (HTTP), or embedding certain full-fledged Web browsers, such as Internet Explorer or Mozilla Firefox. Web scraping may involve the transformation of unstructured data on the Web, typically in HTML format, into structured data that can be stored and analyzed in a central local database or spreadsheet. Specific techniques for web scraping include text grepping and regular expression matching, which extracts information from Web pages based on the UNIX grep command or regular expression matching facilities of programming languages (for instance Perl or Python).

Another web scraping tool is HTTP programming wherein static and dynamic web pages can be retrieved by posting HTTP requests to a remote web server using socket programming.

Another web scraping tool is DOM (document object model) parsing: By embedding a full-fledged web browser, such as Internet Explorer or Mozilla web browser, programs can retrieve dynamic content generated by client-side scripts. These web browser controls may also parse web pages into a DOM tree, based on which programs can retrieve parts of the web pages.

Another web scraping tool is HTML parsing, wherein semi-structured data query languages, such as XQuery and HTQL can be used to parse HTML pages and to retrieve and transform web content.

There are many web-scraping software tools available that can be used to customize web-scraping solutions. These programs may attempt to automatically recognize the data structure of a page or provide a web recording interface that removes the necessity to manually write web-scraping code, or some scripting functions that can be used to extract and transform web content, and database interfaces that can store the scraped data in local databases.

Another web scraping tool is a vertical aggregation platform. These platforms create and monitor a multitude of "bots" for specific verticals with no man-in-the-loop, and no work related to a specific target site. The preparation involves establishing a knowledge base for the entire vertical, and then the platform creates the bots automatically. The platform's robustness is measured by the quality of the information it retrieves (usually number of fields) and its scalability (how quick it can scale up to hundreds or thousands of sites). This scalability is mostly used to target sites that common aggregators find complicated or too labor intensive to harvest content from.

Another web scraping tool is semantic annotation recognizing, wherein web pages may contain metadata or semantic markups/annotations which can be made use of to locate specific data. If the annotations are embedded in the pages, as Microformat does, this technique can be viewed as a special case of DOM parsing. In another case, the annotations, organized into a semantic layer, may be stored and managed separately from the web pages, so the web scrapers can retrieve data schema and instructions from this layer before scraping the pages.

Another tool for web page analysis is iMacros, a program that harvests web data automatically, which can do automatic form-filling. For example, iMacros works with every website; even the most complicated websites that use dialog boxes, frames, Javascript and AJAX can be automated. It has high data extraction speed: on a typical computer, 20-50 instances of iMacros can be run at once ("multi-threading"). It has full web-crawling support. iMacros can be scheduled to run in the background of other programs or in lean traffic hours. iMacros permits change of IP addresses programmatically with full PROXY support. After harvesting the web data, actions may be performed on it, it can be transferred to any application, or it can be used in another process. iMacros integrates with every Windows scripting or programming language. iMacros can connect to any database or software application. iMacros provides visual recording of all web activities and the extraction macros. iMacros has full unicode support, and iMacros can extract text in all languages, including Asian languages such as Chinese, Japanese and Korean.

In addition to working with the website source code like a "normal" software program, iMacros can also look at the website like a human does: iMacros' image recognition support allows a user to automate and test websites using images instead of X/Y coordinates: a user can tell iMacros what a button looks like and iMacros can find it on the page. Even when the button has moved or if it has changed color or screen resolution. The iMacros Image Recognition Wizard functions with web sites that use non-HTML technologies such as Flash applets, Java applets, Movie Player Applets, ActiveX controls or any other technology. Since the software relies only on the images that are rendered in the browser, it works independently of the underlying technology.

FIG. 29 illustrates alternative embodiments of the example operational flow 2800 of FIG. 28. FIG. 29 illustrates example embodiments where the accepting operation

2810 may include at least one additional operation. Additional operations may include operation 2900, 2902, and/or operation 2904.

Operation 2900 depicts accepting a set of personal information as the at least one persona. For example, persona negotiation agent 2706 and/or persona acceptor module 2712 may accept a set of personal information as the at least one persona. In one embodiment, persona acceptor module 2712 may accept from party 2701 a persona including a name and email address for the purchase of an MP3 file from the iTunes store. As another example, persona negotiation agent 2706 may accept a persona on an e-commerce website such as Groupon relating to a potential purchase. In some embodiments, party 2701 may send a message to persona negotiation agent 2706, in effect telling it that it would like to negotiate a persona for a transaction, the message including a URL or other venue for the transaction, from which persona negotiation agent 2706 can extract the information necessary to evaluate the transaction and negotiate an appropriate persona. Such a message may be sent by voice, text, touch, or other user interface mechanism. In some instances the persona negotiation agent 2706 will be invisible or transparent to party 2701, except for the offer/counteroffer of the negotiation.

Operation 2902 depicts accepting at least one persona from a prospective purchaser in an online transaction. For example, persona negotiation agent 2706 and/or persona acceptor module 2712 may accept at least one persona from a prospective purchaser in an online transaction. For example, persona acceptor module 2712 may accept an eBay username as the persona for an eBay auction page from a party 2701 interested in an online auction. Alternatively, party 2701 may provide to persona negotiation agent 2706 a URL for an eBay auction page, and a URL for an eBay sign in page having fields for a User ID and Password as the persona for the party 2701. Access to the auction may be negotiated, in part, based on the past history of party 2701 with eBay.

Operation 2904 depicts accepting a persona consisting of username, email address, and device identifier from a prospective purchaser in an online transaction. For example, persona negotiation agent 2706 and/or persona acceptor module 2712 may accept a persona consisting of username, email address, and device identifier from a prospective purchaser in an online transaction. In one embodiment, persona negotiation agent 2706 and/or persona acceptor module 2712 may accept a username, email address, and IP address for the party's computer at an e-commerce transaction page. The persona may be in the form of information in fields on a web page as well as information detectable by software agents of the website such as the IP address of the party.

FIG. 30 illustrates alternative embodiments of the example operational flow 2800 of FIG. 28. FIG. 30 illustrates example embodiments where the evaluating operation 2820 may include at least one additional operation. Additional operations may include operation 3000, 3002, and/or operation 3004.

Operation 3000 depicts evaluating a monetary value for the transaction. For example, persona negotiation agent 2706, transaction evaluation module 2708, and/or, transaction value analysis module 2710 may evaluate a monetary value for the transaction. In one embodiment, transaction value analysis module 2710 may analyze a URL provided by a party 2701 corresponding to an app store order page. Transaction value analysis module 2710 may read the code on the web page, image the page, or otherwise determine the object of the transaction and the monetary value of the object (i.e., a good or service). In another example, web page parser module 2714 may accept a URL for an online pizza order form, such as an order page for Domino's pizza, and parse the markup language code or text to identify a dollar value for the pizza order (on the Domino's order page the dollar amount appears next to "Total:" and has a dollar sign with the amount).

Operation 3002 depicts evaluating known information about the party to the transaction. For example, persona negotiation agent 2706, transaction evaluation module 2708, persona evaluation module 2720, identity profile module 2722, party history evaluation module 2724, and/or creditworthiness evaluation module 2726 may evaluate known information about the party to the transaction. In one embodiment, party history evaluation module 2724 may evaluate a party's history of interaction with a website, if there is any. If there is a history of purchases and payments, that may be one factor taken into account by persona negotiation agent 2706 in arriving at a persona to support transaction 2702: a long history of timely and diligent payments by a party may decrease personal information requirements going forward.

Operation 3004 depicts evaluating at least one of demographics, credit history, or transaction history about the party to the transaction. For example, persona negotiation agent 2706, transaction evaluation module 2708, persona evaluation module 2720, identity profile module 2722, party history evaluation module 2724, and/or creditworthiness evaluation module 2726 may evaluate at least one of demographics, credit history, or transaction history about the party to the transaction. In one embodiment, identity profile module 2722 may use available information about a party to search for additional information, perhaps based on bankruptcy filings, credit history reports, or any other indicators of financial activity by the party. Alternatively, identity profile module 2722 may search available information about the party 2701 and determine that they are in an young age bracket such that a parent's credit card information would be required to complete the transaction 2702. Persona negotiation agent 2706 may then conduct the negotiation accordingly.

FIG. 31 illustrates alternative embodiments of the example operational flow 2800 of FIG. 28. FIG. 31 illustrates example embodiments where the negotiating operation 2830 may include at least one additional operation. Additional operations may include operation 3100, 3102, 3104, and/or operation 3106.

Operation 3100 depicts negotiating receipt of a persona including an indication of creditworthiness from the party to the transaction at least partly based on an evaluation of the transaction. For example, persona negotiation agent 2706, transaction evaluation module 2708, persona evaluation module 2720, identity profile module 2722, party history evaluation module 2724, and/or creditworthiness evaluation module 2726 may negotiate receipt of a persona including an indication of creditworthiness from the party to the transaction at least partly based on an evaluation of the transaction. In one embodiment, creditworthiness evaluation module 2726 may notify party 2701 that valid credit card information is required to complete transaction 2702, having first evaluated the transaction and deemed it to be one that required transfer of credit card information to ensure payment by party 2701.

As discussed above, high dollar value transactions will require that detailed personal information be provided as security for the transaction, but a large range of intermediate dollar value transactions may benefit from a smart system of providing as little personal information possible during the transaction. This will benefit both party 2701 in terms of minimizing transfer of personal information, and also the vendor, who will save potentially save time and administrative costs if transactions are streamlined.

In one embodiment of how the persona negotiation agent 2706 may operate, it may begin by generating an offer that consists of the issues that is most important for the agent, e.g., a persona containing additional personal information. It does this because it wants to tell to the party, at the outset, which issues are the most important for the agent. After sending the offer, the agent will subsequently receive a message from the party. The party could accept the offer, refuse the offer, or propose a counteroffer. Both acceptance and refusal will result in ending the negotiations, but if the message is a counteroffer, then the agent will form a new offer to the party.

In one embodiment, the agent doesn't know any information regarding the party's preferences, and so it has to create a model of party utility values in order to make an offer that is acceptable to the party, while still maintaining the agent's acceptance value. An acceptance value is the value of an offer that it can accept. This value will decrease in time, since there is a limited time in negotiation. But the acceptance value will never be less than the agent's reservation value, an absolute requirement. The reservation value is the lowest utility value where the agent may still accept a counteroffer from the party, but it will accept it only if there is an impasse in the negotiation. For more information about automated negotiation agents, see U.S. Patent Application Publication 2011 0238840, Method, System, and Device for Service Negotiation; incorporated herein by reference. See also U.S. Patent Application Publication 2002 0120588, Method and Apparatus for Negotiation; also incorporated herein by reference.

Operation 3102 depicts negotiating receipt of a different persona including additional personal information from the party to the transaction at least partly based on an evaluation of the transaction that includes a transaction value over one hundred dollars. For example, persona negotiation agent 2706 may negotiate receipt of a different persona including additional personal information from the party to the transaction at least partly based on an evaluation of the transaction that includes a transaction value over one hundred dollars. In one embodiment, persona negotiation agent 2706 may, for a high dollar value transaction, e.g., one hundred dollars, negotiate receipt of a persona that includes more information than initially provided by party 2701, perhaps identifying information such as birthdate, device identifier information, and/or credit card information. This may provide a vendor with security with which to complete the transaction.

Operation 3104 depicts negotiating receipt of a different persona including additional personal information from the party to the transaction at least partly based on an evaluation of the transaction, wherein the cost of the transaction is discounted in exchange for the additional personal information. For example, persona negotiation agent 2706 may negotiate receipt of a different persona including additional personal information from the party to the transaction at least partly based on an evaluation of the transaction, wherein the cost of the transaction is discounted in exchange for the additional personal information. In one embodiment, persona negotiation agent 2706 may, on behalf of a vendor that places a high value on knowing the personal information of its customers, offer a discount to party 2701 in exchange for more personal information than was initially provided during the transaction. For example, if a party 2701 fills out an online form for purchase of a book on amazon.com, persona negotiation agent 2706, may offer a discount on the price of the book in exchange for, e.g., information about the location of party 2701, demographics of party 2701, or social network participation information about party 2701.

Operation 3106 depicts negotiating receipt of a different persona including reduced personal information from the party to the transaction at least partly based on an evaluation of the transaction, wherein the cost of the transaction is increased in exchange for the reduced personal information. For example, persona negotiation agent 2706 may negotiate receipt of a different persona including reduced personal information from the party to the transaction at least partly based on an evaluation of the transaction, wherein the cost of the transaction is increased in exchange for the reduced personal information. In one embodiment, persona negotiation agent 2706 may offer to party 2701 to complete a transaction with a lesser amount of personal information if the party 2701 pays a higher price. For example, if a party to an online credit card transaction prefers not to provide telephone number information to the vendor, the party may agree to a slightly higher price for the transaction. In this example, the vendor is compensated for slightly higher risk of non-payment by a higher transaction return.

FIG. 32 illustrates alternative embodiments of the example operational flow 2800 of FIG. 28. FIG. 32 illustrates example embodiments where the negotiating operation 2830 may include at least one additional operation. Additional operations may include operation 3200, 3202, and/or operation 3204.

Operation 3200 depicts negotiating receipt of at least one different persona from the party to the transaction at least partly based on an evaluation of the transaction, wherein the negotiating is concluded on the basis of at least one future condition. For example, persona negotiation agent 2706 may negotiate receipt of at least one different persona from the party to the transaction at least partly based on an evaluation of the transaction, wherein the negotiating is concluded on the basis of at least one future condition. In one embodiment, persona negotiation agent 2706, having evaluated a transaction 2702 as one of relatively low monetary value, may permit a party 2701 to provide a minimal persona in exchange for a promise to pay using a preferred payment method within a certain period of time, for example using an Entropay prepaid virtual Visa card within one week. Such conditional virtual payments may be particularly useful for small online purchases such as apps, MP3's, and movie files.

Operation 3202 depicts negotiating receipt of at least one different persona from the party to the transaction at least partly based on an evaluation of the transaction, wherein the negotiating is concluded on the basis of at least one future condition, and wherein the at least one future condition includes a promise to pay the cost of the transaction within a defined time period after an object of the transaction is delivered to the party to the transaction. For example, persona negotiation agent 2706 may negotiate receipt of at least one different persona from the party to the transaction at least partly based on an evaluation of the transaction, wherein the negotiating is concluded on the basis of at least one future condition, and wherein the at least one future condition includes a promise to pay the cost of the transaction within a defined time period after an object of the transaction is delivered to the party to the transaction. In one embodiment, a persona negotiation agent 2706 employed by amazon.com may negotiate receipt of a specific persona in the context of a transaction to ship an item to a physical address, in exchange for an agreement by party 2701 to pay using an amazon.com credit card within 30 days of delivery of the item to party 2701.

Operation 3202 depicts negotiating receipt of at least one different persona from the party to the transaction at least partly based on an evaluation of the transaction, wherein the negotiation is concluded with an electronic signature from the party to the transaction. For example, persona negotiation agent 2706 may negotiate receipt of at least one different persona from the party to the transaction at least partly based on an evaluation of the transaction, wherein the negotiation is concluded with an electronic or digital signature from the party to the transaction. To continue the example above, persona negotiation agent 2706 employed by amazon.com may conclude its negotiation for a commitment to pay using an amazon.com credit card within 30 days of delivery of the item to party 2701 by requiring a digital signature from party 2701.

FIG. 33 illustrates a partial view of an example article of manufacture 3300 that includes a computer program 3304 for executing a computer process on a computing device. An embodiment of the example article of manufacture 3300 is provided including a signal bearing medium 3302, and may include one or more instructions for accepting at least one persona from a party to a transaction; one or more instructions for evaluating the transaction; and one or more instructions for negotiating receipt of at least one different persona from the party to the transaction at least partly based on an evaluation of the transaction. The one or more instructions may be, for example, computer executable and/or logic-implemented instructions. In one implementation, the signal-bearing medium 3302 may include a computer-readable medium 3306. In one implementation, the signal bearing medium 3302 may include a recordable medium 3308. In one implementation, the signal bearing medium 3302 may include a communications medium 3310.

FIG. 34 illustrates an example system 3400 in which embodiments may be implemented. The system 3400 includes a computing system environment. The system 3400 also illustrates a user 3412 using a device 3414, which is optionally shown as being in communication with a computing device 3402 by way of an optional coupling 3406. The optional coupling 3406 may represent a local, wide-area, or peer-to-peer network, or may represent a bus that is internal to a computing device (e.g., in example embodiments in which the computing device 3402 is contained in whole or in part within the device 3404). A storage medium 3408 may be any computer storage media. In one embodiment, the computing device 3402 may include a virtual machine operating within another computing device. In an alternative embodiment, the computing device 3402 may include a virtual machine operating within a program running on a remote server.

The computing device 3402 includes computer-executable instructions 3410 that when executed on the computing device 3402 cause the computing device 3402 to (a) accept at least one persona from a party to a transaction; (b) evaluate the transaction; and (c) negotiate receipt of at least one different persona from the party to the transaction at least partly based on an evaluation of the transaction. As referenced above and as shown in FIG. 34, in some examples, the computing device 3402 may optionally be contained in whole or in part within the device 3404.

In FIG. 34, then, the system 3400 includes at least one computing device (e.g., 3402 and/or 3404). The computer-executable instructions 3410 may be executed on one or more of the at least one computing device. For example, the computing device 3402 may implement the computer-executable instructions 3410 and output a result to (and/or receive data from) the computing device 3404. Since the computing device 3402 may be wholly or partially contained within the computing device 3404, the device 3404 also may be said to execute some or all of the computer-executable instructions 3410, in order to be caused to perform or implement, for example, various ones of the techniques described herein, or other techniques.

The device 3404 may include, for example, a portable computing device, workstation, or desktop computing device. In another example embodiment, the computing device 3402 is operable to communicate with the device 3404 associated with the user 3412 to receive information about the input from the user 3412 for performing data access and data processing, and negotiate receipt of a different persona from the party to the transaction, e.g., user 3412.

Negotiation of Personas Between Parties to a Transaction—User Side

FIG. 35 illustrates an example system 3500 in which embodiments may be implemented. The system 3500 includes a persona negotiation agent 3506. The persona negotiation agent 3506 may contain, for example, transaction evaluation module 3508, which may in turn contain transaction value analysis module 3510. Persona negotiation agent 3506 may also include, for example, personal information request acceptor module 3512, which in turn may include web page parser module 3514, which in turn may include X/Y coordinate web page reader 3516, web page image reader 3518, and/or screen scraper module 3519. Persona negotiation agent 3506 also may contain, for example, cost adjustment module 3528, condition-setting module 3530, party history evaluation module 3524, and/or persona creation module 3520. Persona negotiation agent 3506 may communicate over a network or directly with party 3501 to accept at least one request for personal information in the context of transaction 3502, to evaluate transaction 3502, and to negotiate presentation of at least one persona to the party to the transaction at least partly based on an evaluation of the transaction.

In FIG. 35, persona negotiation agent 3506 may accept a request for personal information 3503 directly from party 3501 or indirectly by inspection of transaction 3502, for example by viewing the party's personal information fields on a web page related to the transaction.

In FIG. 35, the persona negotiation agent 3506 is illustrated as possibly being included within a system 3500. Of course, virtually any kind of computing device may be used to implement the special purpose persona negotiation agent 3506, such as, for example, a workstation, a desktop computer, a networked computer, a server, a collection of servers and/or databases, a virtual machine running inside a computing device, a mobile computing device, or a tablet PC.

Additionally, not all of the persona negotiation agent 3506 need be implemented on a single computing device. For example, the persona negotiation agent 3506 may be implemented and/or operable on a remote computer, while a user interface and/or local instance of the persona negotiation agent 3506 are implemented and/or occur on a local computer. Further, aspects of the persona negotiation agent 3506 may be implemented in different combinations and implementations than that shown in FIG. 35. For example, functionality of a user interface may be incorporated into the persona negotiation agent 3506 for the benefit of a user/ purchaser or for personnel supervising transactions for an online vendor. The persona negotiation agent 3506 may perform simple data relay functions and/or complex data analysis, including, for example, fuzzy logic and/or traditional logic steps. Further, many methods of negotiating personas described herein or known in the art may be used, including, for example, algorithms commonly used in web page analysis may be used to determine a transaction scale as a basis for negotiating an appropriate persona containing an appropriate level of personal information for a transaction. In some embodiments, the persona negotiation agent 3506 may negotiate a persona based on information about a transaction available as updates through a network.

Persona negotiation agent 3506 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

As referenced herein, the persona negotiation agent 3506 may be used to perform various data querying and/or recall techniques with respect to the request 3503, persona 3504, and/or the transaction 3502, in order to negotiate an appropriate persona. For example, where transaction 3502 elements are organized, keyed to, and/or otherwise accessible using one or more web page analysis tools, or the like, persona negotiation agent 3506 may employ various Boolean, statistical, and/or semi-boolean searching techniques to determine the appropriate level of information to include in a persona for it to be acceptable as an underpinning for a transaction. Similarly, for example, where user personal information is organized, keyed to, and/or otherwise accessible using one or more persona negotiation rulesets, various Boolean, statistical, and/or semi-boolean searching techniques may be performed by persona negotiation agent 3506 to negotiate an appropriate persona.

Many examples of databases and database structures may be used in connection with the persona negotiation agent 3506. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database query languages, such as, for example, the structured query language (SQL), which may be used, for example, for interactive negotiation of persona content and/or for gathering and/or compiling data from the relational database(s).

For example, SQL or SQL-like operations over one or more personas 3504 and/or properties of transaction 3502 may be performed, or Boolean operations using personas 3504 and/or properties of transaction 3502 may be performed. For example, weighted Boolean operations may be performed in which different weights or priorities are assigned to one or more of the request 3503, persona 3504, and/or properties of transaction 3502, including various transaction identifier elements, locations, and/or contexts, perhaps relative to one another. For example, a number-weighted, exclusive-OR operation may be performed to request specific weightings of elements found on a checkout page of an e-commerce web page (e.g., email address, telephone number, mailing address, credit card information, dollar amount in cart, web site name, payment type).

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 36 illustrates an operational flow 3600 representing example operations related to regulating information flow during interactions. In FIG. 36 and in following figures that include various examples of operational flows, discussion and explanation may be provided with respect to the above-described system environments of FIG. 35, and/or with respect to other examples and contexts. However, it should be understood that the operational flows may be executed in a number of other environments and contexts including that of FIG. 42, and/or in modified versions of FIG. 35. Also, although the various operational flows are presented in the sequence(s) illustrated, it should be understood that the various operations may be performed in other orders than those which are illustrated, or may be performed concurrently.

After a start operation, operation 3610 depicts accepting at least one request for personal information from a party to a transaction. For example, persona negotiation agent 3506, personal information request acceptor module 3512, and/or web page parser module 3514 may accept at least one request for personal information from a party to a transaction. In one embodiment, personal information request acceptor module 3512 may accept a request for name, phone number, email address, and credit card information during a transaction to purchase an app in an app store. The request 3503 may be in the form of an online transaction form having empty fields labeled for entry of personal information. In another example, web page parser module 3514 may accept markup language code (e.g., HTML or XML) or text corresponding to a transaction web page as the request for personal information 3503.

Operation 3620 depicts evaluating the transaction. For example, persona negotiation agent 3506, transaction evaluation module 3508, web page parser module 3514, and/or transaction value analysis module 3510 may evaluate the transaction. In one embodiment, transaction value analysis module 3510 may analyze markup language code from a checkout webpage corresponding to transaction 3502. In this example, the code may indicate a dollar value of an item to be purchased or to be bid on in an auction. Based on that dollar value, the persona negotiation agent 3520 may present a specific counteroffer to party 3501, e.g., asking to complete the transaction based on a persona containing less personal information that is requested by party 3501. In some embodiments, persona transaction evaluation module 3508 may identify transactions having an arbitrarily-defined low or high dollar value. For financial interactions such as purchases or auctions, transaction value analysis module 3510 may detect a dollar value and assign a dollar value category for the interaction, for example low dollar value, intermediate dollar value, or high dollar value. Rulesets for the persona negotiation agent 3506 to follow may be set by a user/purchaser negotiating with party 3501 according to any premium that the user places on completing the transaction and/or retaining personal information.

Alternatively, many intermediate levels of interaction value may be assigned based on a detected value present in the web page code or other attribute of the transaction 3502. In these embodiments, a minimal persona containing only a few elements of personal information may be presented to party 3501 initially as the persona 3504 that supports the transaction 3502. After the negotiation is initiated, subsequent presentations of personas to party 3501 containing progressively more personal information may be presented with the goal that an acceptable persona may be presented by persona negotiation agent 3506 to party 3501 which provides only that amount of personal information needed for completion of the interaction/transaction. This approach attempts to avoid gratuitous dissemination of potentially valuable personal information. For example, for low dollar value transactions, transaction evaluation module 3508 may be programmed to initially present in a negotiation a minimal persona containing, e.g., only a name and a device identifier, such as a telephone number. For some parties/vendors 3501, such a minimal persona will provide enough trust in the credit-worthiness of the user, perhaps via a check with a telecommunications carrier that the name matches the telephone number. In other, higher dollar value transactions, presentation of a persona containing more detailed personal information may be necessary. For example, for a car purchase, a persona including credit information, credit history, and personal financial asset data may be required by party 3501.

In some embodiments, party 3501 will provide request 3503 to persona negotiation agent 3506. Personal information may be obtainable as a matter of course by persona negotiation agent 3506. For example, personal information of a user/purchaser may be directly provided to persona negotiation agent 3506 for the purpose of facilitating completion of transaction 3502, or alternatively, persona negotiation agent 3506 may indirectly access personal information of a user through access to various accounts, such as website accounts, bank accounts, social network accounts, or telecommunications accounts. In some embodiments, some of the personal information may be publicly available.

Operation 3630 depicts negotiating presentation of at least one persona to the party to the transaction at least partly based on an evaluation of the transaction. For example, persona negotiation agent 3506 may negotiate presentation of at least one persona to the party to the transaction at least partly based on an evaluation of the transaction. For example, persona negotiation agent 3506 may accept a request for personal information from amazon.com in the course of an online purchase. Persona negotiation agent 3506 may then evaluate the transaction 3502 based on dollar amount, party 2701, or personal information requested, and initiate a negotiation to present a persona containing an alternate set of personal information, e.g., where the transaction has a low dollar value only a few of the requested items of personal information may actually be necessary for party/vendor 3501 to go through with the transaction 3502. This may be done according to a persona negotiation ruleset pre-programmed into persona negotiation agent 3506. Persona negotiation agent 3506 may then accept or reject a counteroffer from party 3501, perhaps by examining actions taken/messages left by party 3501 on the transaction webpage, or by direct message from party 3501 to a user/purchaser 4212.

In some embodiments, persona negotiation agent 3506 may include a party history evaluation module 3524 to further characterize party 3501 according to, for example historical acceptance or rejection of personas in similar circumstances as those in 3502.

In some embodiments, both for detecting the specifics of a transaction and for placing data into fields on a web page, it may be useful for persona negotiation agent 3506 to perform web scraping or web page image analysis on the web page.

Web scraping is a computer software technique of extracting information from websites. Usually, such software programs simulate human exploration of the World Wide Web by either implementing low-level Hypertext Transfer Protocol (HTTP), or embedding certain full-fledged Web browsers, such as Internet Explorer or Mozilla Firefox. Web scraping may involve the transformation of unstructured data on the Web, typically in HTML format, into structured data that can be stored and analyzed in a central local database or spreadsheet. Specific techniques for web scraping include text grepping and regular expression matching, which extracts information from Web pages based on the UNIX grep command or regular expression matching facilities of programming languages (for instance Perl or Python).

Another web scraping tool is HTTP programming wherein static and dynamic web pages can be retrieved by posting HTTP requests to a remote web server using socket programming.

Another web scraping tool is DOM (document object model) parsing: By embedding a full-fledged web browser, such as Internet Explorer or Mozilla web browser, programs can retrieve dynamic content generated by client-side scripts. These web browser controls may also parse web pages into a DOM tree, based on which programs can retrieve parts of the web pages.

Another web scraping tool is HTML parsing, wherein semi-structured data query languages, such as XQuery and HTQL can be used to parse HTML pages and to retrieve and transform web content.

There are many web-scraping software tools available that can be used to customize web-scraping solutions. These programs may attempt to automatically recognize the data structure of a page or provide a web recording interface that removes the necessity to manually write web-scraping code, or some scripting functions that can be used to extract and transform web content, and database interfaces that can store the scraped data in local databases.

Another web scraping tool is a vertical aggregation platform. These platforms create and monitor a multitude of "bots" for specific verticals with no man-in-the-loop, and no work related to a specific target site. The preparation involves establishing a knowledge base for the entire vertical, and then the platform creates the bots automatically. The platform's robustness is measured by the quality of the information it retrieves (usually number of fields) and its scalability (how quick it can scale up to hundreds or thousands of sites). This scalability is mostly used to target sites that common aggregators find complicated or too labor intensive to harvest content from.

Another web scraping tool is semantic annotation recognizing, wherein web pages may contain metadata or semantic markups/annotations which can be made use of to locate specific data. If the annotations are embedded in the pages, as Microformat does, this technique can be viewed as a special case of DOM parsing. In another case, the annotations, organized into a semantic layer, may be stored and managed separately from the web pages, so the web scrapers can retrieve data schema and instructions from this layer before scraping the pages.

Another tool for web page analysis is iMacros, a program that harvests web data automatically, which can do automatic form-filling. For example, iMacros works with every website; even the most complicated websites that use dialog boxes, frames, Javascript and AJAX can be automated. It has high data extraction speed: on a typical computer, 20-50 instances of iMacros can be run at once ("multi-threading"). It has full web-crawling support. iMacros can be scheduled to run in the background of other programs or in lean traffic hours. iMacros permits change of IP addresses programmatically with full PROXY support. After harvesting the web data, actions may be performed on it, it can be transferred to any application, or it can be used in another process. iMacros integrates with every Windows scripting or programming language. iMacros can connect to any database or software application. iMacros provides visual recording of all web activities and the extraction macros. iMacros has full unicode support, and iMacros can extract text in all languages, including Asian languages such as Chinese, Japanese and Korean.

In addition to working with the website source code like a "normal" software program, iMacros can also look at the website like a human does: iMacros' image recognition support allows a user to automate and test websites using images instead of X/Y coordinates: a user can tell iMacros what a button looks like and iMacros can find it on the page. Even when the button has moved or if it has changed color or screen resolution. The iMacros Image Recognition Wizard functions with web sites that use non-HTML technologies such as Flash applets, Java applets, Movie Player Applets, ActiveX controls or any other technology. Since the software relies only on the images that are rendered in the browser, it works independently of the underlying technology.

FIG. 37 illustrates alternative embodiments of the example operational flow 3600 of FIG. 36. FIG. 37 illustrates example embodiments where the accepting operation 3610 may include at least one additional operation. Additional operations may include operation 3700, 3702, and/or operation 3704.

Operation 3700 depicts accepting a plurality of fields on a web page as the at least one request for personal information. For example, persona negotiation agent 3506 and/or personal information request acceptor module 3512 may accept a plurality of fields on a web page as the at least one request for personal information. In one embodiment, personal information request acceptor module 3512 may accept from party 3501 a checkout web page having fields for name, telephone number, email address, and credit card information for the purchase of an MP3 file from the iTunes store. As another example, persona negotiation agent 3506 may accept a request for personal information on an a Groupon web page relating to a potential purchase.

Operation 3702 depicts accepting at least one request for personal information from a vendor in an online transaction. For example, persona negotiation agent 3506 and/or personal information request acceptor module 3512 may accept at least one request for personal information from a vendor in an online transaction. For example, personal information request acceptor module 3512 may accept a request from eBay to provide more information where a user left a required field blank on an eBay auction page. Access to the auction may be then be negotiated, in part, based on any past history of the user with party 3501/eBay. In some embodiments, party 3501 may send a message to persona negotiation agent 3506, in effect telling it that it would like to negotiate a persona for a transaction, the message including a URL or other venue for the transaction, from which persona negotiation agent 3506 can extract the information necessary to evaluate the transaction and negotiate an appropriate persona. Such a message may be sent by voice, text, touch, or other user interface mechanism. In some instances the persona negotiation agent 3506 will be invisible or transparent to party 2701, except for the offer/counteroffer of the negotiation.

Operation 3704 depicts accepting a request for personal information consisting of name, email address, birthdate, and credit card information from a vendor in an online transaction. For example, persona negotiation agent 3506 and/or personal information request acceptor module 3512 may accept a request for personal information consisting of name, email address, birthdate, and credit card information from a vendor in an online transaction. In one embodiment, persona negotiation agent 3506 and/or personal information request acceptor module 3512 may accept a request for a name, email address, birthdate, and credit card information at an e-commerce transaction page. The request 3503 may be in the form of information in fields on a web page as well as direct communication such as messaging on a transaction web page, email, and/or text messaging.

FIG. 38 illustrates alternative embodiments of the example operational flow 3600 of FIG. 36. FIG. 38 illustrates example embodiments where the evaluating operation 3620 may include at least one additional operation. Additional operations may include operation 3800, 3802, and/or operation 3804.

Operation 3800 depicts evaluating a monetary value for the transaction. For example, persona negotiation agent 3506, transaction evaluation module 3508, and/or, transaction value analysis module 3510 may evaluate a monetary value for the transaction. In one embodiment, transaction value analysis module 3510 may analyze a URL provided by a party 3501 corresponding to an app store order page. Transaction value analysis module 3510 may read the text or code on the web page, image the page, or otherwise determine the object of the transaction and the monetary value of the object (i.e., a good or service). In another example, web page parser module 3514 may accept a URL for an online pizza order form, such as an order page for Domino's pizza, and parse the markup language code or text to identify a dollar value for the pizza order (on the Domino's order page the dollar amount appears next to "Total:" and has a dollar sign with the amount).

Operation 3802 depicts evaluating the party to the transaction. For example, persona negotiation agent 3506, transaction evaluation module 3508, and/or party history evaluation module 3524 may evaluate the party to the transaction. In one embodiment, transaction evaluation module 3508 may evaluate any available data regarding the name of the party 3501 and any information about whether party 3501 is amenable to negotiating the terms of the personal information that it requests in connection with transactions, including past practices of party 3501.

Operation 3804 depicts evaluating transaction history about the party to the transaction. For example, persona negotiation agent 3506, transaction evaluation module 3508, and/or party history evaluation module 3524 may evaluate transaction history about the party to the transaction. In one embodiment, party history evaluation module 2724 may evaluate a party's history of interaction with user/purchasers, if there is any. If there is a history of purchases and payments, particularly with user 4212, that may be one factor taken into account by persona negotiation agent 3506 in arriving at a persona to support transaction 3502: a history of negotiating personas by a party may increase the chances that a negotiation will occur and that it will be successful to both parties to the transaction.

FIG. 39 illustrates alternative embodiments of the example operational flow 3600 of FIG. 36. FIG. 39 illustrates example embodiments where the negotiating operation 3630 may include at least one additional operation. Additional operations may include operation 3900, 3902, 3904, and/or operation 3906.

Operation 3900 depicts negotiating presentation of at least one persona including an indication of creditworthiness to the party to the transaction at least partly based on an evaluation of the transaction. For example, persona negotiation agent 3506, transaction evaluation module 3508, persona creation module 3520, and/or party history evaluation module 3524 may negotiate presentation of a persona including an indication of creditworthiness to the party to the transaction at least partly based on an evaluation of the transaction. In one embodiment, persona creation module 3520 may present to party 3501 valid credit card information transaction 3502, having first evaluated the transaction and deemed it to be one that legitimately required presentation of a persona that includes credit card information.

As discussed above, high dollar value transactions will require that detailed personal information be provided as security for the transaction, but a large range of intermediate dollar value transactions may benefit from a smart system of providing as little personal information possible during the transaction. This will benefit both a user/purchaser in terms of minimizing transfer of personal information, and also the party 3501/vendor, who will save potentially save time and administrative costs if transactions are streamlined according to the instant disclosure.

In one embodiment of how the persona negotiation agent 3506 may operate, it may begin by generating an offer that consists of the issues that is most important for the agent, e.g., a persona containing a minimum of personal information. It does this because it wants to tell to the party, at the outset, which issues are the most important for the agent. After sending the offer, the agent will subsequently receive a message from the party 3510. The party 3510 could accept the offer, refuse the offer, or propose a counteroffer. Both acceptance and refusal will result in ending the negotiations, but if the message is a counteroffer, then the agent will form a new offer to the party.

In one embodiment, the agent doesn't know any information regarding the party's preferences, and so it has to create a model of party 3510 utility values in order to make an offer that is acceptable to the party 3510, while still maintaining the agent's acceptance value. An acceptance value is the value of an offer that it can accept. This value will decrease in time, since there is a limited time in negotiation. But the acceptance value will never be less than the agent's reservation value, an absolute requirement. The reservation value is the lowest utility value where the agent may still accept a counteroffer from the party 3510, but it will accept it only if there is an impasse in the negotiation. For more information about automated negotiation agents, see U.S. Patent Application Publication 2011 0238840, Method, System, and Device for Service Negotiation; incorporated herein by reference. See also U.S. Patent Application Publication 2002 0120588, Method and Apparatus for Negotiation; also incorporated herein by reference.

Operation 3902 depicts negotiating presentation of at least one persona including less personal information than initially requested to the party to the transaction at least partly based on an evaluation of the transaction that includes a transaction value under one hundred dollars. For example, persona negotiation agent 3506 may negotiate presentation of at least one persona including less personal information than initially requested to the party to the transaction at least partly based on an evaluation of the transaction that includes a transaction value under one hundred dollars. In one embodiment, persona negotiation agent 3506 may, for a low dollar value transaction, e.g., one hundred dollars or less, negotiate presentation of a persona that includes less personal information than initially requested by party 3501, perhaps only providing a persona having a name, address, and credit card information. This may provide a party 3501/vendor with enough security with which to complete the transaction.

Operation 3904 depicts negotiating presentation of at least one persona including more personal information than initially requested to the party to the transaction at least partly based on an evaluation of the transaction, wherein the cost of the transaction is discounted in exchange for the more personal information than initially requested. For example, persona negotiation agent 3506 may negotiate presentation of at least one persona including more personal information than initially requested to the party to the transaction at least partly based on an evaluation of the transaction, wherein the cost of the transaction is discounted in exchange for the more personal information than initially requested. In one embodiment, persona negotiation agent 3506 may, on behalf of a user that places a low value on restricting the flow of his personal information online, offer more personal information than was initially requested during the transaction in exchange for a discount. For example, if a party 3501 requests personal information on an online form for purchase of a book on amazon.com, persona negotiation agent 3506 may offer, e.g., information about the location of the user 4212, the demographics of user 4212, or social network participation information about party 4212 in exchange for a discount on the price of the book.

Operation 3906 depicts negotiating presentation of at least one persona including reduced personal information than initially requested to the party to the transaction at least partly based on an evaluation of the transaction, wherein the cost of the transaction is increased in exchange for the reduced personal information. For example, persona negotiation agent 3506 may negotiate presentation of at least one persona including reduced personal information than initially requested to the party to the transaction at least partly based on an evaluation of the transaction, wherein the cost of the transaction is increased in exchange for the reduced personal information. In one embodiment, persona negotiation agent 3506 may offer to party 3501 to complete a transaction with a lesser amount of personal information if the user 4212 pays a higher price for the object of the transaction. For example, if a user/purchaser in an online credit card transaction prefers not to provide telephone number information to the party 3501/vendor, the party may agree to a slightly higher price for the transaction in exchange. In this example, the party/vendor is compensated for slightly higher risk of non-payment by a higher transaction return.

FIG. 40 illustrates alternative embodiments of the example operational flow 3600 of FIG. 36. FIG. 40 illustrates example embodiments where the negotiating operation 3630 may include at least one additional operation. Additional operations may include operation 4000 and/or operation 4002.

Operation 4000 depicts negotiating presentation of at least one persona to the party to the transaction at least partly based on an evaluation of the transaction, wherein the negotiating is concluded on the basis of at least one future condition. For example, persona negotiation agent 3506 may negotiate presentation of at least one persona to the party to the transaction at least partly based on an evaluation of the transaction, wherein the negotiating is concluded on the basis of at least one future condition. In one embodiment, persona negotiation agent 3506, having evaluated a transaction 3502 as one of relatively low monetary value, may present to party 3501 a minimal persona and a promise to pay for the transaction using a preferred payment method within a certain period of time, for example using an Entropay prepaid virtual Visa card within one week. Such conditional virtual payments may be particularly useful for small online purchases such as apps, MP3's, and movie files.

Operation 4002 depicts negotiating presentation of at least one persona to the party to the transaction at least partly based on an evaluation of the transaction, wherein the negotiating is concluded on the basis of at least one future condition, and wherein the at least one future condition includes a promise to pay the cost of the transaction to the party to the transaction within a defined time period after an object of the transaction is delivered by the party to the transaction. For example, persona negotiation agent 3506 may negotiate presentation of at least one persona to the party to the transaction at least partly based on an evaluation of the transaction, wherein the negotiating is concluded on the basis of at least one future condition, and wherein the at least one future condition includes a promise to pay the cost of the transaction to the party to the transaction within a defined time period after an object of the transaction is delivered by the party to the transaction. In one embodiment, a persona negotiation agent 3506 may negotiate with amazon.com for presentation of a specific persona in the context of a transaction to ship an item to a physical address, in exchange for an agreement by the user/purchaser to pay using an amazon.com credit card within 30 days of delivery of the item to the user/purchaser.

FIG. 41 illustrates a partial view of an example article of manufacture 4100 that includes a computer program 4104 for executing a computer process on a computing device. An embodiment of the example article of manufacture 4100 is provided including a signal bearing medium 4102, and may include one or more instructions for accepting at least one request for personal information from a party to a transaction; one or more instructions for evaluating the transaction; and one or more instructions for negotiating presentation of at least one persona to the party to the transaction at least partly based on an evaluation of the transaction. The one or more instructions may be, for example, computer executable and/or logic-implemented instructions. In one implementation, the signal-bearing medium 4102 may include a computer-readable medium 4106. In one implementation, the signal bearing medium 4102 may include a recordable medium 4108. In one implementation, the signal bearing medium 4102 may include a communications medium 4110.

FIG. 42 illustrates an example system 4200 in which embodiments may be implemented. The system 4200 includes a computing system environment. The system 4200 also illustrates a user 4212 using a device 4214, which is optionally shown as being in communication with a computing device 4202 by way of an optional coupling 4206. The optional coupling 4206 may represent a local, wide-area, or peer-to-peer network, or may represent a bus that is internal to a computing device (e.g., in example embodiments in which the computing device 4202 is contained in whole or in part within the device 4204). A storage medium 4208 may be any computer storage media. In one embodiment, the computing device 4202 may include a virtual machine operating within another computing device. In an alternative embodiment, the computing device 4202 may include a virtual machine operating within a program running on a remote server.

The computing device 4202 includes computer-executable instructions 4210 that when executed on the computing device 4202 cause the computing device 4202 to (a) accept at least one request for personal information from a party to a transaction; (b) evaluate the transaction; and (c) negotiate presentation of at least one persona to the party to the transaction at least partly based on an evaluation of the transaction. As referenced above and as shown in FIG. 42, in some examples, the computing device 4202 may optionally be contained in whole or in part within the device 4204.

In FIG. 42, then, the system 4200 includes at least one computing device (e.g., 4202 and/or 4204). The computer-executable instructions 4210 may be executed on one or more of the at least one computing device. For example, the computing device 4202 may implement the computer-executable instructions 4210 and output a result to (and/or receive data from) the computing device 4204. Since the computing device 4202 may be wholly or partially contained within the computing device 4204, the device 4204 also may be said to execute some or all of the computer-executable instructions 4210, in order to be caused to perform or implement, for example, various ones of the techniques described herein, or other techniques.

The device 4204 may include, for example, a portable computing device, workstation, or desktop computing device. In another example embodiment, the computing device 4202 is operable to communicate with the device 4204 associated with the user 4212 to receive information about the input from the user 4212 for performing data access and data processing, and negotiate presentation of a persona to the party/vendor to the transaction.

Selection of a Persona Linked to a Unique Identifier

FIG. 43 illustrates an example system 4300 in which embodiments may be implemented. The system 4300 includes a persona selection unit 4306. The persona selection unit 4306 may contain, for example, transaction evaluation module 4308, which may in turn contain transaction value analysis module 4310. Persona selection unit 4306 may also include, for example, personal information request acceptor module 4312, which in turn may include web page parser module 4314, which in turn may include X/Y coordinate web page reader 4316, web page image reader 4318, and/or screen scraper module 4319. Persona selection unit

4306 also may contain, for example, cost adjustment module 4328, condition-setting module 4330, party history evaluation module 4324, and/or persona creation module 4320. Persona selection unit 4306 may communicate over a network or directly with party 4301 to accept at least one request for personal information in the context of transaction 4302, to evaluate transaction 4302, to select a persona at least partly based on an evaluation of the transaction, wherein the persona is linked to a unique identifier that is at least partly based on a user's device-identifier data and the user's network-participation data, and to present the persona in response to the request for personal information.

Additionally, persona selection unit 4306 may access persona database 4350 to find personas from which to select and present according to the presently claimed inventions. Alternatively, persona selection unit 4306 may communicate with a persona custodian 4360 to find personas from which to select and present according to the presently claimed inventions. In one embodiment, persona selection unit 4306 may create personas from which to select and present according to the presently claimed inventions, for example, using persona creation module 4320.

In FIG. 43, persona selection unit 4306 may accept a request for personal information 4303 directly from party 4301 or indirectly by inspection of transaction 4302, for example by viewing personal information fields on a web page related to the transaction.

In FIG. 43, the persona selection unit 4306 is illustrated as possibly being included within a system 4300. Of course, virtually any kind of computing device may be used to implement the special purpose persona selection unit 4306, such as, for example, a workstation, a desktop computer, a networked computer, a server, a collection of servers and/or databases, a virtual machine running inside a computing device, a mobile computing device, or a tablet PC.

Additionally, not all of the persona selection unit 4306 need be implemented on a single computing device. For example, the persona selection unit 4306 may be implemented and/or operable on a remote computer, while a user interface and/or local instance of the persona selection unit 4306 are implemented and/or occur on a local computer. Further, aspects of the persona selection unit 4306 may be implemented in different combinations and implementations than that shown in FIG. 43. For example, functionality of a user interface may be incorporated into the persona selection unit 4306 for the benefit of a user/purchaser or for personnel supervising transactions for an online vendor. The persona selection unit 4306 may perform simple data relay functions and/or complex data analysis, including, for example, fuzzy logic and/or traditional logic steps. Further, many methods of evaluating transactions and selecting personas described herein or known in the art may be used, including, for example, algorithms commonly used in web page analysis may be used to determine a transaction scale and/or quality as a basis for selecting an appropriate persona linked to a unique identifier and containing an appropriate level of personal information for a transaction. In some embodiments, the persona selection unit 4306 may select a persona based on information about a transaction available as updates through a network.

Persona selection unit 4306 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

As referenced herein, the persona selection unit 4306 may be used to perform various data querying and/or recall techniques with respect to the request 4303, persona 4304, and/or the transaction 4302, in order to negotiate an appropriate persona. For example, where transaction 4302 elements are organized, keyed to, and/or otherwise accessible using one or more web page analysis tools, or the like, persona selection unit 4306 may employ various Boolean, statistical, and/or semi-boolean searching techniques to determine the appropriate level of information to include in a persona for it to be acceptable as an underpinning for a transaction. Similarly, for example, where user personal information is organized, keyed to, and/or otherwise accessible using one or more persona selection rulesets, various Boolean, statistical, and/or semi-boolean searching techniques may be performed by persona selection unit 4306 to select and present an appropriate persona.

Many examples of databases and database structures may be used in connection with the persona selection unit 4306. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for selection of a persona and/or persona content; and/or for gathering and/or compiling data from the relational database(s).

For example, SQL or SQL-like operations over one or more personas 4304 and/or properties of transaction 4302 may be performed, or Boolean operations using personas 4304 and/or properties of transaction 4302 may be performed. For example, weighted Boolean operations may be performed in which different weights or priorities are assigned to one or more of the request 4303, persona 4304, and/or properties of transaction 4302, including various transaction identifier elements, locations, and/or contexts, perhaps relative to one another. For example, a number-weighted, exclusive-OR operation may be performed to request specific weightings of elements found on a check-out page of an e-commerce web page (e.g., email address, telephone number, mailing address, credit card information, dollar amount in cart, web site name, payment types).

Following are a series of flowcharts depicting implementations. For ease of understanding, the flowcharts are organized such that the initial flowcharts present implementations via an example implementation and thereafter the following flowcharts present alternate implementations and/ or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 44 illustrates an operational flow 4400 representing example operations related to regulating information flow during interactions. In FIG. 44 and in following figures that include various examples of operational flows, discussion and explanation may be provided with respect to the above-described system environments of FIG. 43, and/or with respect to other examples and contexts. However, it should be understood that the operational flows may be executed in a number of other environments and contexts including that of FIG. 51, and/or in modified versions of FIG. 43. Also, although the various operational flows are presented in the sequence(s) illustrated, it should be understood that the various operations may be performed in other orders than those which are illustrated, or may be performed concurrently.

After a start operation, operation 4410 depicts accepting at least one request for personal information from a party to a transaction. For example, persona selection unit 4306, personal information request acceptor module 4312, and/or web page parser module 4314 may accept at least one request for personal information from a party to a transaction. In one embodiment, personal information request acceptor module 4312 may accept a request for name, phone number, email address, and credit card information during a transaction to purchase an app in an app store. The request 4303 may be in the form of an online transaction form having empty fields labeled for entry of personal information. In another example, web page parser module 4314 may accept markup language code (e.g., HTML or XML) or text corresponding to a transaction web page as the request for personal information 4303.

Operation 4320 depicts evaluating the transaction. For example, persona selection unit 4306, transaction evaluation module 4308, web page parser module 4314, and/or transaction value analysis module 4310 may evaluate the transaction. In one embodiment, transaction value analysis module 4310 may analyze markup language code from a checkout webpage corresponding to transaction 4302. In this example, the code may indicate a dollar value of an item to be purchased or to be bid on in an auction. Based on that dollar value, the persona selection unit 4306 may select an appropriate persona from, e.g., persona database 4350. In some embodiments, persona transaction evaluation module 4308 may identify transactions having an arbitrarily-defined low, intermediate, or high dollar value. For financial interactions such as purchases or auctions, transaction value analysis module 4310 may detect a dollar value and assign a dollar value category for the interaction, for example low dollar value, intermediate dollar value, or high dollar value. Rulesets for the persona selection unit 4306 to follow may be set by a user/purchaser interacting with party 4301 according to any premium that the user places on completing the transaction and/or minimizing transmission of personal information.

Alternatively, many intermediate levels of interaction value may be assigned by, e.g., transaction evaluation module 4308 based on a detected value present in the web page code or other attribute of the transaction 4302. In these embodiments, a minimal persona containing only a few elements of personal information may be selected and presented in support of transaction 4302. In one embodiment persona selection unit 4306 may select a persona linked to a unique identifier, wherein the persona provides only that amount of personal information absolutely required for completion of the interaction/transaction. This approach attempts to avoid gratuitous dissemination of potentially valuable personal information. For example, for low dollar value transactions, persona selection unit 4306 may be programmed to select and present a minimal persona containing, e.g., only a name and a device identifier, such as a telephone number. For some parties/vendors 4301, such a minimal persona will provide enough trust in the creditworthiness of the user, perhaps via a check with a telecommunications carrier that the name matches the telephone number. The unique identifier associated with the persona may provide an additional dimension with which a party 4301 may gain confidence in a user's identity and ability to complete payment in a transaction. In other, higher dollar value transactions, selection and presentation of a persona containing more detailed personal information may be necessary. For example, for a car purchase, a persona including credit information, credit history, and personal financial asset data may be required by party 4301.

In some embodiments, party 4301 will provide request 4303 to persona selection unit 4306. Personal information may be obtainable as a matter of course by persona selection unit 4306. For example, personal information of a user/purchaser may be directly provided to persona selection unit 4306 for the purpose of facilitating completion of transaction 4302, or alternatively, persona selection unit 4306 may indirectly access personal information of a user through access to various accounts, such as website accounts, bank accounts, social network accounts, or telecommunications accounts. In some embodiments, some of the personal information may be publicly available.

Operation 4430 depicts selecting a persona at least partly based on an evaluation of the transaction, wherein the persona is linked to a unique identifier that is at least partly based on a user's device-identifier data and the user's network-participation data. For example, persona selection unit 4306 may select a persona at least partly based on an evaluation of the transaction, wherein the persona is linked to a unique identifier that is at least partly based on a user's device-identifier data and the user's network-participation data. In one embodiment, persona selection unit 4306 may select a persona linked to a unique identifier that is at least partly based on a user's device-identifier data and the user's network-participation data, such as a unique ID created by a telecommunications carrier for a user based on her mobile phone's UDID and her Facebook profile. In this scenario, the unique identifier makes the user's identity known to the telecommunications carrier, but not to the party 4301 to the transaction. Accordingly, the telecommunications carrier may provide security for the transaction in this example based on their knowledge about the user's identity, even where that identity is not presented to party 4301 to the transaction.

Operation 4440 depicts presenting the persona in response to the request for personal information. For example, persona selection unit 4306 may present the persona in response to the request for personal information. In one embodiment, persona selection unit 4306 may accept a request for personal information from amazon.com in the course of an online purchase. Persona selection unit 4306 may then evaluate the transaction 4302 based on dollar amount, party 4301, or personal information requested, and select a persona linked to a unique identifier which contains a specific set of personal information, e.g., where the transaction has a low dollar value only a few of the requested items of personal information may actually be necessary for party/vendor 4301 to go through with the transaction 4302. This may be done according to a persona selection ruleset preprogrammed into persona selection unit 4306. Persona selection unit 4306 may then present the persona 4304, e.g., by an action taken on a transaction webpage, or by direct message to party 4301.

In some embodiments, persona selection unit 4306 may include a party history evaluation module 4324 to further characterize party 4301 according to, for example, historical acceptance or rejection of personas in similar circumstances as those in transaction 4302.

In some embodiments, both for detecting the specifics of a transaction and for placing data into fields on a web page, it may be useful for persona selection unit 4306 to perform web scraping or web page image analysis on the web page.

Web scraping is a computer software technique of extracting information from websites. Usually, such software programs simulate human exploration of the World Wide Web by either implementing low-level Hypertext Transfer Protocol (HTTP), or embedding certain full-fledged Web browsers, such as Internet Explorer or Mozilla Firefox. Web scraping may involve the transformation of unstructured data on the Web, typically in HTML format, into structured data that can be stored and analyzed in a central local database or spreadsheet. Specific techniques for web scraping include text grepping and regular expression matching, which extracts information from Web pages based on the UNIX grep command or regular expression matching facilities of programming languages (for instance Perl or Python).

Another web scraping tool is HTTP programming wherein static and dynamic web pages can be retrieved by posting HTTP requests to a remote web server using socket programming.

Another web scraping tool is DOM (document object model) parsing: By embedding a full-fledged web browser, such as Internet Explorer or Mozilla web browser, programs can retrieve dynamic content generated by client-side scripts. These web browser controls may also parse web pages into a DOM tree, based on which programs can retrieve parts of the web pages.

Another web scraping tool is HTML parsing, wherein semi-structured data query languages, such as XQuery and HTQL can be used to parse HTML pages and to retrieve and transform web content.

There are many web-scraping software tools available that can be used to customize web-scraping solutions. These programs may attempt to automatically recognize the data structure of a page or provide a web recording interface that removes the necessity to manually write web-scraping code, or some scripting functions that can be used to extract and transform web content, and database interfaces that can store the scraped data in local databases.

Another web scraping tool is a vertical aggregation platform. These platforms create and monitor a multitude of "bots" for specific verticals with no man-in-the-loop, and no work related to a specific target site. The preparation involves establishing a knowledge base for the entire vertical, and then the platform creates the bots automatically. The platform's robustness is measured by the quality of the information it retrieves (usually number of fields) and its scalability (how quick it can scale up to hundreds or thousands of sites). This scalability is mostly used to target sites that common aggregators find complicated or too labor intensive to harvest content from.

Another web scraping tool is semantic annotation recognizing, wherein web pages may contain metadata or semantic markups/annotations which can be made use of to locate specific data. If the annotations are embedded in the pages, as Microformat does, this technique can be viewed as a special case of DOM parsing. In another case, the annotations, organized into a semantic layer, may be stored and managed separately from the web pages, so the web scrapers can retrieve data schema and instructions from this layer before scraping the pages.

Another tool for web page analysis is iMacros, a program that harvests web data automatically, which can do automatic form-filling. For example, iMacros works with every website; even the most complicated websites that use dialog boxes, frames, Javascript and AJAX can be automated. It has high data extraction speed: on a typical computer, 20-50 instances of iMacros can be run at once ("multi-threading"). It has full web-crawling support. iMacros can be scheduled to run in the background of other programs or in lean traffic hours. iMacros permits change of IP addresses programmatically with full PROXY support. After harvesting the web data, actions may be performed on it, it can be transferred to any application, or it can be used in another process. iMacros integrates with every Windows scripting or programming language. iMacros can connect to any database or software application. iMacros provides visual recording of all web activities and the extraction macros. iMacros has full unicode support, and iMacros can extract text in all languages, including Asian languages such as Chinese, Japanese and Korean.

In addition to working with the website source code like a "normal" software program, iMacros can also look at the website like a human does: iMacros' image recognition support allows a user to automate and test websites using images instead of X/Y coordinates: a user can tell iMacros what a button looks like and iMacros can find it on the page. Even when the button has moved or if it has changed color or screen resolution. The iMacros Image Recognition Wizard functions with web sites that use non-HTML technologies such as Flash applets, Java applets, Movie Player Applets, ActiveX controls or any other technology. Since the software relies only on the images that are rendered in the browser, it works independently of the underlying technology.

FIG. 45 illustrates alternative embodiments of the example operational flow 4400 of FIG. 44. FIG. 45 illustrates example embodiments where the accepting operation 4410 may include at least one additional operation. Additional operations may include operation 4500, 4502, and/or operation 4504.

Operation 4500 depicts accepting a plurality of fields on a web page as the at least one request for personal information. For example, persona selection unit 4306 and/or personal information request acceptor module 4312 may accept a plurality of fields on a web page as the at least one request for personal information. In one embodiment, personal information request acceptor module 4312 may accept from party 4301 a checkout web page having fields for name, telephone number, email address, and credit card information for the purchase of an MP3 file from the iTunes store. As another example, persona selection unit 4306 may accept a request for personal information on a Groupon web page relating to a potential purchase.

Operation 4502 depicts accepting at least one request for personal information from a vendor in an online transaction. For example, persona selection unit 4306 and/or personal information request acceptor module 4312 may accept at least one request for personal information from a vendor in an online transaction. For example, personal information request acceptor module 4312 may accept a request from eBay to provide more information where a user left a required field blank on an eBay auction page. Access to the auction may be then be obtained, for example, by selecting and presenting a persona to satisfy identification requirements of eBay. In some embodiments, party 4301 may send a message to persona selection unit 4306, in effect telling it that it needs more personal information for a transaction, the message perhaps including a URL or other venue for the transaction, from which persona selection unit 4306 can extract the information necessary to evaluate the transaction, select, and present an appropriate persona. Such a message may be sent by voice, text, touch, or other user interface mechanism. In some instances the persona selection unit 4306 will be invisible or transparent to party 4301, except for the offer/counteroffer of the negotiation.

Operation 4504 depicts accepting a request for personal information consisting of name, email address, birthdate, and credit card information from a vendor in an online transaction. For example, persona selection unit 4306 and/or personal information request acceptor module 4312 may accept a request for personal information consisting of name, email address, birthdate, and credit card information from a vendor in an online transaction. In one embodiment, persona selection unit 4306 and/or personal information request acceptor module 4312 may accept a request for a name, email address, birthdate, and credit card information at an e-commerce transaction page. The request 4303 may be in the form of information in fields on a web page as well as direct communication such as messaging on a transaction web page, email, and/or text messaging.

FIG. 46 illustrates alternative embodiments of the example operational flow 4400 of FIG. 44. FIG. 46 illustrates example embodiments where the evaluating operation 4420 may include at least one additional operation. Additional operations may include operation 4600, 4602, and/or operation 4604.

Operation 4600 depicts evaluating a monetary value for the transaction. For example, persona selection unit 4306, transaction evaluation module 4308, and/or, transaction value analysis module 4310 may evaluate a monetary value for the transaction. In one embodiment, transaction value analysis module 4310 may analyze a URL provided by a party 4301 corresponding to an app store order page. Transaction value analysis module 4310 may read the text or code on the web page, image the page, or otherwise determine the object of the transaction and the monetary value of the object (i.e., a good or service). In another example, web page parser module 4314 may accept a URL for an online pizza order form, such as an order page for Domino's pizza, and parse the markup language code or text to identify a dollar value for the pizza order (on the Domino's order page the dollar amount appears next to "Total:" and has a dollar sign with the amount).

Operation 4602 depicts evaluating the party to the transaction. For example, persona selection unit 4306, transaction evaluation module 4308, and/or party history evaluation module 4324 may evaluate the party to the transaction. In one embodiment, transaction evaluation module 4308 may evaluate any available data regarding the name of the party 4301 and any information about whether party 4301 is amenable to negotiating the terms of the personal information that it requests in connection with transactions, including past practices of party 4301.

Operation 4604 depicts evaluating transaction history about the party to the transaction. For example, persona selection unit 4306, transaction evaluation module 4308, and/or party history evaluation module 4324 may evaluate transaction history about the party to the transaction. In one embodiment, party history evaluation module 2724 may evaluate a party's history of interaction with user/purchasers, if there is any. If there is a history of purchases and payments, particularly with user 4212, that may be one factor taken into account by persona selection unit 4306 in arriving at a persona to support transaction 4302: a history of accepting certain personas in like circumstances by a party may increase the chances that a given persona will be accepted to satisfy the requirements of the transaction.

FIG. 47 illustrates alternative embodiments of the example operational flow 4400 of FIG. 44. FIG. 47 illustrates example embodiments where the selecting operation 4430 may include at least one additional operation. Additional operations may include operation 4700, 4702, and/or operation 4704.

Operation 4700 depicts selecting a persona at least partly based on an evaluation of the transaction, wherein the persona is linked to a unique identifier that is at least partly based on at least one of a user's UDID, MAC address, SIM data, IP address, or IMEI as the device-identifier data; and the user's network-participation data. For example, persona selection unit 4306, transaction evaluation module 4308, persona creation module 4320, and/or party history evaluation module 4324 may select a persona at least partly based on an evaluation of the transaction, wherein the persona is linked to a unique identifier that is at least partly based on at least one of a user's UDID, MAC address, SIM data, IP address, or IMEI as the device-identifier data; and the user's network-participation data. In one embodiment, persona creation module 4320 may select for presentation to party 4301 a persona that includes a unique identifier that identifies a user based on an iPhone UDID and a Twitter handle. In one embodiment a custodian of the unique identifier may possess the details of the UDID and the Twitter handle, but not include those details in the persona. Instead the custodian of the unique identifier, upon receipt of a request from a user and verification of the user's identity, may vouch for the integrity of the persona. This process allows a user to maintain a repository for her personal information at the custodian (who is trusted), who in turn may vouch for a persona and provide security for a transaction. In this way a user may avoid spreading her sensitive personal information among online merchants, some of whom may not protect her personal information carefully.

As discussed above, high dollar value transactions will require that detailed personal information be provided as security for the transaction, but a large range of intermediate dollar value transactions may benefit from a smart system of providing as little personal information possible during the transaction. This will benefit both a user/purchaser in terms of minimizing transfer of personal information, and also the party 4301/vendor, who will save potentially save time and administrative costs if transactions are streamlined according to the instant disclosure.

Operation 4702 depicts selecting a persona at least partly based on an evaluation of the transaction, wherein the persona is linked to a unique identifier that is at least partly based on a user's device-identifier data and at least one of Facebook information, Twitter information, or gmail information as the user's network-participation data. For example, persona selection unit 4306 may select a persona at least partly based on an evaluation of the transaction, wherein the persona is linked to a unique identifier that is at least partly based on a user's device-identifier data and at least one of Facebook information, Twitter information, or gmail information as the user's network-participation data.

Operation 4704 depicts selecting a persona at least partly based on an evaluation of the transaction, wherein the persona is linked to a unique identifier that is at least partly based on a user's device-identifier data and the user's network-participation data, and wherein the custodian of the persona is a telecommunications carrier. For example, persona selection unit 4306 may select a persona at least partly based on an evaluation of the transaction, wherein the persona is linked to a unique identifier that is at least partly based on a user's device-identifier data and the user's network-participation data, and wherein the custodian of the persona is a telecommunications carrier. In one embodiment, persona creation module 4320 may select for presentation to party 4301 a persona from Verizon as the persona custodian 4360, where Verizon has compiled a white pages of users across telecommunication carrier networks indexed by unique identifiers based on device identifier information and network participation information, as discussed above. In some embodiments, persona selection unit 4306 may be operated by Verizon; in other embodiments, persona selection unit 4306 may be operated by a trusted third party personal information management service that may, for example, pay Verizon a nominal fee as the custodian of a set of personas for access to the personas (and perhaps to the index of unique identifiers).

FIG. 48 illustrates alternative embodiments of the example operational flow 4400 of FIG. 44. FIG. 48 illustrates example embodiments where the selecting operation 4430 may include at least one additional operation. Additional operations may include operation 4800, 4802, and/or operation 4804.

Operation 4800 depicts selecting a persona at least partly based on an evaluation of the transaction, wherein the persona is linked to a unique identifier that is at least partly based on a user's device-identifier data and the user's network-participation data, and wherein the custodian of the persona is a trusted personal information management service. For example, persona selection unit 4306 may select a persona at least partly based on an evaluation of the transaction, wherein the persona is linked to a unique identifier that is at least partly based on a user's device-identifier data and the user's network-participation data, and wherein the custodian of the persona is a trusted personal information management service. In one embodiment, persona creation module 4320 may select for presentation to party 4301 a persona from a trusted personal information management service that takes steps to shield itself as much as possible from cloud-based data vulnerabilities. In this way a user's personal information may be safeguarded in comparison to large, cloud-based data storage modes that may be vulnerable to failure, hacking, viruses, malware, and/or worms.

Operation 4802 depicts selecting a persona at least partly based on an evaluation of the transaction, wherein the persona is linked to a unique identifier that is at least partly based on a user's device-identifier data and the user's network-participation data, and wherein the persona alone provides security for completion of the transaction. For example, persona selection unit 4306 may select a persona at least partly based on an evaluation of the transaction, wherein the persona is linked to a unique identifier that is at least partly based on a user's device-identifier data and the user's network-participation data, and wherein the persona alone provides security for completion of the transaction. In one embodiment, persona selection unit 4306 may accept a request for personal information including, credit card information, phone number, and birthdate in the context of a transaction for an app that costs $1.99 at an app store. Persona selection unit 4306 may evaluate the transaction to ascertain the low cost involved, select a persona that includes a unique identifier that is based on a user's iPhone information as device-identifier data and the user's iTunes account information as network-participation data. In this example, the persona including the unique identifier containing device-identifier data that matches that of the user's device on which the transaction is occurring may suffice to support the app purchase without transfer of any personal information other than that inherent in the persona and unique identifier. In some embodiments, a custodian of the persona and unique identifier may verify the identity of the user/purchaser and guarantee the purchase on the user's behalf, thus obviating the need for transmission of personal information.

Operation 4804 depicts selecting a persona at least partly based on an evaluation of the transaction, wherein the persona is linked to a unique identifier that is at least partly based on a user's device-identifier data and the user's network-participation data, and wherein the persona allows for substantially anonymous completion of the transaction. For example, persona selection unit 4306 may select a persona at least partly based on an evaluation of the transaction, wherein the persona is linked to a unique identifier that is at least partly based on a user's device-identifier data and the user's network-participation data, and wherein the persona allows for substantially anonymous completion of the transaction. To continue the example above, persona selection unit 4306 may complete the app purchase anonymously, except for presentation of the persona containing the unique identifier, on power of the guarantee by the custodian. In such a situation, the custodian guaranteeing the purchase may charge a user a fee for the guarantee to guard against default, however verification by the custodian prior to guaranteeing a purchase will mitigate most of the risk of default.

FIG. 49 illustrates alternative embodiments of the example operational flow 4400 of FIG. 44. FIG. 49 illustrates example embodiments where the presenting operation 4440 may include at least one additional operation. Additional operations may include operation 4900.

Operation 4900 depicts presenting the persona in response to the request for personal information, wherein the authenticity of the persona is vouched for by at least one of a telecommunications carrier, a bank, or a trusted personal information management service. For example, persona selection unit 4306 may present the persona in response to the request for personal information, wherein the authenticity of the persona is vouched for by at least one of a telecommunications carrier, a bank, or a trusted personal information management service. As in the previous example, persona creation module 4320 may presentation to party 4301 a persona from a trusted personal information management service such as a bank or telecommunication carrier with significant ability to guarantee transactions for at least small amounts of money. Other less-well established, known, and trusted personal information management services may be required to show some sort of security as a financial backing for the transaction to engender confidence in the party/vendor that a debt vouched for by the trusted personal information management service will in fact be paid.

FIG. 41 illustrates a partial view of an example article of manufacture 5000 that includes a computer program 5004 for executing a computer process on a computing device. An embodiment of the example article of manufacture 5000 is provided including a signal bearing medium 5002, and may include one or more instructions for accepting at least one request for personal information from a party to a transaction; one or more instructions for evaluating the transaction; one or more instructions for selecting a persona at least partly based on an evaluation of the transaction, wherein the persona is linked to a unique identifier that is at least partly based on a user's device-identifier data and the user's network-participation data; and one or more instructions for presenting the persona in response to the request for personal information. The one or more instructions may be, for example, computer executable and/or logic-implemented instructions. In one implementation, the signal-bearing medium 5002 may include a computer-readable medium 5006. In one implementation, the signal bearing medium 5002 may include a recordable medium 5008. In one implementation, the signal bearing medium 5002 may include a communications medium 5010.

FIG. 51 illustrates an example system 5100 in which embodiments may be implemented. The system 5100 includes a computing system environment. The system 5100 also illustrates a user 5112 using a device 5114, which is optionally shown as being in communication with a computing device 5102 by way of an optional coupling 5106. The optional coupling 5106 may represent a local, wide-area, or peer-to-peer network, or may represent a bus that is internal to a computing device (e.g., in example embodiments in which the computing device 5102 is contained in whole or in part within the device 5104). A storage medium 5108 may be any computer storage media. In one embodiment, the computing device 5102 may include a virtual machine operating within another computing device. In an alternative embodiment, the computing device 5102 may include a virtual machine operating within a program running on a remote server.

The computing device 5102 includes computer-executable instructions 5110 that when executed on the computing device 5102 cause the computing device 5102 to (a) accept at least one request for personal information from a party to a transaction; (b) evaluate the transaction; (c) select a persona at least partly based on an evaluation of the transaction, wherein the persona is linked to a unique identifier that is at least partly based on a user's device-identifier data and the user's network-participation data; and (d) present the persona in response to the request for personal information. As referenced above and as shown in FIG. 51, in some examples, the computing device 5102 may optionally be contained in whole or in part within the device 5104.

In FIG. 51, then, the system 5100 includes at least one computing device (e.g., 5102 and/or 5104). The computer-executable instructions 5110 may be executed on one or more of the at least one computing device. For example, the computing device 5102 may implement the computer-executable instructions 5110 and output a result to (and/or receive data from) the computing device 5104. Since the computing device 5102 may be wholly or partially contained within the computing device 5104, the device 5104 also may be said to execute some or all of the computer-executable instructions 5110, in order to be caused to perform or implement, for example, various ones of the techniques described herein, or other techniques.

The device 5104 may include, for example, a portable computing device, workstation, or desktop computing device. In another example embodiment, the computing device 5102 is operable to communicate with the device 5104 associated with the user 5112 to receive information about the input from the user 5112 for performing data access and data processing, and selection and presentation of a persona to the party/vendor to the transaction.

Verification of a Persona Linked to a Unique Identifier

FIG. 52 illustrates an example system 5200 in which embodiments may be implemented. The system 5200 includes a persona selection unit 5206. The persona selection unit 4306 may contain, for example, transaction evaluation module 5208, which may in turn contain transaction value analysis module 5210. Persona selection unit 5206 may also include, for example, personal information request acceptor module 5212, which in turn may include web page parser module 5214, which in turn may include X/Y coordinate web page reader 5216, web page image reader 5218, and/or screen scraper module 5219. Persona selection unit 5206 also may contain, for example, cost adjustment module 5228, condition-setting module 5230, party history evaluation module 5224, persona database 5250, persona verification unit 5252, and/or persona creation module 5220. Persona verification unit 5252 may communicate over a network or directly with persona custodian 5260 to access at least one persona that includes a unique identifier that is at least partly based on a first user's device-identifier data and the first user's network-participation data in the context of transaction 5202, to verify the persona by comparing the first user's device-identifier data and the first user's network-participation data of the unique identifier to a second user's device-identifier data and the second user's network-participation data, and to present the persona in response to a request for personal information.

Additionally, persona verification unit 5252 may access persona database 5250 to find personas from which to select, verify, and present according to the presently claimed inventions. Alternatively, persona verification unit 5252 may communicate with a persona custodian 5260 to access personas to validate and present according to the presently claimed inventions. In one embodiment, persona selection unit 5206 may create personas to access, verify, and present according to the presently claimed inventions, for example, using persona creation module 5220.

In FIG. 52, persona selection unit 5206 may accept a request for personal information 5203 directly from party 5201 or indirectly by inspection of transaction 5202, for example by viewing personal information fields on a web page related to the transaction.

In FIG. 52, the persona selection unit 5206 is illustrated as possibly being included within a system 5200. Of course, virtually any kind of computing device may be used to implement the special purpose persona selection unit 5206, such as, for example, a workstation, a desktop computer, a networked computer, a server, a collection of servers and/or databases, a virtual machine running inside a computing device, a mobile computing device, or a tablet PC.

Additionally, not all of the persona selection unit 5206 need be implemented on a single computing device. For example, the persona selection unit 5206 may be implemented and/or operable on a remote computer, while a user interface and/or local instance of the persona selection unit 5206 are implemented and/or occur on a local computer. Further, aspects of the persona selection unit 5206 may be implemented in different combinations and implementations than that shown in FIG. 52. For example, functionality of a user interface may be incorporated into the persona selection unit 5206 for the benefit of a user/purchaser or for personnel supervising transactions for an online vendor. The persona selection unit 5206 may perform simple data relay functions and/or complex data analysis, including, for example, fuzzy logic and/or traditional logic steps. Further, many methods of accessing and validating personas described herein or known in the art may be used, including, for example, algorithms commonly used in web page analysis may be used to determine a transaction scale and/or quality as a basis for accessing an appropriate persona linked to a unique identifier and containing an appropriate level of personal information for a transaction. In some embodiments, the persona selection unit 5206 may select a persona based on information about a transaction available as updates through a network.

Persona selection unit 5206 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

As referenced herein, the persona selection unit 5206 may be used to perform various data querying and/or recall techniques with respect to the request 5203, persona 5204, and/or the transaction 5202, in order to access and verify an appropriate persona. For example, where transaction 5202 elements are organized, keyed to, and/or otherwise accessible using one or more web page analysis tools, or the like, persona selection unit 5206 may employ various Boolean, statistical, and/or semi-boolean searching techniques to determine the appropriate level of information to include in a persona for it to be acceptable as an underpinning for a transaction. Similarly, for example, where user personal information is organized, keyed to, and/or otherwise accessible using one or more persona selection rulesets, various Boolean, statistical, and/or semi-boolean searching techniques may be performed by persona selection unit 4306 to access and verify an appropriate persona.

Many examples of databases and database structures may be used in connection with the persona selection unit 5206. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for verification of a persona and/or unique identifier; and/or for gathering and/or compiling data from the relational database (s).

For example, SQL or SQL-like operations over one or more personas 5204 and/or properties of transaction 5202 may be performed, or Boolean operations using personas 5204 and/or properties of transaction 5202 may be performed. For example, weighted Boolean operations may be performed in which different weights or priorities are assigned to one or more of the request 5203, persona 5204, and/or properties of transaction 5202, including various transaction identifier elements, locations, and/or contexts, perhaps relative to one another. For example, a number-weighted, exclusive-OR operation may be performed to request specific weightings of elements found on a check-out page of an e-commerce web page (e.g., email address, telephone number, mailing address, credit card information, dollar amount in cart, web site name, payment types).

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 53 illustrates an operational flow 5300 representing example operations related to verifying personal information during transactions. In FIG. 53 and in following figures that include various examples of operational flows, discussion and explanation may be provided with respect to the above-described system environments of FIG. 52, and/or with respect to other examples and contexts. However, it should be understood that the operational flows may be executed in a number of other environments and contexts including that of FIG. 58, and/or in modified versions of FIG. 52. Also, although the various operational flows are presented in the sequence(s) illustrated, it should be understood that the various operations may be performed in other orders than those which are illustrated, or may be performed concurrently.

After a start operation, operation 5310 depicts accessing at least one persona that includes a unique identifier that is at least partly based on a first user's device-identifier data and the first user's network-participation data. For example, persona selection unit 5206, personal information request acceptor module 5212, persona verification unit 5252, and/or web page parser module 5214 may access at least one persona that includes a unique identifier that is at least partly based on a first user's device-identifier data and the first user's network-participation data. In one embodiment, personal information request acceptor module 5212 may access a persona after accepting a request for name, phone number, email address, and credit card information during a transaction to purchase an app in an app store. The request 5203 may be in the form of an online transaction form having empty fields labeled for entry of personal information. In another example, web page parser module 5214 may access a persona in response to accepting markup language code (e.g., HTML or XML) or text corresponding to a transaction web page as the request for personal information 5203.

Operation 5220 depicts verifying the persona by comparing the first user's device-identifier data and the first user's network-participation data of the unique identifier to a second user's device-identifier data and the second user's network-participation data. For example, persona selection unit 5206, transaction evaluation module 5208, web page parser module 5214, persona verification unit 5252, and/or transaction value analysis module 5210 may verify the persona by comparing the first user's device-identifier data and the first user's network-participation data of the unique identifier to a second user's device-identifier data and the second user's network-participation data.

For some parties/vendors 5201, a minimal persona will provide enough trust in the credit-worthiness of the user, perhaps via a check with a telecommunications carrier that the name matches the telephone number. The unique identifier associated with the persona may provide an additional dimension with which a party 5201 may gain confidence in a user's identity and ability to complete payment in a transaction, particularly where it is verified against, for example, information about the unique identifier held by a telecommunications carrier or a bank.

In some embodiments, party 5201 will provide request 5203 to persona selection unit 5206. Personal information may be obtainable as a matter of course by persona selection unit 5206. For example, personal information of a user/purchaser may be directly provided to persona selection unit 5206 for the purpose of facilitating completion of transaction 5202, or alternatively, persona selection unit 5206 may indirectly access personal information of a user through access to various accounts, such as website accounts, bank accounts, social network accounts, or telecommunications accounts. In some embodiments, some of the personal information may be publicly available.

Operation 5330 depicts presenting the persona in response to a request for personal information. For example, persona selection unit 5206 and/or persona verification unit 5252 may present the persona in response to a request for personal information. In one embodiment, persona selection unit 4306 may present a verified persona linked to a unique identifier that matches the unique identifier of a second user, where the second user is making a purchase from a vendor. In this case, both personas may be linked to a unique identifier based on the same mobile phone's UDID and Facebook profile. In this scenario, the unique identifier may makes the user's identity known to the telecommunications carrier, but not to the party 5201 to the transaction. Accordingly, the telecommunications carrier may provide security for the transaction in this example based on their knowledge about the second user's verified identity, even where that identity is not presented to party 5201 to the transaction.

FIG. 54 illustrates alternative embodiments of the example operational flow 5300 of FIG. 53. FIG. 54 illustrates example embodiments where the accessing operation 5310 may include at least one additional operation. Additional operations may include operation 5400, 5402, 5404, and/or operation 5406.

Operation 5400 depicts accessing at least one persona that includes a unique identifier that is at least partly based on a first user's device-identifier data and the first user's network-participation data in response to a vendor's request for personal information. For example, persona selection unit 5206, persona verification unit 5252, and/or personal information request acceptor module 5212 may access at least one persona that includes a unique identifier that is at least partly based on a first user's device-identifier data and the first user's network-participation data in response to a vendor's request for personal information. In one embodiment, personal information request acceptor module 5212 may access a persona in response to an interaction of the second user with a checkout web page having fields for name, telephone number, email address, and credit card information for the purchase of an MP3 file from the iTunes store.

Operation 5402 depicts accessing at least one persona that includes a unique identifier that is at least partly based on a first user's device-identifier data and the first user's network-participation data, wherein the unique identifier represents a verified real-world user. For example, persona selection unit 5206, persona verification unit 5252, and/or personal information request acceptor module 5212 may access at least one persona that includes a unique identifier that is at least partly based on a first user's device-identifier data and the first user's network-participation data, wherein the unique identifier represents a verified real-world user. For example, personal information request acceptor module 5212 may accept a request from eBay to provide more information where a user left a required field blank on an eBay auction page. Access to the auction may be then be obtained, for example, by accessing, verifying, and presenting a verified persona to satisfy identification requirements of eBay. In some embodiments, party 5201 may send a message to persona selection unit 5206, telling it that it needs more personal information for a transaction, the message perhaps including a URL or other venue for the transaction, from which persona selection unit 5206 can extract the information necessary to evaluate the transaction, access, verify, and present an appropriate verified persona to secure the transaction. Such a message may be sent by voice, text, touch, or other user interface mechanism. In some instances the persona selection unit 5206 will be invisible or transparent to party 5201, except for the presentation of a persona.

Operation 5404 depicts accessing at least one persona that includes a unique identifier that is at least partly based on a first user's device-identifier data and the first user's network-participation data, wherein the first user's device-identifier data includes at least one of a UDID, MAC address, SIM data, IP address, or IMEI for a device of the first user. For example, persona selection unit 5206, persona verification unit 5252, and/or personal information request acceptor module 5212 may access at least one persona that includes a unique identifier that is at least partly based on a first user's device-identifier data and the first user's network-participation data, wherein the first user's device-identifier data includes at least one of a UDID, MAC address, SIM data, IP address, or IMEI for a device of the first user.

Operation 5406 depicts accessing at least one persona that includes a unique identifier that is at least partly based on a first user's device-identifier data and the first user's network-participation data, wherein the first user's network-participation data includes at least one of a Facebook information, Twitter information, LinkedIn information, or gmail information of the first user. For example, persona selection unit 5206, persona verification unit 5252, and/or personal information request acceptor module 5212 may access at least one persona that includes a unique identifier that is at least partly based on a first user's device-identifier data and the first user's network-participation data, wherein the first user's network-participation data includes at least one of a Facebook information, Twitter information, LinkedIn information, or gmail information of the first user.

FIG. 55 illustrates alternative embodiments of the example operational flow 5300 of FIG. 53. FIG. 55 illustrates example embodiments where the verifying operation 5320 may include at least one additional operation. Additional operations may include operation 5500 and/or operation 5502.

Operation 5500 depicts verifying the persona by comparing the first user's device-identifier data and the first user's network-participation data of the unique identifier to a second user's device-identifier data and the second user's network-participation data, wherein the first user and the second user are the same person. For example, persona selection unit 5206 and/or persona verification unit 5252 may verify the persona by comparing the first user's device-identifier data and the first user's network-participation data of the unique identifier to a second user's device-identifier data and the second user's network-participation data, wherein the first user and the second user are the same person.

Operation 5500 depicts verifying the persona by comparing the first user's device-identifier data and the first user's network-participation data of the unique identifier to a second user's device-identifier data and the second user's network-participation data, wherein the first user and the second user are the different people. For example, persona selection unit 5206 and/or persona verification unit 5252 may verify the persona by comparing the first user's device-identifier data and the first user's network-participation data of the unique identifier to a second user's device-identifier data and the second user's network-participation data, wherein the first user and the second user are the different people.

FIG. 56 illustrates alternative embodiments of the example operational flow 5300 of FIG. 53. FIG. 56 illustrates example embodiments where the presenting operation 5330 may include at least one additional operation. Additional operations may include operation 5600, 5602, 5604, 5606, and/or operation 5608.

Operation 5600 depicts presenting the persona on behalf of the second user in response to a request for personal information, wherein the persona serves as credit for a transaction cost. For example, persona selection unit 5206 and/or persona verification unit 5252 may present the persona on behalf of the second user in response to a request for personal information, wherein the persona serves as credit for a transaction cost. In one embodiment, a trusted custodian of a verified persona and/or a verified unique identifier, upon receipt of a request from a user and verification of the user's identity, may vouch for the integrity of the persona in a transaction. This process allows a user to maintain a repository for her personal information at the custodian (who is trusted), who in turn may vouch for a persona and provide security for a transaction. In this way a user may avoid spreading her sensitive personal information among online merchants, some of whom may not protect her personal information carefully. Additionally, the custodian may provide security to a vendor that a debt will be paid, thereby allowing for the persona to serve as credit in a transaction.

As discussed above, high dollar value transactions will require that detailed personal information be provided as security for the transaction, but a large range of intermediate dollar value transactions may benefit from a smart system of providing as little personal information possible during the transaction. This will benefit both a user/purchaser in terms of minimizing transfer of personal information, and also the party 5201/vendor, who will save potentially save time and administrative costs if transactions are streamlined according to the instant disclosure.

Operation 5602 depicts presenting the persona in response to a request for personal information, including an indication that the persona is verified with respect to the second user. For example, persona selection unit 5206 and/or persona verification unit 5252 may present the persona in response to a request for personal information, including an indication that the persona is verified with respect to the second user.

Operation 5604 depicts presenting the persona in response to a request for personal information, including an indication that the persona is not verified with respect to the second user. For example, persona selection unit 5206 and/or persona verification unit 5252 may present the persona in response to a request for personal information, including an indication that the persona is not verified with respect to the second user. In one embodiment, where the unique identifiers of the first user and the second user do not match, an indication that the identity of the second user is not verified may be presented with or instead of the persona.

Operation 5606 depicts presenting the persona in response to a request for personal information, including an indication that the persona is verified with respect to the second user by a telecommunications carrier. For example, persona selection unit 5206 and/or persona verification unit 5252 may present the persona in response to a request for personal information, including an indication that the persona is verified with respect to the second user by a telecommunications carrier. In one embodiment, persona verification unit 5252 may access, verify, and present a persona that was verified using one or more unique identifiers from Verizon as the persona custodian 5260, where Verizon has compiled a white pages of users across telecommunication carrier networks indexed by unique identifiers based on device identifier information and network participation information, as discussed above. In some embodiments, persona selection unit 5206 and/or persona verification unit 5252 may be operated by Verizon; in other embodiments, persona selection unit 5206 and/or persona verification unit 5252 may be operated by a trusted third party personal information management service that may, for example, pay Verizon a nominal fee as the custodian of a set of personas for access to the personas (and perhaps to the index of unique identifiers).

Operation 5608 depicts presenting the persona in response to a request for personal information, including an indication that the persona is verified with respect to the second user by a bank. For example, persona selection unit 5206 and/or persona verification unit 5252 may present the persona in response to a request for personal information, including an indication that the persona is verified with respect to the second user by a bank. In one embodiment, persona selection unit 5206 and/or persona verification unit 5252 may present a verified persona that was verified using a unique identifier held by a bank as a fiduciary for the first user. Such a fiduciary entity may take strong steps to shield itself and the personal information of the first user as much as possible from cloud-based data vulnerabilities. In this way a user's personal information may be safeguarded in comparison to large, non-fiduciary, cloud-based data storage modes that may be vulnerable to failure, hacking, viruses, malware, and/or worms.

FIG. 57 illustrates a partial view of an example article of manufacture 5700 that includes a computer program 5704 for executing a computer process on a computing device. An embodiment of the example article of manufacture 5700 is provided including a signal bearing medium 5702, and may include one or more instructions for accessing at least one persona that includes a unique identifier that is at least partly based on a first user's device-identifier data and the first user's network-participation data; one or more instructions for verifying the persona by comparing the first user's device-identifier data and the first user's network-participation data of the unique identifier to a second user's device-identifier data and the second user's network-participation data; and one or more instructions for presenting the persona in response to a request for personal information. The one or more instructions may be, for example, computer executable and/or logic-implemented instructions. In one implementation, the signal-bearing medium 5702 may include a computer-readable medium 5706. In one implementation, the signal bearing medium 5702 may include a recordable medium 5708. In one implementation, the signal bearing medium 5702 may include a communications medium 5710.

FIG. 58 illustrates an example system 5800 in which embodiments may be implemented. The system 5800 includes a computing system environment. The system 5800 also illustrates a user 5812 using a device 5814, which is optionally shown as being in communication with a computing device 5802 by way of an optional coupling 5806. The optional coupling 5806 may represent a local, wide-area, or peer-to-peer network, or may represent a bus that is internal to a computing device (e.g., in example embodiments in which the computing device 5802 is contained in whole or in part within the device 5804). A storage medium 5808 may be any computer storage media. In one embodiment, the computing device 5802 may include a virtual machine operating within another computing device. In an alternative embodiment, the computing device 5802 may include a virtual machine operating within a program running on a remote server.

The computing device 5802 includes computer-executable instructions 5810 that when executed on the computing device 5802 cause the computing device 5802 to (a) access at least one persona that includes a unique identifier that is at least partly based on a first user's device-identifier data and the first user's network-participation data; (b) verify the persona by comparing the first user's device-identifier data and the first user's network-participation data of the unique identifier to a second user's device-identifier data and the second user's network-participation data; and (c) present the persona in response to a request for personal information. As referenced above and as shown in FIG. 58, in some examples, the computing device 5802 may optionally be contained in whole or in part within the device 5804.

In FIG. 58, then, the system 5800 includes at least one computing device (e.g., 5802 and/or 5804). The computer-executable instructions 5810 may be executed on one or more of the at least one computing device. For example, the computing device 5802 may implement the computer-executable instructions 5810 and output a result to (and/or receive data from) the computing device 5804. Since the computing device 5802 may be wholly or partially contained within the computing device 5804, the device 5804 also may be said to execute some or all of the computer-executable instructions 5810, in order to be caused to perform or implement, for example, various ones of the techniques described herein, or other techniques.

The device 5804 may include, for example, a portable computing device, workstation, or desktop computing device. In another example embodiment, the computing device 5802 is operable to communicate with the device 5804 associated with the user 5812 to receive information about the input from the user 5812 for performing data access and data processing, and verification and presentation of a persona to, e.g., the party/vendor to a transaction.

Double-Encryption and Anonymous Storage

FIG. 59 illustrates an example system in which embodiments may be implemented. FIG. 59 includes user 5900 interacting with a user interface 5904 that accepts a user identifier, here "Private Citizen." It should be understood that the user identifier can be anything: name, number, symbol, biometric, or signature. It can be anything that can identify user 5900 and a specific instance of data for encryption. User interface 5904 may be implemented by a user identifier encryption entity 5906, e.g., "Name-to-Keyco." The user identifier encryption entity 5906 or Name-to-Keyco may encrypt "Private Citizen" using public key cryptography, resulting in "Encrypted-Name." The public key cryptography used may be traditional, involving certificated public keys; or it may be a kind of pseudo-public key cryptography, in which the public keys may not be made public, and/or in which the private keys may be held by the holder of the public keys.

Every instance of user data 5902 to be stored securely and anonymously could be given a different user identifier by the user identifier encryption entity (e.g., a variant of "Encrypted Name" by Name-to-Keyco) at the time each encryption/storage request is initiated.

Upon receipt of an instance of user data 5902 to be encrypted from a user 5900, user identifier encryption entity 5906 may coordinate with a level-one encryption entity 5912 to associate the encrypted user identifier, e.g., "Encrypted-Name," with level-one encrypted data 5916. Level-one encrypted data 5916 is data that has been encrypted once, for example via public key cryptography. For security reasons, it is desirable that at least decryption keys are not shared between user identifier encryption entity 5906 (which encrypted the user identifier and/or information about the data to be encrypted other than its content) and the level-one encryption entity 5912 (which encrypted the user data 5902). However, in some implementations, level-one encryption entity 5912 may be the same as user identifier encryption entity 5906, to facilitate the coordination or tracking of encrypted data and encrypted/hashed user identifiers through level-two encryption and storage. User data 5902 may be deleted subsequent to this level-one encryption.

The encrypted user identifier 5908, e.g., "Encrypted-Name," may be associated with the level-one encrypted data 5916 by either user identifier encryption entity 5906 or level-one encryption entity 5912. Typically the association will involve attachment of the encrypted user identifier 5908 to the level-one encrypted data 5916 as metadata, for example, descriptive metadata.

In various embodiments, an opaque (e.g., encrypted) user identifier (e.g., "Encrypted-Name") could be outside or inside the first encryption and/or second encryption; but typically it will stay outside encryption. That is, as, e.g., metadata, the encrypted user identifier 5908 may not be encrypted by, e.g., level-one encryption entity 5912 when it encrypts user data 5902, but will instead remain associated "outside" the encryption of user data 5902.

Level-one encryption entity 5912 may then send the level-one encrypted data 5916 and associated encrypted user identifier 5908 to a level-two encryption entity 5918 for a second level of encryption, e.g., using public key cryptography or the pseudo-public key cryptography described above, e.g., using level-two pseudo-public key 5919. At this time, level-two encryption entity 5918 may receive a hash or one-way hash 5922 of encrypted user identifier 5908, e.g., "Encrypted-Name." The hash or one-way hash 5922 of the encrypted user identifier 5908 may be created by user identifier encryption entity 5906 (see 5910). The one-way hash 5922 may be attached as metadata to level-two encrypted data 5924, for example by substitution of the attached metadata "Encrypted-Name." Identification of the correct level-one encrypted data 5916 and one-way hash 5922 pair may be coordinated through level-one encryption entity 5912, or preferably, Name-to-Keyco may give to the level-two encryptor 5918 the association between Encrypted-Name and the one-way hash 5922, in which case encrypted user identifier 5908 (Encrypted-Name) may be used as the identifier by level-two encryptor 5918 to pair level-two encrypted data 5924 and the hash that encodes the source of that data. Level-two encryptor 5918 may or may not then purge its records of the association between encrypted user identifier 5908 and one-way hash 5922.

After pairing level-two encrypted data 5924 and one-way hash 5922, level-two encryptor 5918 may send both pieces, with one-way hash 5922 associated with level-two encrypted data 5924, as e.g., metadata, to encrypted data repository 5926. The repository may be run by a data services company, a telecommunications company, a bank, a government entity, or other trusted storage service provider.

Encrypted data repository 5926 may store the one-way hash 5922 associated with level-two encrypted data 5924 in a secure "double-encrypted lockbox" 5928. Encrypted data repository 5926 may index the contents of the double-encrypted lockbox according to one-way hash 5922, level-two encrypted data 5924, or some other feature of the received encrypted data.

Upon receiving a request (and optionally authentication of the request) for retrieval of the one-way hash 5922 associated with level-two encrypted data 5928 in the double-encrypted lockbox, encrypted data repository 5926 may send one-way hash 5922 associated with level-two encrypted data 5924 back to level-two encryptor 5918 for level-two decryption 5938. In this situation, if the relationship between one-way hash 5922 and encrypted user identifier 5908 had been purged by level-two encryptor 5918 as described above, level-two encryptor 5918 may need to consult user identifier encryption entity 5906, e.g., Name-to-Keyco to re-establish "Encrypted-Name" as the associated metadata, which in this instance functions as a key-pair designator, allowing level-two decryptor 5938 to find the appropriate private key in its possession for decryption of the level-two encrypted data 5924.

The encrypted user identifier, e.g., "Encrypted Name" may serve as a key-pair designator attached to the level-two encrypted data by Double Encrypt Co, e.g., as metadata. After retrieval, this allows Double Encrypt Co to match a private key with the corresponding retrieved level-two encrypted data. This works because Double Encrypt Co generated the key pair for level-two encryption/decryption, and can therefore associate the private key for decryption with "Encrypted Name," e.g. Alternatively, the one-way hash 5922 may be used for this purpose.

In other words, the one-way hash 5922 may be associated in Double Encrypt Co's records with either a key-pair for decryption of the specific level-two encrypted data (e.g., as a key-pair designator) or the encrypted user identifier (e.g., "Encrypted-Name") directly as a key-pair designator according to, e.g., public key cryptography.

Because a user may ask for their double-encrypted lockboxes days or years after they deposit them in an encrypted data repository, there will either need to be tracking/storage of the key pairs for first/second encryptions or cycling of the key pairs. For example, for decryption, cycling of the key pairs involves trial and error use of private keys to find the one that works.

Next, after level-two-decryption 5938, level-one decrypted data 5942 with attached "Encrypted-Name" (e.g., as metadata) may be sent for level-one decryption 5944 via, e.g., public key cryptography, perhaps using pseudo-private key 5946. At this point, encrypted user identifier 5908, e.g., "Encrypted-Name" may be decrypted using, e.g., a private key of a public-private key pair generated by software created by the user identifier encryption entity 5906, e.g., Name-to-Keyco. User 5900 at her machine may request that Name-to-Keyco send the private key to decrypt "Encrypted-Name"; alternatively, the "Encrypted-Name" portion could be given to Name-to-Keyco for them to cycle through their keys to find the private key that unlocks the "Encrypted-Name" as described above. Ultimately user 5900 receives her original data from storage, as unencrypted cleartext.

Name-to-Keyco could use this same technique to create an opaque identifier for basically any metadata, such as dates, time stamps, device identifiers, financial accounts, etc. so that the repository entity ultimately storing the doubly encrypted data, e.g., Trustco could see but not understand the content and source of the data.

As used herein, public-key cryptography may refer to a system requiring two separate keys, one of which is secret and one of which is public. Although different, the two parts of the key pair are mathematically linked. One key locks or encrypts the cleartext, and the other unlocks or decrypts the encrypted text. Neither key can perform both functions by itself. The public key may be published without compromising security, while the private key must not be revealed to anyone not authorized to read the messages.

Public-key cryptography uses asymmetric key algorithms and can also be referred to by the more generic term "asymmetric key cryptography." The algorithms used for public key cryptography are based on mathematical relationships (the most notable ones being the prime integer factorization and discrete logarithm problems) that presumably have no efficient solution. Although it is computationally easy for the intended recipient to generate the public and private keys, to decrypt the message using the private key, and easy for the sender to encrypt the message using the public key, it is extremely difficult (or effectively impossible) for anyone to derive the private key, based only on their knowledge of the public key. This is why, unlike symmetric key algorithms, a public key algorithm does not require a secure initial exchange of one (or more) secret keys between the sender and receiver. The use of these algorithms also allows the authenticity of a message to be checked by creating a digital signature of the message using the private key, which can then be verified by using the public key. In practice, only a hash of the message is typically encrypted for signature verification purposes.

As used herein, a hash may refer to an algorithm that takes an arbitrary block of data and returns a fixed-size bit string, the cryptographic hash value, such that any (accidental or intentional) change to the data will (with very high probability) change the hash value. Some well known hash functions include well-known hash functions, including MD4, MD5, SHA-1, and SHA-2. A one-way hash is one for which it is impossible or nearly impossible to derive the original text from the hash string.

Operational/Functional Language Herein Describes Machines/Machine Control/Machine-Controlled Processes Unless Context Dictates Otherwise The claims, description, and drawings of this application may describe one or more of the instant technologies in operational/functional language, for example as a set of operations to be performed by a computer. Such operational/functional description in most instances would be understood by one skilled in the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations. The logical operations/functions described herein are a distillation of machine specifications or other physical mechanisms specified by the operations/functions such that the otherwise inscrutable machine specifications may be comprehensible to the human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very High speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc. For example, a high-level programming language is a programming language with strong abstraction, e.g., multiple levels of abstraction, from the details of the sequential organizations, states, inputs, outputs, etc., of the machines that a highlevel programming language actually specifies. See, e.g., Wikipedia, High-level programming language, http://en.wikipedia.org/wiki/Highlevelprogramming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction). It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language. This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood with the mechanism powered by cranking a handle.

Thus, far from being understood as an abstract idea, those skilled in the art will recognize a functional/operational technical description as a humanlyunderstandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware).

Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although a user may be shown/described herein as a single illustrated figure, those skilled in the art will appreciate that any user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Century Link, Southwestern Bell, etc.), or (g) a wired/wireless services entity (e.g., Sprint, Verizon, AT&T, etc.), etc.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT) (URL included merely to provide written description). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT) (URL included merely to provide written description).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT) (URL included merely to provide written description).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT) (URL included merely to provide written description).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT) (URL included merely to provide written description).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet are incorporated herein by reference, to the extent not inconsistent herewith.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   circuitry for accepting from a user identifier encryption entity at least one encrypted identifier corresponding to a user having at least one instance of data for encryption;
   circuitry for encrypting the at least one instance of data to produce level-one-encrypted data, the circuitry for encrypting configured to perform the encrypting of the at least one instance of data at least partly with a level-one asymmetric encryption key;
   circuitry for associating the at least one encrypted identifier with the level-one-encrypted data, wherein a level-one decryption key for the level-one-encrypted data is inaccessible to the user identifier encryption entity, and wherein the level-one decryption key is an asymmetric decryption key that is not the same key as the level-one asymmetric encryption key; and
   circuitry for transmitting the level-one-encrypted data and associated encrypted identifier.

2. The system of claim 1 wherein the circuitry for accepting from a user identifier encryption entity at least one encrypted identifier corresponding to a user having at least one instance of data for encryption comprises:
   circuitry for accepting from a user identifier encryption entity an encrypted version of at least one of a device identifier, a username, a real name, an alias, a unique identifier, a date, a date and time, or biometric data as at least a portion of the at least one encrypted identifier corresponding to a human user.

3. The system of claim 2 wherein the circuitry for accepting from a user identifier encryption entity an encrypted version of at least one of a device identifier, a username, a real name, an alias, a unique identifier, a date, a date and time, or biometric data as at least a portion of the at least one encrypted identifier corresponding to a human user comprises:
   circuitry for accepting from a user identifier encryption entity at least one hash corresponding to at least one of a device identifier, a username, a real name, an alias, a unique identifier, a date, a date and time, or biometric data.

4. The system of claim 1 wherein the circuitry for accepting from a user identifier encryption entity at least one encrypted identifier corresponding to a user having at least one instance of data for encryption comprises:
   circuitry for accepting from a user identifier encryption entity at least one encrypted persona corresponding to a user having at least one instance of data for encryption.

5. The system of claim 1 wherein the circuitry for encrypting the at least one instance of data to produce level-one-encrypted data, the circuitry for encrypting configured to perform the encrypting of the at least one instance of data at least partly with a level-one asymmetric encryption key comprises:
   circuitry for encrypting the at least one instance of data via public key cryptography.

6. The system of claim 5 wherein the circuitry for encrypting the at least one instance of data via public key cryptography comprises:
   circuitry for encrypting the at least one instance of data using a certificated public key.

7. The system of claim 6 wherein the circuitry for encrypting the at least one instance of data using a certificated public key comprises:
   circuitry for encrypting the at least one instance of data using an RSA key.

8. The system of claim 1 wherein the circuitry for encrypting the at least one instance of data to produce level-one-encrypted data, the circuitry for encrypting configured to perform the encrypting of the at least one instance of data at least partly with a level-one asymmetric encryption key comprises:
   circuitry for encrypting the at least one instance of data using a public key that is not held by a certificating authority.

9. The system of claim 1 wherein the circuitry for encrypting the at least one instance of data to produce level-one-encrypted data, the circuitry for encrypting configured to perform the encrypting of the at least one instance of data at least partly with a level-one asymmetric encryption key comprises:
   circuitry for encrypting the at least one instance of data to produce level-one-encrypted data, wherein the circuitry for encrypting is further configured to delete the at least one instance of data subsequent to producing the level-one-encrypted data.

10. The system of claim 1 wherein the circuitry for associating the at least one encrypted identifier with the level-one-encrypted data, wherein a level-one decryption key for the level-one-encrypted data is inaccessible to the user identifier encryption entity, and wherein the level-one decryption key is an asymmetric decryption key that is not the same key as the level-one asymmetric encryption key comprises:
   circuitry for associating as metadata the at least one encrypted identifier with the level-one-encrypted data, and wherein a level-one decryption key for the level-one-encrypted data is inaccessible to the user identifier encryption entity.

11. The system of claim 1 wherein the circuitry for associating the at least one encrypted identifier with the level-one-encrypted data, wherein a level-one decryption key for the level-one-encrypted data is inaccessible to the user identifier encryption entity, and wherein the level-one decryption key is an asymmetric decryption key that is not the same key as the level-one asymmetric encryption key comprises:
circuitry for associating as descriptive metadata the at least one encrypted identifier with the level-one-encrypted data, wherein a level-one decryption key is inaccessible to the user identifier encryption entity, and further wherein the encrypted identifier functions as a key-pair designator for a level-one-encryption entity.

12. The system of claim 11 wherein the circuitry for associating as descriptive metadata the at least one encrypted identifier with the level-one-encrypted data, wherein a level-one decryption key is inaccessible to the user identifier encryption entity, and further wherein the encrypted identifier functions as a key-pair designator for a level-one-encryption entity comprises:
circuitry for associating as descriptive metadata the at least one encrypted identifier with the level-one-encrypted data, wherein a level-one decryption key is inaccessible to the user identifier encryption entity, and wherein the encrypted identifier functions as a key-pair designator for a level-one-encryption entity, and further wherein a decryption key for decrypting the encrypted identifier is inaccessible to the level-one-encryption entity.

13. The system of claim 1 wherein the circuitry for transmitting the level-one-encrypted data and associated encrypted identifier comprises:
circuitry for transmitting the level-one-encrypted data and associated encrypted identifier to a level-two-encryption entity.

14. A computer-implemented method comprising:
accepting from a user identifier encryption entity at least one encrypted identifier corresponding to a user having at least one instance of data for encryption;
encrypting the at least one instance of data to produce level-one-encrypted data, the encrypting being performed on the at least one instance of data at least partly with a level-one asymmetric encryption key;
associating the at least one encrypted identifier with the level-one-encrypted data, wherein a level-one decryption key for the level-one-encrypted data is inaccessible to the user identifier encryption entity, and wherein the level-one decryption key is an asymmetric decryption key that is not the same key as the level-one asymmetric encryption key; and
transmitting the level-one-encrypted data and associated encrypted identifier; and
wherein at least one of the accepting, the encrypting, the associating, or the transmitting is performed at least partly with one or more processing devices.

15. A computer program product comprising:
an article of manufacture including a non-transitory signal-bearing medium bearing:
(1) one or more instructions for accepting from a user identifier encryption entity at least one encrypted identifier corresponding to a user having at least one instance of data for encryption;
(2) one or more instructions for encrypting the at least one instance of data to produce level-one-encrypted data, the one or more instructions for encrypting configured to perform the encrypting of the at least one instance of data at least partly with a level-one asymmetric encryption key;
(3) one or more instructions for associating the at least one encrypted identifier with the level-one-encrypted data, wherein a level-one decryption key for the level-one-encrypted data is inaccessible to the user identifier encryption entity, and wherein the level-one decryption key is an asymmetric decryption key that is not the same key as the level-one asymmetric encryption key; and
(4) one or more instructions for transmitting the level-one-encrypted data and associated encrypted identifier.

16. The computer program product of claim 15, wherein the non-transitory signal-bearing medium comprises:
a computer-readable medium;
a recordable medium; or
a communications medium.

17. A system comprising:
a computing device; and instructions that when executed on the computing device cause the computing device to:
(1) accept from a user identifier encryption entity at least one encrypted identifier corresponding to a user having at least one instance of data for encryption;
(2) encrypt the at least one instance of data to produce level-one-encrypted data, the encrypting of the at least one instance of data being at least partly performed with a level-one asymmetric encryption key;
(3) associate the at least one encrypted identifier with the level-one-encrypted data, wherein a level-one decryption key for the level-one-encrypted data is inaccessible to the user identifier encryption entity, and wherein the level-one decryption key is an asymmetric decryption key that is not the same key as the level-one asymmetric encryption key; and
(4) transmit the level-one-encrypted data and associated encrypted identifier.

18. The system of claim 17 wherein the computing device comprises:
at least one of a personal digital assistant (PDA), a personal entertainment device, a mobile phone, a laptop computer, a tablet personal computer, a networked computer, a computing system comprised of a cluster of processors, a computing system comprised of a cluster of servers, a workstation computer, or a desktop computer.

19. A system comprising:
means for accepting from a user identifier encryption entity at least one encrypted identifier corresponding to a user having at least one instance of data for encryption;
means for encrypting the at least one instance of data to produce level-one-encrypted data, the means for encrypting configured to perform the encrypting of the at least one instance of data at least partly with a level-one asymmetric encryption key;
means for associating the at least one encrypted identifier with the level-one-encrypted data, wherein a level-one decryption key for the level-one-encrypted data is inaccessible to the user identifier encryption entity, and wherein the level-one decryption key is an asymmetric decryption key that is not the same key as the level-one asymmetric encryption key; and
means for transmitting the level-one-encrypted data and associated encrypted identifier.

20. The system of claim 1, wherein the asymmetric encryption key is a public key associated with asymmetric key cryptography.

21. The system of claim 20, wherein the asymmetric decryption key is a private key associated with asymmetric key cryptography.

22. The system of claim 1 wherein the asymmetric encryption key and the asymmetric decryption key together form a public-private key pair.

\* \* \* \* \*